(12) United States Patent
McMillen et al.

(10) Patent No.: US 10,352,787 B2
(45) Date of Patent: Jul. 16, 2019

(54) SENSOR SYSTEMS INTEGRATED WITH FOOTWEAR

(71) Applicant: BeBop Sensors, Inc., Berkeley, CA (US)

(72) Inventors: Keith A. McMillen, Berkeley, CA (US); Gregory Wille, Berkeley, CA (US); Daniel Eric McAnulty, Oakland, CA (US)

(73) Assignee: BeBop Sensors, Inc., Berkeley, CA (US)

( * ) Notice: Subject to any disclaimer, the term of this patent is extended or adjusted under 35 U.S.C. 154(b) by 0 days.

(21) Appl. No.: 15/835,131

(22) Filed: Dec. 7, 2017

(65) Prior Publication Data

US 2018/0094991 A1     Apr. 5, 2018

Related U.S. Application Data

(63) Continuation of application No. 15/052,293, filed on Feb. 24, 2016, now Pat. No. 9,863,823.

(60) Provisional application No. 62/126,137, filed on Feb. 27, 2015.

(51) Int. Cl.
| | | |
|---|---|---|
| *G01L 1/00* | (2006.01) | |
| *G01L 1/18* | (2006.01) | |
| *G01L 1/06* | (2006.01) | |
| *A43B 3/00* | (2006.01) | |
| *G01L 1/20* | (2006.01) | |

(52) U.S. Cl.
CPC .............. *G01L 1/18* (2013.01); *A43B 3/0005* (2013.01); *G01L 1/06* (2013.01); *G01L 1/205* (2013.01); *G01L 1/005* (2013.01)

(58) Field of Classification Search
CPC ......... A43B 3/0005; G01L 1/06; G01L 1/005; G01L 1/18
USPC ........................................... 73/774
See application file for complete search history.

(56) References Cited

U.S. PATENT DOCUMENTS

| | | |
|---|---|---|
| 4,294,014 A | 10/1981 | Baumann et al. |
| 4,438,291 A | 3/1984 | Eichelberger et al. |
| 4,489,302 A | 12/1984 | Eventoff |
| 4,693,530 A | 9/1987 | Stillie et al. |
| 4,745,301 A | 5/1988 | Michalchik |
| 4,790,968 A | 12/1988 | Ohkawa et al. |
| 4,852,443 A | 8/1989 | Duncan et al. |
| 5,033,291 A | 7/1991 | Podoloff et al. |
| 5,128,880 A | 7/1992 | White |
| 5,131,306 A | 7/1992 | Yamamoto |
| 5,159,159 A | 10/1992 | Asher |

(Continued)

FOREIGN PATENT DOCUMENTS

| | | |
|---|---|---|
| CN | 200980381 Y | 11/2007 |
| CN | 201920728 U | 8/2011 |

(Continued)

OTHER PUBLICATIONS

U.S. Office Action dated Sep. 12, 2012 issued in U.S. Appl. No. 12/904,657.

(Continued)

*Primary Examiner* — Max H Noori
(74) *Attorney, Agent, or Firm* — Weaver Austin Villeneuve & Sampson LLP

(57) ABSTRACT

Sensors and sensor systems incorporating piezoresistive materials for integration with footwear are described.

30 Claims, 25 Drawing Sheets

(56) References Cited

U.S. PATENT DOCUMENTS

| | | |
|---|---|---|
| 5,219,292 A | 6/1993 | Dickirson et al. |
| 5,237,520 A | 8/1993 | White |
| 5,288,938 A | 2/1994 | Wheaton |
| 5,316,017 A | 5/1994 | Edwards et al. |
| 5,386,720 A | 2/1995 | Toda et al. |
| 5,429,092 A | 7/1995 | Kamei |
| 5,571,973 A | 11/1996 | Taylot |
| 5,578,766 A | 11/1996 | Kondo |
| 5,624,132 A | 4/1997 | Blackburn et al. |
| 5,659,395 A | 8/1997 | Brown et al. |
| 5,695,859 A | 12/1997 | Burgess |
| 5,729,905 A | 3/1998 | Mathiasmeier et al. |
| 5,822,223 A | 10/1998 | Genest |
| 5,866,829 A | 2/1999 | Pecoraro |
| 5,878,359 A | 3/1999 | Takeda |
| 5,943,044 A | 8/1999 | Martinelli et al. |
| 5,989,700 A | 11/1999 | Krivopal |
| 6,029,358 A | 2/2000 | Mathiasmeier et al. |
| 6,032,109 A | 2/2000 | Ritmiller, III |
| 6,049,327 A | 4/2000 | Walker et al. |
| 6,087,930 A | 7/2000 | Kulka et al. |
| 6,121,869 A | 9/2000 | Burgess |
| 6,141,643 A | 10/2000 | Harmon |
| 6,155,120 A * | 12/2000 | Taylor ............... A61B 5/1036 |
| | | 73/862.046 |
| 6,215,055 B1 | 4/2001 | Saravis |
| 6,216,545 B1 | 4/2001 | Taylor |
| 6,304,840 B1 | 10/2001 | Vance et al. |
| 6,331,893 B1 | 12/2001 | Brown et al. |
| 6,360,615 B1 | 3/2002 | Smela |
| 6,452,479 B1 | 9/2002 | Sandbach |
| 6,486,776 B1 | 11/2002 | Pollack et al. |
| 6,687,523 B1 | 2/2004 | Jayaramen et al. |
| 6,763,320 B2 | 7/2004 | Kimble |
| 6,815,602 B2 | 11/2004 | De Franco |
| 6,822,635 B2 | 11/2004 | Shahoian et al. |
| 6,829,942 B2 | 12/2004 | Yanai et al. |
| 6,964,205 B2 | 11/2005 | Papakostas et al. |
| 7,037,268 B1 | 5/2006 | Sleva et al. |
| 7,066,887 B2 | 6/2006 | Flesch et al. |
| 7,109,068 B2 | 9/2006 | Akram et al. |
| 7,113,856 B2 | 9/2006 | Theiss et al. |
| 7,138,976 B1 | 11/2006 | Bouzit et al. |
| 7,157,640 B2 | 1/2007 | Baggs |
| 7,302,866 B1 | 12/2007 | Malkin et al. |
| 7,311,009 B2 | 12/2007 | Kotovsky |
| 7,332,670 B2 | 2/2008 | Fujiwara et al. |
| 7,409,256 B2 | 8/2008 | Lin et al. |
| 7,439,465 B2 | 10/2008 | Parkinson |
| 7,493,230 B2 | 2/2009 | Schwartz et al. |
| 7,536,794 B2 | 5/2009 | Hay et al. |
| 7,584,666 B2 | 9/2009 | Kim et al. |
| 7,608,776 B2 | 10/2009 | Ludwig |
| 7,719,007 B2 | 5/2010 | Tompkins et al. |
| 7,726,199 B2 | 6/2010 | Shkel et al. |
| 7,754,956 B2 | 7/2010 | Gain et al. |
| 7,780,541 B2 | 8/2010 | Bauer |
| 7,855,718 B2 | 12/2010 | Westerman |
| 7,928,312 B2 | 4/2011 | Sharma |
| 7,984,544 B2 | 7/2011 | Rosenberg |
| 8,109,149 B2 | 2/2012 | Kotovsky |
| 8,117,922 B2 | 2/2012 | Xia et al. |
| 8,120,232 B2 | 2/2012 | Daniel et al. |
| 8,127,623 B2 | 3/2012 | Son et al. |
| 8,161,826 B1 * | 4/2012 | Taylor ..................... G01L 1/18 |
| | | 73/862.044 |
| 8,162,857 B2 | 4/2012 | Lanfermann et al. |
| 8,250,934 B2 | 8/2012 | Sakurai |
| 8,274,485 B2 | 9/2012 | Liu et al. |
| 8,346,684 B2 | 1/2013 | Mirbach et al. |
| 8,368,505 B2 | 2/2013 | Deppiesse et al. |
| 8,448,530 B2 | 5/2013 | Leuenberger et al. |
| 8,479,585 B2 | 7/2013 | Shaw-Klein |
| 8,536,880 B2 | 9/2013 | Philipp |
| 8,571,827 B2 | 10/2013 | Jang et al. |
| 8,661,917 B2 | 3/2014 | Jheng et al. |
| 8,680,390 B2 | 3/2014 | McMillen et al. |
| 8,813,579 B2 | 8/2014 | Aufrere |
| 8,857,274 B2 | 10/2014 | Mamigonians |
| 8,884,913 B2 | 11/2014 | Saynac et al. |
| 8,892,051 B2 | 11/2014 | Yi et al. |
| 8,893,565 B2 | 11/2014 | White et al. |
| 8,904,876 B2 | 12/2014 | Taylor et al. |
| 8,925,392 B2 | 1/2015 | Esposito et al. |
| 8,925,393 B2 | 1/2015 | Cannard et al. |
| 8,928,014 B2 | 1/2015 | Tischler et al. |
| 8,945,328 B2 | 2/2015 | Longinotti-Buitoni et al. |
| 8,947,889 B2 | 2/2015 | Kelley et al. |
| 8,950,265 B2 | 2/2015 | Dunn et al. |
| 8,964,205 B2 | 2/2015 | Shimizu |
| 8,970,513 B2 | 3/2015 | Kwon et al. |
| 9,032,804 B2 | 5/2015 | Granado et al. |
| 9,038,482 B2 | 5/2015 | Xia et al. |
| 9,075,404 B2 | 7/2015 | McMillen et al. |
| 9,076,419 B2 | 7/2015 | McMillen et al. |
| 9,112,058 B2 | 8/2015 | Bao et al. |
| 9,116,569 B2 | 8/2015 | William et al. |
| 9,164,586 B2 | 10/2015 | Zellers et al. |
| 9,182,302 B2 | 11/2015 | Lim et al. |
| 9,271,665 B2 | 3/2016 | Sarrafzadeh et al. |
| 9,417,693 B2 | 8/2016 | Seth |
| 9,442,614 B2 * | 9/2016 | McMillen ............... G06F 3/044 |
| 9,480,582 B2 | 11/2016 | Lundborg |
| 9,529,433 B2 | 12/2016 | Shankar et al. |
| 9,546,921 B2 | 1/2017 | McMillen et al. |
| 9,652,101 B2 | 5/2017 | McMillen et al. |
| 9,682,856 B2 | 6/2017 | Whitesides et al. |
| 9,696,833 B2 | 7/2017 | McMillen |
| 9,710,060 B2 * | 7/2017 | McMillen ............. H03K 17/964 |
| 9,721,553 B2 | 8/2017 | McMillen et al. |
| 9,753,568 B2 | 9/2017 | McMillen |
| 9,756,895 B2 | 9/2017 | Rice et al. |
| 9,827,996 B2 | 11/2017 | McMillen |
| 9,836,151 B2 | 12/2017 | McMillen |
| 9,863,823 B2 | 1/2018 | McMillen |
| 9,891,718 B2 | 2/2018 | Connor |
| 9,965,076 B2 * | 5/2018 | McMillen ............... G06F 1/163 |
| 10,082,381 B2 | 9/2018 | McMillen et al. |
| 10,114,493 B2 | 10/2018 | McMillen et al. |
| 10,268,315 B2 | 4/2019 | McMillen et al. |
| 10,282,011 B2 | 5/2019 | McMillen et al. |
| 2002/0078757 A1 | 6/2002 | Hines et al. |
| 2002/0180578 A1 | 12/2002 | Sandbach |
| 2004/0031180 A1 | 2/2004 | Ivanov |
| 2004/0093746 A1 | 5/2004 | Varsallona |
| 2004/0183648 A1 | 9/2004 | Weber et al. |
| 2004/0189145 A1 | 9/2004 | Pletner et al. |
| 2004/0252007 A1 | 12/2004 | Lussey et al. |
| 2005/0109095 A1 | 5/2005 | Sinnett |
| 2005/0220673 A1 * | 10/2005 | Thaysen ............... G01N 29/036 |
| | | 422/98 |
| 2007/0063992 A1 | 3/2007 | Lundquist |
| 2007/0129776 A1 | 6/2007 | Robins et al. |
| 2007/0151348 A1 | 7/2007 | Zdeblick et al. |
| 2007/0188179 A1 | 8/2007 | Deangelis et al. |
| 2007/0188180 A1 | 8/2007 | Deangelis et al. |
| 2007/0202765 A1 | 8/2007 | Krans et al. |
| 2007/0234888 A1 | 10/2007 | Rotolo De Moraes |
| 2008/0069412 A1 | 3/2008 | Champagne et al. |
| 2008/0158145 A1 | 7/2008 | Westerman |
| 2008/0189827 A1 | 8/2008 | Bauer |
| 2008/0254824 A1 | 10/2008 | Moraes |
| 2009/0013793 A1 | 1/2009 | Kim et al. |
| 2009/0049980 A1 | 2/2009 | Sharma |
| 2009/0134966 A1 | 5/2009 | Baker |
| 2009/0237374 A1 | 9/2009 | Li et al. |
| 2009/0272197 A1 | 11/2009 | Ridao Granado et al. |
| 2009/0301190 A1 | 12/2009 | Ross, Jr. et al. |
| 2009/0303400 A1 | 12/2009 | Hou et al. |
| 2010/0066572 A1 | 3/2010 | Dietz et al. |
| 2010/0123686 A1 | 5/2010 | Klinghult et al. |
| 2010/0134327 A1 | 6/2010 | Dinh et al. |
| 2010/0149108 A1 | 6/2010 | Hotelling et al. |
| 2010/0179724 A1 | 7/2010 | Weston |

(56) References Cited

U.S. PATENT DOCUMENTS

| | | |
|---|---|---|
| 2010/0199777 A1 | 8/2010 | Hooper et al. |
| 2010/0242274 A1 | 9/2010 | Rosenfeld et al. |
| 2010/0274447 A1 | 10/2010 | Stumpf |
| 2010/0286951 A1 | 11/2010 | Danenberg et al. |
| 2010/0292945 A1 | 11/2010 | Reynolds et al. |
| 2010/0315337 A1 | 12/2010 | Ferren et al. |
| 2011/0005090 A1 | 1/2011 | Lee et al. |
| 2011/0088535 A1 | 4/2011 | Zarimis |
| 2011/0088536 A1 | 4/2011 | McMillen et al. |
| 2011/0107771 A1 | 5/2011 | Crist et al. |
| 2011/0141052 A1 | 6/2011 | Bernstein et al. |
| 2011/0153261 A1 | 6/2011 | Jang et al. |
| 2011/0199284 A1* | 8/2011 | Davis ............... G02B 26/0833 345/31 |
| 2011/0221564 A1 | 9/2011 | Deppiesse et al. |
| 2011/0241850 A1 | 10/2011 | Bosch et al. |
| 2011/0246028 A1 | 10/2011 | Lisseman et al. |
| 2011/0260994 A1 | 10/2011 | Saynac et al. |
| 2011/0271772 A1 | 11/2011 | Parks et al. |
| 2011/0279409 A1 | 11/2011 | Salaverry et al. |
| 2011/0292049 A1 | 12/2011 | Muravsky |
| 2011/0302694 A1 | 12/2011 | Wang et al. |
| 2012/0007831 A1 | 1/2012 | Chang et al. |
| 2012/0024132 A1 | 2/2012 | Wallace et al. |
| 2012/0026124 A1 | 2/2012 | Li et al. |
| 2012/0055257 A1 | 3/2012 | Shaw-Klein |
| 2012/0090408 A1 | 4/2012 | Jheng et al. |
| 2012/0143092 A1 | 6/2012 | Xia et al. |
| 2012/0191554 A1 | 7/2012 | Xia et al. |
| 2012/0197161 A1 | 8/2012 | Xia et al. |
| 2012/0198949 A1 | 8/2012 | Xia et al. |
| 2012/0222498 A1 | 9/2012 | Mamigonians |
| 2012/0234105 A1 | 9/2012 | Taylor |
| 2012/0283979 A1 | 11/2012 | Bruekers et al. |
| 2012/0296528 A1 | 11/2012 | Wellhoefer et al. |
| 2012/0297885 A1 | 11/2012 | Hou et al. |
| 2012/0299127 A1 | 11/2012 | Fujii et al. |
| 2012/0312102 A1 | 12/2012 | Alvarez et al. |
| 2012/0323501 A1 | 12/2012 | Sarrafzadeh et al. |
| 2013/0009905 A1 | 1/2013 | Castillo et al. |
| 2013/0055482 A1 | 3/2013 | D'Aprile et al. |
| 2013/0082970 A1 | 4/2013 | Frey et al. |
| 2013/0085394 A1 | 4/2013 | Corbett, III et al. |
| 2013/0113057 A1 | 5/2013 | Taylor |
| 2013/0113704 A1 | 5/2013 | Sarrafzadeh et al. |
| 2013/0165809 A1 | 6/2013 | Abir |
| 2013/0192071 A1 | 8/2013 | Esposito et al. |
| 2013/0203201 A1 | 8/2013 | Britton et al. |
| 2013/0211208 A1 | 8/2013 | Varadan et al. |
| 2013/0214365 A1 | 8/2013 | Schlarmann et al. |
| 2013/0239787 A1 | 9/2013 | McMillen et al. |
| 2013/0274985 A1 | 10/2013 | Lee et al. |
| 2013/0275057 A1 | 10/2013 | Perlin et al. |
| 2013/0327560 A1 | 12/2013 | Ichiki |
| 2013/0340598 A1 | 12/2013 | Marquez et al. |
| 2014/0007704 A1 | 1/2014 | Granado et al. |
| 2014/0007706 A1 | 1/2014 | Aufrere et al. |
| 2014/0013865 A1 | 1/2014 | White et al. |
| 2014/0026678 A1 | 1/2014 | Cannard et al. |
| 2014/0033829 A1 | 2/2014 | Xia et al. |
| 2014/0090488 A1 | 4/2014 | Taylor et al. |
| 2014/0104776 A1 | 4/2014 | Clayton et al. |
| 2014/0104792 A1 | 4/2014 | Jeziorek |
| 2014/0107966 A1 | 4/2014 | Xia et al. |
| 2014/0107967 A1 | 4/2014 | Xia et al. |
| 2014/0107968 A1 | 4/2014 | Xia et al. |
| 2014/0125124 A1 | 5/2014 | Verner |
| 2014/0130593 A1 | 5/2014 | Ciou et al. |
| 2014/0150573 A1 | 6/2014 | Cannard et al. |
| 2014/0182170 A1 | 7/2014 | Wawrousek et al. |
| 2014/0195023 A1 | 7/2014 | Statham et al. |
| 2014/0215684 A1 | 8/2014 | Hardy et al. |
| 2014/0222173 A1 | 8/2014 | Giedwoyn et al. |
| 2014/0222243 A1 | 8/2014 | McMillen et al. |
| 2014/0264407 A1 | 9/2014 | Tischler et al. |
| 2014/0318699 A1 | 10/2014 | Longinotti-Buitoni et al. |
| 2014/0347076 A1 | 11/2014 | Barton et al. |
| 2015/0035743 A1 | 2/2015 | Rosener |
| 2015/0084873 A1 | 3/2015 | Hagenbuch et al. |
| 2015/0086955 A1 | 3/2015 | Poniatowski et al. |
| 2015/0130698 A1 | 5/2015 | Burgess |
| 2015/0168238 A1 | 6/2015 | Raut et al. |
| 2015/0177080 A1 | 6/2015 | Esposito et al. |
| 2015/0248159 A1 | 9/2015 | Luo et al. |
| 2015/0261372 A1 | 9/2015 | McMillen et al. |
| 2015/0316434 A1* | 11/2015 | McMillen ............... G10H 1/348 345/174 |
| 2015/0317964 A1 | 11/2015 | McMillen et al. |
| 2015/0328492 A1 | 11/2015 | Marriott et al. |
| 2015/0330855 A1 | 11/2015 | Daniecki et al. |
| 2015/0331512 A1 | 11/2015 | McMillen et al. |
| 2015/0331522 A1 | 11/2015 | McMillen et al. |
| 2015/0331523 A1 | 11/2015 | McMillen et al. |
| 2015/0331524 A1* | 11/2015 | McMillen ................. G01L 1/18 345/174 |
| 2015/0331533 A1 | 11/2015 | McMillen et al. |
| 2015/0370396 A1 | 12/2015 | Hotelling et al. |
| 2016/0052131 A1 | 2/2016 | Lessing et al. |
| 2016/0054798 A1 | 2/2016 | Messingher et al. |
| 2016/0070347 A1 | 3/2016 | McMillen et al. |
| 2016/0073539 A1 | 3/2016 | Driscoll et al. |
| 2016/0147352 A1 | 5/2016 | Filiz et al. |
| 2016/0162022 A1 | 6/2016 | Seth |
| 2016/0169754 A1 | 6/2016 | Kowalewski et al. |
| 2016/0175186 A1 | 6/2016 | Shadduck |
| 2016/0187973 A1 | 6/2016 | Shankar et al. |
| 2016/0209441 A1 | 7/2016 | Mazzeo et al. |
| 2016/0238547 A1 | 8/2016 | Park et al. |
| 2016/0246369 A1 | 8/2016 | Osman |
| 2016/0252412 A1 | 9/2016 | McMillen et al. |
| 2016/0270727 A1 | 9/2016 | Berg et al. |
| 2016/0278709 A1 | 9/2016 | Ridao Granado et al. |
| 2016/0313798 A1 | 10/2016 | Connor |
| 2016/0318356 A1* | 11/2016 | McMillen ............... B60C 11/243 |
| 2016/0340534 A1 | 11/2016 | Wijesundara et al. |
| 2016/0375910 A1 | 12/2016 | McMillen et al. |
| 2017/0000369 A1 | 1/2017 | Hyde et al. |
| 2017/0038881 A1 | 2/2017 | McMillen |
| 2017/0056644 A1 | 3/2017 | Chahine et al. |
| 2017/0086519 A1 | 3/2017 | Vigano et al. |
| 2017/0108929 A1 | 4/2017 | Sinko et al. |
| 2017/0110103 A1 | 4/2017 | McMillen et al. |
| 2017/0127736 A1 | 5/2017 | Roberts et al. |
| 2017/0167931 A1 | 6/2017 | McMillen et al. |
| 2017/0212638 A1* | 7/2017 | McMillen ................. G01L 1/18 |
| 2017/0215495 A1 | 8/2017 | Okumiya et al. |
| 2017/0303853 A1 | 10/2017 | McMillen et al. |
| 2017/0305301 A1 | 10/2017 | McMillen et al. |
| 2018/0015932 A1* | 1/2018 | McMillen .......... B60W 50/0098 |
| 2018/0263563 A1* | 9/2018 | McMillen ............... G01L 25/00 |
| 2019/0034019 A1 | 1/2019 | McMillen et al. |

FOREIGN PATENT DOCUMENTS

| | | |
|---|---|---|
| CN | 102551728 A | 7/2012 |
| CN | 202396601 U | 8/2012 |
| CN | 203234132 U | 10/2013 |
| CN | 102406280 B | 3/2014 |
| DE | 102 12 023 A1 | 10/2003 |
| DE | 11 2010 004 038 T5 | 9/2012 |
| EP | 0 014 022 B1 | 11/1984 |
| EP | 0 211 984 | 3/1987 |
| EP | 2 682 724 A1 | 1/2014 |
| JP | S47-18925 | 5/1972 |
| JP | H04-011666 A | 1/1992 |
| JP | H06-323929 A | 11/1994 |
| JP | H08-194481 A | 7/1996 |
| JP | H10-198503 A | 7/1998 |
| JP | 2000-267664 A | 9/2000 |
| JP | 2007-503052 A | 2/2007 |
| JP | 2008-515008 A | 5/2008 |
| JP | 2009-543030 A | 12/2009 |
| JP | 2011-502313 A | 1/2011 |
| JP | 2012-521550 A | 9/2012 |

(56) References Cited

FOREIGN PATENT DOCUMENTS

| | | |
|---|---|---|
| JP | 2012-220315 A | 11/2012 |
| JP | 2014-077662 A | 5/2014 |
| KR | 10-2007-0008500 A | 1/2007 |
| KR | 100865148 B1 | 10/2008 |
| KR | 10-1362742 B1 | 2/2014 |
| KR | 10-2014-0071693 A | 6/2014 |
| NL | 8900820 A | 11/1990 |
| RU | 2 533 539 C1 | 11/2014 |
| WO | WO 99/020179 A1 | 4/1999 |
| WO | WO 2007/024875 A2 | 3/2007 |
| WO | WO 2008/032661 | 3/2008 |
| WO | WO 2009/155891 A1 | 12/2009 |
| WO | WO 2011/047171 A2 | 4/2011 |
| WO | WO 2013/181474 | 12/2013 |
| WO | WO 2015/175317 A1 | 11/2015 |
| WO | WO 2016/070078 A1 | 5/2016 |
| WO | WO 2016/138234 A1 | 9/2016 |
| WO | WO 2016/176307 A1 | 11/2016 |
| WO | WO 2016/210173 A1 | 12/2016 |
| WO | WO 2017/066096 A1 | 4/2017 |
| WO | WO 2017/184367 A1 | 10/2017 |

OTHER PUBLICATIONS

U.S. Office Action dated Apr. 15, 2013 issued in U.S. Appl. No. 12/904,657.
U.S. Notice of Allowance dated Nov. 8, 2013 issued in U.S. Appl. No. 12/904,657.
U.S. Office Action dated Mar. 12, 2015 issued in U.S. Appl. No. 14/173,617.
U.S. Notice of Allowance dated May 1, 2015 issued in U.S. Appl. No. 14/173,617.
U.S. Office Action dated Mar. 10, 2016 issued in U.S. Appl. No. 14/727,619.
U.S. Final Office Action dated Jul. 18, 2016 issued in U.S. Appl. No. 14/727,619.
U.S. Notice of Allowance dated Sep. 15, 2016 issued in U.S. Appl. No. 14/727,619.
U.S. Office Action dated Apr. 2, 2015 issued in U.S. Appl. No. 13/799,304.
U.S. Notice of Allowance dated Apr. 24, 2015 issued in U.S. Appl. No. 13/799,304.
U.S. Office Action dated Sep. 1, 2015 issued in U.S. Appl. No. 14/728,872.
U.S. Final Office Action dated Mar. 9, 2016 issued in U.S. Appl. No. 14/728,872.
U.S. Office Action dated Jun. 22, 2016 issued in U.S. Appl. No. 14/728,872.
U.S. Final Office Action dated Oct. 18, 2016 issued in U.S. Appl. No. 14/728,872.
U.S. Advisory Action dated Feb. 10, 2017 issued in U.S. Appl. No. 14/728,872.
U.S. Office Action dated May 19, 2017 issued in U.S. Appl. No. 14/728,872.
U.S. Notice of Allowance dated Oct. 16, 2017 issued in U.S. Appl. No. 14/728,872.
U.S. Office Action dated Jul. 25, 2016 issued in U.S. Appl. No. 14/728,873.
U.S. Office Action dated Dec. 30, 2016 issued in U.S. Appl. No. 14/728,873.
U.S. Final Office Action dated Mar. 31, 2017 issued in U.S. Appl. No. 14/728,873.
U.S. Advisory Action and Examiner initiated interview summary dated May 26, 2017 issued in U.S. Appl. No. 14/728,873.
U.S. Office Action dated Aug. 25, 2017 issued in U.S. Appl. No. 14/728,873.
U.S. Office Action dated Mar. 9, 2016 issued in U.S. Appl. No. 14/299,976.
U.S. Final Office Action dated Jul. 6, 2016 issued in U.S. Appl. No. 14/299,976.
U.S. Office Action dated Oct. 21, 2016 issued in U.S. Appl. No. 14/299,976.
U.S. Final Office Action dated Apr. 19, 2017 issued in U.S. Appl. No. 14/299,976.
U.S. Final Office Action dated Jun. 8, 2017 issued in U.S. Appl. No. 14/299,976.
U.S. Office Action dated Sep. 1, 2017 issued in U.S. Appl. No. 14/299,976.
U.S. Office Action dated Jan. 13, 2016 issued in U.S. Appl. No. 14/464,551.
U.S. Notice of Allowance dated Jun. 23, 2016 issued in U.S. Appl. No. 14/464,551.
U.S. Office Action dated Sep. 23, 2016 issued in U.S. Appl. No. 14/800,538.
U.S. Notice of Allowance dated Jan. 17, 2017 issued in U.S. Appl. No. 14/800,538.
U.S. Office Action dated Feb. 22, 2017 issued in U.S. Appl. No. 14/671,821.
U.S. Notice of Allowance dated Jul. 3, 2017 issued in U.S. Appl. No. 14/671,821.
U.S. Office Action dated Jun. 30, 2017 issued in U.S. Appl. No. 15/251,772.
U.S. Final Office Action dated Nov. 15, 2017 issued in U.S. Appl. No. 15/251,772.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S.Notice of Allowance dated Mar. 13, 2017 issued in U.S. Appl. No. 14/671,844.
U.S. Office Action dated Jan. 26, 2017 issued in U.S. Appl. No. 15/052,293.
U.S. Final Office Action dated May 2, 2017 issued in U.S. Appl. No. 15/052,293.
U.S. Notice of Allowance dated May 24, 2017 issued in U.S. Appl. No. 15/052,293.
U.S. Notice of Allowance [Supplemental Notice of Allowability] dated Jun. 20, 2017 issued in U.S. Appl. No. 15/052,293.
U.S. Notice of Allowance dated Sep. 22, 2017 issued in U.S. Appl. No. 15/052,293.
U.S. Notice of Allowance [Supplemental Notice of Allowability] dated Oct. 19, 2017 issued in U.S. Appl. No. 15/052,293.
U.S. Office Action dated May 20, 2016 issued in U.S. Appl. No. 14/928,058.
U.S. Final Office Action dated Jan. 6, 2017 issued in U.S. Appl. No. 14/928,058.
U.S. Notice of Allowance dated Mar. 16, 2017 issued in U.S. Appl. No. 14/928,058.
U.S. Office Action dated Nov. 3, 2017 issued in U.S. Appl. No. 15/138,802.
U.S. Office Action dated Jun. 23, 2017 issued in U.S. Appl. No. 15/190,089.
U.S. Notice of Allowance dated Aug. 10, 2017 issued in U.S. Appl. No. 15/190,089.
U.S. Office Action dated Dec. 27, 2016 issued in U.S. Appl. No. 15/287,520.
U.S. Notice of Allowance dated Mar. 27, 2017 issued in U.S. Appl. No. 15/287,520.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
PCT International Search Report and Written Opinion dated Sep. 3, 2015 issued in PCT/US2015/029732.
PCT International Preliminary Report on Patentability and Written Opinion dated Nov. 24, 2016 issued in PCT/US2015/029732.
PCT International Search Report and Written Opinion dated May 26, 2016 issued in PCT/US2016/019513.
PCT International Preliminary Report on Patentability and Written Opinion dated Sep. 8, 2017 issued in PCT/US2016/019513.

(56) References Cited

OTHER PUBLICATIONS

PCT International Search Report and Written Opinion dated Apr. 14, 2016 issued in PCT/US2015/058370.
PCT International Preliminary Report on Patentability and Written Opinion dated May 11, 2017 issued in PCT/US2015/058370.
PCT International Search Report and Written Opinion dated Sep. 15, 2016 issued in PCT/US2016/029528.
PCT International Preliminary Report on Patentability and Written Opinion dated Oct. 31, 2017 issued in PCT/US2016/029528.
PCT International Search Report and Written Opinion dated Sep. 29, 2016 issued in PCT/US2016/039089.
PCT International Search Report and Written Opinion dated Jan. 19, 2017 issued in PCT/US2016/055997.
PCT International Search Report and Written Opinion dated Aug. 14, 2017 issued in PCT/US2017/026812.
"Electronic Foot Size Measuring Devices," *Sensatech Research Ltd., Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"iStep® Digital Foot Scan," (© 2002-2015) [retrieved at http://www.foot.com/site/iStep on Sep. 17, 2015], 1 page.
"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.
Roh, Jung-Sim et al. (2011) "Robust and reliable fabric and piezoresistive multitouch sensing surfaces for musical controllers," from Alexander Refsum Jensenius, Recorded at: *11th International Conference on New Interfaces for Musical Expression* May 30-Jun. 1, 2011, Oslo, Norway, a vimeo download at http://vimeo.com/26906580.
"The Emed®-Systems," [retrieved at http://www.novel.de/novelcontent/emed on Sep. 17, 2015] novel.de, 4 pages.
U.S. Appl. No. 15/630,840, filed Jun. 22, 2017, McMillen et al.
U.S. Appl. No. 15/690,108, filed Aug. 29, 2017, McMillen et al.
U.S. Final Office Action dated Dec. 22, 2017 issued in U.S. Appl. No. 14/728,873.
U.S. Office Action dated Mar. 26, 2018 issued in U.S. Appl. No. 14/728,873.
U.S. Notice of Allowance dated Jul. 19, 2018 issued in U.S. Appl. No. 14/728,873.
U.S. Notice of Allowance dated Feb. 22, 2018 issued in U.S. Appl. No. 14/299,976.
U.S. Office Action dated Jul. 12, 2018 issued in U.S. Appl. No. 15/483,926.
U.S. Office Action dated Feb. 22, 2018 issued in U.S. Appl. No. 15/251,772.
U.S. Office Action dated Sep. 4, 2018 issued in U.S. Appl. No. 15/251,772.
U.S. Office Action dated Aug. 14, 2018 issued in U.S. Appl. No. 15/621,935.
U.S. Final Office Action dated Mar. 1, 2018 issued in U.S. Appl. No. 15/138,802.
U.S. Advisory Action dated May 16, 2018 issued in U.S. Appl. No. 15/138,802.
U.S. Notice of Allowance dated Jul. 3, 2018 issued in U.S. Appl. No. 15/138,802.
PCT International Preliminary Report on Patentability and Written Opinion dated Dec. 26, 2017 issued in PCT/US2016/039089.
PCT International Preliminary Report on Patentability and Written Opinion dated Apr. 26, 2018 issued in PCT/US2016/055997.
U.S. Appl. No. 16/148,570, filed Oct. 1, 2018, McMillen et al.
U.S. Office Action dated Dec. 31, 2018 issued in U.S. Appl. No. 15/374,816.
U.S. Notice of Allowance dated Dec. 31, 2018 issued in U.S. Appl. No. 15/483,926.
U.S. Final Office Action dated Dec. 21, 2018 issued in U.S. Appl. No. 15/251,772.
U.S. Office Action dated Dec. 13, 2018 issued in U.S. Appl. No. 15/690,108.
Japanese Office Action dated Dec. 4, 2018 issued in JP 2016-566814.
PCT International Search Report and Written Opinion dated Nov. 8, 2018 issued in PCT/US2018/035848.
U.S. Notice of Allowance dated Mar. 11, 2019 issued in U.S. Appl. No. 15/374,816.
U.S. Notice of Allowance dated Mar. 5, 2019 issued in U.S. Appl. No. 15/251,772.
U.S. Final Office Action dated Feb. 14, 2019 issued in U.S. Appl. No. 15/621,935.
PCT International Preliminary Report on Patentability dated Nov. 1, 2018 issued in PCT/US2017/026812.
U.S. Appl. No. 16/362,017, filed Mar. 22, 2019, McMillen et al.

\* cited by examiner

SENSOR SYSTEMS INTEGRATED WITH FOOTWEAR

RELATED APPLICATION DATA

The present application is continuation of and claims priority under 35 U.S.C. 120 to U.S. patent application Ser. No. 15/052,293 entitled Sensor Systems Integrated with Footwear filed on Feb. 24, 2016, which is a non-provisional of and claims priority under 35 U.S.C. 119(e) to U.S. Provisional Patent Application No. 62/126,137 entitled Sensor Systems Integrated with Footwear filed on Feb. 27, 2015, the entire disclosures of both which are incorporated herein by reference for all purposes.

BACKGROUND

Demand is rapidly rising for technologies that bridge the gap between computing devices and the physical world. These interfaces typically require some form of sensor technology that translates information from the physical domain to the digital domain. The "Internet of Things" contemplates the use of sensors in a virtually limitless range of applications, for many of which conventional sensor technology is not well suited.

SUMMARY

According to various implementations, sensors and applications of sensors are provided. According to a particular class of implementations, a sensor system includes a flexible piezoresistive substrate having a shape of a portion of an article of footwear and an array of sensors. Each sensor includes two conductive traces formed directly on the piezoresistive substrate. Each sensor is positioned on the substrate to align with a region of the exterior of a human foot. Sensor circuitry is configured to energize the sensors to generate sensor signals, and to receive the sensor signals from the array of sensors. Each sensor signal represents a force associated with a corresponding one of the sensors.

According to some implementations, the sensor system includes a flexible dielectric substrate having the shape of the portion of an article of footwear. The flexible dielectric substrate is aligned with the flexible piezoresistive substrate and in contact with the array of sensors. The flexible dielectric substrate is secured to the flexible piezoresistive substrate only at locations on the flexible piezoresistive substrate where there are no sensors. According to a specific implementation, the flexible piezoresistive substrate and the flexible dielectric substrate are included among a plurality of layers. The plurality of layers further includes a stiffener, and top and bottom layers that combine to enclose and provide environmental protection to the flexible piezoresistive substrate, the flexible dielectric substrate, and the stiffener.

According to some implementations, the sensor circuitry is configured to process the sensor signals to determine the corresponding forces. According to a specific implementation, processing of the sensor signals includes determining the corresponding forces by mapping an analog-to-digital converter (ADC) value for each sensor signal to a force value stored in memory associated with the sensor circuitry. According to another specific implementation, processing of the sensor signals includes determining the corresponding forces by, for each sensor signal corresponding to a sensor of interest, generating a first value with the sensor of interest activated, generating a second value with remaining sensors of the array activated, and processing the first and second values to account for parasitic resistances of the sensor array. According to another specific implementation, processing of the sensor signals includes processing the sensor signals corresponding to multiple sensors to determine a speed and a direction of one or more of the corresponding forces.

According to some implementations, the shape of the portion of an article of footwear is a shape of an insole. A first set of the sensors is positioned on the flexible piezoresistive substrate to align with undersides of toes of the human foot. A second set of the sensors is positioned on the flexible piezoresistive substrate to align with a ball of the human foot. A third set of the sensors is positioned on the flexible piezoresistive substrate to align with a heel of the human foot. According to a specific implementation, a fourth set of the sensors is positioned on the flexible piezoresistive substrate to align with an outside edge of the human foot.

According to some implementations, the shape of the portion of an article of footwear is a shape of an upper.

According to another class of implementations, a sensor system, includes a flexible piezoresistive substrate having a shape of a portion of an article of footwear, and a flexible dielectric substrate having the shape of the portion of an article of footwear. The flexible dielectric substrate is aligned with the piezoresistive substrate. An array of sensors includes at least two conductive traces formed directly on the flexible dielectric substrate. The conductive traces are in contact with the flexible piezoresistive substrate. Each sensor is positioned on the flexible dielectric substrate to align with a region of the exterior of a human foot. Sensor circuitry is configured to energize the sensors to generate sensor signals, and to receive the sensor signals from the array of sensors. Each sensor signal represents a force associated with a corresponding one of the sensors.

According to some implementations, the flexible dielectric substrate is secured to the flexible piezoresistive substrate only at locations on the flexible dielectric substrate where there are no sensors. According to a specific implementation, the flexible piezoresistive substrate and the flexible dielectric substrate are included among a plurality of layers. The plurality of layers further includes a stiffener, and top and bottom layers that combine to enclose and provide environmental protection to the flexible piezoresistive substrate, the flexible dielectric substrate, and the stiffener.

According to some implementations, the sensor circuitry is configured to process the sensor signals to determine the corresponding forces. According to a specific implementation, processing of the sensor signals includes determining the corresponding forces by mapping an analog-to-digital converter (ADC) value for each sensor signal to a force value stored in memory associated with the sensor circuitry. According to a specific implementation, processing of the sensor signals includes determining the corresponding forces by, for each sensor signal corresponding to a sensor of interest, generating a first value with the sensor of interest activated, generating a second value with remaining sensors of the array activated, and processing the first and second values to account for parasitic resistances of the sensor array. According to a specific implementation, processing of the sensor signals includes processing the sensor signals corresponding to multiple sensors to determine a speed and a direction of one or more of the corresponding forces.

According to some implementations, the shape of the portion of an article of footwear is a shape of an insole. A first set of the sensors is positioned on the flexible dielectric substrate to align with undersides of toes of the human foot. A second set of the sensors is positioned on the flexible dielectric substrate to align with a ball of the human foot. A third set of the sensors is positioned on the flexible dielectric substrate to align with a heel of the human foot. According to a specific implementation, a fourth set of the sensors is positioned on the flexible dielectric substrate to align with an outside edge of the human foot.

According to some implementations, the shape of the portion of an article of footwear is a shape of an upper.

A further understanding of the nature and advantages of various implementations may be realized by reference to the remaining portions of the specification and the drawings.

DETAILED DESCRIPTION

Figure 1:
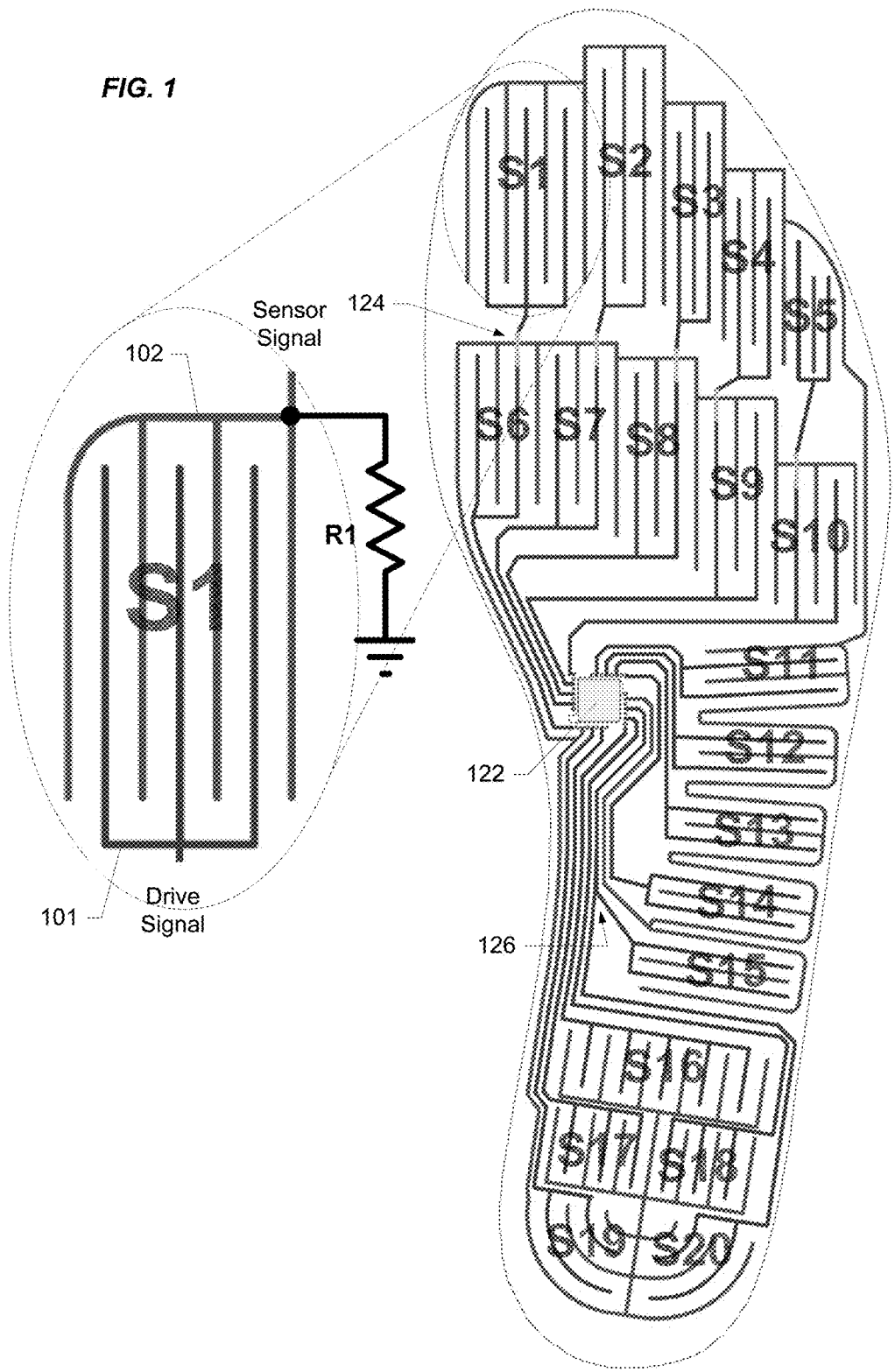
FIG. 1 shows a particular implementation of a footwear insole sensor array.

Sensors and sensor systems incorporating piezoresistive materials are described in this disclosure. In particular, various sensor systems for integration with footwear are described. Specific implementations are described herein including the best modes contemplated. Examples of these implementations are illustrated in the accompanying drawings. However, the scope of this disclosure is not limited to the described implementations. Rather, this disclosure is intended to cover alternatives, modifications, and equivalents of these implementations. In the following description, specific details are set forth in order to provide a thorough understanding of the described implementations. Some implementations may be practiced without some or all of these specific details. In addition, well known features may not have been described in detail to promote clarity.

Piezoresistive materials include any of a class of materials that exhibit a change in electrical resistance in response to mechanical force (e.g., pressure, impact, distortion, etc.) applied to the material. One class of sensors described herein includes conductive traces formed directly on or otherwise integrated with a flexible substrate of piezoresistive material, e.g., a piezoresistive fabric or other flexible material. Another class of sensors described herein includes conductive traces formed directly on or otherwise integrated with a flexible dielectric substrate with flexible piezoresistive material that is adjacent and/or tightly integrated with the dielectric substrate and in contact with portions of the traces. When force is applied to such a sensor, the resistance between traces connected by the piezoresistive material changes in a time-varying manner that is representative of the applied force. A signal representative of the magnitude of the applied force is generated based on the change in resistance. This signal is captured via the conductive traces (e.g., as a voltage or a current), digitized (e.g., via an analog-to-digital converter), processed (e.g., by an associated processor, controller, or suitable circuitry), and potentially mapped (e.g., by the associated processor, controller, or circuitry) to a control function that may be used in conjunction with the control and/or operation of virtually any type of process, device, or system. It should be noted that the output signals from such sensors may also be used to detect a variety of distortions and/or deformations of the substrate(s) on which they are formed or with which they are integrated such as, for example, bends, stretches, torsions, rotations, etc. In addition, arrays of sensors having various configurations are described in this disclosure.

Printing, screening, depositing, thermally transferring, or otherwise forming conductive traces directly on flexible substrates allows for the creation of a sensor or sensor array that fits any arbitrary shape or volume. The piezoresistive material on which the traces are formed or with which the traces are in contact may be any of a variety of woven and non-woven fabrics having piezoresistive properties. Implementations are also contemplated in which the piezoresistive material may be any of a variety of flexible, stretchable, or otherwise deformable materials (e.g., rubber, or a stretchable fabric such as spandex or open mesh fabrics) having piezoresistive properties. The conductive traces may be formed on the piezoresistive material or a flexible dielectric substrate using any of a variety of conductive inks or paints. More generally, implementations are contemplated in which the conductive traces are formed using any flexible conductive material that may be formed on a flexible substrate. It should be understood with reference to the foregoing that, while specific implementations are described with reference to specific materials and techniques, the scope of this disclosure is not so limited.

Both one-sided and two-side implementations are contemplated, e.g., conductive traces can be printed or formed on one or both sides of flexible substrate. As will be understood, two-sided implementations may require some mechanism for connecting conductive traces on one side of the substrate to those on the other side. Some implementations use vias in which conductive ink or paint is flowed through the vias to establish the connections. Alternatively, conductive vias or rivets may make connections through the flexible substrate. Both single and double-sided implementations may also use insulating materials formed over or under conductive traces. This allows for the stacking or layering of conductive traces and signal lines, e.g., to allow the routing of signal line to isolated structures in a manner analogous to the different layers of a printed circuit board.

Routing of signals on and off the flexible substrate may be achieved in a variety of ways. For example, some implementations might use elastomeric connectors (e.g., ZEBRA® connectors) which alternate conductive and non-conductive rubber at a density typically an order of magnitude greater than the width of the conductive traces to which they connect (e.g., at the edge of the substrate). Alternatively, a circuit board (possibly made of a flexible material such as Kapton), or a bundle of conductors may be riveted or otherwise secured to the substrate. The use of rivets may also provide mechanical reinforcement to the connection.

According to some implementations, matching conductive traces or pads on the flexible substrate and a circuit board can be secured to each other using, for example, a layer of conductive adhesive (e.g., a conductive epoxy such as Masterbond EP79 from Masterbond, Inc. of Hackensack, N.J.) applied to one or both of the surfaces which are then mated to each other. The conductive traces or pads can also be held together with additional mechanical elements such as sonic welds or rivets. If conductive rivets are used to make the electrical connections to the conductive traces of the flexible substrate, the conductive adhesive may not be required. Conductive threads may also be used to connect the conductive traces of the flexible substrate to an external assembly. The wide range of variations within the scope of this disclosure will be apparent to those of skill in the art.

According to a particular class of implementations, the piezoresistive material is a pressure sensitive fabric manufactured by Eeonyx, Inc., of Pinole, Calif. The fabric includes conductive particles that are polymerized to keep them suspended in the fabric. The base material is a polyester felt selected for uniformity in density and thickness as this promotes greater uniformity in conductivity of the finished piezoresistive fabric. That is, the mechanical uniformity of the base material results in a more even distribution of conductive particles when the slurry containing the conductive particles is introduced. The fabric may be woven. Alternatively, the fabric may be non-woven such as, for example, a calendared fabric, e.g., fibers bonded together by chemical, mechanical, heat, or solvent treatment. For implementations in which conductive traces are formed on the piezoresistive fabric, calendared material may present a smooth outer surface which promotes more accurate screening of conductive inks.

The conductive particles in the fabric may be any of a wide variety of materials including, for example, silver, copper, gold, aluminum, carbon, etc. Some implementations may employ carbon graphenes that are formed to grip the fabric. Such materials may be fabricated using techniques described in U.S. Pat. No. 7,468,332 for Electroconductive Woven and Non-Woven Fabric issued on Dec. 23, 2008, the entire disclosure of which is incorporated herein by reference for all purposes. However, it should again be noted that any of a wide variety of flexible materials that exhibit a change in resistance or conductivity when force is applied to the material may be suitable for implementation of sensors as described herein.

According to a particular class of implementations, conductive traces having varying levels of conductivity are formed on flexible piezoresistive material or a flexible dielectric substrate using conductive silicone-based inks manufactured by, for example, E.I. du Pont de Nemours and Company (DuPont) of Wilmington, Del., and/or Creative Materials of Ayer, Mass. An example of a conductive ink suitable for implementing highly conductive traces for use with various implementations is product number 125-19 from Creative Materials, a flexible, high temperature, electrically conductive ink. Examples of conductive inks for implementing lower conductivity traces for use with various implementations are product numbers 7102 and 7105 from DuPont, both carbon conductive compositions. Examples of dielectric materials suitable for implementing insulators for use with various implementations are product numbers 5018 and 5036 from DuPont, a UV curable dielectric and an encapsulant, respectively. These inks are flexible and durable and can handle creasing, washing, etc. The degree of conductivity for different traces and applications is controlled by the amount or concentration of conductive particles (e.g., silver, copper, aluminum, carbon, etc.) suspended in the silicone. These inks can be screen printed or printed from an inkjet printer. Another class of implementations uses conductive paints (e.g., carbon particles mixed with paint) such as those that are commonly used for EMI shielding and ESD protection.

Additional examples of sensors and arrays of sensors that may be used with various implementations enabled by the present disclosure are described in U.S. patent application Ser. No. 14/299,976 entitled Piezoresistive Sensors and Applications filed on Jun. 9, 2014 and U.S. patent application Ser. No. 14/464,551 entitled Two-Dimensional Sensor Arrays filed on Aug. 20, 2014 , the entire disclosures of both of which are incorporated herein by reference for all purposes. However, it should also be noted that implementations are contemplated that employ a variety of other suitable sensor technologies.

According to a particular class of implementations, insole sensor systems are provided for sensing forces relating to the human foot. FIG. 1 is an illustration of an example of such a sensor system that may be incorporated as part of the insole of a shoe or other type of footwear. The depicted insole sensor system includes twenty sensors that capture data from different areas of the foot. The sensors are implemented with conductive trace patterns that are formed directly on or otherwise integrated with a flexible substrate. The flexible substrate may be a piezoresistive material or a dielectric material. In the latter case, a flexible piezoresistive material is tightly integrated with the dielectric material such that it makes contact with each of the sensor trace patterns. Portions of the conductive traces that are not intended to be part of a sensor (e.g., signal routing traces) may be shielded to reduce any unwanted contributions to the sensor signals. That is, the portions of the conductive traces that bring the drive and sense signals to and from the sensors may be insulated from the piezoresistive material using, for example, a dielectric or non-conducting material (not shown for clarity) that insulates portions of the traces from the piezoresistive material. Portions of the conductive traces may also be formed over such insulating materials.

In the depicted implementation there are 20 sensors, S1-S20. Each of the sensors includes two adjacent traces, the respective patterns of which may include extension that alternate as shown. See, for example, the magnified view of sensor S1. One of the traces 101 receives a drive signal; the other trace 102 transmits the sensor signal to associated sensor circuitry (not shown). The drive signal might be provided, for example, by connecting the trace (permanently or temporarily) to a voltage reference, a signal source that may include additional information in the drive signal, a GPIO (General Purpose Input Output) pin of an associated processor or controller, etc. And as shown in the example in FIG. 1, the sensor signal might be generated using a voltage divider in which one of the resistors of the divider includes the resistance between the two traces through the intervening piezoresistive material. The other resistor (represented by R1) might be included, for example, with the associated sensor circuitry. As the resistance of the piezoresistive material changes with applied force, the sensor signal also varies as a divided portion of the drive signal.

A first set of sensors (S1-S5) aligns with the user's toes; one sensor for each toe. A second set of sensors (S6-S10) aligns with the ball of the foot. A third set of sensors (S11-S15) aligns with the outside of the bottom of the foot opposite the arch. A fourth set of sensors (S16-S20) aligns with the heel. The sensors are energized (via the drive signals) and interrogated (via the sensor signals) to generate an output signal for each that is a representation of the force exerted on that sensor. As will also be appreciated, and depending on the application, implementations are contemplated having more or fewer sensors.

According to various implementations, different sets of sensors may be selectively energized and interrogated thereby reducing the number and overall area of traces on the substrate, as well as the connections to sensor circuitry on an associated PCB (e.g., PCB 122) that may reside, for example, in a cutout of the flexible substrate on which the sensors are configured. In the sensor system depicted in FIG. 1, the 20 sensors are driven via 14 drive signal outputs from the sensor circuitry on the PCB, and the sensor signals are received via 2 sensor signal inputs to the sensor circuitry on the PCB; with 16 connections between the substrate and the PCB. This may be compared to an implementation in which each sensor has its own dedicated pair of signal lines (i.e., 20 sensors; 40 signal lines). The set of sensors providing sensor signals to one of the 2 sensor signal inputs (e.g., sensors S1-S5 and S16-S20) may be energized in any suitable sequence or pattern such that any signal received on the corresponding sensor signal input can be correlated with the corresponding sensor drive signal by the sensor circuitry.

And because the sensor signals in this implementation are received by the sensor circuitry via two different sensor signal inputs, two sensors can be simultaneously energized as long as they are connected to different sensor signal inputs to the sensor circuitry. This allows for the sharing of drive signal lines. For example, in the implementation of FIG. 1, several pairs of sensors share a common drive signal line, i.e., S1 and S6, S2 and S7, S3 and S8, S4 and S9, S5 and S10, and S15 and S20. The sharing of the common drive signal lines is enabled in some cases (e.g., sensors S1 and S6) by insulators which allow the conductive traces to cross (e.g., as illustrated at 124). In other cases (e.g., sensors S15 and S20), the conductive traces might simply diverge (e.g., as illustrated at 126). And although not apparent from the conductive traces of FIG. 1, the remaining pairs of sensors (i.e., S11 and S16, S12 and S17, S13 and S18, and S14 and S19) may share common drive signals that originate and then diverge while on PCB 122. Thus, in the implementation shown, as few as 10 drive signals might need to be generated for energizing 20 sensors. Other suitable variations on this theme will be understood by those of skill in the art to be within the scope of this disclosure.

A printed circuit board (e.g., PCB 122) including circuitry for controlling operation of the sensors and receiving sensor data may be provided, for example, in the area aligned with the arch of the foot (e.g., the cutout in FIG. 1); an area for which sensor data might be either irrelevant or of lesser importance for some applications. According to some implementations, such a PCB may be connected to the conductive traces of the sensor array as described U.S. patent application Ser. No. 14/671,821 entitled Flexible Sensors and Applications filed on Mar. 27, 2015, the entire disclosure of which is incorporated herein by reference for all purposes. According to other implementations and as mentioned above, any of a variety of techniques may be employed to make such a connection including, for example, elastomeric connectors (e.g., ZEBRA® connectors). A variety of other suitable alternatives are available to those of skill in the art.

The substrate on which the sensors are formed may be susceptible to damage or corruption due to environmental conditions (e.g., moisture or temperature) and shear forces. Testing was performed using a variety of multilayer configurations with various materials resulting in an insole design that performs well under a range of conditions. A particular multilayer configuration of such an insole assembly that includes a sensor array like the one described above with reference to FIG. 1 is shown in FIG. 2.

Figure 2:
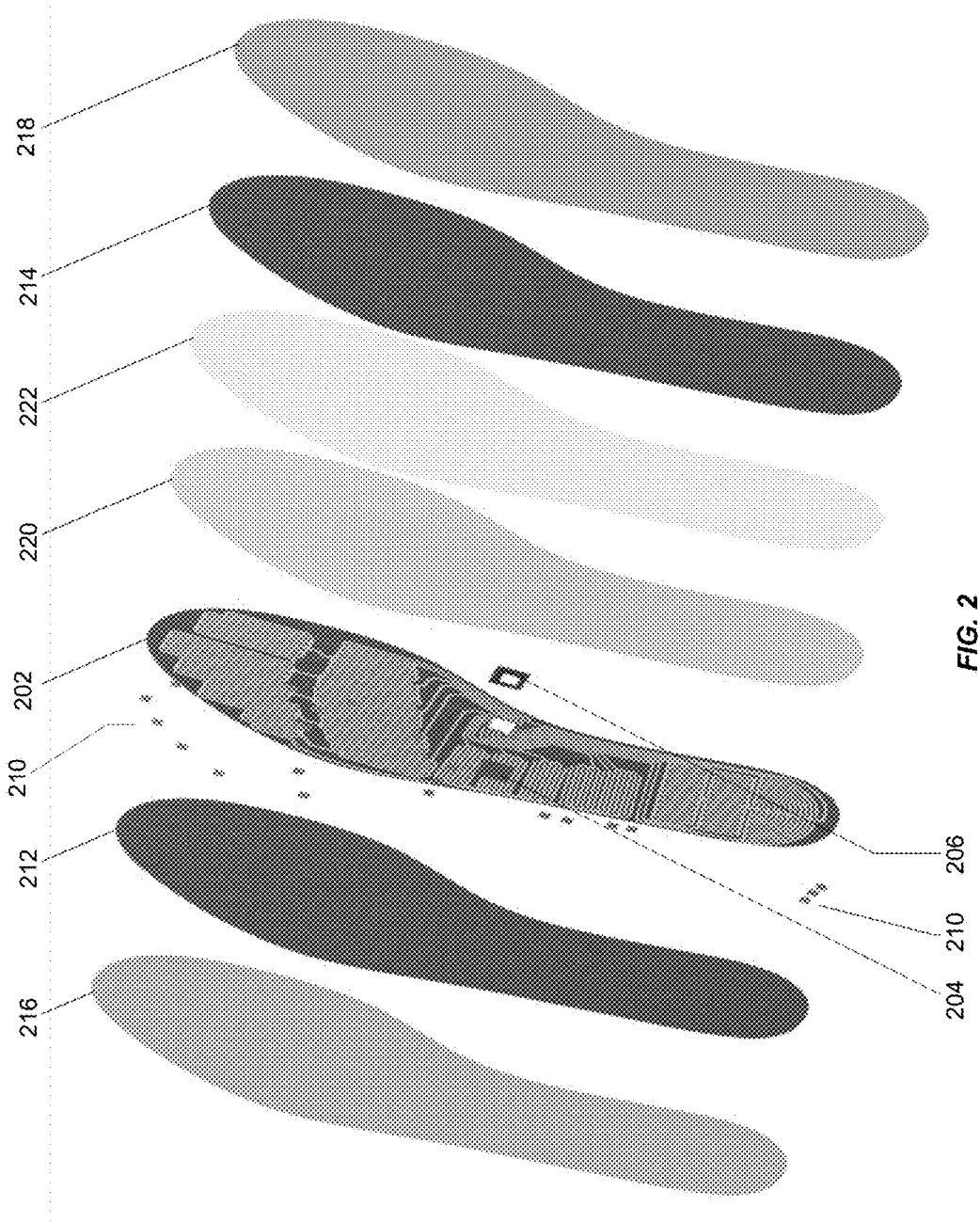
FIG. 2 shows an example of a multilayer configuration of an insole assembly that includes a sensor array.

The multilayer configuration shown in FIG. 2 was shown not only to protect the sensor array from environmental conditions and shear forces, but also to enable a wide dynamic range of operation for each of the sensors (e.g., detection of force or pressure ranging from about 50 grams to about 100 kg; a ratio of about 2000:1). As will be appreciated, this kind of range is important for an insole sensor system intended to work with a wide range of body weights and foot shapes and sizes. That is, under most conditions, only a subset of the sensors in an insole sensor system are likely to be experiencing force at any given time. For example, as a person walks, the heel, ball of the foot, and toes experience the force of coming into contact with the ground in succession. Therefore, at any given moment, most of the force experienced by the foot is concentrated on the sensors aligned with the respective portions of the foot. To be able to usefully measure the forces experienced by those few sensors, each individual sensor must be able to handle a significant amount of weight without running out of range.

On the other hand, it may also be important for some applications to accurately measure very small amounts of force and/or to be able to precisely distinguish between slight variations in force on the same or adjacent sensors. It is therefore desirable not only to have individual sensors that can measure large amounts of force, but also to have those same sensors be sensitive to very small forces and very small changes in force. Implementations of sensor systems as shown in FIGS. 1 and 2 are characterized by such a dynamic range.

Dynamic range testing data for 19 of the 20 sensors of a particular implementation are provided herewith as part of this disclosure (sensor 15 was inoperable during the testing). Raw data is provided in tables below and presented in corresponding graphs in FIGS. 7-25. Also provided in the data below are representations of the logarithmic trendlines for each of the operable sensors. These data demonstrate a wide dynamic range (about 50 grams to about 100 kg) for sensors constructed from conductive traces formed directly on a flexible piezoresistive substrate. The dynamic ranges achieved may be due, at least in part, to the deep integration of the traces with the underlying substrate, i.e., the traces may be able to gather more signal/electrons than conductors of previous sensor designs. Similarly wide dynamic ranges may be achieved for systems in which the conductive traces of the sensors are formed on a flexible dielectric substrate adjacent or otherwise integrated with a piezoresistive substrate.

Referring again to FIG. 2, layer 202 includes a flexible piezoresistive substrate with sensor traces formed directly on the substrate (e.g., conductive ink printed on fabric) and includes a PCB 204 (with associated sensor circuitry) that is secured in an aperture in layer 202 using a backplate 206. It should be noted that implementations are also contemplated in which the sensor traces are formed on a flexible dielectric substrate that is tightly integrated with a flexible piezoresistive material. According to the particular implementation shown in FIG. 2 and in order to better preserve the dynamic ranges of the sensors, the layer of material adjacent the sensor traces on sensor layer 202 (e.g., layer 212) is only adhered to layer 202 at locations that do not include conductive traces. In the depicted implementation, this is achieved using adhesive squares 210 that are aligned with the substrate of layer 202 where there are no traces. It was found during testing that a continuous layer of adhesive in contact with the sensor traces degraded the dynamic range of the sensors.

Layers 212 and 214 are both layers of a closed-cell foam (e.g., Poron or Sorbathane) that is commonly used in shoe insoles. These provide the general look and feel of the insole assembly. In the depicted implementation, each is about 0.5 mm thick. Layers 216 and 218 are both very thin (e.g., about 0.05 mm) plastic layers that are pressed and heated such that they melt into layers 212 and 214. Layers 216 and 218 may be slightly larger than the other layers of the insole assembly so that they contact each other around the edges of the stack, thereby providing an environmental seal for the assembly.

Layer 220 is a stiffener made of a suitable material (e.g., polyethylene terephthalate or PET) and coated with a pressure sensitive adhesive (PSA) (not shown) that adheres to the underside of layer 202. Layer 220 provides enough stiffness to the stack to facilitate, for example, insertion of the assembly into a shoe. Layer 222 is a thin (e.g., about 0.05 mm) layer of PSA that secures layer 220 to layer 214. A wide variety of PSAs are suitable for use on layer 220 and as layer 222 and adhesive squares 210. According to a particular implementation, the PSA for layers 220 and 222 and adhesive squares 210 is 3M-467MP, a double-sided adhesive tape from 3M of Minneapolis, Minn. However, to facilitate mass production, such adhesives may be formed or deposited (e.g., screen printed) on the layer surfaces. As will be appreciated, insole sensor systems implemented as described herein can be configured to operate properly even if set below or above one or more additional insole layers added for comfort or podiatric purposes.

Figure 3:
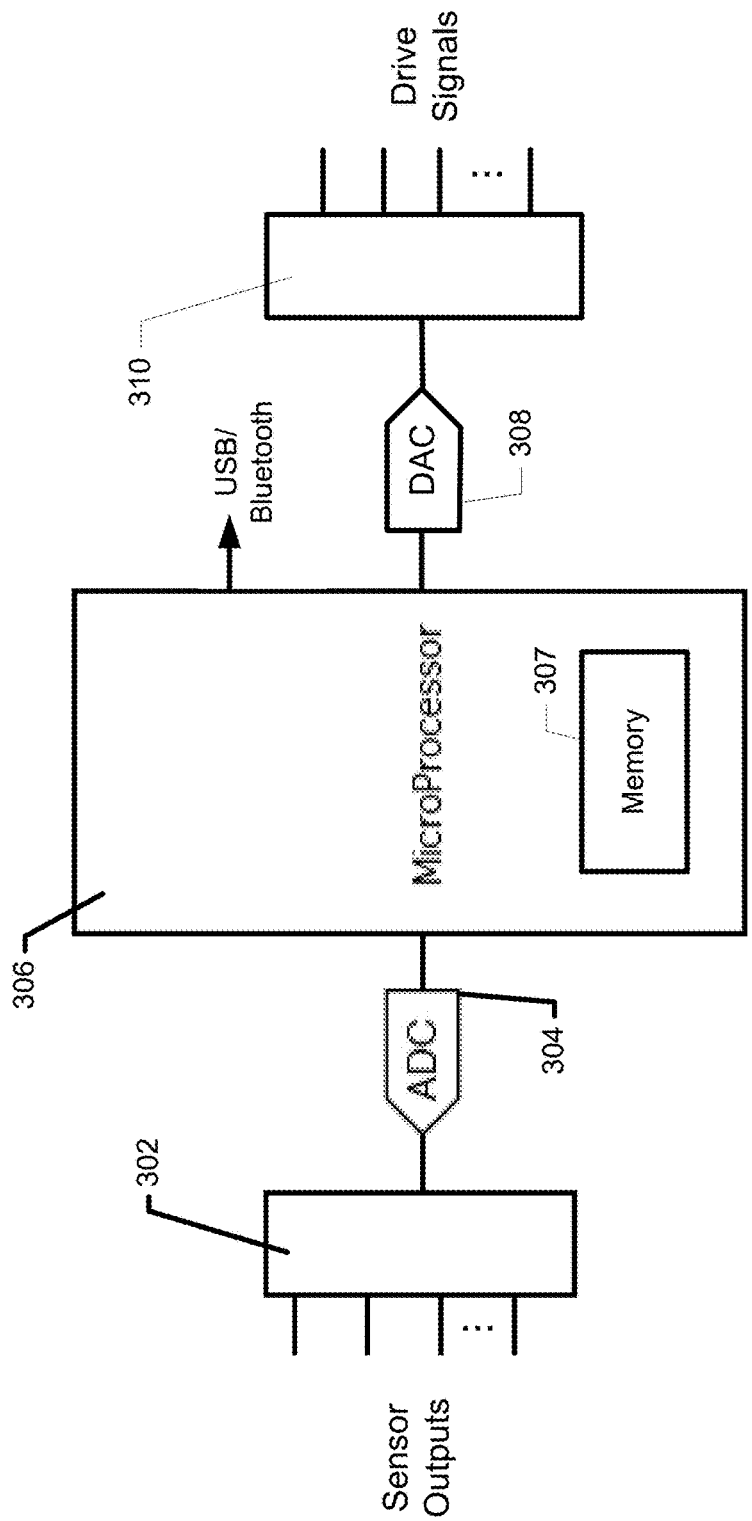
FIG. 3 is a simplified block diagram of sensor circuitry suitable for use with various implementations.
Figure 4:
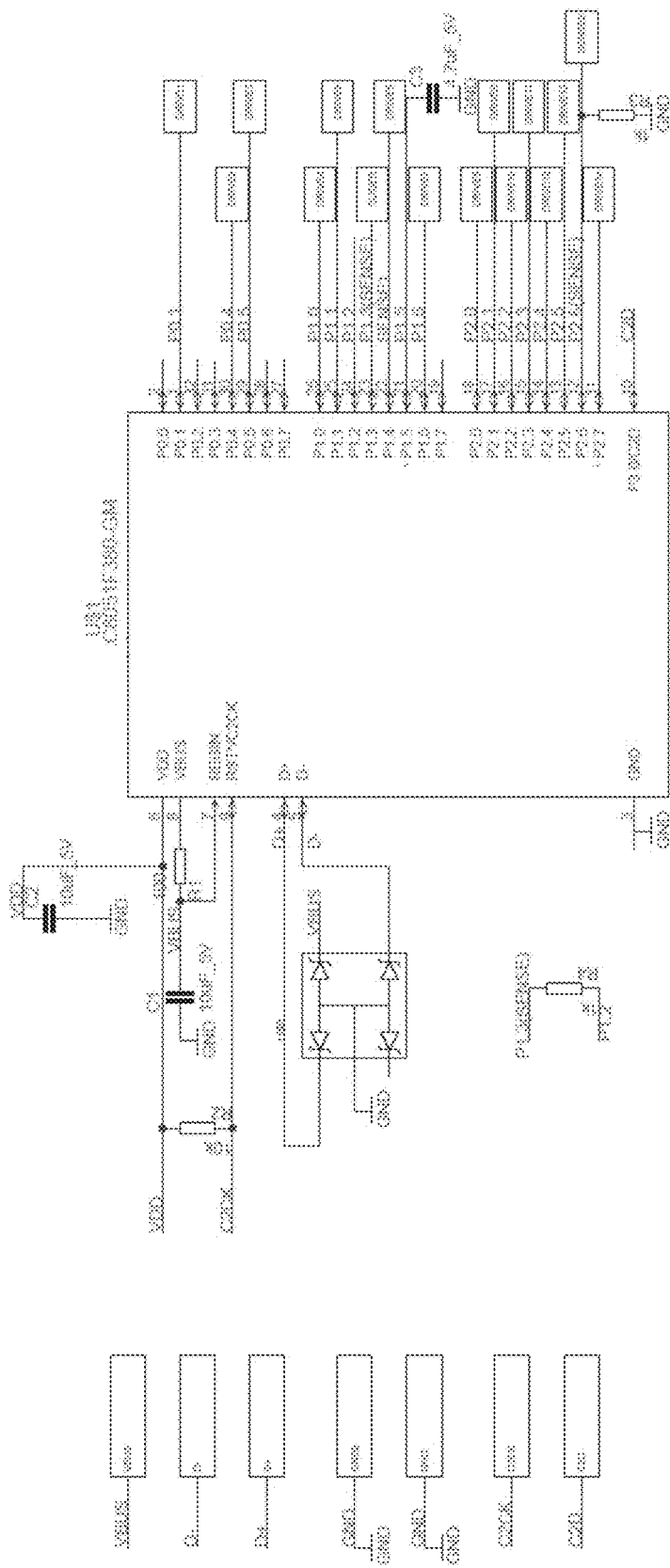
FIG. 4 is a schematic of sensor circuitry suitable for use with various implementations.

FIG. 3 is a simplified diagram of sensor circuitry that may be provided on a PCB for use with implementations described herein. For example, in the implementation described above with reference to FIGS. 1 and 2, such sensor circuitry could be provided on PCB 122 or PCB 204 and connected to the conductive traces associated with sensors S1-S20. When pressure is applied to one of the sensors, a resulting signal (captured via the corresponding traces) is received and digitized (e.g., via multiplexer 302 and A-to-D converter 304) and may be processed locally (e.g., by processor 306) and/or transmitted to a connected device (e.g., via a USB or Bluetooth connection). The sensors may be selectively energized by the sensor circuitry (e.g., under the control of processor 306 via D-to-A converter 308 and multiplexer 310) to effect the generation of the sensor signals. In addition to transmission of data to and from a connected device, power may be provided to the sensor circuitry via a USB connection. Alternatively, systems that transmit data wirelessly (e.g., via Bluetooth) may provide power to the sensor circuitry using any of a variety of mechanisms and techniques including, for example, using one or more batteries, solar cells, and/or mechanisms that harvest mechanical energy. The LTC3588 (provided by Linear Technology Corporation of Milpitas, Calif.) is an example of an energy harvesting power supply that may be used with at least some of these diverse energy sources. Other suitable variations will be appreciated by those of skill in the art. And as will be appreciated, the sensor circuitry shown in FIG. 3 is merely an example. A wide range of sensor circuitry components, configurations, and functionalities are contemplated. FIG. 4 shows a schematic diagram of a specific implementation of sensor circuitry that includes a controller which is the C8051F380-GM controller (provided by Silicon Labs of Austin, Tex.).

As will be understood (and as demonstrated in the sensor test data provided below), the responses of the sensors in arrays enabled by the present disclosure may exhibit variation relative to each other. According to some implementations, calibrated sensor data may be stored (e.g., in memory 307 of processor 306) representing the response of each of the sensors. Such data may be used for ensuring consistency in the way the sensor outputs are processed and/or used to represent applied forces. During calibration, the output of each sensor (e.g., as captured by ADC 304) is measured for a range of known input forces. This may be done, for example, by placing each sensor on a scale, applying force to that sensor, and recording a value in memory for each of a plurality of ADC values that represents a corresponding value reported by the scale. In this way, a set of data points for each sensor is captured (e.g., in a table in memory 307) associating ADC values with corresponding forces (e.g., weights in grams or kilograms). The data set for each sensor may capture a force value for every possible value of the ADC output. Alternatively, fewer data points may be captured and the sensor circuitry may use interpolation to derive force values for ADC outputs not represented in the data set.

Generating the set of data points for each sensor may be done by applying the force individually to each sensor using, for example, a device with a footprint that matches the sensor's active area configuration (e.g., see the shapes of sensors S1-S20 of FIG. 1). It may also be done by applying force simultaneously over the entire array using, for example, a precision inflatable bladder that distributes force evenly over the array. The measurements for a given force can then be captured by activating the sensors sequentially. Other variations will be appreciated by those of skill in the art. Regardless of how the calibration force is applied, what results is data set that the processor may use to map the output received from each sensor to an accurate representation of the force represented. As will be appreciated, this consistency of representation may be important for many applications.

Figure 5:
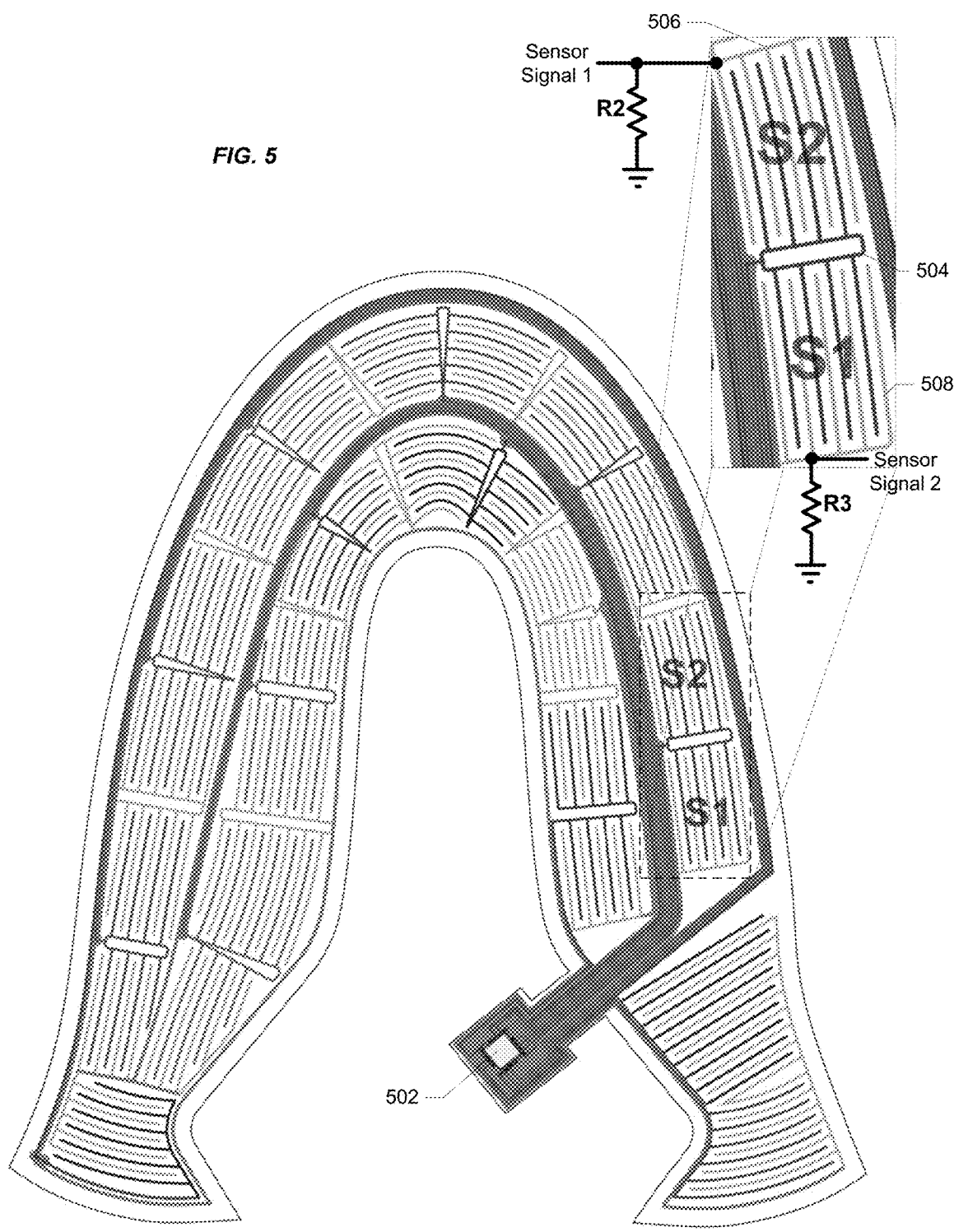
FIG. 5 shows a particular implementation of a footwear upper sensor array.
Figure 6:
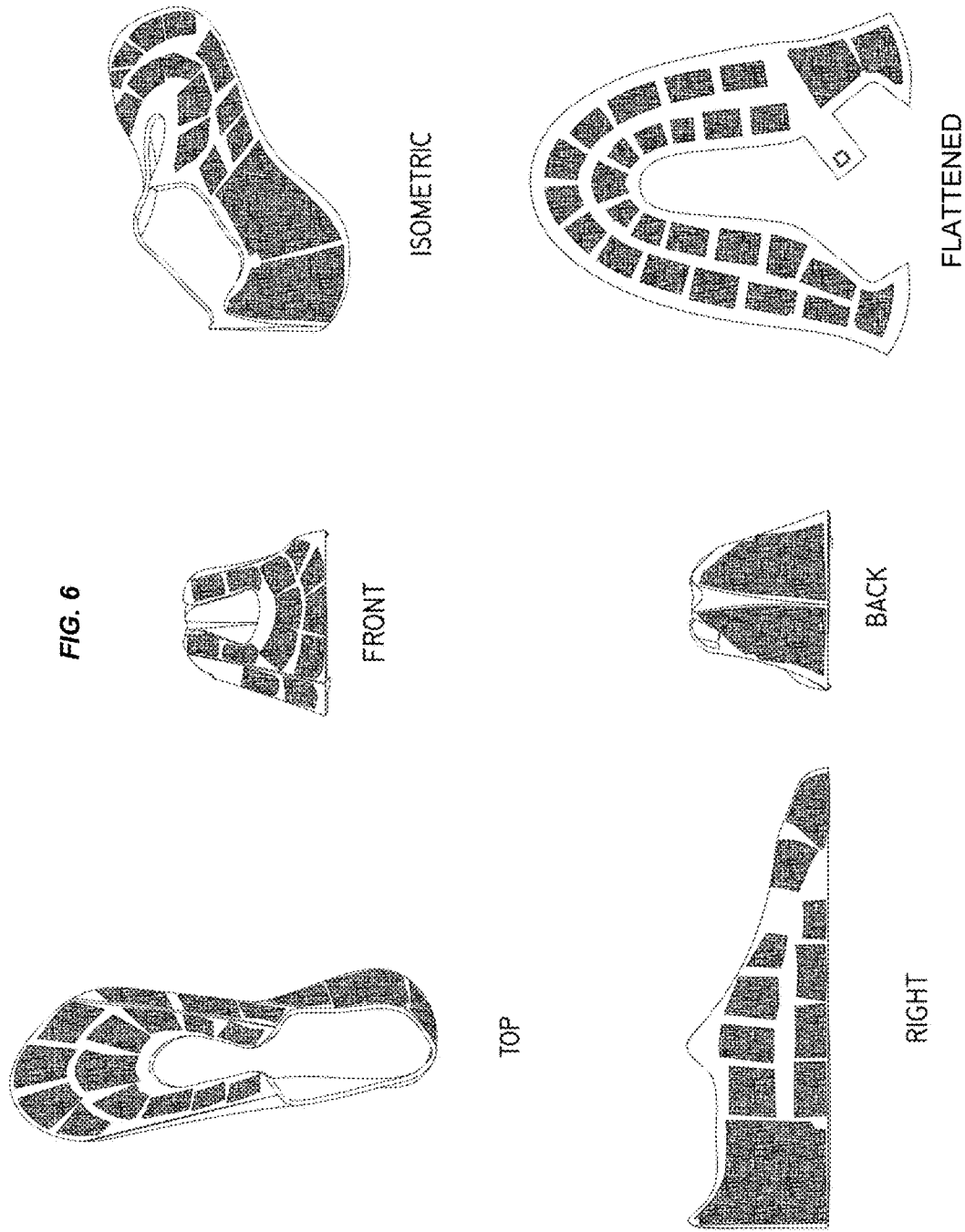
FIG. 6 shows various views and configurations of a footwear upper sensor array similar to the one shown in FIG. 5.
Figure 7:
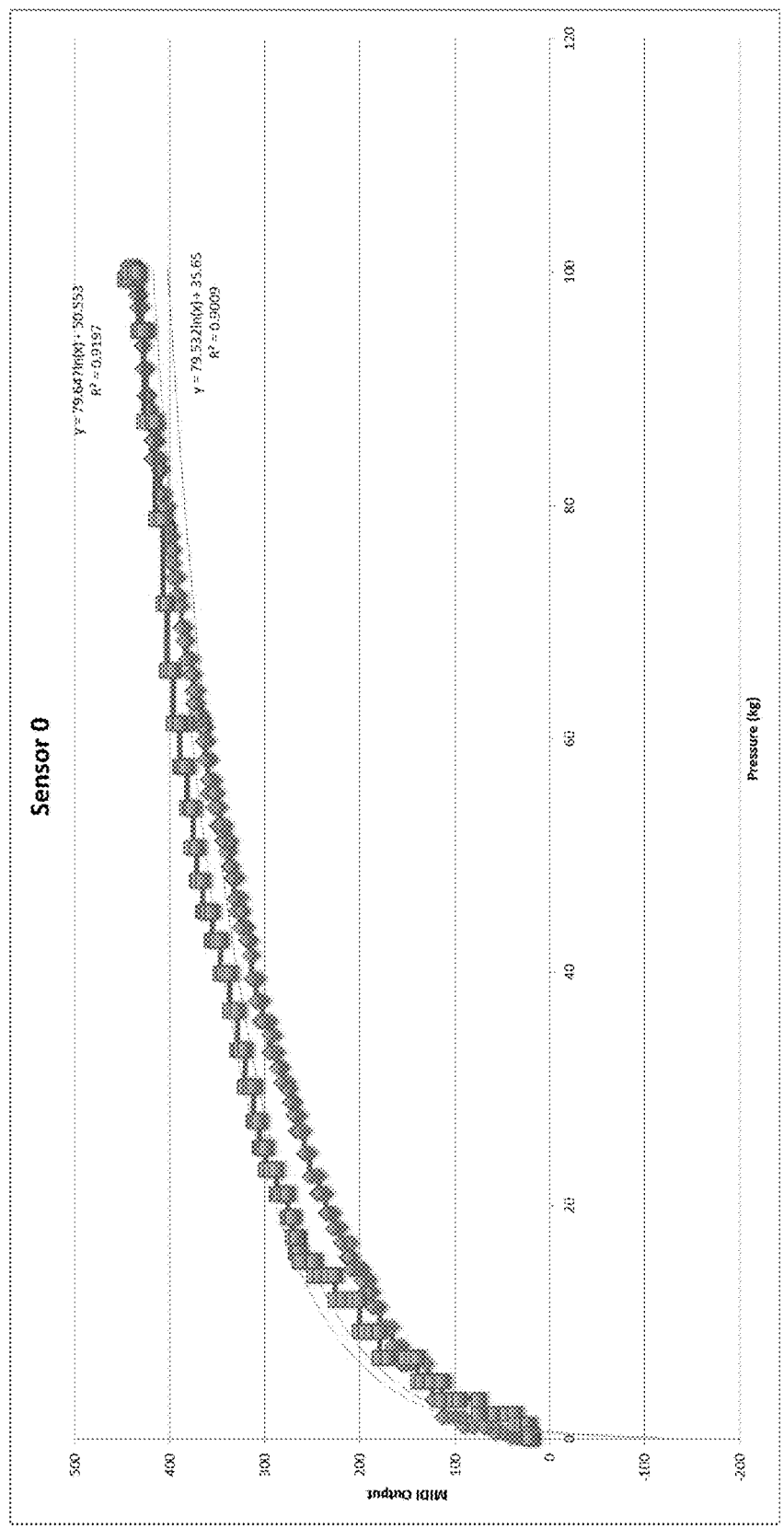
FIGS. 7-25 are graphs of sensor test data.
Figure 8:
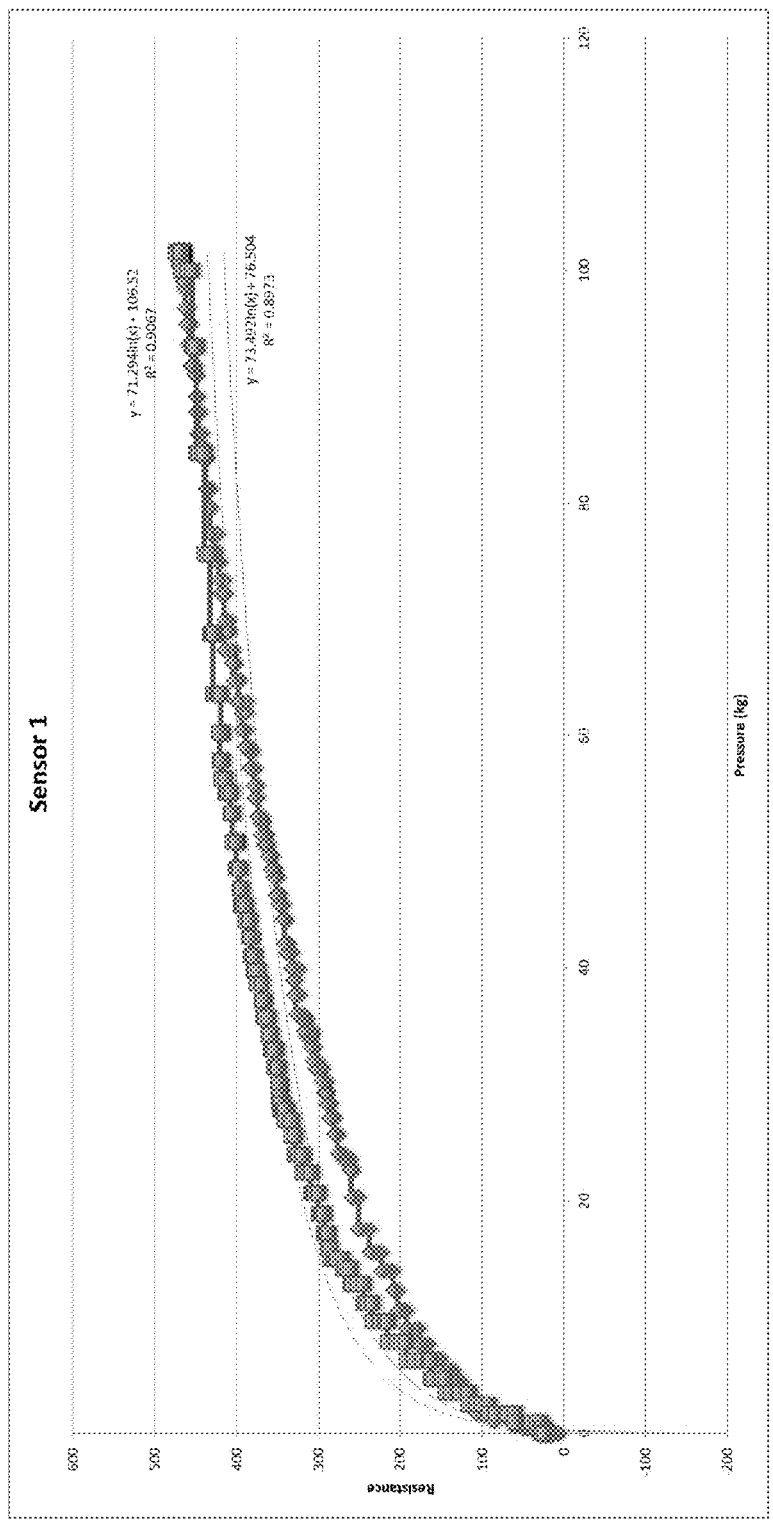
Figure 9:
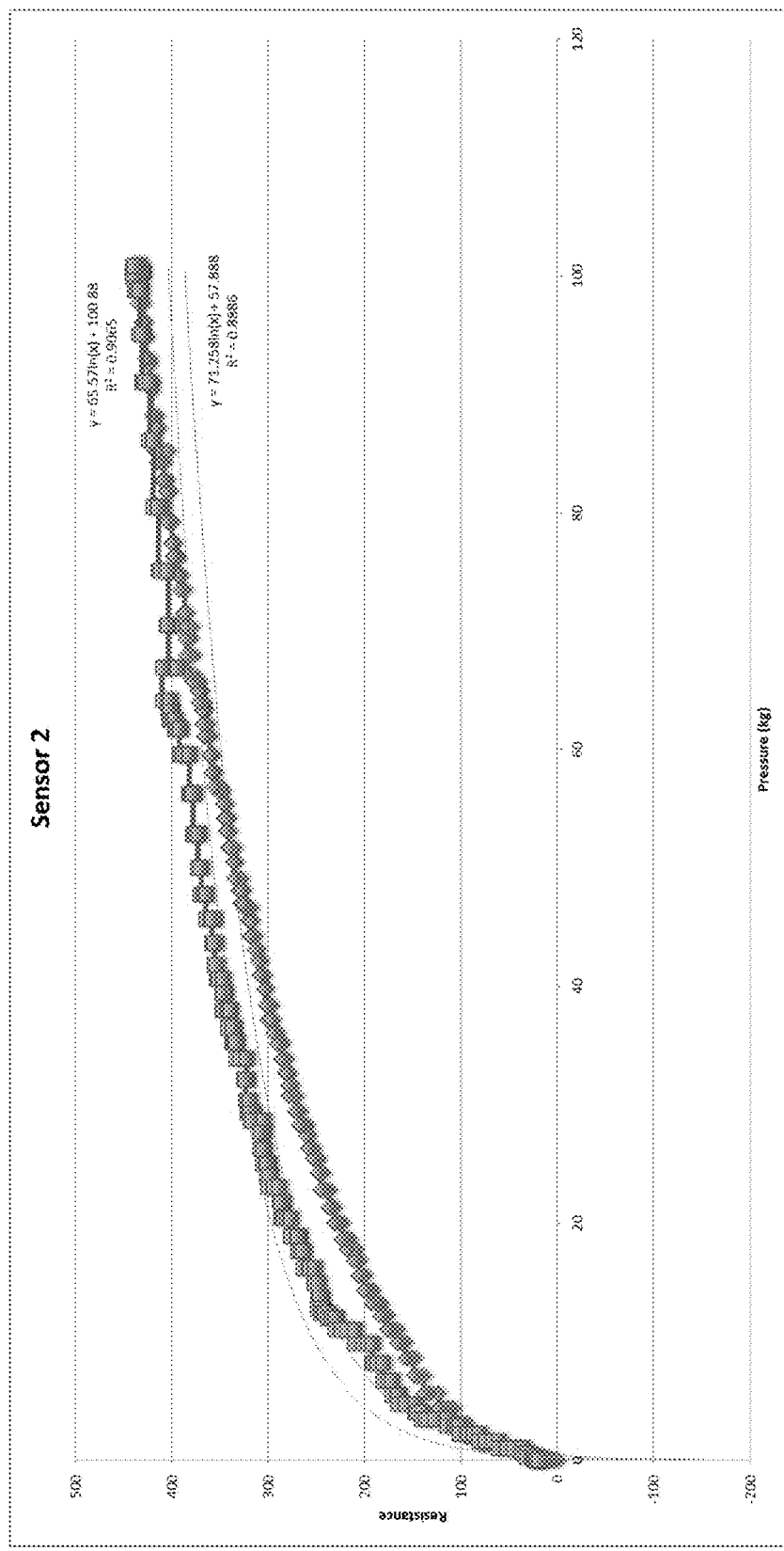
Figure 10:
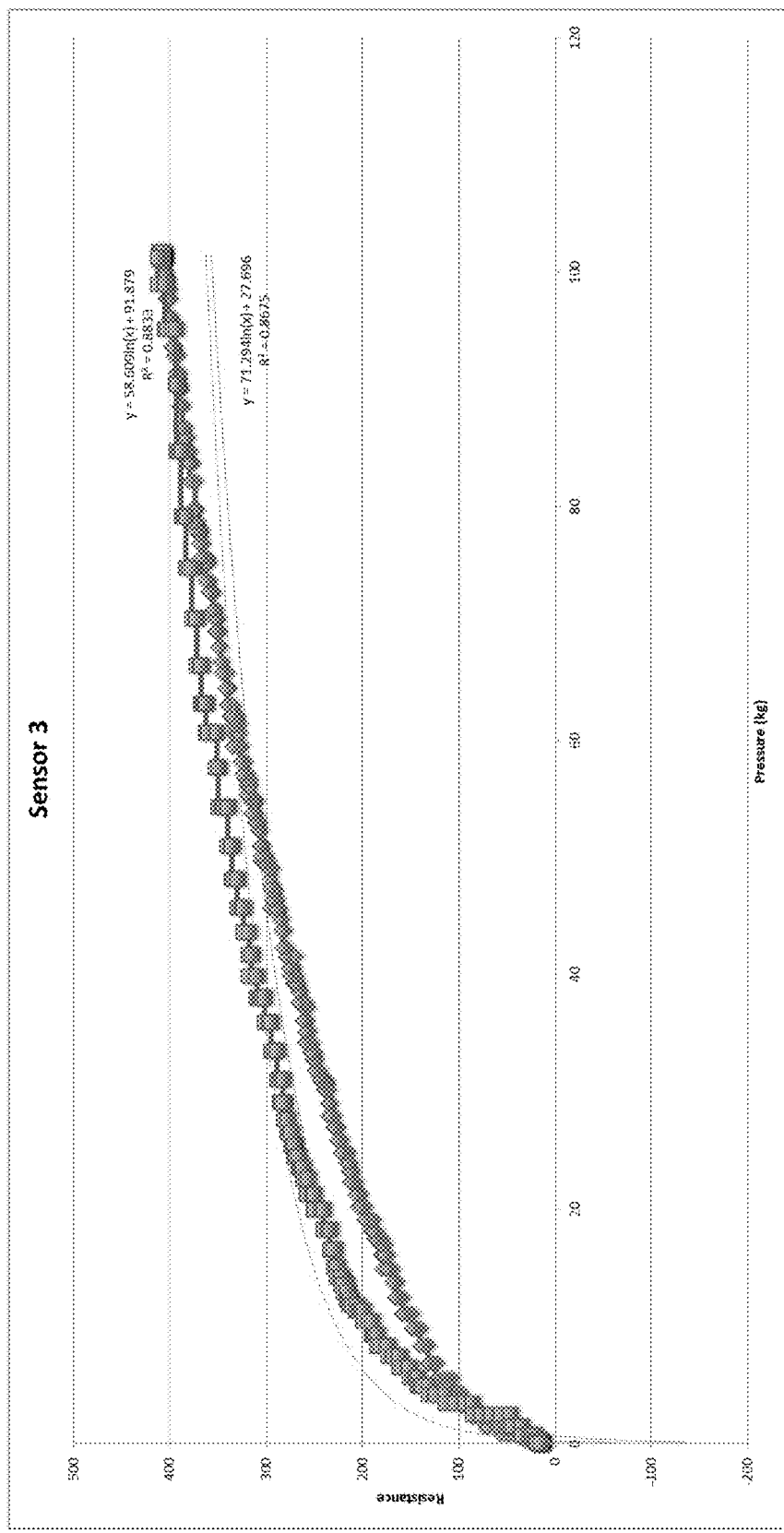
Figure 11:
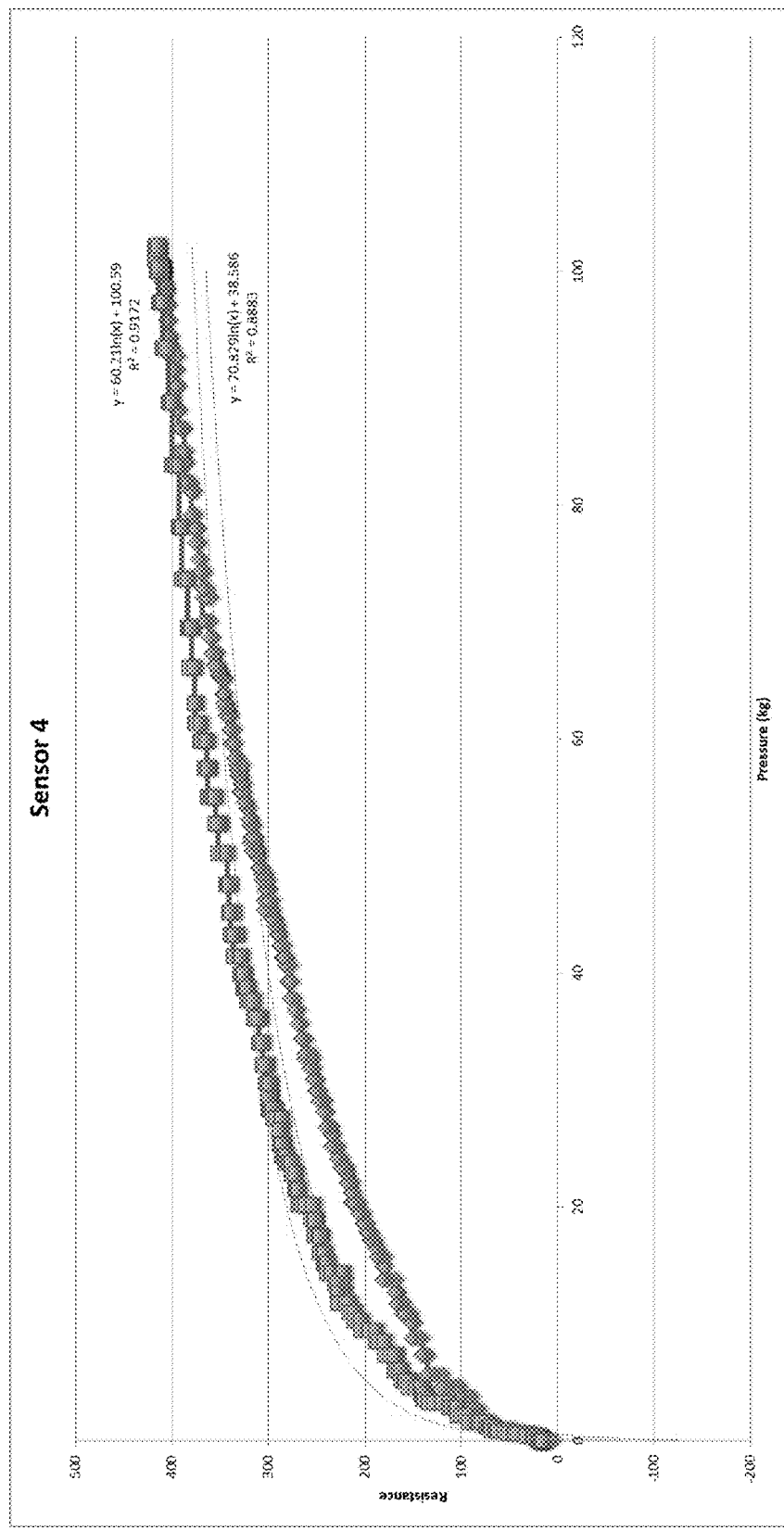
Figure 12:
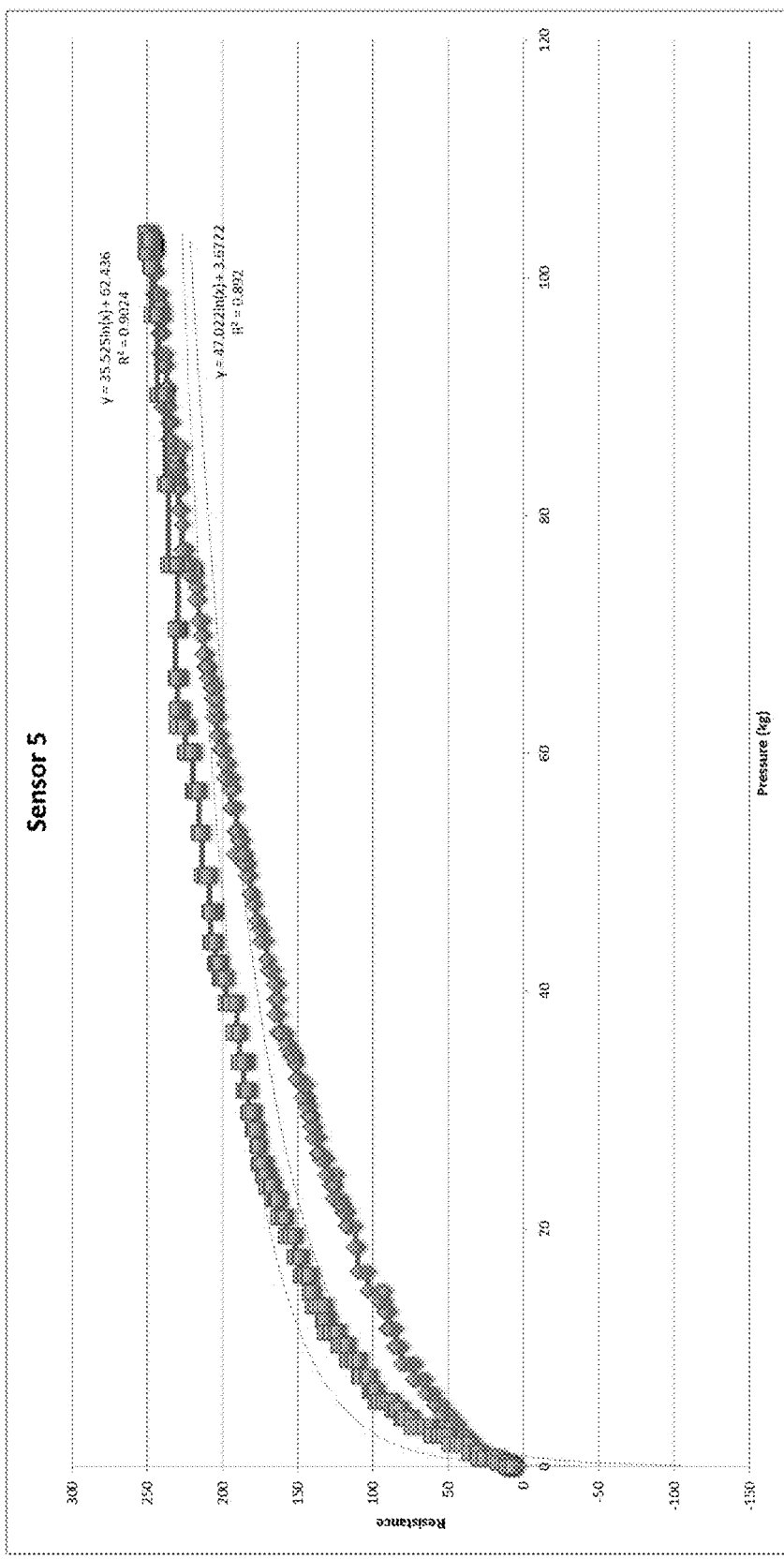
Figure 13:
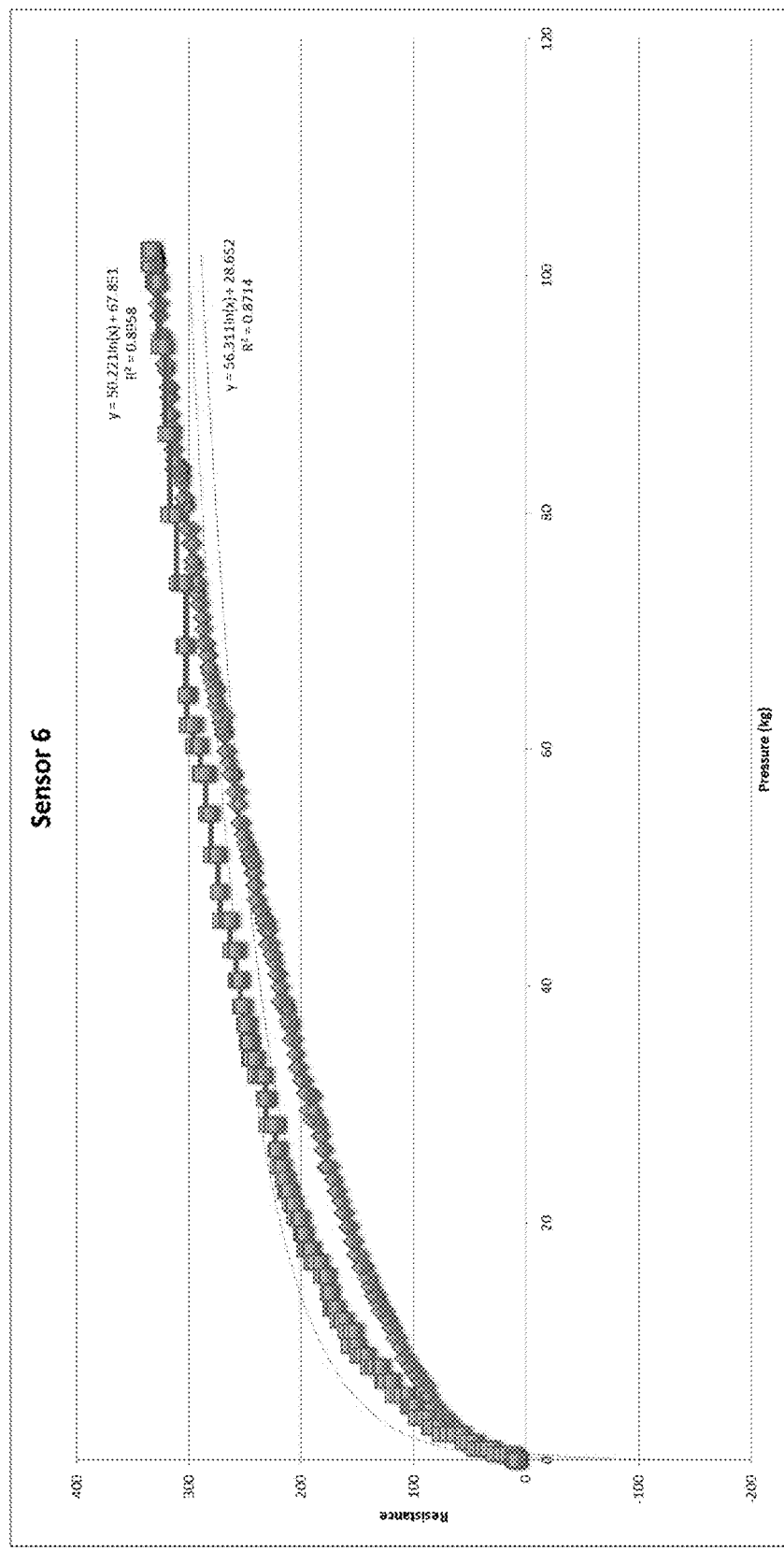
Figure 14:
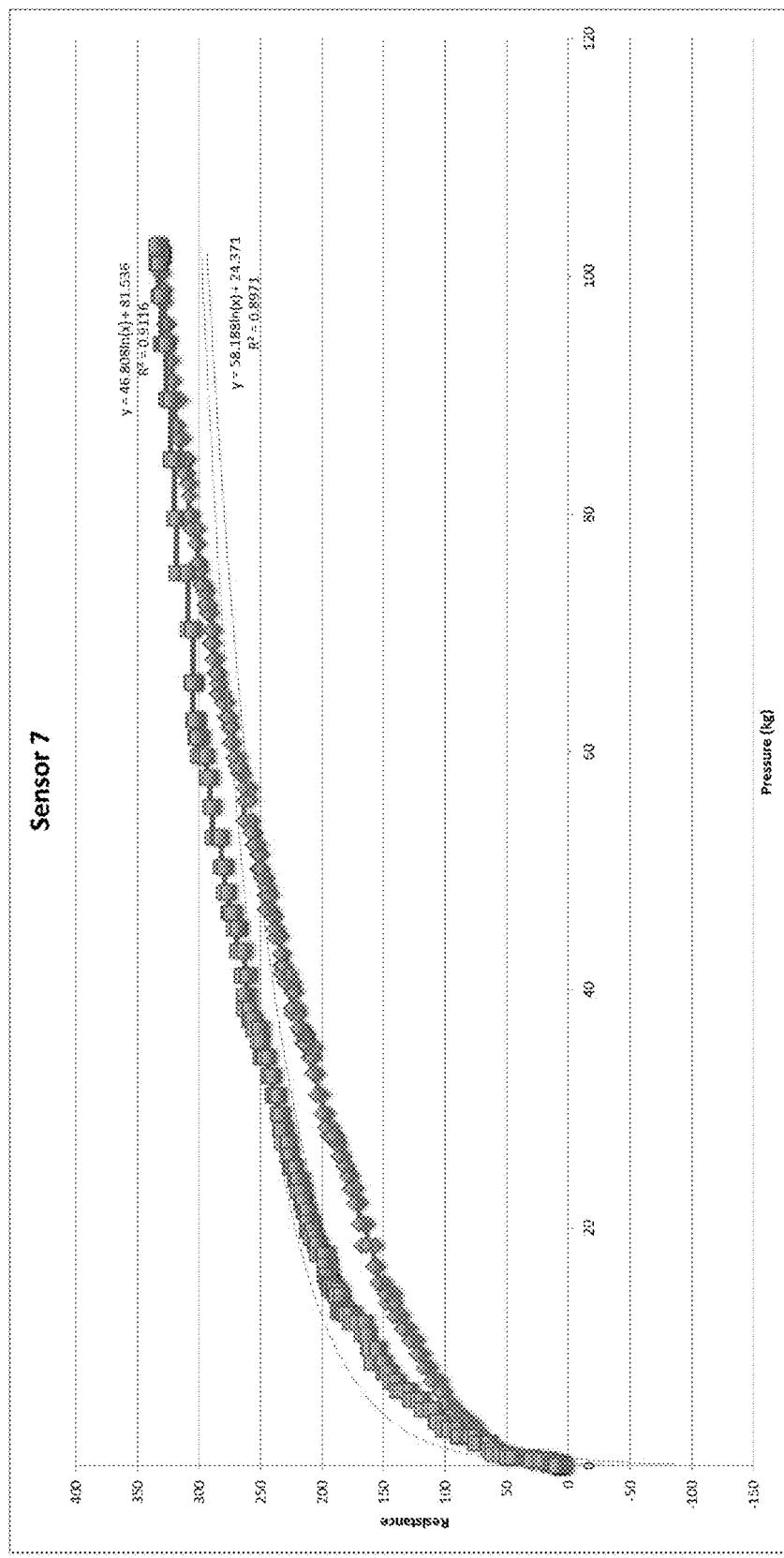
Figure 15:
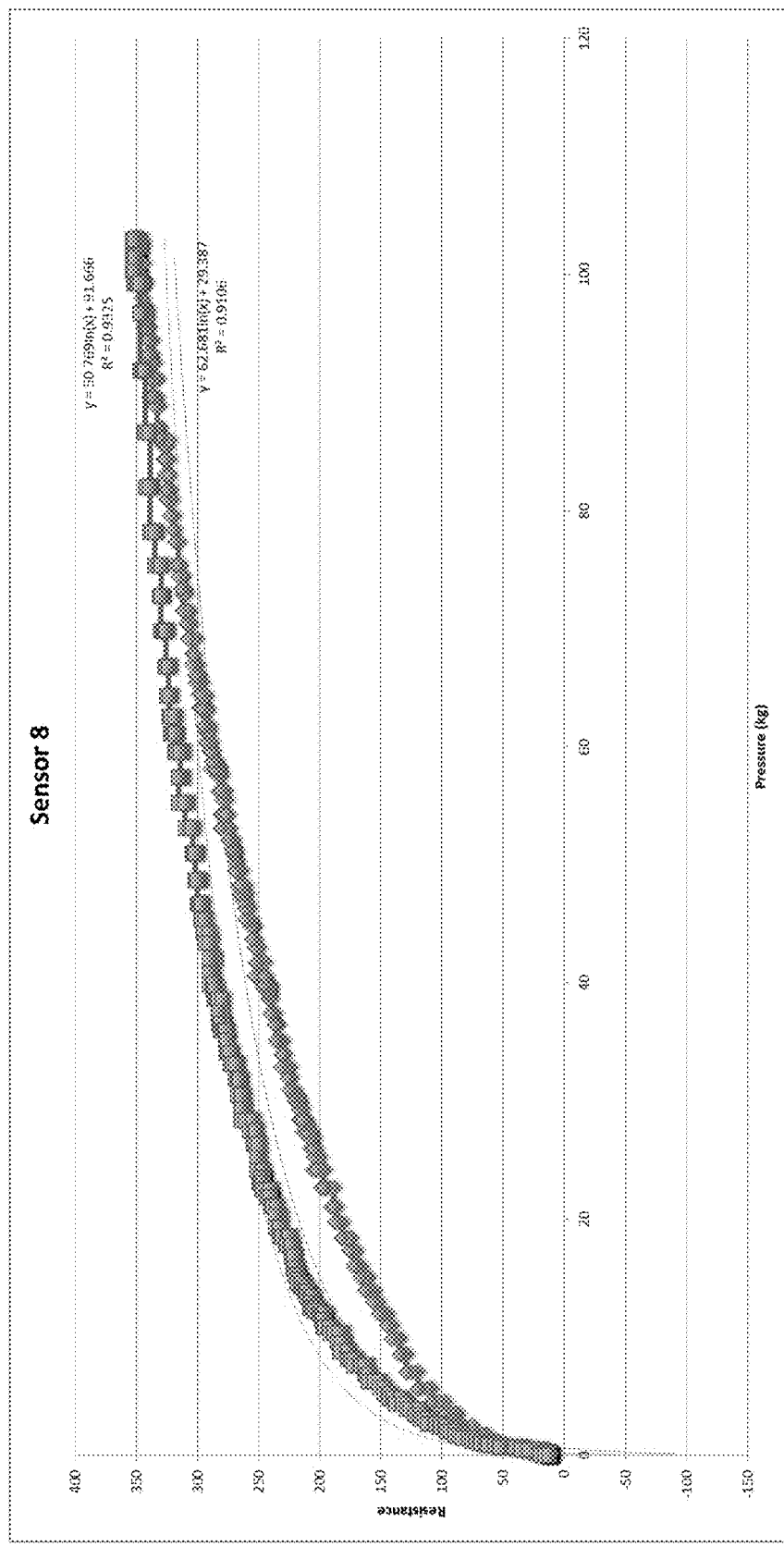
Figure 16:
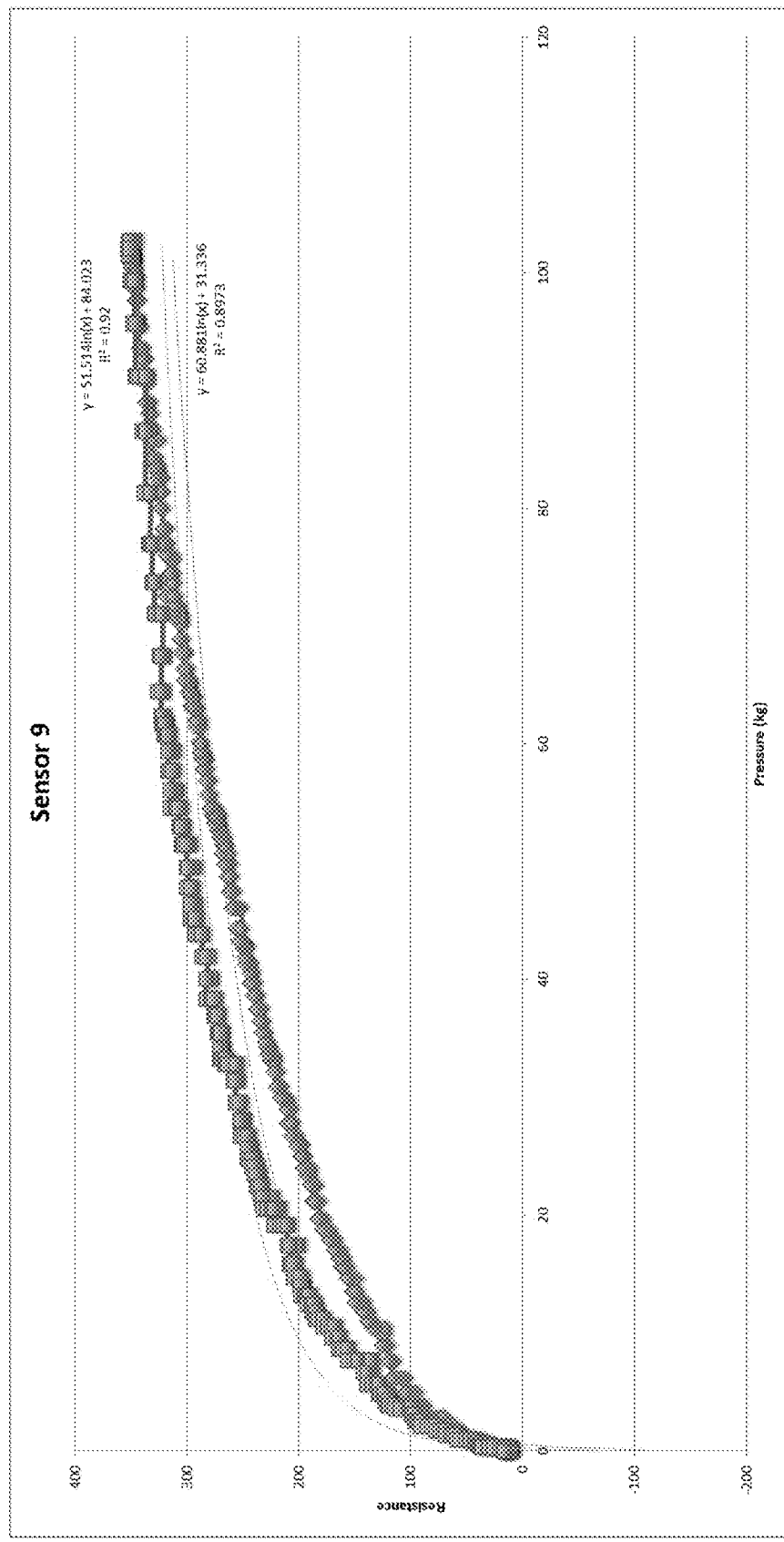
Figure 17:
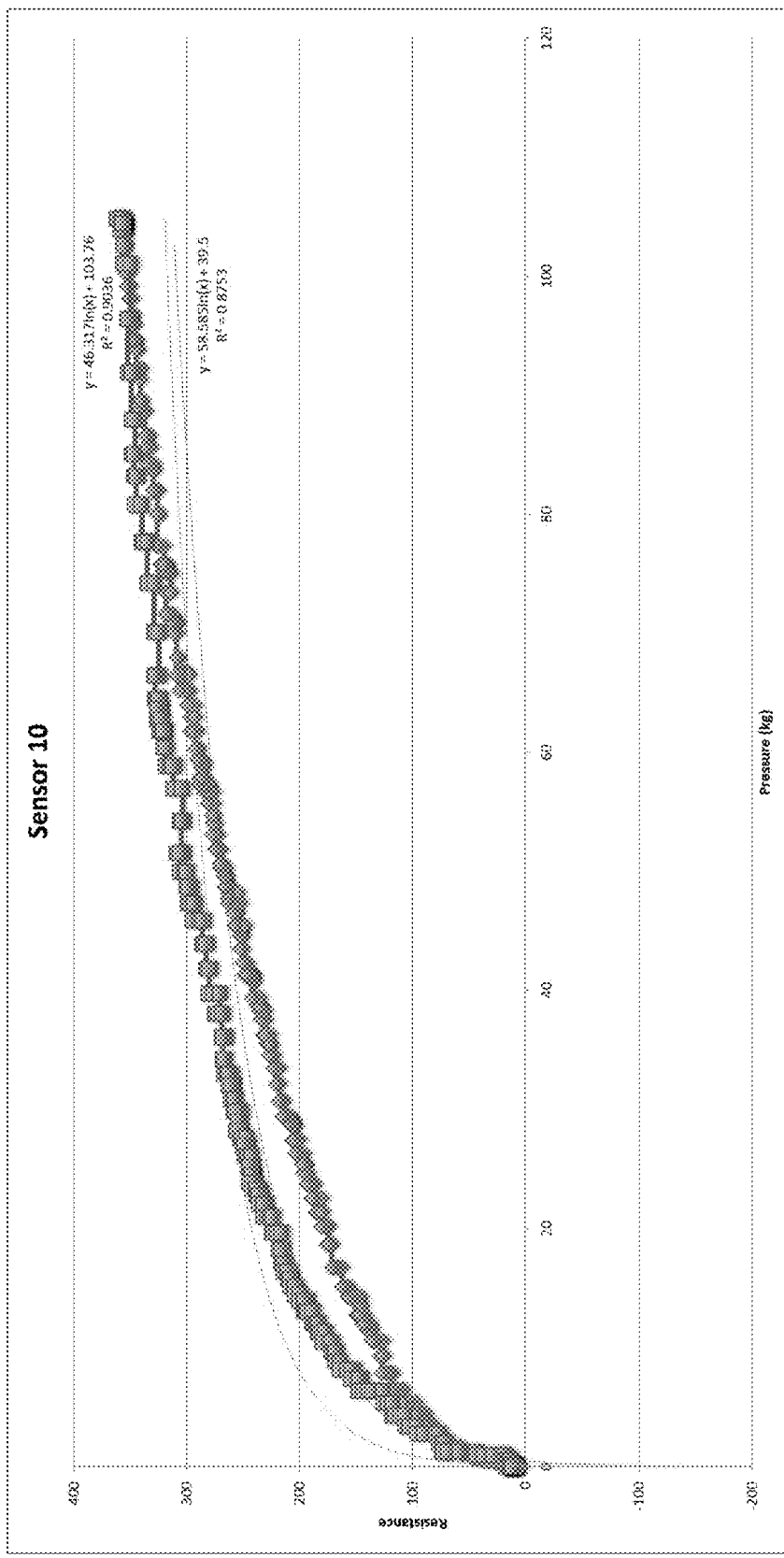
Figure 18:
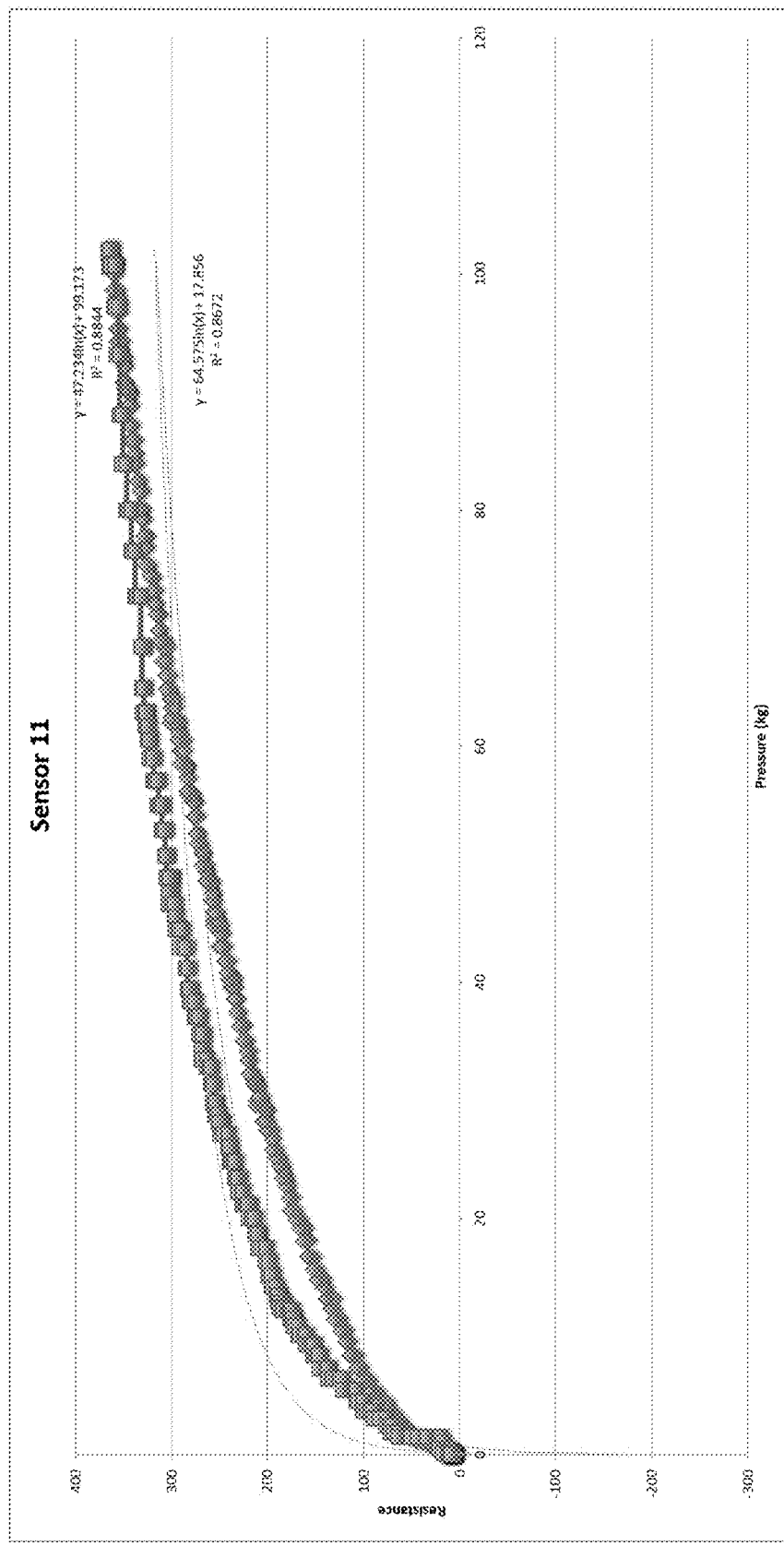
Figure 19:
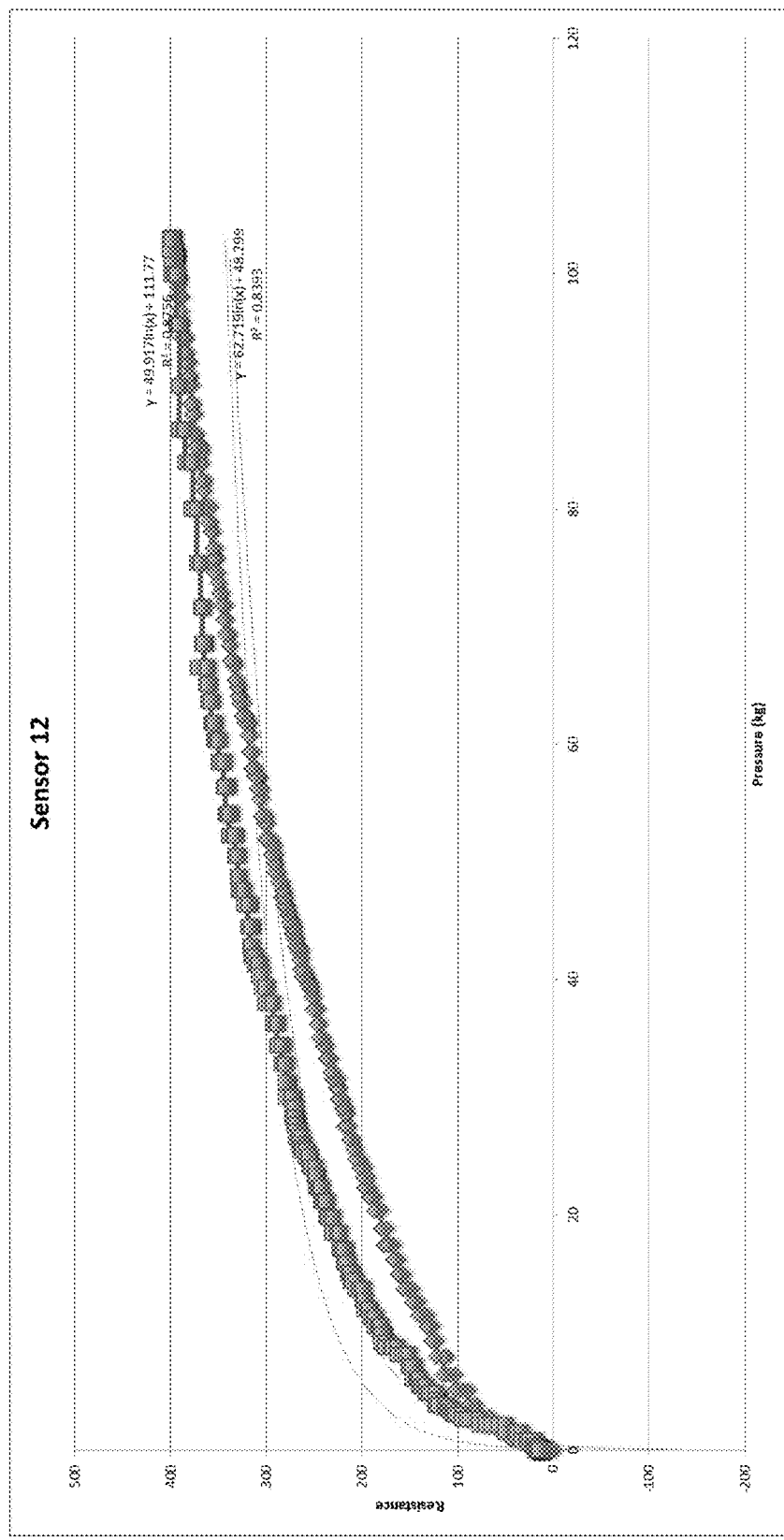
Figure 20:
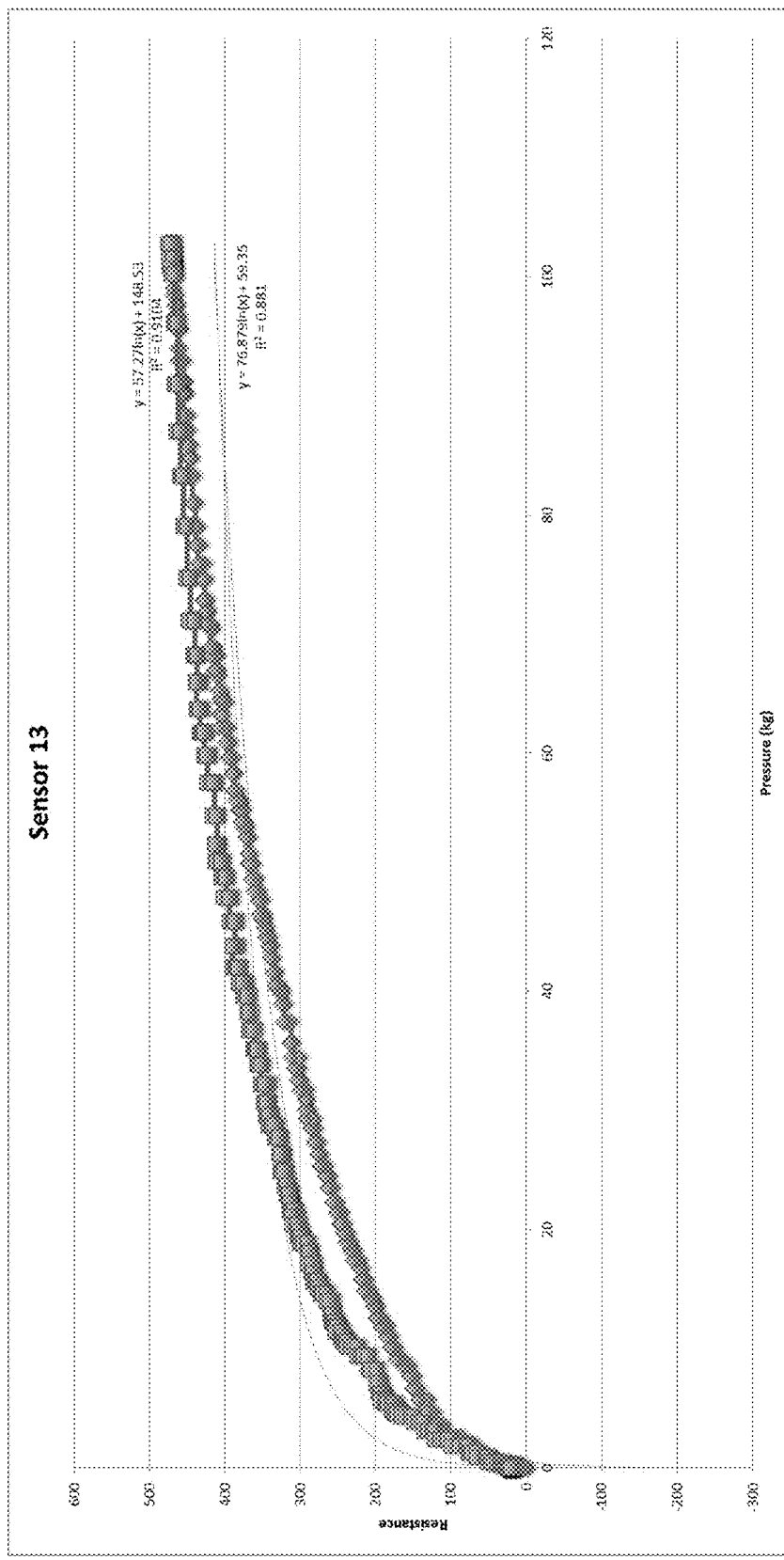
Figure 21:
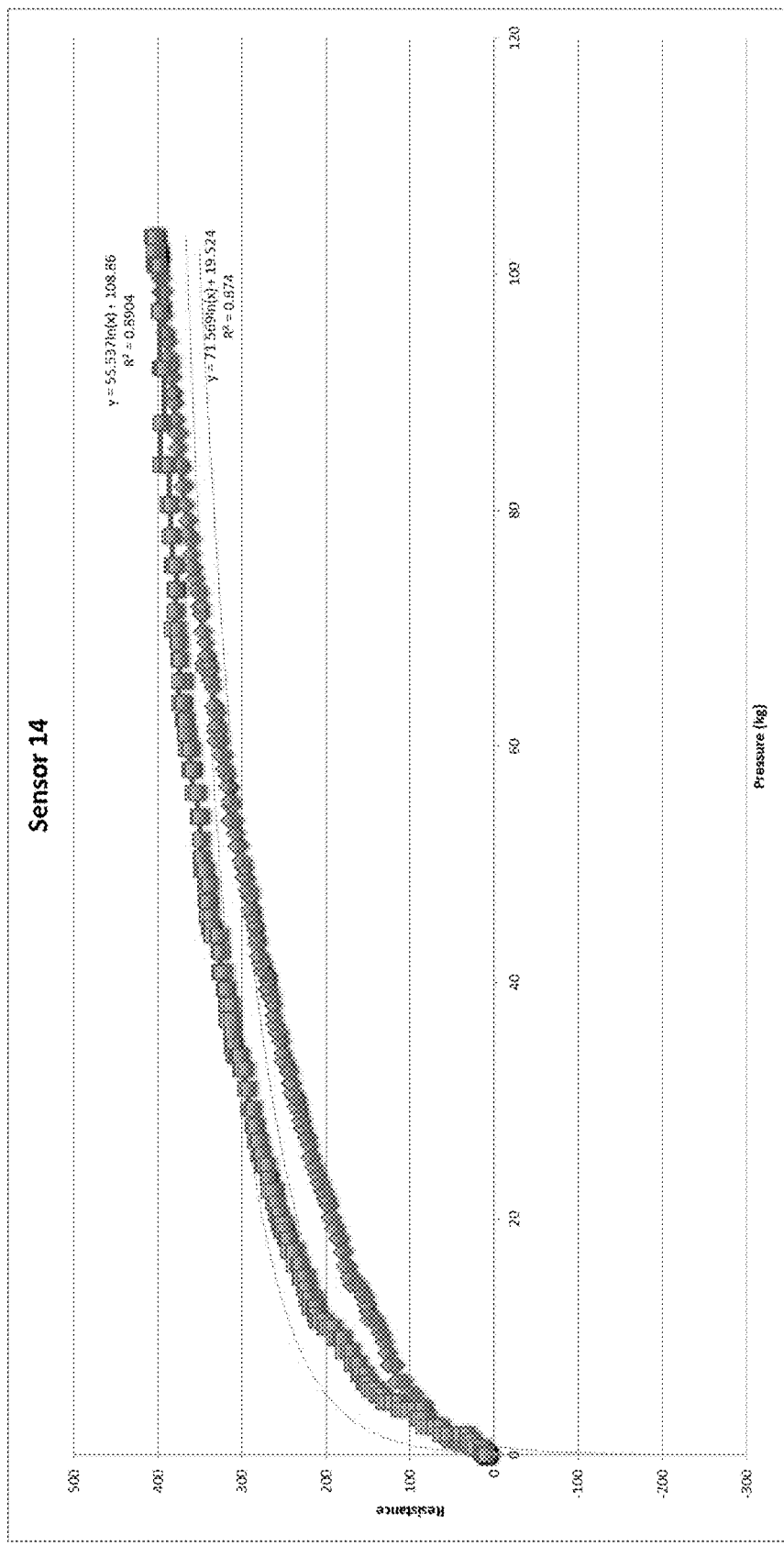
Figure 22:
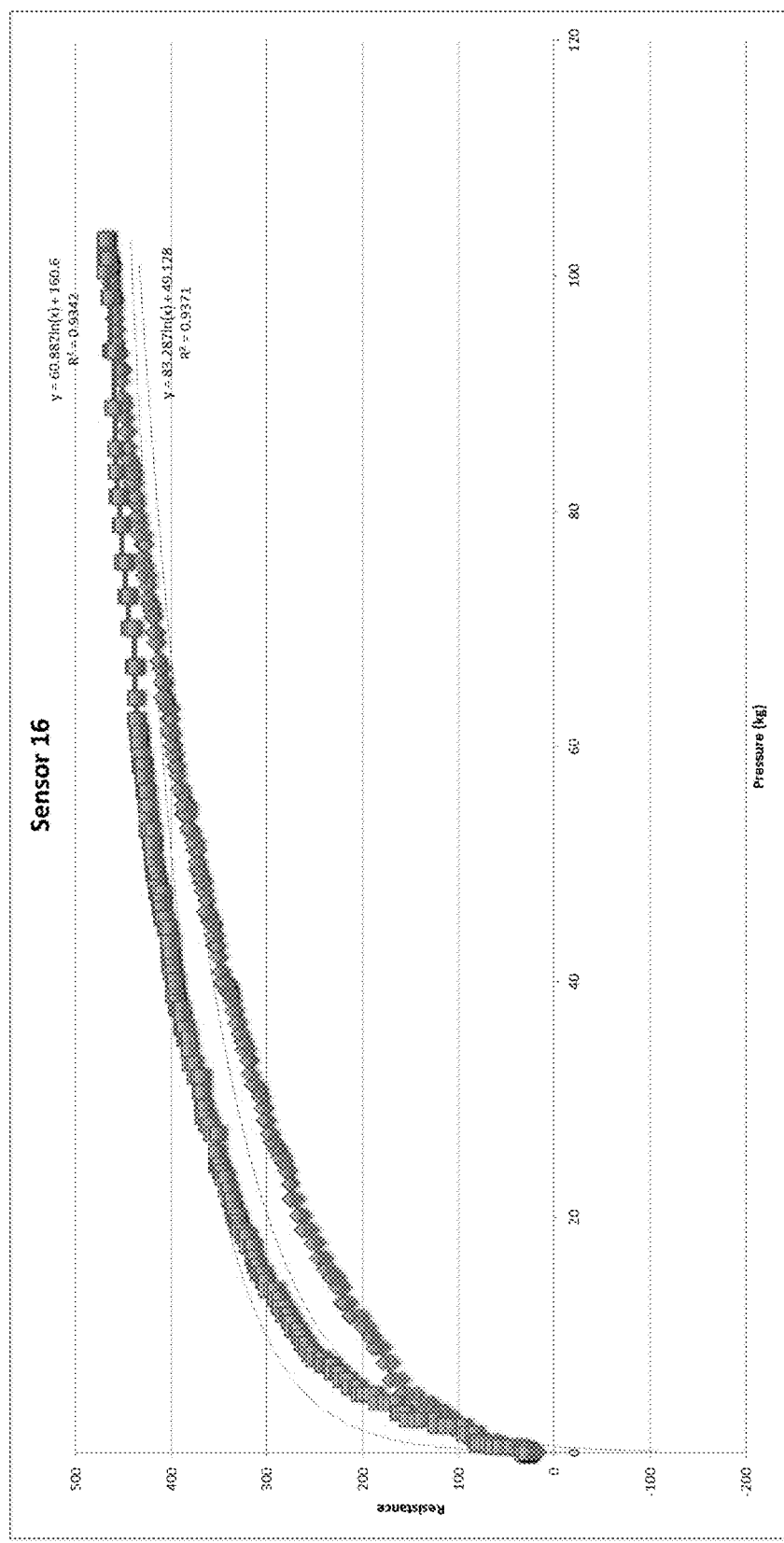
Figure 23:
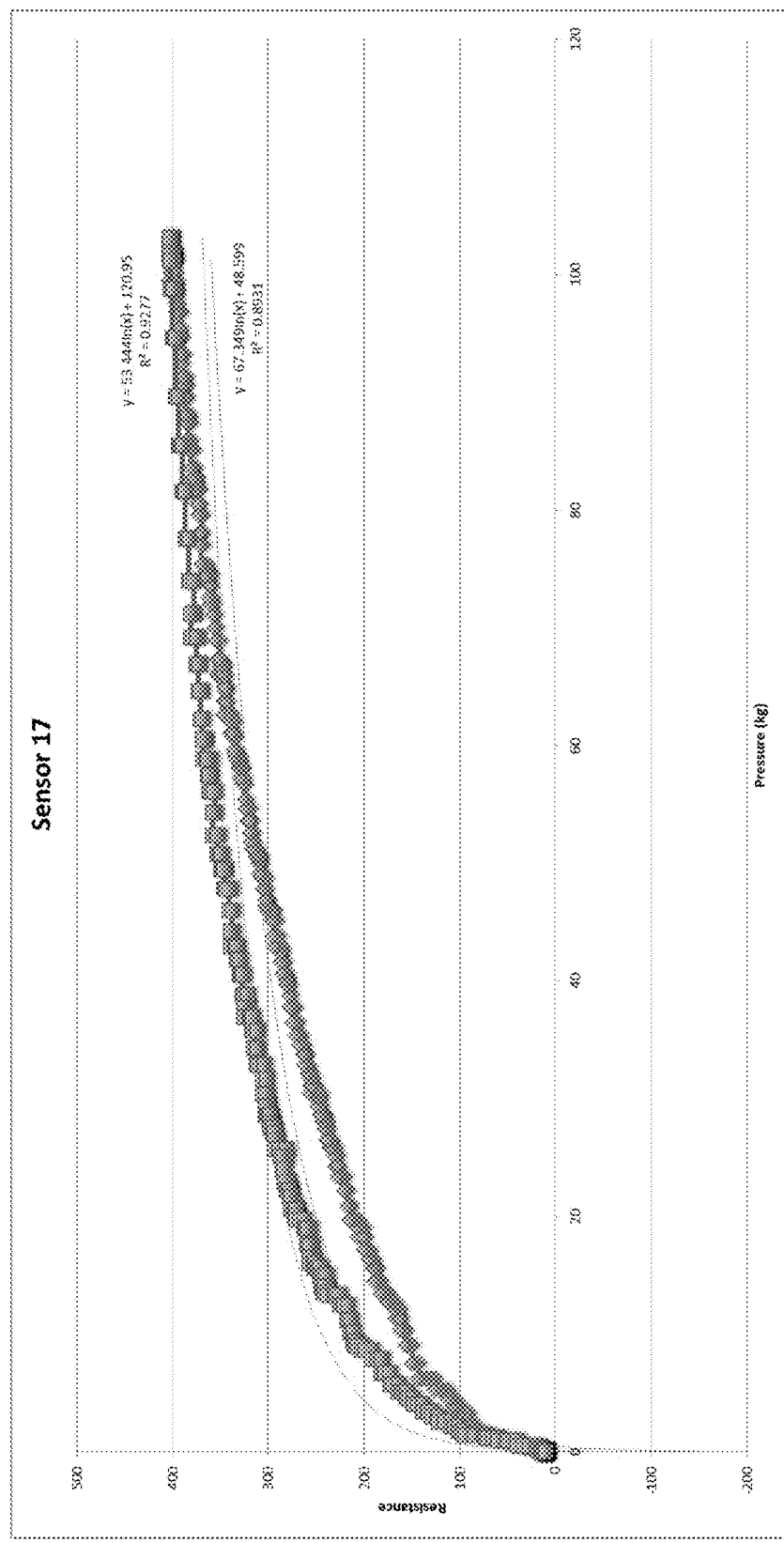
Figure 24:
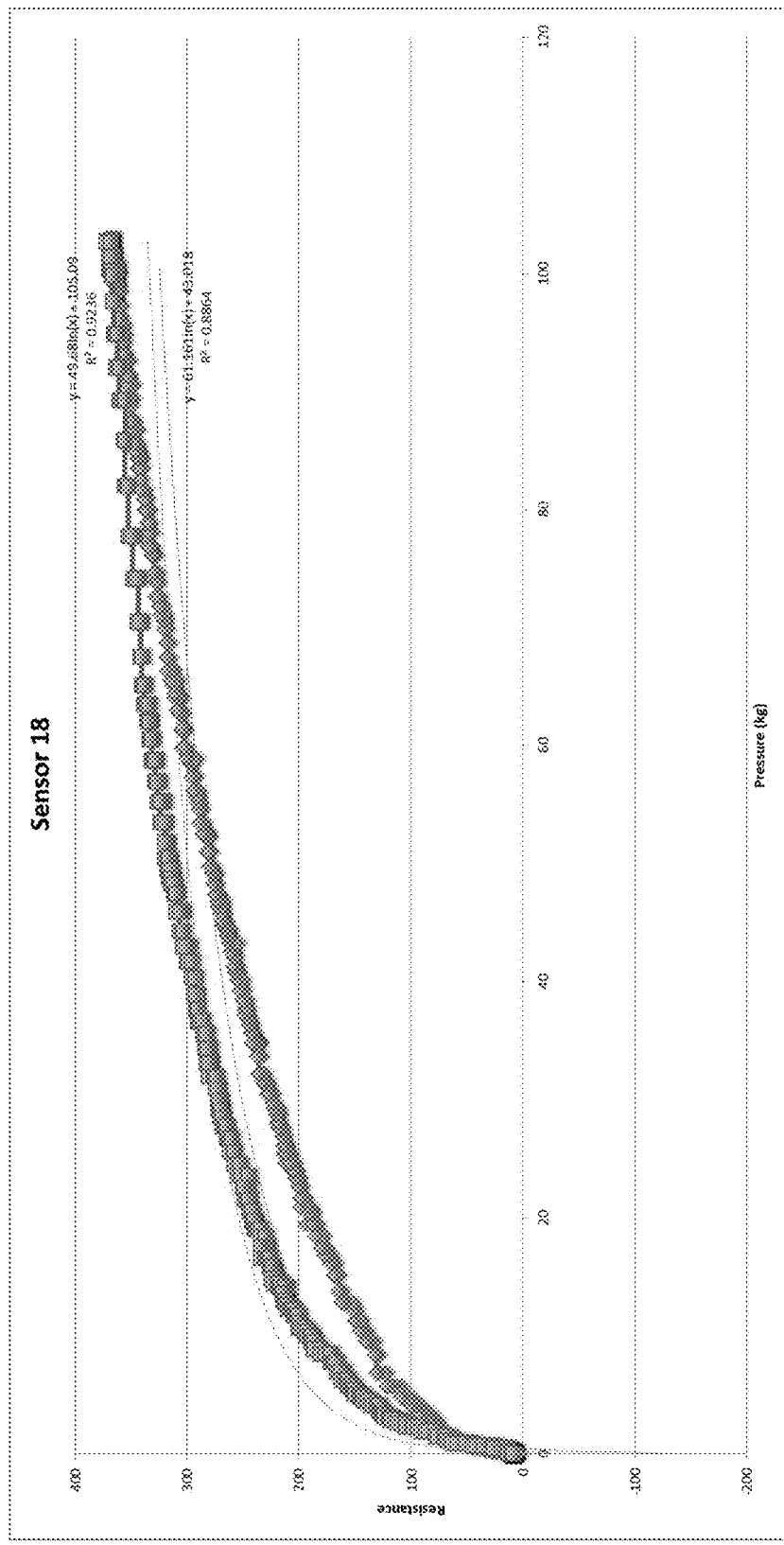
Figure 25:
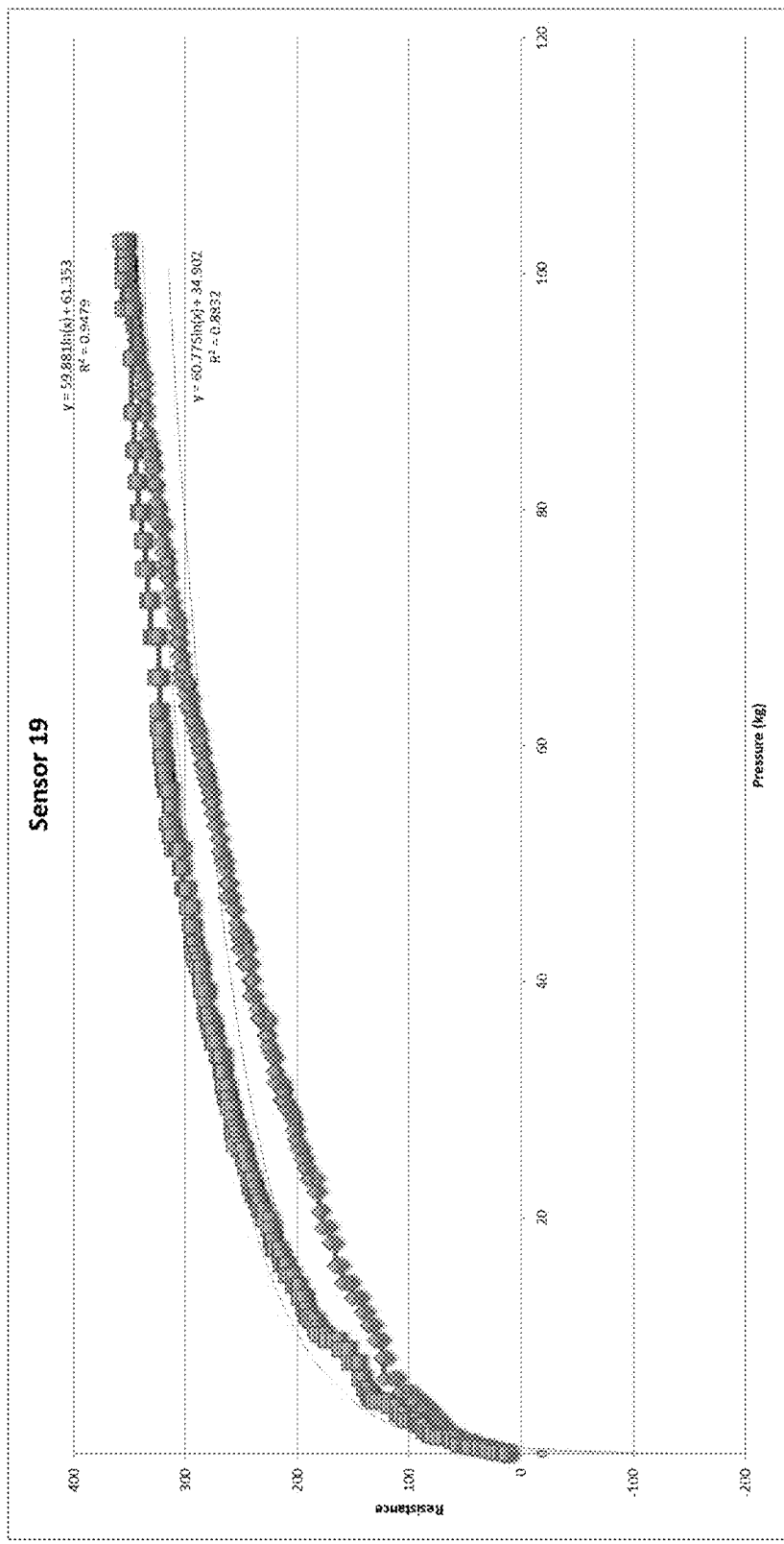

According to another class of implementations, a sensor system for the upper of an article of footwear is provided for sensing a different (and possibly complementary) set of forces relating to the human foot relative to the insole sensor system described above. FIG. 5 is an illustration of an example of such a sensor system that may be incorporated as part of the upper of a shoe or other type of footwear. The sensors are implemented with conductive trace patterns that are formed directly on or otherwise integrated with a flexible substrate. The flexible substrate may be a piezoresistive material or a dielectric material. In the latter case, a flexible piezoresistive material is tightly integrated with the dielectric material such that it makes contact with the sensor trace patterns. Portions of the conductive traces that are not intended to be part of a sensor are insulated from the piezoresistive substrate as indicated by the darker, shaded areas in FIG. 5. The sensor system (shown in a flattened position) may be made to conform to the curved form factor of the upper of the footwear with which it is integrated. This is enabled by the flexibility of the material(s) with which the sensor system is constructed. FIG. 6 shows various views of the sensor system including a "FLATTENED" view similar to FIG. 5 as well as five additional views from various perspectives of the sensor system formed for integration with an article of footwear.

In the depicted implementation, sensor circuitry (not shown) on PCB 502 energizes 27 sensors via 14 drive signal outputs and receives sensor signals from the 27 sensors via 2 sensor signal inputs. Selectively energizing the drive signal outputs allows for detection of forces at 27 different regions of the sensor system and may be accomplished in a manner similar to that described above with reference to the insole sensor system of FIG. 1. Two such regions (S1 and S2) are represented in a magnified view in the upper right hand corner of FIG. 5. One of the traces 504 receives a drive signal while traces 506 and 508 transmit respective sensor signals via insulated routing traces to the sensor circuitry on PCB 502. In this configuration, a single drive signal (e.g., on trace 504) energizes two adjacent sensors (S1 and S2), the sensor signals for which are received by independent sense signal lines (e.g., via traces 506 and 508). The drive signal might be provided, for example, by connecting the trace (permanently or temporarily) to a voltage reference, a signal source that may include additional information in the drive signal, a GPIO pin of a processor on PCB 502, etc. The order in which the sensors are energized may vary. And as shown in the example in FIG. 5, the sensor signals might be generated using voltage dividers in which one of the resistors of the divider includes the resistance between the two traces of each sensor through the intervening piezoresistive material and the other (represented by R2 and R3) might be included with the sensor circuitry. The sensor circuitry may be implemented, for example, as described above with reference to FIGS. 3 and 4.

In some implementations, the multiplicity of sensors in the upper sensor system may enable the determination of a vector representing the force of an impact. That is, because a shoe upper can be made to deform fairly readily, signals representing an impact can be captured for multiple adjacent sensors. By comparing the timing and magnitudes of the captured signals and applying some fairly straightforward mathematics (e.g., with the associated sensor circuitry) a vector representing the impact (e.g., magnitude, speed, direction, etc.) can be derived.

The upper sensor system can be multi-layered in a manner similar to at least some aspects of the insole system described above with reference to FIG. 2, e.g., for comfort, and/or protection of the system components from environmental conditions and/or shear forces. And as should be appreciated, sensors implemented as described herein can be inserted into an existing shoe, on the outside of an existing shoe, or integrated with the shoe structure depending on the application.

For some applications, it may be important to account for crosstalk among the sensors of an array. Crosstalk refers to contributions to a particular sensor's output attributable to other resistive components of the array in parallel with the resistance of the sensor of interest; often referred to as parasitic resistances. As discussed above, the capture of a sensor's output is accomplished through the use of an analog-to-digital converter (ADC) that compares the input to a stable reference and generates an ADC Count given by:

$$\text{Count} = ADC_{max} * \left( \frac{(V_+ - V_-)}{V_{ref}} \right)$$

where $V_+ - V_-$ represents the ADC input voltage from the sensor ($V_{in}$), and $V_{ref}$ the ADC's reference. According to a particular class of implementations, it is possible to more accurately determine the value of the resistance of interest by taking multiple measurements for the sensor and combining the measurements mathematically in a way that allows for solving for the resistance of interest.

According to one such implementation, one measurement, V1, is taken with the drive signal of the sensor of interest driven high and the drive signals of all of the other sensors driven low. A second measurement, V2, is taken with the drive signal of the sensor of interest driven low and the drive signals of the other sensors driven high. Equations for V1 and V2 may be written as follows:

$$V1 = 3.3V \left( \frac{R? \| Rp}{R? + R \| Rp} \right)$$

$$V2 = 3.3V \left( \frac{R \| Rp}{R + R? \| Rp} \right)$$

where R represents the resistance of the sensor of interest, R? represents the resistance of the other resistive components of the array contributing to the measurement, Rp represents the other resistor of the sensor's voltage divider, and 3.3V represents the reference voltage of the ADC. Using substitution, we can find an equation for V1 in terms of V2 (or vice-versa), eliminating the dependence on R? as follows:

$$V1 = Rp \left( \frac{3.3V - V2}{R + Rp} \right)$$

$$V2 = 3.3V - \frac{V1(R + Rp)}{Rp}$$

Solving either of these equations for R yields:

$$R = Rp \left( \frac{3.3V - V2}{V1} - 1 \right)$$

And since the measurements of V1 and V2 are in units of ADC Counts, we can choose Vref=Vin=3.3V such that the processor can determine R, the resistance of the sensor of interest, as follows:

$$R = Rp \left( \frac{ADC_{max} - Count_{V2}}{Count_{V1}} - 1 \right)$$

A more accurate determination of R allows for a more accurate determination of the force applied to the sensor of interest (e.g., using R as an index into a table of resistance vs. force values).

Modifications to this approach might be useful for some applications in which it is desirable to reduce the amount of time required to complete the measurements and calculations for each sensor. For example, V2 can be measured without driving the signal line for the sensor of interest low, in which case it can be shown that R, the resistance of the sensor of interest, is given by:

$$R = Rp \left( \frac{ADC_{max} - Count_{V2}}{Count_{V1}} \right)$$

This requires fewer instructions/operations by the processor and may be advantageous for applications using higher sample rates. Other variations of these approaches may be apparent to those of skill in the art.

The sensor systems described herein may be used separately and in combination in a wide range of applications. For example, insole sensor systems enabled by the present disclosure can provide information about how the different parts of the foot are contacting a surface (e.g., the ground) through the bottom of a shoe. Such information might be used, for example, for measuring pronation, heel-toe gait analysis, measuring ground reaction (e.g., start/stop speed), measuring hang time (when jumping), measuring torque on turns, etc. Such information might be useful in a wide variety of applications. For example, in the context of athletics, such information could be used to monitor the running technique or balance of an athlete. In the context of medicine, such information could be used to monitor the gait of a rehab patient. In the development of prosthetic devices, such information could be used to provide feedback about the forces on a prosthetic limb for helping to control operation of the prosthesis. In the context of virtual reality, such information (possibly in conjunction with sensor data from an upper sensor system) might be used to translate the movements of a human or interaction with objects in the physical world to an avatar or objects in a virtual space.

An upper sensor system enabled by the present disclosure might be useful for a wide variety of health related applications including, for example, sensing forces associated with the swelling of the feet associated with a diabetic incident. In another example, the depicted sensor system (possibly in conjunction with an insole sensor system) might be used in measuring the style of walking of a patient, with such sensor data being useful, for example, for anticipating a stroke or other health related incident that can be determined by comparing variations in gait and flexing over time. Other examples include measurement of incident forces on soldiers' boots or construction footwear for safety purposes. Applications relating to various sports that involve kicking an object (e.g., a soccer ball, hackeysack, football, etc.) are also contemplated in which impacts are measured in a variety of ways. Other applications (possibly using upper and insole sensor systems together) could relate to sensing the forces associated with footwork (e.g., in sports, dance, etc.) for instructional or coaching purposes. As should be appreciated, any of the foregoing examples may use insole and upper sensor systems in combination to provide additional information that is relevant to the particular application.

As will be appreciated from these diverse examples, the range of applications of sensor systems enabled by the present disclosure is quite broad.

It will be understood by those skilled in the art that changes in the form and details of the implementations described herein may be made without departing from the scope of this disclosure. For example, implementations have been described herein in which conductive traces are formed directly on a flexible piezoresistive substrate to form various types of sensor systems. However, it has also been noted that implementations are contemplated in which some or even all of the conductive traces of a sensor system enabled by the present disclosure may not be formed directly on a flexible piezoresistive substrate, but instead are formed on another flexible substrate that is tightly integrated with a piezoresistive substrate. For example, the conductive traces forming a sensor array may be formed on a non-conductive or low conductivity substrate (e.g., a fabric or rubber with dielectric properties) which is placed in contact with a flexible piezoresistive substrate in a multi-layer structure such that the conductive traces are in contact with the piezoresistive substrate. As will be appreciated by those of skill in the art, such an arrangement may function in a manner similar to sensor systems in which the conductive traces are formed directly on the piezoresistive substrate.

Finally, although various advantages and aspects may have been described with reference to particular implementations, the scope of this disclosure should not be limited by reference to such advantages and aspects.

Sensor Test Data

The data for each of the sensor tables in the following pages are shown graphically in a corresponding figure.

| Sensor 0 | |
|---|---|
| pressure | resistance |
| 0.15 | 26 |
| 0.15 | 32 |
| 0.15 | 35 |
| 0.15 | 41 |
| 0.5 | 41 |
| 0.5 | 44 |
| 0.5 | 49 |
| 0.5 | 57 |
| 1.05 | 57 |
| 1.05 | 64 |
| 1.05 | 69 |
| 1.05 | 81 |
| 1.05 | 91 |
| 1.9 | 91 |
| 1.9 | 99 |
| 1.9 | 106 |
| 1.9 | 112 |
| 3.4 | 112 |
| 3.4 | 114 |
| 3.4 | 117 |
| 3.4 | 123 |
| 5.05 | 123 |
| 5.05 | 129 |
| 5.05 | 133 |
| 5.05 | 129 |
| 6.45 | 129 |
| 6.45 | 145 |
| 6.45 | 150 |
| 6.45 | 156 |
| 7.95 | 156 |
| 7.95 | 159 |
| 7.95 | 162 |
| 7.95 | 166 |
| 9.6 | 166 |
| 9.6 | 171 |
| 9.6 | 177 |
| 9.6 | 179 |
| 11.3 | 179 |
| 11.3 | 182 |
| 11.3 | 187 |
| 12.65 | 187 |
| 12.65 | 190 |
| 12.65 | 195 |
| 12.65 | 190 |
| 13.65 | 190 |
| 13.65 | 194 |
| 13.65 | 195 |
| 13.65 | 198 |
| 14.6 | 198 |
| 14.6 | 200 |
| 14.6 | 202 |
| 14.6 | 206 |
| 14.6 | 209 |
| 15.65 | 209 |
| 15.65 | 214 |
| 15.65 | 211 |
| 15.65 | 212 |
| 16.85 | 212 |
| 16.85 | 210 |
| 16.85 | 219 |
| 16.85 | 220 |
| 18.1 | 220 |
| 18.1 | 225 |
| 18.1 | 226 |
| 18.1 | 228 |
| 19.35 | 228 |
| 19.35 | 230 |
| 19.35 | 233 |
| 19.35 | 236 |
| 21.05 | 236 |
| 21.05 | 239 |
| 21.05 | 244 |
| 21.05 | 243 |
| 22.6 | 243 |
| 22.6 | 247 |
| 22.6 | 251 |
| 22.6 | 253 |

-continued

Sensor 0

| pressure | resistance |
|---|---|
| 24.55 | 253 |
| 24.55 | 257 |
| 24.55 | 259 |
| 26.4 | 259 |
| 26.4 | 263 |
| 26.4 | 267 |
| 26.4 | 264 |
| 27.75 | 264 |
| 27.75 | 267 |
| 27.75 | 268 |
| 27.75 | 270 |
| 28.9 | 270 |
| 28.9 | 271 |
| 28.9 | 273 |
| 28.9 | 274 |
| 30 | 274 |
| 30 | 276 |
| 30.65 | 276 |
| 30.65 | 282 |
| 30.65 | 283 |
| 31.85 | 283 |
| 31.85 | 284 |
| 31.85 | 285 |
| 31.85 | 287 |
| 33.15 | 287 |
| 33.15 | 290 |
| 33.15 | 295 |
| 34.65 | 295 |
| 34.65 | 290 |
| 34.65 | 294 |
| 34.65 | 295 |
| 35.8 | 295 |
| 35.8 | 298 |
| 35.8 | 300 |
| 35.8 | 306 |
| 35.8 | 303 |
| 37.55 | 303 |
| 37.55 | 305 |
| 37.55 | 308 |
| 37.55 | 309 |
| 39.45 | 309 |
| 39.45 | 308 |
| 39.45 | 312 |
| 39.45 | 314 |
| 41.45 | 314 |
| 41.45 | 316 |
| 42.7 | 316 |
| 42.7 | 317 |
| 42.7 | 320 |
| 43.85 | 320 |
| 43.85 | 322 |
| 43.85 | 321 |
| 43.85 | 326 |
| 45.25 | 326 |
| 45.25 | 325 |
| 45.25 | 332 |
| 45.25 | 325 |
| 46.35 | 325 |
| 46.35 | 329 |
| 46.35 | 331 |
| 46.35 | 333 |
| 48.05 | 333 |
| 48.05 | 329 |
| 48.05 | 333 |
| 48.05 | 335 |
| 49.1 | 335 |
| 49.1 | 339 |
| 49.1 | 338 |
| 50.35 | 338 |
| 50.35 | 340 |
| 50.35 | 341 |
| 51.1 | 341 |
| 51.1 | 340 |
| 51.1 | 341 |
| 51.1 | 338 |

-continued

Sensor 0

| pressure | resistance |
|---|---|
| 51.3 | 338 |
| 51.3 | 344 |
| 51.3 | 345 |
| 52.15 | 345 |
| 52.15 | 346 |
| 52.6 | 346 |
| 52.6 | 342 |
| 52.6 | 351 |
| 52.6 | 348 |
| 54.15 | 348 |
| 54.15 | 354 |
| 54.15 | 351 |
| 55.4 | 351 |
| 55.4 | 355 |
| 55.4 | 360 |
| 55.4 | 355 |
| 55.4 | 354 |
| 56.5 | 354 |
| 56.5 | 356 |
| 56.5 | 357 |
| 56.5 | 360 |
| 58.25 | 360 |
| 58.25 | 359 |
| 58.25 | 360 |
| 58.25 | 363 |
| 59.8 | 363 |
| 59.8 | 361 |
| 59.8 | 364 |
| 59.8 | 366 |
| 60.95 | 366 |
| 60.95 | 364 |
| 60.95 | 367 |
| 60.95 | 365 |
| 61.6 | 365 |
| 61.6 | 368 |
| 61.6 | 367 |
| 61.6 | 369 |
| 62.1 | 369 |
| 62.1 | 371 |
| 62.1 | 370 |
| 62.1 | 372 |
| 63.05 | 372 |
| 63.05 | 374 |
| 63.05 | 375 |
| 63.05 | 376 |
| 64.1 | 376 |
| 64.1 | 371 |
| 64.1 | 375 |
| 64.1 | 376 |
| 65.5 | 376 |
| 65.5 | 378 |
| 65.5 | 377 |
| 66.85 | 377 |
| 66.85 | 380 |
| 66.85 | 383 |
| 68.4 | 383 |
| 68.4 | 385 |
| 68.4 | 384 |
| 69.55 | 384 |
| 69.55 | 387 |
| 69.55 | 388 |
| 71.4 | 388 |
| 71.4 | 390 |
| 72.25 | 390 |
| 72.25 | 392 |
| 72.25 | 393 |
| 73.85 | 393 |
| 73.85 | 392 |
| 73.85 | 397 |
| 75.05 | 397 |
| 75.05 | 398 |
| 76.15 | 398 |
| 76.15 | 397 |
| 76.15 | 400 |
| 76.15 | 398 |

-continued

| Sensor 0 | |
|---|---|
| pressure | resistance |
| 77.35 | 398 |
| 77.35 | 399 |
| 77.35 | 402 |
| 77.35 | 403 |
| 78.2 | 403 |
| 78.2 | 402 |
| 78.2 | 404 |
| 78.2 | 403 |
| 79.9 | 403 |
| 79.9 | 405 |
| 79.9 | 403 |
| 79.9 | 406 |
| 80.95 | 406 |
| 80.95 | 410 |
| 80.95 | 408 |
| 80.95 | 410 |
| 83.05 | 410 |
| 83.05 | 411 |
| 83.05 | 410 |
| 83.05 | 411 |
| 84 | 411 |
| 84 | 413 |
| 84 | 414 |
| 84 | 419 |
| 85.5 | 419 |
| 85.5 | 414 |
| 85.5 | 415 |
| 85.5 | 416 |
| 85.5 | 418 |
| 86.55 | 418 |
| 86.55 | 415 |
| 87 | 415 |
| 87 | 419 |
| 87 | 420 |
| 87 | 422 |
| 88.25 | 422 |
| 88.25 | 421 |
| 88.25 | 423 |
| 89.35 | 423 |
| 89.35 | 425 |
| 89.35 | 426 |
| 89.35 | 425 |
| 91.7 | 425 |
| 91.7 | 426 |
| 91.7 | 427 |
| 91.7 | 428 |
| 93.65 | 428 |
| 93.65 | 429 |
| 95.05 | 429 |
| 95.05 | 432 |
| 95.05 | 430 |
| 97.05 | 430 |
| 97.05 | 432 |
| 97.05 | 433 |
| 97.05 | 434 |
| 98 | 434 |
| 98 | 433 |
| 98 | 435 |
| 98 | 434 |
| 98 | 435 |
| 98.8 | 435 |
| 98.8 | 436 |
| 99.4 | 436 |
| 99.4 | 438 |
| 99.4 | 437 |
| 99.9 | 437 |
| 99.9 | 444 |
| 99.9 | 438 |
| 99.9 | 441 |
| 100.15 | 441 |
| 100.15 | 439 |
| 100.15 | 437 |
| 100.15 | 440 |
| 100.35 | 440 |
| 100.35 | 437 |

-continued

| Sensor 0 | |
|---|---|
| pressure | resistance |
| 100.35 | 440 |
| 100.35 | 440 |
| 100.35 | 435 |
| 100.35 | 439 |
| 100.35 | 441 |
| 100.35 | 441 |
| 100.05 | 441 |
| 100.05 | 442 |
| 100.05 | 438 |
| 100.05 | 441 |
| 100.05 | 442 |
| 99.6 | 442 |
| 99.35 | 442 |
| 99.35 | 444 |
| 99.35 | 447 |
| 99.35 | 444 |
| 99.55 | 444 |
| 99.55 | 443 |
| 99.55 | 435 |
| 99.55 | 443 |
| 100.2 | 443 |
| 100.2 | 442 |
| 100.2 | 444 |
| 100.2 | 442 |
| 99.9 | 442 |
| 99.9 | 437 |
| 99.9 | 436 |
| 99.9 | 433 |
| 94.95 | 433 |
| 94.95 | 431 |
| 94.95 | 424 |
| 94.95 | 427 |
| 87.15 | 427 |
| 87.15 | 424 |
| 87.15 | 418 |
| 87.15 | 415 |
| 78.85 | 415 |
| 78.85 | 407 |
| 78.85 | 409 |
| 78.85 | 407 |
| 71.6 | 407 |
| 71.6 | 404 |
| 71.6 | 403 |
| 65.85 | 403 |
| 65.85 | 399 |
| 65.85 | 396 |
| 61.3 | 396 |
| 61.3 | 390 |
| 61.3 | 382 |
| 61.3 | 389 |
| 57.6 | 389 |
| 57.6 | 388 |
| 57.6 | 385 |
| 57.6 | 382 |
| 54.05 | 382 |
| 54.05 | 379 |
| 54.05 | 378 |
| 54.05 | 376 |
| 50.65 | 376 |
| 50.65 | 377 |
| 50.65 | 373 |
| 50.65 | 372 |
| 47.8 | 372 |
| 47.8 | 370 |
| 47.8 | 366 |
| 45.15 | 366 |
| 45.15 | 364 |
| 45.15 | 361 |
| 45.15 | 360 |
| 45.15 | 356 |
| 42.7 | 356 |
| 42.7 | 354 |
| 42.7 | 351 |
| 42.7 | 347 |
| 39.85 | 347 |

| Sensor 0 | |
|---|---|
| pressure | resistance |
| 39.85 | 344 |
| 39.85 | 340 |
| 39.85 | 337 |
| 36.7 | 337 |
| 36.7 | 332 |
| 36.7 | 329 |
| 33.35 | 329 |
| 33.35 | 327 |
| 33.35 | 326 |
| 33.35 | 321 |
| 30.2 | 321 |
| 30.2 | 316 |
| 30.2 | 313 |
| 30.2 | 312 |
| 27.25 | 312 |
| 27.25 | 311 |
| 27.25 | 308 |
| 27.25 | 306 |
| 24.95 | 306 |
| 24.95 | 304 |
| 24.95 | 302 |
| 24.95 | 299 |
| 23.05 | 299 |
| 23.05 | 294 |
| 23.05 | 293 |
| 23.05 | 288 |
| 21 | 288 |
| 21 | 286 |
| 21 | 283 |
| 21 | 280 |
| 21 | 276 |
| 18.95 | 276 |
| 18.95 | 275 |
| 18.95 | 272 |
| 18.95 | 271 |
| 17.25 | 271 |
| 17.25 | 267 |
| 17.25 | 268 |
| 17.25 | 267 |
| 15.95 | 267 |
| 15.95 | 268 |
| 15.95 | 267 |
| 15.95 | 264 |
| 15.25 | 264 |
| 15.25 | 261 |
| 15.25 | 250 |
| 15.25 | 248 |
| 14.05 | 248 |
| 14.05 | 242 |
| 14.05 | 233 |
| 14.05 | 226 |
| 11.95 | 226 |
| 11.95 | 217 |
| 11.95 | 207 |
| 11.95 | 200 |
| 9.25 | 200 |
| 9.25 | 194 |
| 9.25 | 188 |
| 9.25 | 179 |
| 6.95 | 179 |
| 6.95 | 170 |
| 6.95 | 152 |
| 6.95 | 143 |
| 6.95 | 139 |
| 4.95 | 139 |
| 4.95 | 134 |
| 4.95 | 124 |
| 4.95 | 113 |
| 3.4 | 113 |
| 3.4 | 101 |
| 3.4 | 95 |
| 3.4 | 75 |
| 2.2 | 75 |
| 2.2 | 58 |
| 2.2 | 45 |
| 2.2 | 37 |
| 1.2 | 37 |
| 1.2 | 29 |
| 1.2 | 24 |
| 1.2 | 23 |
| 0.45 | 23 |
| 0.45 | 22 |
| 0.1 | 22 |
| 0.1 | 20 |
| 0.1 | 22 |
| 0.1 | 21 |

| Sensor 1 | |
|---|---|
| pressure | resistance |
| 0.05 | 7 |
| 0.05 | 8 |
| 0.05 | 12 |
| 0.05 | 15 |
| 0.15 | 15 |
| 0.15 | 19 |
| 0.15 | 21 |
| 0.15 | 23 |
| 0.25 | 23 |
| 0.25 | 26 |
| 0.25 | 32 |
| 0.25 | 39 |
| 0.45 | 39 |
| 0.45 | 40 |
| 0.45 | 47 |
| 0.45 | 50 |
| 0.7 | 50 |
| 0.7 | 52 |
| 0.7 | 58 |
| 0.7 | 64 |
| 1.1 | 64 |
| 1.1 | 63 |
| 1.1 | 84 |
| 1.1 | 88 |
| 1.75 | 88 |
| 1.75 | 95 |
| 1.75 | 101 |
| 1.75 | 106 |
| 2.7 | 106 |
| 2.7 | 110 |
| 2.7 | 116 |
| 3.7 | 116 |
| 3.7 | 121 |
| 3.7 | 124 |
| 3.7 | 126 |
| 4.6 | 126 |
| 4.6 | 131 |
| 4.6 | 132 |
| 4.6 | 136 |
| 5.45 | 136 |
| 5.45 | 140 |
| 5.45 | 143 |
| 5.45 | 151 |
| 6.4 | 151 |
| 6.4 | 153 |
| 6.4 | 159 |
| 6.4 | 161 |
| 6.4 | 166 |
| 7.65 | 166 |
| 7.65 | 170 |
| 7.65 | 174 |
| 7.65 | 177 |
| 9 | 177 |
| 9 | 181 |
| 9 | 190 |
| 9 | 193 |

-continued

| Sensor 1 | |
|---|---|
| pressure | resistance |
| 10.55 | 193 |
| 10.55 | 196 |
| 10.55 | 198 |
| 10.55 | 203 |
| 12.3 | 203 |
| 12.3 | 207 |
| 12.3 | 209 |
| 13.95 | 209 |
| 13.95 | 215 |
| 13.95 | 220 |
| 13.95 | 223 |
| 15.55 | 223 |
| 15.55 | 229 |
| 15.55 | 233 |
| 15.55 | 238 |
| 17.6 | 238 |
| 17.6 | 246 |
| 17.6 | 251 |
| 20.35 | 251 |
| 20.35 | 257 |
| 20.35 | 258 |
| 20.35 | 260 |
| 22.7 | 260 |
| 22.7 | 261 |
| 22.7 | 260 |
| 22.7 | 261 |
| 23.6 | 261 |
| 23.6 | 265 |
| 23.6 | 266 |
| 23.6 | 270 |
| 24.1 | 270 |
| 24.1 | 274 |
| 24.1 | 275 |
| 24.1 | 277 |
| 25.7 | 277 |
| 25.7 | 278 |
| 25.7 | 279 |
| 25.7 | 282 |
| 27.2 | 282 |
| 27.2 | 283 |
| 27.2 | 285 |
| 27.2 | 287 |
| 28.35 | 287 |
| 28.35 | 286 |
| 28.35 | 289 |
| 28.35 | 291 |
| 29.3 | 291 |
| 29.3 | 292 |
| 29.3 | 293 |
| 29.3 | 292 |
| 30.25 | 292 |
| 30.25 | 293 |
| 30.25 | 296 |
| 30.25 | 297 |
| 31.4 | 297 |
| 31.4 | 299 |
| 31.4 | 300 |
| 31.4 | 299 |
| 31.4 | 304 |
| 32.1 | 304 |
| 32.1 | 307 |
| 33.25 | 307 |
| 33.25 | 309 |
| 33.25 | 310 |
| 34.2 | 310 |
| 34.2 | 311 |
| 34.2 | 316 |
| 34.2 | 311 |
| 34.65 | 311 |
| 34.65 | 309 |
| 34.65 | 314 |
| 34.65 | 318 |
| 35.55 | 318 |
| 35.55 | 316 |
| 35.55 | 319 |

-continued

| Sensor 1 | |
|---|---|
| pressure | resistance |
| 35.55 | 320 |
| 36.05 | 320 |
| 36.05 | 323 |
| 36.05 | 328 |
| 37.75 | 328 |
| 37.75 | 324 |
| 37.75 | 329 |
| 39 | 329 |
| 39 | 331 |
| 39.95 | 331 |
| 39.95 | 325 |
| 39.95 | 331 |
| 39.95 | 334 |
| 39.95 | 333 |
| 41.35 | 333 |
| 41.35 | 336 |
| 41.35 | 339 |
| 42.15 | 339 |
| 42.15 | 340 |
| 42.15 | 341 |
| 42.15 | 342 |
| 44.2 | 342 |
| 44.2 | 344 |
| 44.2 | 342 |
| 44.2 | 345 |
| 45.5 | 345 |
| 45.5 | 346 |
| 45.5 | 349 |
| 46.4 | 349 |
| 46.4 | 350 |
| 46.4 | 353 |
| 46.4 | 352 |
| 47.9 | 352 |
| 47.9 | 353 |
| 47.9 | 355 |
| 48.6 | 355 |
| 48.6 | 357 |
| 48.6 | 358 |
| 48.6 | 356 |
| 48.6 | 358 |
| 49.7 | 358 |
| 49.7 | 360 |
| 49.7 | 359 |
| 49.7 | 362 |
| 50.65 | 362 |
| 50.65 | 368 |
| 50.65 | 365 |
| 51.5 | 365 |
| 51.5 | 367 |
| 51.5 | 366 |
| 51.5 | 370 |
| 52.5 | 370 |
| 52.5 | 369 |
| 52.5 | 371 |
| 53 | 371 |
| 53 | 372 |
| 53 | 374 |
| 53 | 375 |
| 54.7 | 375 |
| 54.7 | 379 |
| 55.7 | 379 |
| 55.7 | 376 |
| 55.7 | 379 |
| 57.15 | 379 |
| 57.15 | 381 |
| 57.15 | 385 |
| 57.15 | 384 |
| 58.6 | 384 |
| 58.6 | 382 |
| 58.6 | 385 |
| 58.6 | 386 |
| 59.05 | 386 |
| 59.05 | 389 |
| 59.05 | 390 |
| 60.45 | 390 |

-continued

| Sensor 1 | |
|---|---|
| pressure | resistance |
| 60.45 | 392 |
| 60.45 | 394 |
| 61.95 | 394 |
| 61.95 | 388 |
| 62.95 | 388 |
| 62.95 | 398 |
| 62.95 | 400 |
| 62.95 | 398 |
| 64.75 | 398 |
| 64.75 | 399 |
| 64.75 | 405 |
| 66.2 | 405 |
| 66.2 | 404 |
| 66.2 | 405 |
| 66.2 | 406 |
| 67.35 | 406 |
| 67.35 | 407 |
| 67.35 | 409 |
| 67.35 | 415 |
| 69 | 415 |
| 69 | 411 |
| 69 | 412 |
| 69 | 410 |
| 69.95 | 410 |
| 69.95 | 415 |
| 69.95 | 416 |
| 72.25 | 416 |
| 72.25 | 420 |
| 72.25 | 416 |
| 73.4 | 416 |
| 73.4 | 420 |
| 73.4 | 422 |
| 75 | 422 |
| 75 | 423 |
| 75 | 426 |
| 75.9 | 426 |
| 75.9 | 428 |
| 77.4 | 428 |
| 77.4 | 424 |
| 77.4 | 432 |
| 77.4 | 433 |
| 79.6 | 433 |
| 79.6 | 434 |
| 81.25 | 434 |
| 81.25 | 435 |
| 81.25 | 437 |
| 81.25 | 438 |
| 83.85 | 438 |
| 83.85 | 439 |
| 83.85 | 441 |
| 84.7 | 441 |
| 84.7 | 442 |
| 84.7 | 444 |
| 84.7 | 443 |
| 86 | 443 |
| 86 | 448 |
| 86 | 447 |
| 87.8 | 447 |
| 87.8 | 446 |
| 87.8 | 450 |
| 89.1 | 450 |
| 89.1 | 449 |
| 89.1 | 450 |
| 91.05 | 450 |
| 91.05 | 452 |
| 91.05 | 451 |
| 91.8 | 451 |
| 91.8 | 457 |
| 91.8 | 455 |
| 91.8 | 456 |
| 93.7 | 456 |
| 93.7 | 460 |
| 93.7 | 459 |
| 95.45 | 459 |
| 95.45 | 460 |

-continued

| Sensor 1 | |
|---|---|
| pressure | resistance |
| 95.45 | 459 |
| 95.45 | 462 |
| 96.85 | 462 |
| 96.85 | 461 |
| 96.85 | 463 |
| 98.45 | 463 |
| 98.45 | 464 |
| 98.45 | 465 |
| 99.1 | 465 |
| 99.1 | 466 |
| 99.1 | 465 |
| 100.25 | 465 |
| 100.25 | 466 |
| 100.25 | 467 |
| 100.25 | 468 |
| 100.95 | 468 |
| 100.95 | 467 |
| 100.95 | 468 |
| 101.6 | 468 |
| 101.6 | 475 |
| 101.6 | 475 |
| 101.4 | 475 |
| 101.4 | 468 |
| 101.4 | 469 |
| 101.4 | 468 |
| 101.4 | 470 |
| 100.9 | 470 |
| 100.9 | 471 |
| 100.9 | 470 |
| 101.55 | 470 |
| 101.55 | 469 |
| 101.55 | 471 |
| 101.55 | 470 |
| 101.65 | 470 |
| 101.65 | 468 |
| 101.65 | 469 |
| 100 | 469 |
| 100 | 465 |
| 100 | 461 |
| 100 | 455 |
| 93.5 | 455 |
| 93.5 | 454 |
| 93.5 | 453 |
| 93.5 | 450 |
| 84.25 | 450 |
| 84.25 | 447 |
| 84.25 | 443 |
| 84.25 | 440 |
| 75.6 | 440 |
| 75.6 | 436 |
| 75.6 | 433 |
| 68.8 | 433 |
| 68.8 | 431 |
| 68.8 | 429 |
| 68.8 | 426 |
| 68.8 | 429 |
| 63.55 | 429 |
| 63.55 | 425 |
| 63.55 | 423 |
| 63.55 | 420 |
| 60.2 | 420 |
| 60.2 | 422 |
| 60.2 | 419 |
| 60.2 | 421 |
| 57.85 | 421 |
| 57.85 | 420 |
| 57.85 | 419 |
| 56.3 | 419 |
| 56.3 | 418 |
| 56.3 | 414 |
| 55.1 | 414 |
| 55.1 | 413 |
| 55.1 | 411 |
| 55.1 | 408 |
| 53.35 | 408 |

-continued

| Sensor 1 | |
|---|---|
| pressure | resistance |
| 53.35 | 406 |
| 50.85 | 406 |
| 50.85 | 402 |
| 50.85 | 401 |
| 50.85 | 402 |
| 50.85 | 401 |
| 48.6 | 401 |
| 48.6 | 399 |
| 48.6 | 397 |
| 46.85 | 397 |
| 46.85 | 395 |
| 45.45 | 395 |
| 45.45 | 393 |
| 45.45 | 392 |
| 45.45 | 390 |
| 44.15 | 390 |
| 44.15 | 389 |
| 44.15 | 390 |
| 44.15 | 385 |
| 42.65 | 385 |
| 42.65 | 384 |
| 42.65 | 383 |
| 41.1 | 383 |
| 41.1 | 381 |
| 41.1 | 380 |
| 39.75 | 380 |
| 39.75 | 378 |
| 39.75 | 374 |
| 38.7 | 374 |
| 38.7 | 376 |
| 38.7 | 370 |
| 37.25 | 370 |
| 37.25 | 369 |
| 37.25 | 368 |
| 35.75 | 368 |
| 35.75 | 366 |
| 35.75 | 362 |
| 34.3 | 362 |
| 34.3 | 359 |
| 33 | 359 |
| 33 | 357 |
| 33 | 353 |
| 33 | 355 |
| 31.45 | 355 |
| 31.45 | 352 |
| 31.45 | 350 |
| 30.05 | 350 |
| 30.05 | 348 |
| 30.05 | 349 |
| 28.95 | 349 |
| 28.95 | 348 |
| 28.3 | 348 |
| 28.3 | 345 |
| 28.3 | 347 |
| 27.8 | 347 |
| 27.8 | 346 |
| 27.8 | 344 |
| 27.8 | 339 |
| 27.8 | 342 |
| 26.95 | 342 |
| 26.95 | 336 |
| 26.95 | 333 |
| 25.6 | 333 |
| 25.6 | 334 |
| 25.6 | 329 |
| 23.95 | 329 |
| 23.95 | 326 |
| 23.95 | 321 |
| 23.95 | 320 |
| 22.45 | 320 |
| 22.45 | 318 |
| 22.45 | 314 |
| 22.45 | 310 |
| 20.7 | 310 |
| 20.7 | 307 |

-continued

| Sensor 1 | |
|---|---|
| pressure | resistance |
| 20.7 | 305 |
| 20.7 | 301 |
| 18.9 | 301 |
| 18.9 | 298 |
| 18.9 | 297 |
| 18.9 | 294 |
| 17.2 | 294 |
| 17.2 | 292 |
| 17.2 | 291 |
| 17.2 | 289 |
| 15.85 | 289 |
| 15.85 | 286 |
| 15 | 286 |
| 15 | 283 |
| 15 | 279 |
| 15 | 271 |
| 14.2 | 271 |
| 14.2 | 268 |
| 14.2 | 265 |
| 14.2 | 261 |
| 12.85 | 261 |
| 12.85 | 259 |
| 12.85 | 252 |
| 12.85 | 245 |
| 11.2 | 245 |
| 11.2 | 242 |
| 11.2 | 239 |
| 11.2 | 234 |
| 9.6 | 234 |
| 9.6 | 225 |
| 9.6 | 219 |
| 9.6 | 215 |
| 7.85 | 215 |
| 7.85 | 204 |
| 7.85 | 199 |
| 7.85 | 193 |
| 6.25 | 193 |
| 6.25 | 183 |
| 6.25 | 173 |
| 6.25 | 166 |
| 6.25 | 163 |
| 4.7 | 163 |
| 4.7 | 160 |
| 4.7 | 149 |
| 4.7 | 145 |
| 3.5 | 145 |
| 3.5 | 139 |
| 3.5 | 127 |
| 3.5 | 117 |
| 2.5 | 117 |
| 2.5 | 107 |
| 2.5 | 101 |
| 2.5 | 92 |
| 1.7 | 92 |
| 1.7 | 84 |
| 1.7 | 69 |
| 1.7 | 60 |
| 1 | 60 |
| 1 | 41 |
| 1 | 33 |
| 1 | 30 |
| 0.45 | 30 |
| 0.45 | 29 |
| 0.45 | 28 |
| 0.45 | 27 |
| 0.15 | 27 |
| 0.15 | 26 |
| 0.15 | 25 |
| 0.05 | 25 |
| 0.05 | 24 |
| 0.05 | 26 |
| 0.05 | 25 |
| 0.05 | 28 |

-continued

| Sensor 1 | |
|---|---|
| pressure | resistance |
| 0.05 | 28 |
| 0.05 | 24 |

| Sensor 2 | |
|---|---|
| pressure | resistance |
| 0.05 | 0 |
| 0.05 | 3 |
| 0.05 | 6 |
| 0.05 | 8 |
| 0.15 | 8 |
| 0.15 | 10 |
| 0.15 | 13 |
| 0.15 | 14 |
| 0.25 | 14 |
| 0.25 | 20 |
| 0.25 | 21 |
| 0.45 | 21 |
| 0.45 | 32 |
| 0.45 | 35 |
| 0.65 | 35 |
| 0.65 | 39 |
| 0.65 | 37 |
| 0.65 | 42 |
| 0.95 | 42 |
| 0.95 | 51 |
| 0.95 | 48 |
| 0.95 | 49 |
| 0.95 | 59 |
| 1.3 | 59 |
| 1.3 | 67 |
| 1.3 | 74 |
| 1.3 | 79 |
| 2 | 79 |
| 2 | 88 |
| 2 | 94 |
| 2 | 95 |
| 3.2 | 95 |
| 3.2 | 100 |
| 3.2 | 105 |
| 3.2 | 108 |
| 4.45 | 108 |
| 4.45 | 113 |
| 4.45 | 118 |
| 4.45 | 123 |
| 5.7 | 123 |
| 5.7 | 132 |
| 5.7 | 135 |
| 5.7 | 139 |
| 7.15 | 139 |
| 7.15 | 144 |
| 7.15 | 149 |
| 8.7 | 149 |
| 8.7 | 150 |
| 8.7 | 155 |
| 8.7 | 158 |
| 10 | 158 |
| 10 | 161 |
| 10 | 164 |
| 10 | 166 |
| 11.1 | 166 |
| 11.1 | 170 |
| 11.1 | 173 |
| 11.1 | 175 |
| 11.1 | 177 |
| 12.25 | 177 |
| 12.25 | 180 |
| 12.25 | 181 |
| 12.25 | 184 |
| 13.3 | 184 |
| 13.3 | 185 |

-continued

| Sensor 2 | |
|---|---|
| pressure | resistance |
| 13.3 | 188 |
| 13.3 | 192 |
| 14.35 | 192 |
| 14.35 | 194 |
| 14.35 | 198 |
| 14.35 | 200 |
| 15.65 | 200 |
| 15.65 | 203 |
| 15.65 | 206 |
| 16.9 | 206 |
| 16.9 | 207 |
| 16.9 | 211 |
| 17.85 | 211 |
| 17.85 | 210 |
| 17.85 | 216 |
| 17.85 | 218 |
| 18.7 | 218 |
| 18.7 | 217 |
| 18.7 | 220 |
| 18.7 | 224 |
| 20.05 | 224 |
| 20.05 | 226 |
| 20.05 | 227 |
| 20.05 | 231 |
| 20.05 | 232 |
| 21.4 | 232 |
| 21.4 | 234 |
| 21.4 | 236 |
| 21.4 | 237 |
| 22.8 | 237 |
| 22.8 | 240 |
| 22.8 | 243 |
| 22.8 | 245 |
| 24.25 | 245 |
| 24.25 | 244 |
| 24.25 | 248 |
| 25.45 | 248 |
| 25.45 | 250 |
| 25.45 | 253 |
| 25.45 | 254 |
| 26.45 | 254 |
| 26.45 | 258 |
| 26.45 | 257 |
| 26.45 | 258 |
| 27.5 | 258 |
| 27.5 | 261 |
| 28.3 | 261 |
| 28.3 | 262 |
| 28.3 | 264 |
| 28.3 | 265 |
| 28.3 | 268 |
| 29.5 | 268 |
| 29.5 | 269 |
| 29.5 | 272 |
| 30.8 | 272 |
| 30.8 | 273 |
| 30.8 | 279 |
| 31.75 | 279 |
| 31.75 | 276 |
| 31.75 | 279 |
| 32.75 | 279 |
| 32.75 | 282 |
| 32.75 | 283 |
| 32.75 | 282 |
| 33.95 | 282 |
| 33.95 | 285 |
| 33.95 | 287 |
| 35.25 | 287 |
| 35.25 | 286 |
| 35.25 | 290 |
| 35.25 | 291 |
| 36.15 | 291 |
| 36.15 | 293 |
| 36.15 | 296 |
| 37.2 | 296 |

-continued

| Sensor 2 | |
|---|---|
| pressure | resistance |
| 37.2 | 301 |
| 37.2 | 298 |
| 38.4 | 298 |
| 38.4 | 302 |
| 38.4 | 299 |
| 38.4 | 303 |
| 39.8 | 303 |
| 39.8 | 304 |
| 39.8 | 305 |
| 40.95 | 305 |
| 40.95 | 307 |
| 40.95 | 310 |
| 42.2 | 310 |
| 42.2 | 309 |
| 42.2 | 311 |
| 43.15 | 311 |
| 43.15 | 314 |
| 44.3 | 314 |
| 44.3 | 318 |
| 44.3 | 320 |
| 44.3 | 319 |
| 45.55 | 319 |
| 45.55 | 321 |
| 45.55 | 318 |
| 46.6 | 318 |
| 46.6 | 321 |
| 46.6 | 323 |
| 46.6 | 324 |
| 46.6 | 325 |
| 47 | 325 |
| 47 | 329 |
| 47 | 327 |
| 48.15 | 327 |
| 48.15 | 329 |
| 48.15 | 331 |
| 48.15 | 328 |
| 49.15 | 328 |
| 49.15 | 334 |
| 49.15 | 336 |
| 50.55 | 336 |
| 50.55 | 335 |
| 50.55 | 337 |
| 51.75 | 337 |
| 51.75 | 336 |
| 51.75 | 342 |
| 51.75 | 341 |
| 53.15 | 341 |
| 53.15 | 345 |
| 53.15 | 344 |
| 54.25 | 344 |
| 54.25 | 346 |
| 54.25 | 342 |
| 54.25 | 345 |
| 55.45 | 345 |
| 55.45 | 347 |
| 55.45 | 348 |
| 56.45 | 348 |
| 56.45 | 350 |
| 56.45 | 351 |
| 56.45 | 352 |
| 56.95 | 352 |
| 56.95 | 351 |
| 56.95 | 355 |
| 56.95 | 357 |
| 58.1 | 357 |
| 58.1 | 358 |
| 58.1 | 359 |
| 58.1 | 360 |
| 59.6 | 360 |
| 59.6 | 359 |
| 59.6 | 362 |
| 59.6 | 361 |
| 61.15 | 361 |
| 61.15 | 363 |
| 61.15 | 365 |

-continued

| Sensor 2 | |
|---|---|
| pressure | resistance |
| 61.15 | 367 |
| 62.15 | 367 |
| 62.15 | 363 |
| 62.15 | 367 |
| 62.15 | 368 |
| 63.35 | 368 |
| 63.35 | 367 |
| 63.35 | 368 |
| 63.35 | 369 |
| 64 | 369 |
| 64 | 368 |
| 64 | 370 |
| 64 | 373 |
| 65 | 373 |
| 65 | 372 |
| 65 | 373 |
| 65 | 372 |
| 65.75 | 372 |
| 65.75 | 376 |
| 65.75 | 375 |
| 65.75 | 379 |
| 66.45 | 379 |
| 66.45 | 384 |
| 67.95 | 384 |
| 67.95 | 378 |
| 67.95 | 381 |
| 67.95 | 384 |
| 69.4 | 384 |
| 69.4 | 383 |
| 69.4 | 382 |
| 69.4 | 386 |
| 70.4 | 386 |
| 70.4 | 395 |
| 70.4 | 380 |
| 70.4 | 385 |
| 71.55 | 385 |
| 71.55 | 388 |
| 71.55 | 387 |
| 73.55 | 387 |
| 73.55 | 391 |
| 74.75 | 391 |
| 74.75 | 394 |
| 74.75 | 393 |
| 74.75 | 394 |
| 76.15 | 394 |
| 76.15 | 396 |
| 76.4 | 396 |
| 76.4 | 397 |
| 76.4 | 398 |
| 77.5 | 398 |
| 77.5 | 400 |
| 77.5 | 401 |
| 77.5 | 400 |
| 79.3 | 400 |
| 79.3 | 403 |
| 79.3 | 404 |
| 79.3 | 405 |
| 81.8 | 405 |
| 81.8 | 402 |
| 81.8 | 406 |
| 82.75 | 406 |
| 82.75 | 407 |
| 82.75 | 411 |
| 82.75 | 409 |
| 84.25 | 409 |
| 84.25 | 410 |
| 84.25 | 415 |
| 85.2 | 415 |
| 85.2 | 411 |
| 85.2 | 404 |
| 85.2 | 418 |
| 85.2 | 415 |
| 87.15 | 415 |
| 87.15 | 417 |
| 87.15 | 416 |

-continued

| Sensor 2 | |
|---|---|
| pressure | resistance |
| 88.2 | 416 |
| 88.2 | 419 |
| 88.2 | 420 |
| 88.2 | 421 |
| 90.25 | 421 |
| 91 | 421 |
| 91 | 422 |
| 91 | 423 |
| 92.6 | 423 |
| 92.6 | 424 |
| 93.05 | 424 |
| 93.05 | 426 |
| 93.05 | 427 |
| 94.9 | 427 |
| 94.9 | 428 |
| 94.9 | 429 |
| 96.15 | 429 |
| 96.15 | 431 |
| 96.15 | 430 |
| 97.7 | 430 |
| 97.7 | 432 |
| 97.7 | 434 |
| 97.7 | 435 |
| 99.1 | 435 |
| 99.1 | 434 |
| 100.1 | 434 |
| 100.1 | 433 |
| 100.1 | 434 |
| 100.1 | 435 |
| 100.3 | 435 |
| 100.3 | 436 |
| 100.3 | 437 |
| 100.3 | 435 |
| 100.35 | 435 |
| 100.35 | 436 |
| 100.35 | 435 |
| 100.35 | 435 |
| 100.35 | 432 |
| 100.4 | 432 |
| 100.4 | 437 |
| 100.2 | 437 |
| 99.95 | 437 |
| 99.95 | 434 |
| 99.95 | 438 |
| 99.95 | 440 |
| 100.15 | 440 |
| 100.15 | 441 |
| 100.15 | 439 |
| 100.15 | 438 |
| 100.15 | 439 |
| 100.75 | 439 |
| 100.75 | 440 |
| 100.75 | 438 |
| 100.9 | 438 |
| 100.9 | 434 |
| 100.9 | 437 |
| 100.9 | 439 |
| 98.8 | 439 |
| 98.8 | 436 |
| 98.8 | 434 |
| 98.8 | 433 |
| 95.05 | 433 |
| 95.05 | 434 |
| 95.05 | 431 |
| 91 | 431 |
| 91 | 429 |
| 91 | 428 |
| 91 | 423 |
| 86.1 | 423 |
| 86.1 | 424 |
| 86.1 | 419 |
| 80.45 | 419 |
| 80.45 | 410 |
| 80.45 | 415 |
| 80.45 | 414 |

-continued

| Sensor 2 | |
|---|---|
| pressure | resistance |
| 75.1 | 414 |
| 75.1 | 412 |
| 75.1 | 406 |
| 75.1 | 404 |
| 70.5 | 404 |
| 70.5 | 405 |
| 70.5 | 404 |
| 66.9 | 404 |
| 66.9 | 407 |
| 66.9 | 394 |
| 66.9 | 409 |
| 64.1 | 409 |
| 64.1 | 404 |
| 64.1 | 402 |
| 63.2 | 402 |
| 63.2 | 404 |
| 63.2 | 402 |
| 62.5 | 402 |
| 62.5 | 399 |
| 62.5 | 397 |
| 61.75 | 397 |
| 61.75 | 395 |
| 61.75 | 393 |
| 61.75 | 392 |
| 59.55 | 392 |
| 59.55 | 389 |
| 59.55 | 388 |
| 59.55 | 386 |
| 59.55 | 382 |
| 56.3 | 382 |
| 56.3 | 381 |
| 56.3 | 380 |
| 56.3 | 378 |
| 52.9 | 378 |
| 52.9 | 377 |
| 52.9 | 375 |
| 52.9 | 373 |
| 50.05 | 373 |
| 50.05 | 370 |
| 47.75 | 370 |
| 47.75 | 367 |
| 47.75 | 365 |
| 45.7 | 365 |
| 45.7 | 357 |
| 45.7 | 360 |
| 45.7 | 359 |
| 43.65 | 359 |
| 43.65 | 357 |
| 43.65 | 356 |
| 41.85 | 356 |
| 41.85 | 354 |
| 40.6 | 354 |
| 40.6 | 353 |
| 40.6 | 352 |
| 40.6 | 348 |
| 39.4 | 348 |
| 39.4 | 346 |
| 39.4 | 348 |
| 38 | 348 |
| 38 | 343 |
| 38 | 342 |
| 38 | 340 |
| 36.55 | 340 |
| 36.55 | 342 |
| 36.55 | 337 |
| 36.55 | 338 |
| 35.35 | 338 |
| 35.35 | 337 |
| 35.35 | 335 |
| 35.35 | 334 |
| 33.95 | 334 |
| 33.95 | 328 |
| 33.95 | 329 |
| 33.95 | 323 |
| 32.15 | 323 |

Sensor 2

| pressure | resistance |
|---|---|
| 32.15 | 325 |
| 32.15 | 324 |
| 30.4 | 324 |
| 30.4 | 323 |
| 30.4 | 320 |
| 29.3 | 320 |
| 29.3 | 322 |
| 29.3 | 320 |
| 29.3 | 316 |
| 29.3 | 319 |
| 28.7 | 319 |
| 28.7 | 317 |
| 28.7 | 305 |
| 27.75 | 305 |
| 27.75 | 309 |
| 27.75 | 308 |
| 26.3 | 308 |
| 26.3 | 309 |
| 26.3 | 308 |
| 26.3 | 306 |
| 25 | 306 |
| 25 | 301 |
| 25 | 303 |
| 25 | 302 |
| 23.95 | 302 |
| 23.95 | 301 |
| 23.95 | 299 |
| 23.05 | 299 |
| 23.05 | 300 |
| 23.05 | 295 |
| 23.05 | 289 |
| 21.8 | 289 |
| 21.8 | 287 |
| 21.8 | 286 |
| 21.8 | 287 |
| 20.4 | 287 |
| 20.4 | 285 |
| 20.4 | 281 |
| 20.4 | 277 |
| 18.9 | 277 |
| 18.9 | 276 |
| 18.9 | 269 |
| 18.9 | 271 |
| 18.9 | 269 |
| 17.65 | 269 |
| 17.65 | 266 |
| 17.65 | 264 |
| 16.2 | 264 |
| 16.2 | 258 |
| 16.2 | 257 |
| 16.2 | 252 |
| 14.95 | 252 |
| 14.95 | 251 |
| 14.95 | 248 |
| 13.7 | 248 |
| 13.7 | 246 |
| 13.7 | 247 |
| 12.85 | 247 |
| 12.85 | 249 |
| 12.85 | 246 |
| 12.85 | 245 |
| 12.45 | 245 |
| 12.45 | 243 |
| 12.45 | 241 |
| 12.45 | 238 |
| 12 | 238 |
| 12 | 233 |
| 12 | 234 |
| 12 | 231 |
| 12 | 230 |
| 11.1 | 230 |
| 11.1 | 224 |
| 11.1 | 218 |
| 11.1 | 210 |
| 9.9 | 210 |

Sensor 2

| pressure | resistance |
|---|---|
| 9.9 | 201 |
| 9.9 | 196 |
| 9.9 | 192 |
| 8.25 | 192 |
| 8.25 | 191 |
| 8.25 | 187 |
| 8.25 | 181 |
| 6.7 | 181 |
| 6.7 | 175 |
| 6.7 | 171 |
| 5.55 | 171 |
| 5.55 | 166 |
| 5.55 | 165 |
| 4.75 | 165 |
| 4.75 | 157 |
| 4.75 | 147 |
| 4.05 | 147 |
| 4.05 | 146 |
| 4.05 | 143 |
| 4.05 | 140 |
| 3.5 | 140 |
| 3.5 | 136 |
| 3.5 | 133 |
| 3.5 | 126 |
| 3.5 | 114 |
| 2.95 | 114 |
| 2.95 | 107 |
| 2.95 | 104 |
| 2.95 | 101 |
| 2.25 | 101 |
| 2.25 | 93 |
| 2.25 | 87 |
| 2.25 | 81 |
| 1.6 | 81 |
| 1.6 | 75 |
| 1.6 | 66 |
| 1.6 | 61 |
| 1.05 | 61 |
| 1.05 | 52 |
| 1.05 | 45 |
| 1.05 | 36 |
| 0.6 | 36 |
| 0.6 | 34 |
| 0.6 | 31 |
| 0.25 | 31 |
| 0.25 | 27 |
| 0.25 | 25 |
| 0.25 | 24 |
| 0.1 | 24 |
| 0.1 | 22 |
| 0.1 | 23 |
| 0.05 | 23 |
| 0.05 | 22 |
| 0.05 | 22 |
| 0.05 | 21 |
| 0.05 | 21 |
| 0.05 | 20 |
| 0.05 | 20 |
| 0.05 | 21 |
| 0.05 | 19 |

Sensor 3

| pressure | resistance |
|---|---|
| 0.1 | 11 |
| 0.1 | 14 |
| 0.1 | 16 |
| 0.1 | 19 |
| 0.25 | 19 |
| 0.25 | 22 |
| 0.25 | 25 |

-continued

| Sensor 3 | |
|---|---|
| pressure | resistance |
| 0.25 | 31 |
| 0.5 | 31 |
| 0.5 | 29 |
| 0.5 | 37 |
| 0.5 | 34 |
| 0.8 | 34 |
| 0.8 | 46 |
| 0.8 | 50 |
| 0.8 | 56 |
| 1.4 | 56 |
| 1.4 | 62 |
| 1.4 | 73 |
| 1.4 | 70 |
| 2.3 | 70 |
| 2.3 | 71 |
| 2.3 | 76 |
| 2.3 | 82 |
| 2.3 | 85 |
| 3.25 | 85 |
| 3.25 | 90 |
| 3.25 | 96 |
| 3.25 | 98 |
| 4.35 | 98 |
| 4.35 | 102 |
| 4.35 | 103 |
| 4.35 | 107 |
| 5.55 | 107 |
| 5.55 | 111 |
| 5.55 | 116 |
| 5.55 | 123 |
| 6.9 | 123 |
| 6.9 | 126 |
| 6.9 | 131 |
| 6.9 | 132 |
| 8.4 | 132 |
| 8.4 | 134 |
| 8.4 | 140 |
| 9.85 | 140 |
| 9.85 | 143 |
| 9.85 | 146 |
| 9.85 | 148 |
| 11.1 | 148 |
| 11.1 | 153 |
| 11.1 | 156 |
| 11.1 | 155 |
| 11.1 | 159 |
| 12.45 | 159 |
| 12.45 | 160 |
| 12.45 | 163 |
| 12.45 | 166 |
| 13.8 | 166 |
| 13.8 | 167 |
| 13.8 | 166 |
| 13.8 | 169 |
| 14.95 | 169 |
| 14.95 | 172 |
| 14.95 | 179 |
| 14.95 | 174 |
| 16.1 | 174 |
| 16.1 | 180 |
| 16.1 | 179 |
| 16.1 | 177 |
| 17 | 177 |
| 17 | 180 |
| 17 | 183 |
| 17 | 180 |
| 17.5 | 180 |
| 17.5 | 184 |
| 17.5 | 187 |
| 17.5 | 186 |
| 18.15 | 186 |
| 18.15 | 191 |
| 18.15 | 189 |
| 19.05 | 189 |
| 19.05 | 193 |

-continued

| Sensor 3 | |
|---|---|
| pressure | resistance |
| 19.05 | 191 |
| 19.05 | 198 |
| 20.2 | 198 |
| 20.2 | 200 |
| 20.2 | 204 |
| 20.2 | 203 |
| 21.3 | 203 |
| 21.3 | 204 |
| 21.3 | 205 |
| 21.3 | 207 |
| 22.25 | 207 |
| 22.25 | 209 |
| 22.25 | 211 |
| 22.25 | 213 |
| 23.2 | 213 |
| 23.2 | 211 |
| 23.2 | 215 |
| 23.2 | 213 |
| 23.95 | 213 |
| 23.95 | 216 |
| 23.95 | 215 |
| 24.85 | 215 |
| 24.85 | 217 |
| 24.85 | 221 |
| 24.85 | 222 |
| 25.9 | 222 |
| 25.9 | 223 |
| 25.9 | 226 |
| 27 | 226 |
| 27 | 228 |
| 27 | 230 |
| 28 | 230 |
| 28 | 235 |
| 28 | 233 |
| 28 | 234 |
| 29.05 | 234 |
| 29.05 | 236 |
| 29.05 | 235 |
| 30.2 | 235 |
| 30.2 | 240 |
| 30.2 | 239 |
| 30.85 | 239 |
| 30.85 | 238 |
| 30.85 | 240 |
| 30.85 | 239 |
| 30.95 | 239 |
| 30.95 | 242 |
| 30.95 | 243 |
| 30.95 | 244 |
| 31.35 | 244 |
| 31.35 | 245 |
| 31.9 | 245 |
| 31.9 | 248 |
| 31.9 | 249 |
| 32.8 | 249 |
| 32.8 | 252 |
| 32.8 | 250 |
| 33.4 | 250 |
| 33.4 | 252 |
| 33.4 | 254 |
| 33.4 | 253 |
| 34.2 | 253 |
| 34.2 | 255 |
| 34.2 | 260 |
| 35.2 | 260 |
| 35.2 | 256 |
| 35.2 | 258 |
| 35.2 | 259 |
| 36.15 | 259 |
| 36.15 | 260 |
| 36.15 | 261 |
| 36.15 | 262 |
| 37.25 | 262 |
| 37.25 | 257 |
| 37.25 | 261 |

-continued

| Sensor 3 | |
|---|---|
| pressure | resistance |
| 37.25 | 262 |
| 37.65 | 262 |
| 37.65 | 260 |
| 37.65 | 265 |
| 37.65 | 266 |
| 38.6 | 266 |
| 38.6 | 265 |
| 38.6 | 267 |
| 39.25 | 267 |
| 39.25 | 269 |
| 39.25 | 273 |
| 39.25 | 271 |
| 39.25 | 270 |
| 39.95 | 270 |
| 39.95 | 271 |
| 39.95 | 275 |
| 39.95 | 276 |
| 40.6 | 276 |
| 40.6 | 273 |
| 40.6 | 274 |
| 40.65 | 274 |
| 40.65 | 277 |
| 41.6 | 277 |
| 41.6 | 270 |
| 41.6 | 280 |
| 42.35 | 280 |
| 42.35 | 281 |
| 42.35 | 283 |
| 43.75 | 283 |
| 43.75 | 282 |
| 43.75 | 284 |
| 44.75 | 284 |
| 44.75 | 286 |
| 44.75 | 287 |
| 45.65 | 287 |
| 45.65 | 296 |
| 45.65 | 288 |
| 45.65 | 289 |
| 45.65 | 290 |
| 46.5 | 290 |
| 46.5 | 291 |
| 46.5 | 292 |
| 46.5 | 294 |
| 47.25 | 294 |
| 47.25 | 292 |
| 47.25 | 291 |
| 47.25 | 296 |
| 47.6 | 296 |
| 47.6 | 295 |
| 47.6 | 296 |
| 48.35 | 296 |
| 49.1 | 296 |
| 49.1 | 299 |
| 49.1 | 294 |
| 49.1 | 299 |
| 49.7 | 299 |
| 49.7 | 306 |
| 49.7 | 303 |
| 50.2 | 303 |
| 50.2 | 301 |
| 50.2 | 304 |
| 50.2 | 305 |
| 51.05 | 305 |
| 51.05 | 307 |
| 51.05 | 305 |
| 51.05 | 307 |
| 52.3 | 307 |
| 52.3 | 308 |
| 53.05 | 308 |
| 53.05 | 310 |
| 53.05 | 311 |
| 53.05 | 312 |
| 53.85 | 312 |
| 53.85 | 315 |
| 53.85 | 312 |

-continued

| Sensor 3 | |
|---|---|
| pressure | resistance |
| 53.85 | 315 |
| 54.8 | 315 |
| 54.8 | 313 |
| 54.8 | 314 |
| 54.8 | 313 |
| 55.1 | 313 |
| 55.1 | 315 |
| 55.1 | 318 |
| 55.4 | 318 |
| 55.4 | 320 |
| 56.15 | 320 |
| 56.15 | 319 |
| 56.15 | 317 |
| 56.7 | 317 |
| 56.7 | 321 |
| 56.7 | 323 |
| 56.7 | 321 |
| 57.25 | 321 |
| 57.25 | 323 |
| 57.25 | 324 |
| 57.25 | 325 |
| 58.25 | 325 |
| 58.25 | 326 |
| 58.25 | 323 |
| 58.25 | 327 |
| 59.55 | 327 |
| 59.55 | 328 |
| 59.55 | 329 |
| 59.55 | 335 |
| 60.6 | 335 |
| 60.6 | 331 |
| 60.6 | 329 |
| 61.4 | 329 |
| 61.4 | 331 |
| 61.4 | 332 |
| 61.4 | 334 |
| 61.8 | 334 |
| 61.8 | 335 |
| 61.8 | 332 |
| 62.1 | 332 |
| 62.1 | 337 |
| 62.1 | 332 |
| 62.1 | 338 |
| 62.1 | 336 |
| 63 | 336 |
| 63 | 335 |
| 63 | 341 |
| 64.45 | 341 |
| 64.45 | 342 |
| 64.45 | 341 |
| 64.45 | 342 |
| 65.8 | 342 |
| 65.8 | 343 |
| 65.8 | 344 |
| 65.8 | 346 |
| 66.7 | 346 |
| 66.7 | 348 |
| 68.05 | 348 |
| 68.05 | 350 |
| 69.35 | 350 |
| 69.35 | 351 |
| 69.35 | 352 |
| 69.35 | 353 |
| 70.45 | 353 |
| 70.45 | 354 |
| 70.45 | 352 |
| 70.45 | 353 |
| 71.2 | 353 |
| 71.2 | 354 |
| 71.2 | 356 |
| 72.7 | 356 |
| 72.7 | 358 |
| 72.7 | 357 |
| 72.7 | 359 |
| 72.7 | 360 |

-continued

| Sensor 3 | |
|---|---|
| pressure | resistance |
| 73.6 | 360 |
| 73.6 | 362 |
| 73.6 | 361 |
| 73.6 | 363 |
| 75.2 | 363 |
| 75.2 | 362 |
| 75.2 | 361 |
| 75.2 | 362 |
| 75.65 | 362 |
| 75.65 | 364 |
| 75.65 | 366 |
| 75.65 | 368 |
| 76.9 | 368 |
| 76.9 | 367 |
| 76.9 | 369 |
| 77.65 | 369 |
| 77.65 | 370 |
| 78.05 | 370 |
| 78.05 | 369 |
| 78.05 | 371 |
| 78.05 | 372 |
| 78.65 | 372 |
| 78.65 | 375 |
| 78.65 | 374 |
| 78.65 | 375 |
| 79.75 | 375 |
| 79.75 | 376 |
| 79.75 | 377 |
| 79.75 | 374 |
| 82.15 | 374 |
| 82.15 | 379 |
| 83.7 | 379 |
| 83.7 | 380 |
| 83.7 | 378 |
| 83.7 | 380 |
| 84.7 | 380 |
| 84.7 | 382 |
| 84.7 | 383 |
| 85.85 | 383 |
| 85.85 | 384 |
| 85.85 | 385 |
| 85.85 | 384 |
| 86.7 | 384 |
| 86.7 | 388 |
| 86.7 | 387 |
| 88.6 | 387 |
| 88.6 | 388 |
| 88.6 | 390 |
| 90 | 390 |
| 90 | 389 |
| 90 | 391 |
| 90 | 392 |
| 91.4 | 392 |
| 91.4 | 391 |
| 91.4 | 393 |
| 92.9 | 393 |
| 92.9 | 392 |
| 92.9 | 396 |
| 92.9 | 395 |
| 92.9 | 396 |
| 93.6 | 396 |
| 93.6 | 397 |
| 93.6 | 398 |
| 93.6 | 397 |
| 95.05 | 397 |
| 95.05 | 398 |
| 95.05 | 399 |
| 96.1 | 399 |
| 96.1 | 401 |
| 96.1 | 400 |
| 96.1 | 401 |
| 97.75 | 401 |
| 97.75 | 404 |
| 97.75 | 401 |
| 98.5 | 401 |

-continued

| Sensor 3 | |
|---|---|
| pressure | resistance |
| 98.5 | 404 |
| 99.5 | 404 |
| 99.5 | 405 |
| 99.5 | 406 |
| 100.05 | 406 |
| 100.05 | 405 |
| 100.05 | 406 |
| 100.05 | 407 |
| 100.85 | 407 |
| 100.85 | 408 |
| 101.4 | 408 |
| 101.4 | 408 |
| 101.4 | 407 |
| 101.4 | 408 |
| 101.4 | 409 |
| 101.35 | 409 |
| 101.35 | 408 |
| 101.1 | 408 |
| 101.1 | 410 |
| 101.1 | 407 |
| 101.1 | 411 |
| 101.75 | 411 |
| 101.75 | 410 |
| 101.75 | 407 |
| 101.25 | 407 |
| 101.25 | 409 |
| 101.25 | 408 |
| 101.25 | 412 |
| 98.95 | 412 |
| 98.95 | 406 |
| 98.95 | 404 |
| 98.95 | 405 |
| 95.15 | 405 |
| 95.15 | 403 |
| 95.15 | 397 |
| 95.15 | 394 |
| 90.4 | 394 |
| 90.4 | 392 |
| 90.4 | 393 |
| 84.7 | 393 |
| 84.7 | 391 |
| 84.7 | 387 |
| 84.7 | 388 |
| 79.15 | 388 |
| 79.15 | 385 |
| 79.15 | 383 |
| 74.75 | 383 |
| 74.75 | 380 |
| 74.75 | 375 |
| 74.75 | 377 |
| 70.45 | 377 |
| 70.45 | 373 |
| 70.45 | 372 |
| 66.4 | 372 |
| 66.4 | 369 |
| 66.4 | 368 |
| 63.15 | 368 |
| 63.15 | 366 |
| 63.15 | 365 |
| 63.15 | 363 |
| 60.65 | 363 |
| 60.65 | 362 |
| 60.65 | 361 |
| 60.65 | 352 |
| 57.7 | 352 |
| 57.7 | 353 |
| 57.7 | 350 |
| 54.3 | 350 |
| 54.3 | 346 |
| 54.3 | 345 |
| 54.3 | 341 |
| 54.3 | 340 |
| 51 | 340 |
| 51 | 341 |
| 51 | 337 |

Sensor 3

| pressure | resistance |
|---|---|
| 51 | 336 |
| 48.2 | 336 |
| 48.2 | 335 |
| 48.2 | 331 |
| 48.2 | 330 |
| 45.75 | 330 |
| 45.75 | 328 |
| 45.75 | 326 |
| 45.75 | 324 |
| 43.65 | 324 |
| 43.65 | 323 |
| 43.65 | 318 |
| 41.7 | 318 |
| 41.7 | 319 |
| 41.7 | 318 |
| 41.7 | 316 |
| 39.85 | 316 |
| 39.85 | 315 |
| 39.85 | 319 |
| 39.85 | 310 |
| 38.05 | 310 |
| 38.05 | 307 |
| 38.05 | 305 |
| 38.05 | 302 |
| 35.95 | 302 |
| 35.95 | 297 |
| 35.95 | 295 |
| 33.5 | 295 |
| 33.5 | 292 |
| 33.5 | 291 |
| 33.5 | 289 |
| 31.1 | 289 |
| 31.1 | 287 |
| 31.1 | 285 |
| 31.1 | 283 |
| 29.1 | 283 |
| 29.1 | 286 |
| 29.1 | 284 |
| 29.1 | 282 |
| 27.7 | 282 |
| 27.7 | 279 |
| 27.7 | 278 |
| 26.55 | 278 |
| 26.55 | 275 |
| 26.55 | 274 |
| 25.4 | 274 |
| 25.4 | 273 |
| 25.4 | 272 |
| 25.4 | 273 |
| 25.4 | 271 |
| 24.45 | 271 |
| 24.45 | 270 |
| 24.45 | 269 |
| 24.45 | 267 |
| 23.55 | 267 |
| 23.55 | 265 |
| 23.55 | 264 |
| 23.55 | 262 |
| 22.6 | 262 |
| 22.6 | 261 |
| 22.6 | 259 |
| 22.6 | 257 |
| 21.3 | 257 |
| 21.3 | 258 |
| 21.3 | 252 |
| 21.3 | 251 |
| 19.95 | 251 |
| 19.95 | 250 |
| 19.95 | 244 |
| 19.95 | 241 |
| 18.25 | 241 |
| 18.25 | 240 |
| 18.25 | 236 |
| 18.25 | 234 |
| 16.55 | 234 |
| 16.55 | 229 |
| 16.55 | 230 |
| 15.1 | 230 |
| 15.1 | 228 |
| 15.1 | 227 |
| 14.2 | 227 |
| 14.2 | 224 |
| 14.2 | 227 |
| 14.2 | 223 |
| 14.2 | 222 |
| 13.6 | 222 |
| 13.6 | 219 |
| 13.6 | 217 |
| 13.6 | 220 |
| 12.9 | 220 |
| 12.9 | 217 |
| 12.9 | 216 |
| 12.3 | 216 |
| 12.3 | 214 |
| 12.3 | 215 |
| 12.3 | 214 |
| 11.85 | 214 |
| 11.85 | 211 |
| 11.85 | 206 |
| 11.85 | 207 |
| 11.35 | 207 |
| 11.35 | 204 |
| 11.35 | 202 |
| 11.35 | 199 |
| 10.45 | 199 |
| 10.45 | 193 |
| 10.45 | 190 |
| 9.25 | 190 |
| 9.25 | 189 |
| 9.25 | 187 |
| 9.25 | 185 |
| 8.3 | 185 |
| 8.3 | 181 |
| 8.3 | 176 |
| 8.3 | 173 |
| 7.45 | 173 |
| 7.45 | 169 |
| 7.45 | 168 |
| 7.45 | 163 |
| 7.45 | 162 |
| 6.5 | 162 |
| 6.5 | 159 |
| 6.5 | 153 |
| 6.5 | 151 |
| 5.65 | 151 |
| 5.65 | 148 |
| 5.65 | 145 |
| 5.65 | 143 |
| 4.9 | 143 |
| 4.9 | 140 |
| 4.9 | 138 |
| 4.9 | 131 |
| 4.2 | 131 |
| 4.2 | 125 |
| 4.2 | 124 |
| 4.2 | 114 |
| 3.45 | 114 |
| 3.45 | 104 |
| 3.45 | 93 |
| 3.45 | 86 |
| 2.5 | 86 |
| 2.5 | 77 |
| 2.5 | 67 |
| 2.5 | 56 |
| 2.5 | 46 |
| 1.5 | 46 |
| 1.5 | 44 |
| 1.5 | 35 |
| 0.7 | 35 |
| 0.7 | 28 |

-continued

| Sensor 3 | |
|---|---|
| pressure | resistance |
| 0.7 | 25 |
| 0.7 | 24 |
| 0.7 | 22 |
| 0.25 | 22 |
| 0.25 | 21 |
| 0.25 | 19 |
| 0.25 | 20 |
| 0.1 | 20 |
| 0.1 | 17 |
| 0.1 | 19 |
| 0.05 | 19 |
| 0.05 | 18 |
| 0.05 | 17 |
| 0.05 | 17 |
| 0.05 | 16 |
| 0.05 | 19 |
| 0.05 | 19 |
| 0.05 | 16 |
| 0.05 | 15 |
| 0.05 | 15 |
| 0.05 | 16 |

| Sensor 4 | |
|---|---|
| pressure | resistance |
| 0.1 | 5 |
| 0.1 | 9 |
| 0.1 | 12 |
| 0.1 | 14 |
| 0.2 | 14 |
| 0.2 | 15 |
| 0.2 | 16 |
| 0.2 | 19 |
| 0.35 | 19 |
| 0.35 | 23 |
| 0.35 | 25 |
| 0.35 | 26 |
| 0.35 | 29 |
| 0.5 | 29 |
| 0.5 | 32 |
| 0.5 | 36 |
| 0.5 | 37 |
| 0.75 | 37 |
| 0.75 | 39 |
| 0.75 | 42 |
| 0.75 | 49 |
| 1.05 | 49 |
| 1.05 | 55 |
| 1.05 | 63 |
| 1.05 | 70 |
| 1.7 | 70 |
| 1.7 | 75 |
| 1.7 | 79 |
| 1.7 | 82 |
| 2.75 | 82 |
| 2.75 | 85 |
| 2.75 | 88 |
| 2.75 | 89 |
| 3.8 | 89 |
| 3.8 | 93 |
| 3.8 | 99 |
| 3.8 | 102 |
| 4.7 | 102 |
| 4.7 | 106 |
| 4.7 | 111 |
| 4.7 | 115 |
| 4.7 | 120 |
| 5.75 | 120 |
| 5.75 | 127 |
| 5.75 | 130 |
| 5.75 | 135 |

-continued

| Sensor 4 | |
|---|---|
| pressure | resistance |
| 7.35 | 135 |
| 7.35 | 138 |
| 7.35 | 140 |
| 7.35 | 141 |
| 8.85 | 141 |
| 8.85 | 144 |
| 8.85 | 150 |
| 8.85 | 151 |
| 10.15 | 151 |
| 10.15 | 150 |
| 10.15 | 152 |
| 10.9 | 152 |
| 10.9 | 155 |
| 10.9 | 161 |
| 10.9 | 160 |
| 11.85 | 160 |
| 11.85 | 163 |
| 11.85 | 165 |
| 11.85 | 167 |
| 12.75 | 167 |
| 12.75 | 169 |
| 12.75 | 167 |
| 12.75 | 168 |
| 13.85 | 168 |
| 13.85 | 175 |
| 13.85 | 179 |
| 13.85 | 181 |
| 14.9 | 181 |
| 14.9 | 180 |
| 15.75 | 180 |
| 15.75 | 183 |
| 15.75 | 185 |
| 15.75 | 188 |
| 16.55 | 188 |
| 16.55 | 189 |
| 16.55 | 190 |
| 17.2 | 190 |
| 17.2 | 193 |
| 17.2 | 195 |
| 17.85 | 195 |
| 17.85 | 196 |
| 17.85 | 199 |
| 17.85 | 198 |
| 18.6 | 198 |
| 18.6 | 202 |
| 18.6 | 201 |
| 18.6 | 202 |
| 19.5 | 202 |
| 19.5 | 204 |
| 19.5 | 205 |
| 19.5 | 207 |
| 20.4 | 207 |
| 20.4 | 208 |
| 20.4 | 215 |
| 20.4 | 212 |
| 21.25 | 212 |
| 21.25 | 214 |
| 22.1 | 214 |
| 22.1 | 216 |
| 22.1 | 218 |
| 22.1 | 215 |
| 22.1 | 218 |
| 22.9 | 218 |
| 22.9 | 221 |
| 22.9 | 220 |
| 23.4 | 220 |
| 23.4 | 221 |
| 23.4 | 222 |
| 23.4 | 225 |
| 24.2 | 225 |
| 24.2 | 226 |
| 24.2 | 229 |
| 25.2 | 229 |
| 25.2 | 230 |
| 25.2 | 232 |

| Sensor 4 | |
|---|---|
| pressure | resistance |
| 25.2 | 235 |
| 26.2 | 235 |
| 26.2 | 234 |
| 26.2 | 235 |
| 26.9 | 235 |
| 26.9 | 237 |
| 26.9 | 239 |
| 26.9 | 241 |
| 28.15 | 241 |
| 28.15 | 242 |
| 28.15 | 243 |
| 29.1 | 243 |
| 29.1 | 244 |
| 29.1 | 246 |
| 29.1 | 248 |
| 29.95 | 248 |
| 29.95 | 249 |
| 29.95 | 251 |
| 30.9 | 251 |
| 30.9 | 254 |
| 30.9 | 251 |
| 30.9 | 254 |
| 31.9 | 254 |
| 31.9 | 256 |
| 31.9 | 257 |
| 32.75 | 257 |
| 32.75 | 255 |
| 32.75 | 257 |
| 32.75 | 262 |
| 33.2 | 262 |
| 33.2 | 256 |
| 33.2 | 261 |
| 33.2 | 262 |
| 34.4 | 262 |
| 34.4 | 264 |
| 34.4 | 266 |
| 35.7 | 266 |
| 35.7 | 268 |
| 35.7 | 269 |
| 36.85 | 269 |
| 36.85 | 272 |
| 36.85 | 273 |
| 37.8 | 273 |
| 37.8 | 277 |
| 39.3 | 277 |
| 39.3 | 280 |
| 39.3 | 277 |
| 40.65 | 277 |
| 40.65 | 281 |
| 40.65 | 282 |
| 41.35 | 282 |
| 41.35 | 283 |
| 41.35 | 286 |
| 41.35 | 284 |
| 42.4 | 284 |
| 42.4 | 289 |
| 42.4 | 288 |
| 43.35 | 288 |
| 43.35 | 290 |
| 43.35 | 291 |
| 43.35 | 290 |
| 44.1 | 290 |
| 44.1 | 293 |
| 44.1 | 294 |
| 44.65 | 294 |
| 44.65 | 295 |
| 44.65 | 294 |
| 44.65 | 296 |
| 45.4 | 296 |
| 45.4 | 297 |
| 45.4 | 299 |
| 45.4 | 304 |
| 46.25 | 304 |
| 46.25 | 296 |
| 46.25 | 304 |

| Sensor 4 | |
|---|---|
| pressure | resistance |
| 46.25 | 300 |
| 47.2 | 300 |
| 47.2 | 301 |
| 47.2 | 302 |
| 47.2 | 303 |
| 47.95 | 303 |
| 47.95 | 301 |
| 47.95 | 306 |
| 48.45 | 306 |
| 48.45 | 302 |
| 48.45 | 307 |
| 49 | 307 |
| 49 | 311 |
| 49 | 309 |
| 49 | 310 |
| 49.9 | 310 |
| 49.9 | 311 |
| 49.9 | 312 |
| 50.5 | 312 |
| 50.5 | 311 |
| 50.5 | 313 |
| 50.5 | 312 |
| 50.5 | 317 |
| 51.2 | 317 |
| 51.2 | 315 |
| 51.2 | 314 |
| 51.2 | 319 |
| 51.65 | 319 |
| 51.65 | 315 |
| 51.65 | 314 |
| 51.65 | 316 |
| 52.65 | 316 |
| 52.65 | 318 |
| 52.65 | 317 |
| 52.65 | 319 |
| 53.2 | 319 |
| 53.2 | 320 |
| 53.2 | 321 |
| 54.1 | 321 |
| 54.1 | 323 |
| 54.65 | 323 |
| 54.65 | 324 |
| 54.65 | 325 |
| 55.5 | 325 |
| 55.5 | 330 |
| 55.5 | 328 |
| 56.2 | 328 |
| 56.2 | 326 |
| 56.2 | 329 |
| 56.2 | 328 |
| 56.9 | 328 |
| 56.9 | 329 |
| 56.9 | 332 |
| 56.9 | 330 |
| 57.4 | 330 |
| 57.4 | 332 |
| 57.4 | 331 |
| 57.4 | 332 |
| 57.85 | 332 |
| 57.85 | 333 |
| 57.85 | 327 |
| 57.85 | 334 |
| 58.4 | 334 |
| 58.4 | 333 |
| 58.4 | 336 |
| 59.6 | 336 |
| 59.6 | 338 |
| 59.6 | 339 |
| 59.6 | 336 |
| 60.85 | 336 |
| 60.85 | 339 |
| 60.85 | 338 |
| 60.85 | 341 |
| 62.05 | 341 |
| 62.05 | 340 |

Sensor 4

| pressure | resistance |
|---|---|
| 62.05 | 341 |
| 62.05 | 344 |
| 62.05 | 342 |
| 62.65 | 342 |
| 62.65 | 343 |
| 62.65 | 345 |
| 63.1 | 345 |
| 63.1 | 346 |
| 63.1 | 345 |
| 63.1 | 347 |
| 63.85 | 347 |
| 63.85 | 348 |
| 63.85 | 346 |
| 65.15 | 346 |
| 65.15 | 348 |
| 65.15 | 346 |
| 65.15 | 350 |
| 65.45 | 350 |
| 65.45 | 351 |
| 65.45 | 352 |
| 65.45 | 351 |
| 65.85 | 351 |
| 65.85 | 352 |
| 65.85 | 351 |
| 65.85 | 354 |
| 66.35 | 354 |
| 66.35 | 353 |
| 66.35 | 355 |
| 66.35 | 356 |
| 67.35 | 356 |
| 67.35 | 354 |
| 67.35 | 356 |
| 67.35 | 358 |
| 67.35 | 359 |
| 68.7 | 359 |
| 68.7 | 360 |
| 68.7 | 361 |
| 70.1 | 361 |
| 70.1 | 362 |
| 70.1 | 365 |
| 70.1 | 368 |
| 72.1 | 368 |
| 72.1 | 360 |
| 72.1 | 363 |
| 72.1 | 364 |
| 72.85 | 364 |
| 72.85 | 366 |
| 72.85 | 368 |
| 74.35 | 368 |
| 74.35 | 367 |
| 74.35 | 370 |
| 74.35 | 371 |
| 75.4 | 371 |
| 75.4 | 372 |
| 76.8 | 372 |
| 76.8 | 373 |
| 76.8 | 375 |
| 78 | 375 |
| 78 | 374 |
| 78 | 377 |
| 78 | 376 |
| 79.2 | 376 |
| 79.2 | 378 |
| 79.2 | 380 |
| 81.2 | 380 |
| 81.2 | 378 |
| 81.2 | 379 |
| 81.2 | 381 |
| 81.95 | 381 |
| 81.95 | 382 |
| 81.95 | 384 |
| 81.95 | 386 |
| 83.65 | 386 |
| 83.65 | 387 |
| 83.65 | 386 |
| 84.6 | 386 |
| 84.6 | 394 |
| 84.6 | 388 |
| 86.6 | 388 |
| 86.6 | 390 |
| 86.6 | 389 |
| 86.6 | 393 |
| 88.1 | 393 |
| 88.1 | 394 |
| 90.2 | 394 |
| 90.2 | 396 |
| 90.2 | 395 |
| 91.6 | 395 |
| 91.6 | 397 |
| 91.6 | 398 |
| 91.6 | 399 |
| 92.7 | 399 |
| 92.7 | 400 |
| 92.7 | 394 |
| 92.7 | 402 |
| 93.5 | 402 |
| 93.5 | 401 |
| 93.5 | 402 |
| 94.45 | 402 |
| 94.45 | 403 |
| 94.45 | 404 |
| 94.45 | 405 |
| 95.8 | 405 |
| 95.8 | 404 |
| 95.8 | 405 |
| 95.8 | 406 |
| 97.15 | 406 |
| 97.15 | 404 |
| 97.15 | 406 |
| 97.15 | 407 |
| 98.25 | 407 |
| 98.25 | 408 |
| 98.25 | 406 |
| 98.6 | 406 |
| 98.6 | 408 |
| 98.6 | 409 |
| 98.6 | 408 |
| 99.05 | 408 |
| 99.05 | 409 |
| 99.05 | 410 |
| 99.6 | 410 |
| 99.6 | 413 |
| 99.6 | 411 |
| 99.85 | 411 |
| 99.85 | 410 |
| 99.85 | 413 |
| 99.85 | 412 |
| 100.05 | 412 |
| 100.05 | 411 |
| 100.05 | 412 |
| 100.2 | 412 |
| 100.2 | 409 |
| 100.2 | 413 |
| 100.2 | 412 |
| 100.2 | 412 |
| 100.35 | 412 |
| 100.35 | 413 |
| 100.3 | 413 |
| 100.2 | 413 |
| 100.2 | 414 |
| 100.2 | 413 |
| 100.1 | 413 |
| 100.1 | 411 |
| 100.1 | 414 |
| 100.1 | 416 |
| 100 | 416 |
| 100 | 415 |
| 100 | 416 |
| 100 | 415 |
| 100.95 | 415 |

-continued

| Sensor 4 | |
|---|---|
| pressure | resistance |
| 100.95 | 416 |
| 100.95 | 418 |
| 101.95 | 418 |
| 101.95 | 417 |
| 101.95 | 416 |
| 102.2 | 416 |
| 102.2 | 417 |
| 102.2 | 415 |
| 100.35 | 415 |
| 100.35 | 414 |
| 100.35 | 413 |
| 100.35 | 414 |
| 97.35 | 414 |
| 97.35 | 413 |
| 97.35 | 412 |
| 97.35 | 410 |
| 93.45 | 410 |
| 93.45 | 409 |
| 93.45 | 407 |
| 93.45 | 404 |
| 88.8 | 404 |
| 88.8 | 403 |
| 88.8 | 402 |
| 88.8 | 400 |
| 83.4 | 400 |
| 83.4 | 397 |
| 83.4 | 396 |
| 83.4 | 393 |
| 78.15 | 393 |
| 78.15 | 392 |
| 78.15 | 390 |
| 73.7 | 390 |
| 73.7 | 387 |
| 73.7 | 386 |
| 73.7 | 384 |
| 69.55 | 384 |
| 69.55 | 382 |
| 69.55 | 381 |
| 69.55 | 380 |
| 66.1 | 380 |
| 66.1 | 381 |
| 66.1 | 382 |
| 66.1 | 377 |
| 63.05 | 377 |
| 63.05 | 376 |
| 61.35 | 376 |
| 61.35 | 375 |
| 61.35 | 371 |
| 59.85 | 371 |
| 59.85 | 369 |
| 59.85 | 366 |
| 59.85 | 364 |
| 57.55 | 364 |
| 57.55 | 366 |
| 57.55 | 364 |
| 57.55 | 363 |
| 55.05 | 363 |
| 55.05 | 360 |
| 55.05 | 358 |
| 55.05 | 355 |
| 52.8 | 355 |
| 52.8 | 352 |
| 52.8 | 351 |
| 52.8 | 352 |
| 50.25 | 352 |
| 50.25 | 347 |
| 50.25 | 343 |
| 47.55 | 343 |
| 47.55 | 344 |
| 47.55 | 342 |
| 47.55 | 341 |
| 45.2 | 341 |
| 45.2 | 340 |
| 45.2 | 337 |
| 45.2 | 339 |

-continued

| Sensor 4 | |
|---|---|
| pressure | resistance |
| 43.25 | 339 |
| 43.25 | 336 |
| 43.25 | 332 |
| 43.25 | 336 |
| 41.45 | 336 |
| 41.45 | 330 |
| 41.45 | 328 |
| 39.9 | 328 |
| 39.9 | 329 |
| 39.9 | 327 |
| 39.9 | 326 |
| 38.7 | 326 |
| 38.7 | 325 |
| 38.7 | 324 |
| 38.7 | 322 |
| 37.6 | 322 |
| 37.6 | 320 |
| 37.6 | 319 |
| 37.6 | 315 |
| 36.15 | 315 |
| 36.15 | 313 |
| 36.15 | 309 |
| 36.15 | 310 |
| 34.1 | 310 |
| 34.1 | 309 |
| 34.1 | 306 |
| 32.2 | 306 |
| 32.2 | 305 |
| 32.2 | 302 |
| 32.2 | 303 |
| 30.6 | 303 |
| 30.6 | 301 |
| 30.6 | 300 |
| 30.6 | 299 |
| 29.3 | 299 |
| 29.3 | 301 |
| 29.3 | 299 |
| 29.3 | 300 |
| 28.35 | 300 |
| 28.35 | 298 |
| 28.35 | 296 |
| 28.35 | 294 |
| 28.35 | 295 |
| 27.6 | 295 |
| 27.6 | 293 |
| 27.6 | 292 |
| 27.6 | 286 |
| 26.6 | 286 |
| 26.6 | 288 |
| 25.35 | 288 |
| 25.35 | 287 |
| 25.35 | 285 |
| 25.35 | 286 |
| 24.35 | 286 |
| 24.35 | 284 |
| 24.35 | 282 |
| 23.8 | 282 |
| 23.8 | 280 |
| 23.8 | 279 |
| 23.8 | 276 |
| 22.85 | 276 |
| 22.85 | 274 |
| 22.85 | 275 |
| 22.85 | 272 |
| 21.5 | 272 |
| 21.5 | 271 |
| 21.5 | 269 |
| 20.2 | 269 |
| 20.2 | 266 |
| 20.2 | 265 |
| 20.2 | 261 |
| 20.2 | 254 |
| 18.95 | 254 |
| 18.95 | 256 |
| 18.95 | 253 |

-continued

| Sensor 4 | |
|---|---|
| pressure | resistance |
| 18.95 | 252 |
| 17.5 | 252 |
| 17.5 | 247 |
| 17.5 | 248 |
| 17.5 | 247 |
| 16.05 | 247 |
| 16.05 | 244 |
| 16.05 | 243 |
| 15.15 | 243 |
| 15.15 | 241 |
| 15.15 | 240 |
| 14.35 | 240 |
| 14.35 | 234 |
| 14.35 | 235 |
| 14.35 | 223 |
| 13.55 | 223 |
| 13.55 | 231 |
| 13.55 | 229 |
| 12.7 | 229 |
| 12.7 | 225 |
| 12.7 | 223 |
| 12.7 | 228 |
| 11.85 | 228 |
| 11.85 | 220 |
| 11.85 | 217 |
| 11.05 | 217 |
| 11.05 | 214 |
| 11.05 | 211 |
| 10.3 | 211 |
| 10.3 | 207 |
| 10.3 | 204 |
| 9.5 | 204 |
| 9.5 | 196 |
| 9.5 | 189 |
| 8.55 | 189 |
| 8.55 | 187 |
| 8.55 | 180 |
| 7.35 | 180 |
| 7.35 | 174 |
| 7.35 | 168 |
| 7.35 | 170 |
| 6.05 | 170 |
| 6.05 | 167 |
| 6.05 | 165 |
| 6.05 | 163 |
| 5.15 | 163 |
| 5.15 | 160 |
| 5.15 | 158 |
| 5.15 | 153 |
| 5.15 | 155 |
| 4.6 | 155 |
| 4.6 | 147 |
| 4.6 | 143 |
| 4.6 | 142 |
| 4.05 | 142 |
| 4.05 | 141 |
| 4.05 | 138 |
| 4.05 | 140 |
| 3.6 | 140 |
| 3.6 | 138 |
| 3.6 | 134 |
| 3.3 | 134 |
| 3.3 | 128 |
| 3.3 | 120 |
| 3.3 | 113 |
| 2.85 | 113 |
| 2.85 | 110 |
| 2.85 | 107 |
| 2.85 | 104 |
| 2.2 | 104 |
| 2.2 | 100 |
| 2.2 | 96 |
| 2.2 | 93 |
| 1.6 | 93 |
| 1.6 | 82 |

-continued

| Sensor 4 | |
|---|---|
| pressure | resistance |
| 1.6 | 79 |
| 1.6 | 74 |
| 1.2 | 74 |
| 1.2 | 72 |
| 1.2 | 70 |
| 1.2 | 69 |
| 0.9 | 69 |
| 0.9 | 65 |
| 0.9 | 63 |
| 0.9 | 56 |
| 0.9 | 51 |
| 0.65 | 51 |
| 0.65 | 45 |
| 0.65 | 42 |
| 0.65 | 32 |
| 0.45 | 32 |
| 0.45 | 26 |
| 0.45 | 25 |
| 0.45 | 21 |
| 0.25 | 21 |
| 0.25 | 22 |
| 0.25 | 24 |
| 0.25 | 20 |
| 0.1 | 20 |
| 0.1 | 21 |
| 0.1 | 20 |
| 0.1 | 19 |
| 0.05 | 19 |
| 0.05 | 17 |
| 0.05 | 20 |
| 0.05 | 20 |
| 0.05 | 18 |
| 0.05 | 19 |
| 0.05 | 19 |
| 0.05 | 18 |
| 0.05 | 18 |
| 0.05 | 16 |
| 0.05 | 18 |
| 0.05 | 17 |
| 0.05 | 16 |

| Sensor 5 | |
|---|---|
| pressure | resistance |
| 0.1 | 4 |
| 0.1 | 6 |
| 0.25 | 6 |
| 0.25 | 8 |
| 0.4 | 8 |
| 0.4 | 10 |
| 0.4 | 11 |
| 0.4 | 12 |
| 0.55 | 12 |
| 0.55 | 17 |
| 0.55 | 14 |
| 0.55 | 16 |
| 0.85 | 16 |
| 0.85 | 18 |
| 0.85 | 19 |
| 0.85 | 20 |
| 0.85 | 24 |
| 1.15 | 24 |
| 1.15 | 26 |
| 1.15 | 29 |
| 1.15 | 31 |
| 1.7 | 31 |
| 1.7 | 35 |
| 1.7 | 36 |
| 1.7 | 37 |
| 2.6 | 37 |
| 2.6 | 40 |

-continued

| Sensor 5 | |
|---|---|
| pressure | resistance |
| 2.6 | 38 |
| 2.6 | 43 |
| 3.55 | 43 |
| 3.55 | 46 |
| 3.55 | 48 |
| 4.4 | 48 |
| 4.4 | 52 |
| 4.4 | 53 |
| 4.4 | 54 |
| 5.25 | 54 |
| 5.25 | 59 |
| 5.25 | 58 |
| 5.25 | 59 |
| 6.2 | 59 |
| 6.2 | 62 |
| 6.2 | 64 |
| 6.2 | 65 |
| 7.35 | 65 |
| 7.35 | 67 |
| 7.35 | 71 |
| 7.35 | 73 |
| 8.7 | 73 |
| 8.7 | 72 |
| 8.7 | 75 |
| 8.7 | 78 |
| 8.7 | 81 |
| 10.1 | 81 |
| 10.1 | 83 |
| 10.1 | 86 |
| 10.1 | 85 |
| 11.65 | 85 |
| 11.65 | 87 |
| 11.65 | 91 |
| 11.65 | 89 |
| 13.1 | 89 |
| 13.1 | 90 |
| 13.1 | 91 |
| 13.1 | 92 |
| 13.95 | 92 |
| 13.95 | 94 |
| 13.95 | 95 |
| 13.95 | 96 |
| 14.8 | 96 |
| 14.8 | 92 |
| 14.8 | 103 |
| 16.4 | 103 |
| 16.4 | 106 |
| 16.4 | 110 |
| 18.45 | 110 |
| 18.45 | 111 |
| 18.45 | 112 |
| 20.25 | 112 |
| 20.25 | 116 |
| 20.25 | 117 |
| 20.25 | 118 |
| 21.45 | 118 |
| 21.45 | 117 |
| 21.45 | 119 |
| 21.45 | 120 |
| 22.05 | 120 |
| 22.05 | 123 |
| 22.05 | 121 |
| 22.55 | 121 |
| 22.55 | 124 |
| 22.55 | 127 |
| 23.7 | 127 |
| 23.7 | 126 |
| 23.7 | 128 |
| 23.7 | 126 |
| 24.6 | 126 |
| 24.6 | 124 |
| 24.6 | 129 |
| 24.6 | 131 |
| 25.9 | 131 |
| 25.9 | 132 |

-continued

| Sensor 5 | |
|---|---|
| pressure | resistance |
| 25.9 | 135 |
| 25.9 | 133 |
| 25.9 | 135 |
| 26.4 | 135 |
| 26.4 | 137 |
| 26.4 | 136 |
| 27.7 | 136 |
| 27.7 | 138 |
| 27.7 | 140 |
| 28.6 | 140 |
| 28.6 | 139 |
| 28.6 | 141 |
| 29.5 | 141 |
| 29.5 | 142 |
| 29.5 | 143 |
| 29.5 | 142 |
| 30.4 | 142 |
| 30.4 | 144 |
| 30.4 | 145 |
| 31.1 | 145 |
| 31.1 | 144 |
| 31.1 | 145 |
| 31.1 | 147 |
| 32.15 | 147 |
| 32.15 | 144 |
| 32.15 | 148 |
| 32.65 | 148 |
| 32.65 | 150 |
| 32.65 | 151 |
| 33.95 | 151 |
| 33.95 | 152 |
| 34.55 | 152 |
| 34.55 | 154 |
| 34.55 | 152 |
| 34.55 | 155 |
| 34.55 | 154 |
| 35.2 | 154 |
| 35.2 | 156 |
| 35.2 | 157 |
| 35.7 | 157 |
| 35.7 | 158 |
| 36.55 | 158 |
| 36.55 | 159 |
| 36.55 | 164 |
| 36.55 | 162 |
| 38.05 | 162 |
| 38.05 | 165 |
| 39.3 | 165 |
| 39.3 | 163 |
| 40.65 | 163 |
| 40.65 | 165 |
| 40.65 | 166 |
| 41.75 | 166 |
| 41.75 | 169 |
| 41.75 | 170 |
| 42.65 | 170 |
| 42.65 | 171 |
| 44.2 | 171 |
| 44.2 | 173 |
| 44.2 | 175 |
| 45.25 | 175 |
| 45.25 | 174 |
| 45.25 | 176 |
| 45.95 | 176 |
| 45.95 | 178 |
| 47.35 | 178 |
| 47.35 | 180 |
| 48.2 | 180 |
| 48.2 | 181 |
| 48.2 | 182 |
| 49.7 | 182 |
| 49.7 | 183 |
| 49.7 | 184 |
| 50.75 | 184 |
| 50.75 | 183 |

-continued

| Sensor 5 | |
|---|---|
| pressure | resistance |
| 50.75 | 185 |
| 50.75 | 187 |
| 50.75 | 186 |
| 51.55 | 186 |
| 51.55 | 185 |
| 51.55 | 192 |
| 51.55 | 187 |
| 52.7 | 187 |
| 52.7 | 188 |
| 52.7 | 190 |
| 52.7 | 189 |
| 53.5 | 189 |
| 53.5 | 191 |
| 53.5 | 192 |
| 53.5 | 191 |
| 55.5 | 191 |
| 55.5 | 193 |
| 55.5 | 194 |
| 55.5 | 195 |
| 57.05 | 195 |
| 57.05 | 194 |
| 57.05 | 196 |
| 57.05 | 193 |
| 57.9 | 193 |
| 57.9 | 196 |
| 57.9 | 197 |
| 57.9 | 199 |
| 59.15 | 199 |
| 59.15 | 196 |
| 59.15 | 198 |
| 59.15 | 199 |
| 60.35 | 199 |
| 60.35 | 201 |
| 60.35 | 202 |
| 60.35 | 201 |
| 61.55 | 201 |
| 61.55 | 203 |
| 61.55 | 204 |
| 63.05 | 204 |
| 63.05 | 206 |
| 63.05 | 203 |
| 63.05 | 205 |
| 63.7 | 205 |
| 64.55 | 205 |
| 64.55 | 207 |
| 64.55 | 204 |
| 65.55 | 204 |
| 65.55 | 208 |
| 65.55 | 207 |
| 65.55 | 208 |
| 66.35 | 208 |
| 66.35 | 209 |
| 66.35 | 210 |
| 67.3 | 210 |
| 67.3 | 209 |
| 67.3 | 211 |
| 67.3 | 212 |
| 67.3 | 211 |
| 68.35 | 211 |
| 68.35 | 212 |
| 68.35 | 213 |
| 69.9 | 213 |
| 69.9 | 214 |
| 69.9 | 215 |
| 71.1 | 215 |
| 71.1 | 213 |
| 71.1 | 216 |
| 72.95 | 216 |
| 72.95 | 218 |
| 73.95 | 218 |
| 73.95 | 217 |
| 73.95 | 218 |
| 74.95 | 218 |
| 74.95 | 219 |
| 74.95 | 220 |

-continued

| Sensor 5 | |
|---|---|
| pressure | resistance |
| 75.35 | 220 |
| 75.35 | 219 |
| 75.8 | 219 |
| 75.8 | 221 |
| 75.8 | 223 |
| 75.8 | 221 |
| 75.85 | 221 |
| 75.85 | 220 |
| 75.85 | 222 |
| 75.55 | 222 |
| 75.55 | 220 |
| 75.55 | 221 |
| 75.55 | 222 |
| 75.05 | 222 |
| 75.05 | 223 |
| 75.05 | 221 |
| 75.05 | 223 |
| 75.85 | 223 |
| 75.85 | 225 |
| 75.85 | 224 |
| 77.15 | 224 |
| 77.15 | 225 |
| 77.15 | 227 |
| 79.3 | 227 |
| 80.55 | 227 |
| 80.55 | 229 |
| 82.3 | 229 |
| 82.3 | 228 |
| 82.3 | 230 |
| 82.3 | 229 |
| 83.05 | 229 |
| 83.05 | 230 |
| 83.05 | 233 |
| 83.95 | 233 |
| 83.95 | 230 |
| 83.95 | 229 |
| 83.95 | 231 |
| 84.35 | 231 |
| 84.35 | 232 |
| 84.35 | 231 |
| 84.95 | 231 |
| 84.95 | 232 |
| 84.95 | 231 |
| 85.7 | 231 |
| 85.7 | 227 |
| 85.7 | 233 |
| 85.7 | 234 |
| 86.35 | 234 |
| 86.35 | 236 |
| 86.35 | 235 |
| 87.85 | 235 |
| 87.85 | 234 |
| 87.85 | 235 |
| 87.85 | 236 |
| 89.15 | 236 |
| 89.15 | 237 |
| 89.15 | 240 |
| 89.15 | 237 |
| 90.75 | 237 |
| 90.75 | 238 |
| 90.75 | 237 |
| 92.65 | 237 |
| 92.65 | 239 |
| 92.65 | 240 |
| 92.65 | 239 |
| 93.6 | 239 |
| 93.6 | 241 |
| 93.6 | 238 |
| 93.6 | 242 |
| 95.4 | 242 |
| 95.4 | 240 |
| 95.4 | 242 |
| 95.4 | 241 |
| 96.45 | 241 |
| 96.45 | 243 |

Sensor 5

| pressure | resistance |
|---|---|
| 96.45 | 242 |
| 97.8 | 242 |
| 97.8 | 243 |
| 97.8 | 241 |
| 98.65 | 241 |
| 98.65 | 242 |
| 98.65 | 246 |
| 98.65 | 245 |
| 100.5 | 245 |
| 100.5 | 247 |
| 100.5 | 244 |
| 102.15 | 244 |
| 102.15 | 247 |
| 102.15 | 245 |
| 102.15 | 247 |
| 103 | 247 |
| 103 | 245 |
| 103 | 246 |
| 103 | 247 |
| 102.95 | 247 |
| 102.95 | 247 |
| 102.95 | 246 |
| 102.55 | 246 |
| 102.55 | 247 |
| 102.55 | 248 |
| 102.35 | 248 |
| 102.35 | 246 |
| 102.35 | 249 |
| 102.15 | 249 |
| 102.15 | 250 |
| 102.15 | 251 |
| 102.15 | 250 |
| 103.2 | 250 |
| 103.2 | 249 |
| 103.2 | 250 |
| 103.7 | 250 |
| 103.7 | 248 |
| 103.7 | 250 |
| 103.7 | 251 |
| 103.15 | 251 |
| 103.15 | 249 |
| 103.15 | 247 |
| 103.15 | 248 |
| 100.95 | 248 |
| 100.95 | 247 |
| 96.9 | 247 |
| 96.9 | 244 |
| 96.9 | 240 |
| 96.9 | 243 |
| 90.15 | 243 |
| 90.15 | 240 |
| 90.15 | 239 |
| 90.15 | 238 |
| 82.6 | 238 |
| 82.6 | 237 |
| 82.6 | 238 |
| 82.6 | 236 |
| 75.85 | 236 |
| 75.85 | 234 |
| 75.85 | 231 |
| 75.85 | 230 |
| 70.45 | 230 |
| 70.45 | 231 |
| 70.45 | 230 |
| 70.45 | 231 |
| 66.35 | 231 |
| 66.35 | 229 |
| 66.35 | 231 |
| 66.35 | 230 |
| 63.7 | 230 |
| 63.7 | 229 |
| 63.7 | 228 |
| 63.7 | 230 |
| 62.2 | 230 |
| 62.2 | 224 |
| 62.2 | 225 |
| 60.05 | 225 |
| 60.05 | 224 |
| 60.05 | 221 |
| 60.05 | 220 |
| 56.85 | 220 |
| 56.85 | 219 |
| 56.85 | 218 |
| 56.85 | 216 |
| 53.3 | 216 |
| 53.3 | 214 |
| 49.75 | 214 |
| 49.75 | 212 |
| 49.75 | 211 |
| 49.75 | 209 |
| 46.7 | 209 |
| 46.7 | 207 |
| 46.7 | 206 |
| 46.7 | 208 |
| 44.1 | 208 |
| 44.1 | 207 |
| 44.1 | 205 |
| 42.35 | 205 |
| 42.35 | 204 |
| 42.35 | 203 |
| 42.35 | 202 |
| 41.05 | 202 |
| 41.05 | 201 |
| 41.05 | 200 |
| 41.05 | 198 |
| 39 | 198 |
| 39 | 196 |
| 39 | 195 |
| 39 | 191 |
| 36.55 | 191 |
| 36.55 | 193 |
| 36.55 | 189 |
| 34.05 | 189 |
| 34.05 | 186 |
| 34.05 | 184 |
| 34.05 | 186 |
| 31.65 | 186 |
| 31.65 | 184 |
| 31.65 | 183 |
| 29.85 | 183 |
| 29.85 | 181 |
| 29.85 | 182 |
| 29.85 | 180 |
| 28.4 | 180 |
| 28.4 | 179 |
| 28.4 | 177 |
| 27 | 177 |
| 27 | 176 |
| 25.5 | 176 |
| 25.5 | 175 |
| 25.5 | 172 |
| 25.5 | 173 |
| 24.45 | 173 |
| 24.45 | 169 |
| 24.45 | 171 |
| 23.55 | 171 |
| 23.55 | 168 |
| 23.55 | 167 |
| 22.5 | 167 |
| 22.5 | 165 |
| 22.5 | 164 |
| 22.5 | 163 |
| 21 | 163 |
| 21 | 160 |
| 21 | 158 |
| 19.4 | 158 |
| 19.4 | 155 |
| 19.4 | 152 |
| 17.65 | 152 |
| 17.65 | 149 |

-continued

| Sensor 5 ||
|---|---|
| pressure | resistance |
| 17.65 | 148 |
| 16.05 | 148 |
| 16.05 | 146 |
| 16.05 | 145 |
| 16.05 | 143 |
| 16.05 | 142 |
| 14.7 | 142 |
| 14.7 | 140 |
| 13.55 | 140 |
| 13.55 | 138 |
| 13.55 | 135 |
| 13.55 | 132 |
| 12.35 | 132 |
| 12.35 | 133 |
| 12.35 | 130 |
| 12.35 | 132 |
| 11.35 | 132 |
| 11.35 | 128 |
| 11.35 | 125 |
| 11.35 | 123 |
| 10.25 | 123 |
| 10.25 | 121 |
| 10.25 | 119 |
| 10.25 | 117 |
| 9 | 117 |
| 9 | 114 |
| 9 | 112 |
| 9 | 109 |
| 7.6 | 109 |
| 7.6 | 108 |
| 7.6 | 104 |
| 7.6 | 102 |
| 6.4 | 102 |
| 6.4 | 101 |
| 6.4 | 99 |
| 6.4 | 98 |
| 5.55 | 98 |
| 5.55 | 96 |
| 5.55 | 93 |
| 5.55 | 90 |
| 5.55 | 87 |
| 4.85 | 87 |
| 4.85 | 85 |
| 4.85 | 84 |
| 4.85 | 81 |
| 4.1 | 81 |
| 4.1 | 80 |

-continued

| Sensor 5 ||
|---|---|
| pressure | resistance |
| 4.1 | 78 |
| 4.1 | 74 |
| 3.4 | 74 |
| 3.4 | 71 |
| 3.4 | 65 |
| 3.4 | 61 |
| 2.7 | 61 |
| 2.7 | 56 |
| 2.7 | 53 |
| 2.7 | 49 |
| 1.9 | 49 |
| 1.9 | 44 |
| 1.9 | 41 |
| 1.9 | 35 |
| 1.15 | 35 |
| 1.15 | 36 |
| 1.15 | 31 |
| 1.15 | 30 |
| 0.7 | 30 |
| 0.7 | 26 |
| 0.7 | 19 |
| 0.7 | 17 |
| 0.35 | 17 |
| 0.35 | 14 |
| 0.35 | 12 |
| 0.35 | 11 |
| 0.35 | 12 |
| 0.15 | 12 |
| 0.15 | 11 |
| 0.15 | 10 |
| 0.05 | 10 |
| 0.05 | 9 |
| 0.05 | 10 |
| 0.05 | 10 |
| 0.05 | 9 |
| 0.05 | 10 |
| 0.05 | 10 |
| 0.05 | 9 |
| 0.05 | 10 |
| 0.05 | 10 |
| 0.05 | 9 |
| 0.05 | 11 |
| 0.05 | 9 |
| 0.05 | 7 |

| Sensor 6 ||||||||||
|---|---|---|---|---|---|---|---|---|---|
| pressure | resistance | pressure | resistance | pressure | resistance | pressure | resistance | pressure | resistance |
| 0.05 | 8 | 3.35 | 70 | 12.05 | 124 | 22.75 | 166 | 35.55 | 206 |
| 0.05 | 9 | 3.35 | 72 | 12.05 | 125 | 22.75 | 169 | 35.55 | 207 |
| 0.05 | 12 | 3.9 | 72 | 12.65 | 125 | 22.75 | 170 | 35.55 | 210 |
| 0.15 | 12 | 3.9 | 77 | 12.65 | 127 | 23.7 | 170 | 36.6 | 210 |
| 0.15 | 11 | 3.9 | 79 | 12.65 | 129 | 23.7 | 172 | 36.6 | 209 |
| 0.15 | 16 | 4.65 | 79 | 12.65 | 131 | 23.7 | 173 | 36.6 | 211 |
| 0.15 | 14 | 4.65 | 82 | 13.35 | 131 | 24.75 | 173 | 37.1 | 211 |
| 0.3 | 14 | 4.65 | 87 | 13.35 | 132 | 24.75 | 175 | 37.1 | 208 |
| 0.3 | 16 | 4.65 | 85 | 13.35 | 131 | 24.75 | 180 | 37.1 | 213 |
| 0.3 | 17 | 5.45 | 85 | 13.35 | 133 | 24.75 | 178 | 37.1 | 212 |
| 0.35 | 17 | 5.45 | 91 | 13.95 | 133 | 26.25 | 178 | 37.85 | 212 |
| 0.35 | 15 | 5.45 | 88 | 13.95 | 132 | 26.25 | 181 | 37.85 | 213 |
| 0.35 | 18 | 5.45 | 87 | 13.95 | 135 | 26.25 | 182 | 38.25 | 213 |
| 0.35 | 20 | 6.25 | 87 | 13.95 | 137 | 27.4 | 182 | 38.25 | 214 |
| 0.45 | 20 | 6.25 | 90 | 14.75 | 137 | 27.4 | 184 | 38.25 | 216 |
| 0.45 | 21 | 6.25 | 93 | 14.75 | 138 | 27.4 | 183 | 38.25 | 213 |
| 0.45 | 26 | 6.25 | 92 | 14.75 | 140 | 28.25 | 183 | 38.75 | 213 |
| 0.45 | 25 | 6.85 | 92 | 15.45 | 140 | 28.25 | 185 | 38.75 | 219 |
| 0.6 | 25 | 6.85 | 95 | 15.45 | 142 | 28.75 | 185 | 38.75 | 216 |
| 0.6 | 26 | 6.85 | 96 | 15.45 | 138 | 28.75 | 187 | 38.75 | 217 |

-continued

| Sensor 6 | | | | | | | | | |
|---|---|---|---|---|---|---|---|---|---|
| pressure | resistance | pressure | resistance | pressure | resistance | pressure | resistance | pressure | resistance |
| 0.6 | 29 | 7.4 | 96 | 15.45 | 143 | 28.75 | 190 | 38.75 | 220 |
| 0.6 | 33 | 7.4 | 98 | 16.3 | 143 | 28.75 | 192 | 39.95 | 220 |
| 0.85 | 33 | 7.4 | 101 | 16.3 | 144 | 29.6 | 192 | 39.95 | 217 |
| 0.85 | 32 | 7.95 | 101 | 16.3 | 145 | 29.6 | 191 | 39.95 | 220 |
| 0.85 | 34 | 7.95 | 102 | 16.3 | 148 | 29.6 | 194 | 41 | 220 |
| 0.85 | 35 | 7.95 | 104 | 17.35 | 148 | 29.6 | 189 | 41 | 222 |
| 0.85 | 37 | 7.95 | 105 | 17.35 | 147 | 30.7 | 189 | 41 | 220 |
| 1.05 | 37 | 8.7 | 105 | 17.35 | 152 | 30.7 | 191 | 41 | 223 |
| 1.05 | 41 | 8.7 | 108 | 17.35 | 153 | 30.7 | 192 | 42 | 223 |
| 1.05 | 46 | 8.7 | 110 | 18.55 | 153 | 30.9 | 192 | 42 | 224 |
| 1.05 | 51 | 9.5 | 110 | 18.55 | 155 | 30.9 | 194 | 42.7 | 224 |
| 1.45 | 51 | 9.5 | 112 | 18.55 | 153 | 31.05 | 194 | 42.7 | 226 |
| 1.45 | 53 | 9.5 | 113 | 18.55 | 156 | 31.05 | 197 | 42.7 | 227 |
| 1.45 | 57 | 10.4 | 113 | 19.7 | 156 | 32.1 | 197 | 43.6 | 227 |
| 2.05 | 57 | 10.4 | 117 | 19.7 | 157 | 32.1 | 199 | 43.6 | 226 |
| 2.05 | 58 | 10.4 | 118 | 19.7 | 158 | 32.1 | 201 | 43.6 | 231 |
| 2.05 | 60 | 11.25 | 118 | 19.7 | 160 | 33.2 | 201 | 44.8 | 231 |
| 2.05 | 61 | 11.25 | 120 | 20.9 | 160 | 33.2 | 203 | 44.8 | 229 |
| 2.75 | 61 | 11.25 | 119 | 20.9 | 162 | 33.2 | 205 | 44.8 | 233 |
| 2.75 | 63 | 11.25 | 122 | 20.9 | 163 | 33.2 | 204 | 44.8 | 229 |
| 2.75 | 67 | 12.05 | 122 | 20.9 | 164 | 34.4 | 204 | 45.45 | 229 |
| 3.35 | 67 | 12.05 | 124 | 21.9 | 164 | 34.4 | 205 | 45.45 | 231 |
| 3.35 | 68 | 12.05 | 125 | 21.9 | 166 | 34.4 | 206 | 45.45 | 234 |
| 45.75 | 234 | 57.85 | 261 | 66.95 | 284 | 80.55 | 305 | 90.55 | 320 |
| 45.75 | 235 | 57.85 | 260 | 66.95 | 283 | 80.55 | 303 | 91.95 | 320 |
| 45.75 | 234 | 58 | 260 | 68 | 283 | 81.2 | 303 | 91.95 | 321 |
| 45.75 | 235 | 58 | 262 | 68 | 284 | 81.2 | 305 | 91.95 | 320 |
| 46.5 | 235 | 58 | 263 | 68 | 283 | 81.2 | 304 | 92.55 | 320 |
| 46.5 | 236 | 58 | 264 | 68 | 284 | 81.2 | 306 | 92.55 | 319 |
| 46.5 | 238 | 58.95 | 264 | 68.95 | 284 | 82.45 | 306 | 92.55 | 322 |
| 47.35 | 238 | 58.95 | 265 | 68.95 | 286 | 82.45 | 307 | 92.55 | 323 |
| 47.35 | 241 | 59.8 | 265 | 68.95 | 285 | 83.05 | 307 | 93.8 | 323 |
| 47.35 | 239 | 59.8 | 268 | 68.95 | 288 | 83.05 | 306 | 95 | 323 |
| 47.35 | 240 | 59.8 | 267 | 70.2 | 288 | 83.05 | 307 | 95 | 325 |
| 48.6 | 240 | 59.8 | 268 | 70.2 | 286 | 83.05 | 308 | 95 | 323 |
| 48.6 | 241 | 61.25 | 268 | 70.2 | 289 | 83.7 | 308 | 95 | 326 |
| 48.6 | 242 | 61.25 | 270 | 71.1 | 289 | 83.7 | 307 | 96.65 | 326 |
| 49.65 | 242 | 61.25 | 271 | 71.1 | 288 | 83.7 | 306 | 96.65 | 327 |
| 49.65 | 244 | 61.25 | 269 | 71.1 | 289 | 83.7 | 308 | 96.65 | 328 |
| 49.65 | 242 | 61.7 | 269 | 72.35 | 289 | 83.75 | 308 | 97.65 | 328 |
| 50.45 | 242 | 61.7 | 268 | 72.35 | 290 | 83.75 | 311 | 97.65 | 325 |
| 50.45 | 243 | 61.7 | 270 | 72.35 | 292 | 83.75 | 309 | 97.65 | 327 |
| 50.45 | 246 | 61.7 | 271 | 73.15 | 292 | 83.75 | 311 | 97.65 | 329 |
| 50.45 | 244 | 62.3 | 271 | 73.15 | 293 | 83.8 | 311 | 99 | 329 |
| 51 | 244 | 62.3 | 273 | 73.15 | 292 | 83.8 | 309 | 99 | 331 |
| 51 | 248 | 62.3 | 270 | 73.15 | 293 | 83.65 | 309 | 99 | 326 |
| 51 | 246 | 62.85 | 270 | 73.85 | 293 | 83.65 | 310 | 99 | 330 |
| 51.5 | 246 | 62.85 | 272 | 73.85 | 291 | 83.65 | 311 | 99.95 | 330 |
| 51.5 | 247 | 62.85 | 267 | 73.85 | 293 | 83.65 | 314 | 100.95 | 330 |
| 51.5 | 248 | 62.85 | 273 | 74.2 | 293 | 84.4 | 314 | 100.95 | 329 |
| 52.05 | 248 | 63.65 | 273 | 74.2 | 295 | 84.4 | 312 | 100.95 | 328 |
| 52.05 | 249 | 63.65 | 276 | 74.2 | 293 | 85.35 | 312 | 100.95 | 332 |
| 52.05 | 251 | 63.65 | 277 | 75.3 | 293 | 85.35 | 314 | 101.3 | 332 |
| 52.85 | 251 | 64.3 | 277 | 75.3 | 296 | 85.35 | 316 | 101.3 | 331 |
| 52.85 | 252 | 64.3 | 276 | 75.3 | 297 | 87.2 | 316 | 101.7 | 331 |
| 53.8 | 252 | 65.05 | 276 | 75.3 | 296 | 87.2 | 314 | 101.7 | 332 |
| 53.8 | 254 | 65.05 | 274 | 75.9 | 296 | 87.2 | 317 | 101.7 | 332 |
| 53.8 | 255 | 65.05 | 277 | 75.9 | 297 | 88.25 | 317 | 101.7 | 332 |
| 53.8 | 256 | 65.05 | 278 | 75.9 | 298 | 88.25 | 316 | 101.7 | 333 |
| 55.4 | 256 | 65.05 | 278 | 75.9 | 297 | 88.25 | 318 | 101.3 | 333 |
| 55.4 | 258 | 65.05 | 279 | 77.35 | 297 | 88.25 | 317 | 101.3 | 332 |
| 55.4 | 255 | 65.75 | 279 | 77.35 | 300 | 89.7 | 317 | 101.3 | 333 |
| 56.45 | 255 | 65.75 | 280 | 77.35 | 296 | 89.7 | 318 | 101.3 | 334 |
| 56.45 | 259 | 65.75 | 281 | 78.65 | 296 | 89.7 | 319 | 101 | 334 |
| 56.45 | 258 | 66.45 | 281 | 78.65 | 300 | 89.7 | 318 | 101 | 333 |
| 56.45 | 260 | 66.45 | 280 | 78.65 | 302 | 90.55 | 318 | 101 | 332 |
| 57.85 | 260 | 66.45 | 282 | 80.55 | 302 | 90.55 | 317 | 101 | 333 |
| 57.85 | 262 | 66.95 | 282 | 80.55 | 303 | 90.55 | 318 | 100.9 | 333 |
| 100.9 | 334 | 60.25 | 293 | 32.5 | 237 | 16.7 | 183 | 4.55 | 98 |
| 101 | 334 | 60.25 | 292 | 32.5 | 235 | 15.55 | 183 | 3.6 | 98 |
| 101 | 331 | 60.25 | 290 | 32.5 | 232 | 15.55 | 181 | 3.6 | 93 |
| 101 | 331 | 57.9 | 290 | 30.55 | 232 | 15.55 | 178 | 3.6 | 91 |
| 101 | 336 | 57.9 | 289 | 30.55 | 233 | 15.55 | 177 | 3.6 | 86 |
| 101 | 334 | 57.9 | 283 | 30.55 | 230 | 14.15 | 177 | 2.8 | 86 |
| 101 | 335 | 57.9 | 285 | 30.55 | 231 | 14.15 | 175 | 2.8 | 85 |

-continued

Sensor 6

| pressure | resistance | pressure | resistance | pressure | resistance | pressure | resistance | pressure | resistance |
|---|---|---|---|---|---|---|---|---|---|
| 101.85 | 335 | 54.6 | 285 | 28.3 | 231 | 14.15 | 174 | 2.8 | 82 |
| 101.85 | 334 | 54.6 | 282 | 28.3 | 226 | 12.85 | 174 | 2.8 | 77 |
| 101.85 | 336 | 54.6 | 280 | 28.3 | 223 | 12.85 | 172 | 2.25 | 77 |
| 102.15 | 336 | 51.1 | 280 | 28.3 | 222 | 12.85 | 171 | 2.25 | 70 |
| 102.15 | 334 | 51.1 | 276 | 28.3 | 223 | 12.85 | 168 | 2.25 | 64 |
| 102.15 | 335 | 51.1 | 275 | 26.2 | 223 | 11.85 | 168 | 2.25 | 56 |
| 102.15 | 332 | 51.1 | 274 | 26.2 | 222 | 11.85 | 165 | 1.55 | 56 |
| 99.5 | 332 | 47.95 | 274 | 26.2 | 220 | 11.85 | 164 | 1.55 | 52 |
| 99.5 | 331 | 47.95 | 272 | 26.2 | 221 | 11.85 | 161 | 1.55 | 44 |
| 99.5 | 329 | 45.55 | 272 | 24.75 | 221 | 10.95 | 161 | 1.55 | 46 |
| 99.5 | 327 | 45.55 | 267 | 24.75 | 218 | 10.95 | 155 | 0.95 | 46 |
| 94 | 327 | 45.55 | 265 | 24.75 | 216 | 10.95 | 156 | 0.95 | 42 |
| 94 | 323 | 45.55 | 263 | 23.7 | 216 | 10.95 | 152 | 0.95 | 39 |
| 94 | 321 | 43.05 | 263 | 23.7 | 213 | 9.7 | 152 | 0.95 | 34 |
| 86.6 | 321 | 43.05 | 259 | 23.7 | 214 | 9.7 | 158 | 0.95 | 29 |
| 86.6 | 315 | 43.05 | 257 | 22.7 | 214 | 9.7 | 152 | 0.55 | 29 |
| 86.6 | 317 | 43.05 | 258 | 22.7 | 213 | 9.7 | 150 | 0.55 | 22 |
| 79.85 | 317 | 40.5 | 258 | 22.7 | 211 | 8.85 | 150 | 0.55 | 17 |
| 79.85 | 318 | 40.5 | 256 | 22.7 | 210 | 8.85 | 147 | 0.55 | 11 |
| 79.85 | 312 | 40.5 | 255 | 21.6 | 210 | 8.85 | 145 | 0.3 | 11 |
| 79.85 | 311 | 40.5 | 254 | 21.6 | 207 | 8.85 | 141 | 0.3 | 12 |
| 74.05 | 311 | 38.3 | 254 | 21.6 | 206 | 7.9 | 141 | 0.15 | 12 |
| 74.05 | 307 | 38.3 | 253 | 20.4 | 206 | 7.9 | 137 | 0.15 | 10 |
| 74.05 | 305 | 38.3 | 251 | 20.4 | 203 | 7.9 | 134 | 0.05 | 10 |
| 74.05 | 303 | 36.75 | 251 | 20.4 | 202 | 7.9 | 130 | 0.05 | 9 |
| 68.7 | 303 | 36.75 | 250 | 20.4 | 200 | 7.9 | 128 | 0.05 | 9 |
| 68.7 | 305 | 36.75 | 247 | 19.1 | 200 | 6.75 | 128 | 0.05 | 12 |
| 68.7 | 303 | 36.75 | 248 | 19.1 | 198 | 6.75 | 126 | 0.05 | 9 |
| 64.55 | 303 | 35.35 | 248 | 19.1 | 197 | 6.75 | 121 | 0.05 | 10 |
| 64.55 | 301 | 35.35 | 247 | 17.8 | 197 | 6.75 | 119 | 0.05 | 11 |
| 64.55 | 303 | 35.35 | 245 | 17.8 | 195 | 5.55 | 119 | 0.05 | 8 |
| 64.55 | 302 | 35.35 | 246 | 17.8 | 193 | 5.55 | 114 | 0.05 | 7 |
| 62.05 | 302 | 33.95 | 246 | 17.8 | 192 | 5.55 | 111 | 0.05 | 9 |
| 62.05 | 300 | 33.95 | 245 | 17.8 | 191 | 5.55 | 105 | | |
| 62.05 | 295 | 33.95 | 240 | 16.7 | 191 | 4.55 | 105 | | |
| 62.05 | 296 | 33.95 | 241 | 16.7 | 189 | 4.55 | 103 | | |
| 60.25 | 296 | 32.5 | 241 | 16.7 | 187 | 4.55 | 100 | | |

Sensor 7

| pressure | resistance | pressure | resistance | pressure | resistance | pressure | resistance | pressure | resistance |
|---|---|---|---|---|---|---|---|---|---|
| 0.15 | 17 | 4.6 | 95 | 15.4 | 155 | 29.65 | 197 | 39.9 | 224 |
| 0.15 | 20 | 5.35 | 95 | 16.75 | 155 | 29.65 | 199 | 39.9 | 223 |
| 0.15 | 21 | 5.35 | 98 | 16.75 | 157 | 29.65 | 198 | 40.6 | 223 |
| 0.3 | 21 | 5.35 | 100 | 16.75 | 158 | 29.65 | 200 | 40.6 | 226 |
| 0.3 | 24 | 5.35 | 101 | 18.55 | 158 | 31.25 | 200 | 40.6 | 227 |
| 0.3 | 29 | 6.3 | 101 | 18.55 | 157 | 31.25 | 203 | 40.6 | 230 |
| 0.45 | 29 | 6.3 | 102 | 18.55 | 168 | 31.25 | 204 | 41.4 | 230 |
| 0.45 | 31 | 6.3 | 105 | 18.55 | 164 | 33 | 204 | 41.4 | 231 |
| 0.45 | 33 | 6.3 | 104 | 20.35 | 164 | 33 | 206 | 41.4 | 226 |
| 0.45 | 34 | 7.25 | 104 | 20.35 | 166 | 33 | 207 | 41.4 | 234 |
| 0.65 | 34 | 7.25 | 107 | 20.35 | 168 | 33 | 208 | 42.05 | 234 |
| 0.65 | 37 | 7.25 | 110 | 20.35 | 170 | 34.35 | 208 | 42.05 | 231 |
| 0.65 | 39 | 7.25 | 112 | 22.1 | 170 | 34.35 | 209 | 42.05 | 232 |
| 0.65 | 41 | 8.3 | 112 | 22.1 | 171 | 34.35 | 210 | 43 | 232 |
| 0.85 | 41 | 8.3 | 114 | 22.1 | 172 | 34.35 | 209 | 43 | 233 |
| 0.85 | 39 | 8.3 | 115 | 22.1 | 174 | 35.2 | 209 | 43 | 234 |
| 0.85 | 40 | 8.3 | 118 | 23.35 | 174 | 35.2 | 205 | 44.5 | 234 |
| 0.85 | 48 | 9.45 | 118 | 23.35 | 173 | 35.2 | 212 | 44.5 | 237 |
| 1.05 | 48 | 9.45 | 121 | 23.35 | 178 | 35.2 | 211 | 44.5 | 234 |
| 1.05 | 53 | 9.45 | 123 | 23.35 | 177 | 35.55 | 211 | 44.5 | 239 |
| 1.05 | 55 | 10.6 | 123 | 24.4 | 177 | 35.55 | 216 | 45.2 | 239 |
| 1.05 | 62 | 10.6 | 125 | 24.4 | 178 | 35.55 | 212 | 45.2 | 237 |
| 1.55 | 62 | 10.6 | 128 | 24.4 | 179 | 35.55 | 214 | 45.2 | 240 |
| 1.55 | 63 | 10.6 | 129 | 24.4 | 180 | 36.2 | 214 | 46.2 | 240 |
| 1.55 | 64 | 11.6 | 129 | 25.25 | 180 | 36.2 | 213 | 46.2 | 239 |
| 1.55 | 68 | 11.6 | 132 | 25.25 | 182 | 36.35 | 213 | 46.2 | 240 |
| 2.25 | 68 | 11.6 | 134 | 25.25 | 183 | 36.35 | 214 | 46.2 | 241 |
| 2.25 | 69 | 11.6 | 135 | 26.1 | 183 | 36.35 | 217 | 46.8 | 241 |
| 2.25 | 73 | 12.65 | 135 | 26.1 | 186 | 36.35 | 215 | 46.8 | 243 |

-continued

| \multicolumn{10}{c}{Sensor 7} |
|---|---|---|---|---|---|---|---|---|---|
| pressure | resistance | pressure | resistance | pressure | resistance | pressure | resistance | pressure | resistance |
| 3 | 73 | 12.65 | 136 | 26.1 | 185 | 36.55 | 215 | 46.8 | 246 |
| 3 | 76 | 12.65 | 139 | 26.1 | 187 | 36.55 | 217 | 48 | 246 |
| 3.5 | 76 | 12.65 | 142 | 27.05 | 187 | 36.55 | 218 | 48 | 243 |
| 3.5 | 79 | 13.7 | 142 | 27.05 | 188 | 36.85 | 218 | 48 | 241 |
| 3.5 | 80 | 13.7 | 144 | 27.5 | 188 | 36.85 | 217 | 48 | 244 |
| 3.5 | 84 | 13.7 | 148 | 27.5 | 190 | 36.85 | 219 | 48.7 | 244 |
| 4 | 84 | 13.7 | 141 | 27.8 | 190 | 37.95 | 219 | 48.7 | 246 |
| 4 | 85 | 14.5 | 141 | 27.8 | 192 | 37.95 | 225 | 49.5 | 246 |
| 4 | 84 | 14.5 | 144 | 27.8 | 194 | 37.95 | 219 | 49.5 | 249 |
| 4 | 85 | 14.5 | 147 | 27.8 | 195 | 38.5 | 219 | 49.5 | 246 |
| 4 | 90 | 14.5 | 149 | 27.8 | 192 | 38.5 | 222 | 49.5 | 250 |
| 4.6 | 90 | 15.4 | 149 | 28.5 | 192 | 38.5 | 225 | 50.2 | 250 |
| 4.6 | 91 | 15.4 | 151 | 28.5 | 196 | 39.9 | 225 | 50.2 | 252 |
| 4.6 | 94 | 15.4 | 154 | 28.5 | 197 | 39.9 | 222 | 50.2 | 251 |
| 50.2 | 250 | 64.2 | 281 | 77.5 | 302 | 97.85 | 330 | 84.6 | 320 |
| 51.45 | 250 | 64.95 | 281 | 77.5 | 303 | 98.85 | 330 | 79.65 | 320 |
| 51.45 | 252 | 64.95 | 282 | 78.75 | 303 | 98.85 | 329 | 79.65 | 318 |
| 51.45 | 253 | 64.95 | 283 | 78.75 | 301 | 98.85 | 331 | 75.05 | 318 |
| 51.45 | 251 | 64.95 | 285 | 78.75 | 307 | 98.85 | 330 | 75.05 | 310 |
| 52.25 | 251 | 65.8 | 285 | 79.95 | 307 | 100.25 | 330 | 75.05 | 309 |
| 52.25 | 253 | 65.8 | 283 | 79.95 | 306 | 100.25 | 331 | 70.3 | 309 |
| 52.25 | 256 | 65.8 | 285 | 79.95 | 308 | 100.25 | 332 | 70.3 | 306 |
| 53.25 | 256 | 66.65 | 285 | 81.55 | 308 | 101.25 | 332 | 70.3 | 305 |
| 53.25 | 257 | 66.65 | 287 | 82.55 | 308 | 101.25 | 331 | 65.85 | 305 |
| 53.25 | 256 | 66.65 | 284 | 82.55 | 309 | 101.95 | 331 | 65.85 | 306 |
| 53.25 | 257 | 66.65 | 286 | 82.55 | 310 | 101.95 | 331 | 65.85 | 304 |
| 54.25 | 257 | 67.85 | 286 | 83.45 | 310 | 101.95 | 332 | 65.85 | 305 |
| 54.25 | 258 | 67.85 | 287 | 83.45 | 311 | 101.95 | 333 | 62.65 | 305 |
| 54.25 | 263 | 67.85 | 289 | 83.45 | 312 | 101.85 | 333 | 62.65 | 302 |
| 55.95 | 263 | 69.15 | 289 | 84.5 | 312 | 101.85 | 334 | 62.65 | 304 |
| 55.95 | 262 | 69.15 | 291 | 84.5 | 317 | 101.85 | 332 | 62.65 | 303 |
| 55.95 | 258 | 69.15 | 290 | 84.5 | 312 | 101.85 | 335 | 61.2 | 303 |
| 57 | 258 | 70.25 | 290 | 84.5 | 311 | 101.55 | 335 | 61.2 | 302 |
| 57 | 263 | 70.25 | 288 | 84.65 | 311 | 101.55 | 334 | 61.2 | 298 |
| 57 | 264 | 70.25 | 291 | 84.65 | 310 | 101.55 | 333 | 61.2 | 301 |
| 58.1 | 264 | 70.25 | 290 | 84.65 | 314 | 101.7 | 333 | 59.65 | 301 |
| 58.1 | 266 | 71.7 | 290 | 84.65 | 315 | 101.7 | 335 | 59.65 | 299 |
| 58.35 | 266 | 71.7 | 293 | 86.35 | 315 | 101.7 | 333 | 59.65 | 297 |
| 58.35 | 268 | 71.7 | 292 | 86.35 | 313 | 102.4 | 333 | 59.65 | 294 |
| 58.8 | 268 | 71.7 | 293 | 86.35 | 316 | 102.4 | 335 | 57.85 | 294 |
| 58.8 | 269 | 72.4 | 293 | 86.35 | 317 | 102.4 | 334 | 57.85 | 293 |
| 58.8 | 270 | 72.4 | 294 | 87.4 | 317 | 102.6 | 334 | 57.85 | 291 |
| 58.8 | 267 | 72.4 | 292 | 87.4 | 319 | 102.6 | 335 | 55.4 | 291 |
| 59.6 | 267 | 72.4 | 295 | 89.55 | 319 | 101.05 | 335 | 55.4 | 289 |
| 59.6 | 272 | 73.5 | 295 | 89.55 | 315 | 101.05 | 334 | 52.8 | 289 |
| 60.8 | 272 | 73.5 | 296 | 89.55 | 319 | 101.05 | 333 | 52.8 | 285 |
| 60.8 | 275 | 73.5 | 293 | 89.55 | 321 | 98.35 | 333 | 52.8 | 284 |
| 60.8 | 274 | 73.5 | 296 | 91.2 | 321 | 98.35 | 331 | 52.8 | 282 |
| 62.1 | 274 | 74.1 | 296 | 91.2 | 322 | 94.3 | 331 | 50.35 | 282 |
| 62.1 | 275 | 74.1 | 297 | 92.9 | 322 | 94.3 | 329 | 50.35 | 280 |
| 62.1 | 276 | 74.1 | 299 | 92.9 | 324 | 94.3 | 328 | 50.35 | 279 |
| 62.1 | 274 | 74.1 | 298 | 94.7 | 324 | 94.3 | 327 | 48.2 | 279 |
| 62.95 | 274 | 75.3 | 298 | 94.7 | 328 | 89.65 | 327 | 48.2 | 280 |
| 62.95 | 277 | 75.3 | 300 | 94.7 | 327 | 89.65 | 326 | 48.2 | 276 |
| 62.95 | 279 | 75.95 | 300 | 96 | 327 | 89.65 | 324 | 46.5 | 276 |
| 62.95 | 277 | 75.95 | 301 | 96 | 326 | 89.65 | 323 | 46.5 | 275 |
| 64.2 | 277 | 75.95 | 302 | 96 | 327 | 84.6 | 323 | 46.5 | 274 |
| 64.2 | 280 | 75.95 | 301 | 96 | 328 | 84.6 | 320 | 46.5 | 272 |
| 64.2 | 279 | 77.5 | 301 | 97.85 | 328 | 84.6 | 323 | 45.15 | 272 |
| 45.15 | 269 | 27.15 | 227 | 16.85 | 196 | 12.1 | 172 | 1.95 | 76 |
| 45.15 | 268 | 26.1 | 227 | 16.85 | 195 | 12.1 | 165 | 1.95 | 73 |
| 45.15 | 269 | 26.1 | 228 | 16.85 | 198 | 11.1 | 165 | 1.95 | 66 |
| 43.25 | 269 | 26.1 | 226 | 16 | 198 | 11.1 | 168 | 1.95 | 65 |
| 43.25 | 266 | 25.1 | 226 | 16 | 194 | 11.1 | 165 | 1.35 | 65 |
| 43.25 | 263 | 25.1 | 225 | 16 | 196 | 11.1 | 163 | 1.35 | 61 |
| 41.2 | 263 | 25.1 | 224 | 15.5 | 196 | 9.85 | 163 | 1.35 | 60 |
| 41.2 | 265 | 25.1 | 222 | 15.5 | 195 | 9.85 | 161 | 1.35 | 62 |
| 41.2 | 260 | 24 | 222 | 15.5 | 194 | 9.85 | 156 | 1 | 62 |
| 41.2 | 261 | 24 | 220 | 15.5 | 195 | 9.85 | 155 | 1 | 54 |
| 39.5 | 261 | 24 | 217 | 15.3 | 195 | 8.7 | 155 | 1 | 55 |
| 39.5 | 260 | 24 | 220 | 15.3 | 194 | 8.7 | 160 | 1 | 50 |
| 39.5 | 263 | 24 | 219 | 15.15 | 194 | 8.7 | 152 | 0.75 | 50 |
| 38.4 | 263 | 23.1 | 219 | 15.15 | 192 | 8.7 | 150 | 0.75 | 46 |
| 38.4 | 259 | 23.1 | 215 | 15 | 192 | 7.85 | 150 | 0.75 | 45 |
| 37.5 | 259 | 23.1 | 220 | 15 | 194 | 7.85 | 148 | 0.75 | 30 |

-continued

Sensor 7

| pressure | resistance | pressure | resistance | pressure | resistance | pressure | resistance | pressure | resistance |
|---|---|---|---|---|---|---|---|---|---|
| 37.5 | 257 | 23.1 | 217 | 15 | 193 | 7.85 | 147 | 0.55 | 30 |
| 37.5 | 258 | 22.2 | 217 | 15 | 191 | 7.85 | 145 | 0.55 | 23 |
| 37.5 | 256 | 22.2 | 216 | 14.75 | 191 | 7.1 | 145 | 0.55 | 20 |
| 36.7 | 256 | 22.2 | 215 | 14.75 | 190 | 7.1 | 141 | 0.55 | 16 |
| 36.7 | 254 | 21.35 | 215 | 14.75 | 187 | 7.1 | 139 | 0.3 | 16 |
| 36.7 | 250 | 21.35 | 213 | 14.35 | 187 | 6.35 | 139 | 0.3 | 13 |
| 36.7 | 251 | 21.35 | 214 | 14.35 | 188 | 6.35 | 137 | 0.3 | 14 |
| 35.7 | 251 | 21.35 | 212 | 14.35 | 189 | 6.35 | 133 | 0.3 | 13 |
| 35.7 | 252 | 20.5 | 212 | 14.35 | 185 | 6.35 | 129 | 0.3 | 11 |
| 35.7 | 250 | 20.5 | 210 | 13.75 | 185 | 5.6 | 129 | 0.15 | 11 |
| 34.4 | 250 | 20.5 | 209 | 13.75 | 186 | 5.6 | 126 | 0.15 | 10 |
| 34.4 | 248 | 20.5 | 212 | 13.25 | 186 | 5.6 | 122 | 0.15 | 9 |
| 34.4 | 247 | 19.7 | 212 | 13.25 | 185 | 5.6 | 119 | 0.05 | 9 |
| 34.4 | 244 | 19.7 | 211 | 13.25 | 182 | 4.75 | 119 | 0.05 | 10 |
| 32.8 | 244 | 19.7 | 209 | 13.25 | 186 | 4.75 | 110 | 0.05 | 10 |
| 32.8 | 242 | 19.7 | 208 | 13.05 | 186 | 4.75 | 112 | 0.05 | 9 |
| 32.8 | 240 | 19.15 | 208 | 13.05 | 187 | 4.75 | 108 | 0.05 | 7 |
| 31.15 | 240 | 19.15 | 209 | 13.05 | 185 | 3.75 | 108 | 0.05 | 9 |
| 31.15 | 238 | 19.15 | 206 | 13.05 | 186 | 3.75 | 107 | 0.05 | 9 |
| 31.15 | 237 | 18.6 | 206 | 12.9 | 186 | 3.75 | 102 | 0.05 | 3 |
| 31.15 | 236 | 18.6 | 204 | 12.9 | 184 | 3.05 | 102 | 0.05 | 8 |
| 29.55 | 236 | 18.6 | 203 | 12.9 | 183 | 3.05 | 98 | 0.05 | 7 |
| 29.55 | 233 | 18.6 | 204 | 12.9 | 181 | 3.05 | 97 | 0.05 | 7 |
| 29.55 | 234 | 17.8 | 204 | 12.75 | 181 | 3.05 | 90 | 0.05 | 9 |
| 28.25 | 234 | 17.8 | 201 | 12.75 | 177 | 2.5 | 90 | 0.05 | 7 |
| 28.25 | 229 | 17.8 | 199 | 12.75 | 175 | 2.5 | 87 | 0.05 | 6 |
| 28.25 | 233 | 17.8 | 197 | 12.75 | 178 | 2.5 | 89 | 0.05 | 6 |
| 27.15 | 233 | 17.8 | 198 | 12.1 | 178 | 2.5 | 80 | 0.05 | 10 |
| 27.15 | 228 | 16.85 | 198 | 12.1 | 175 | 2.5 | 76 | 0.05 | 8 |
| 0.05 | 10 | | | | | | | | |

Sensor 8

| pressure | resistance | pressure | resistance | pressure | resistance | pressure | resistance | pressure | resistance |
|---|---|---|---|---|---|---|---|---|---|
| 0.15 | 17 | 7.1 | 129 | 21.05 | 189 | 31 | 225 | 41.75 | 245 |
| 0.15 | 20 | 8.6 | 129 | 22.7 | 189 | 32.05 | 225 | 41.75 | 250 |
| 0.15 | 17 | 8.6 | 132 | 22.7 | 195 | 32.05 | 224 | 41.75 | 251 |
| 0.15 | 27 | 8.6 | 134 | 22.7 | 198 | 32.05 | 226 | 41.75 | 249 |
| 0.35 | 27 | 8.6 | 135 | 22.7 | 196 | 32.95 | 226 | 41.75 | 252 |
| 0.35 | 28 | 9.95 | 135 | 22.7 | 197 | 32.95 | 225 | 42.95 | 252 |
| 0.35 | 29 | 9.95 | 137 | 24.2 | 197 | 32.95 | 227 | 42.95 | 250 |
| 0.35 | 33 | 9.95 | 141 | 24.2 | 198 | 32.95 | 231 | 42.95 | 253 |
| 0.55 | 33 | 11.1 | 141 | 24.2 | 205 | 34 | 231 | 43.7 | 253 |
| 0.55 | 36 | 11.1 | 144 | 24.2 | 202 | 34 | 229 | 43.7 | 255 |
| 0.55 | 39 | 11.1 | 145 | 25.3 | 202 | 34 | 230 | 44.8 | 255 |
| 0.55 | 44 | 12.05 | 145 | 25.3 | 200 | 35.15 | 230 | 44.8 | 256 |
| 0.8 | 44 | 12.05 | 148 | 25.3 | 204 | 35.15 | 232 | 44.8 | 255 |
| 0.8 | 45 | 12.05 | 149 | 26.05 | 204 | 35.15 | 233 | 44.8 | 256 |
| 0.8 | 49 | 12.05 | 152 | 26.05 | 207 | 35.15 | 235 | 45.35 | 256 |
| 0.8 | 55 | 13.05 | 152 | 26.05 | 205 | 35.15 | 236 | 45.35 | 258 |
| 1.25 | 55 | 13.05 | 155 | 26.85 | 205 | 36.5 | 236 | 45.35 | 261 |
| 1.25 | 58 | 13.05 | 156 | 26.85 | 206 | 36.5 | 235 | 46.4 | 261 |
| 1.25 | 61 | 13.95 | 156 | 26.85 | 208 | 36.5 | 236 | 46.4 | 258 |
| 1.25 | 63 | 13.95 | 158 | 27.45 | 208 | 36.5 | 237 | 46.4 | 260 |
| 1.8 | 63 | 13.95 | 161 | 27.45 | 207 | 37.5 | 237 | 46.95 | 260 |
| 1.8 | 66 | 13.95 | 163 | 27.45 | 213 | 37.5 | 239 | 46.95 | 262 |
| 1.8 | 71 | 15.1 | 163 | 27.45 | 210 | 37.5 | 240 | 47.6 | 262 |
| 1.8 | 75 | 15.1 | 161 | 28.05 | 210 | 38.65 | 240 | 47.6 | 260 |
| 2.55 | 75 | 15.1 | 162 | 28.05 | 211 | 38.65 | 241 | 47.6 | 262 |
| 2.55 | 83 | 15.1 | 167 | 28.05 | 214 | 39.15 | 241 | 47.6 | 266 |
| 2.55 | 85 | 16.05 | 167 | 28.45 | 214 | 39.15 | 242 | 48.25 | 266 |
| 2.55 | 88 | 16.05 | 169 | 28.45 | 212 | 39.15 | 241 | 48.25 | 261 |
| 3.55 | 88 | 16.05 | 170 | 28.45 | 214 | 39.65 | 241 | 48.25 | 267 |
| 3.55 | 89 | 16.05 | 172 | 28.45 | 216 | 39.65 | 246 | 48.25 | 264 |
| 3.55 | 90 | 17.3 | 172 | 28.45 | 214 | 39.65 | 240 | 49.55 | 264 |
| 3.55 | 93 | 17.3 | 171 | 29.4 | 214 | 39.65 | 242 | 49.55 | 266 |
| 3.55 | 97 | 17.3 | 174 | 29.4 | 217 | 39.85 | 242 | 49.55 | 269 |
| 4.55 | 97 | 17.3 | 176 | 30 | 217 | 39.85 | 243 | 50.35 | 269 |
| 4.55 | 102 | 18.4 | 176 | 30 | 218 | 39.85 | 245 | 50.35 | 270 |
| 4.55 | 108 | 18.4 | 179 | 30 | 217 | 39.85 | 244 | 50.35 | 269 |
| 4.55 | 109 | 18.4 | 176 | 30 | 220 | 39.9 | 244 | 50.35 | 270 |

-continued

| \multicolumn{10}{c|}{Sensor 8} |
| pressure | resistance | pressure | resistance | pressure | resistance | pressure | resistance | pressure | resistance |
| --- | --- | --- | --- | --- | --- | --- | --- | --- | --- |
| 5.7 | 109 | 18.4 | 182 | 30.55 | 220 | 39.9 | 246 | 51.05 | 270 |
| 5.7 | 112 | 19.7 | 182 | 30.55 | 218 | 39.9 | 245 | 51.05 | 269 |
| 5.7 | 118 | 19.7 | 184 | 30.55 | 220 | 40.55 | 245 | 51.05 | 271 |
| 5.7 | 120 | 19.7 | 187 | 30.55 | 222 | 40.55 | 247 | 51.05 | 270 |
| 7.1 | 120 | 21.05 | 187 | 31 | 222 | 40.55 | 253 | 51.45 | 270 |
| 7.1 | 124 | 21.05 | 190 | 31 | 223 | 40.55 | 245 | 51.45 | 271 |
| 51.45 | 272 | 61.8 | 292 | 73.4 | 312 | 87.05 | 333 | 99.3 | 352 |
| 52.15 | 272 | 61.8 | 293 | 73.4 | 313 | 88.85 | 333 | 99.3 | 348 |
| 52.15 | 271 | 61.8 | 295 | 74.45 | 313 | 88.85 | 332 | 99.45 | 348 |
| 52.15 | 273 | 63.1 | 295 | 74.45 | 314 | 88.85 | 335 | 99.45 | 343 |
| 52.15 | 274 | 63.1 | 294 | 74.45 | 313 | 89.65 | 335 | 99.45 | 348 |
| 53.15 | 274 | 63.1 | 292 | 74.45 | 315 | 89.65 | 334 | 99.45 | 347 |
| 53.15 | 275 | 63.1 | 294 | 75.45 | 315 | 89.65 | 339 | 99.55 | 347 |
| 53.15 | 281 | 63.3 | 294 | 75.45 | 316 | 89.65 | 337 | 99.55 | 348 |
| 54.3 | 281 | 63.3 | 299 | 75.45 | 319 | 91.15 | 337 | 99.55 | 347 |
| 54.3 | 276 | 63.3 | 297 | 75.45 | 316 | 91.15 | 333 | 99.75 | 347 |
| 54.3 | 278 | 63.3 | 296 | 77.35 | 316 | 91.15 | 336 | 99.75 | 348 |
| 54.3 | 279 | 64.15 | 296 | 77.35 | 317 | 91.15 | 334 | 100.1 | 348 |
| 54.3 | 276 | 64.15 | 294 | 77.35 | 319 | 91.15 | 339 | 100.1 | 347 |
| 55.55 | 276 | 64.45 | 294 | 78.4 | 319 | 92.55 | 339 | 100.1 | 349 |
| 55.55 | 279 | 64.45 | 298 | 78.4 | 320 | 92.55 | 337 | 100.4 | 349 |
| 56.3 | 279 | 64.45 | 299 | 79.6 | 320 | 92.55 | 336 | 100.4 | 348 |
| 56.3 | 278 | 64.45 | 297 | 79.6 | 321 | 92.55 | 338 | 100.4 | 349 |
| 56.3 | 283 | 65.45 | 297 | 79.6 | 322 | 93.25 | 338 | 100.4 | 352 |
| 56.3 | 281 | 65.45 | 298 | 81 | 322 | 93.25 | 339 | 100.65 | 352 |
| 57.55 | 281 | 65.45 | 301 | 81 | 321 | 93.25 | 341 | 100.65 | 349 |
| 57.55 | 282 | 66 | 301 | 81 | 325 | 93.25 | 340 | 101 | 349 |
| 57.55 | 283 | 66 | 299 | 81.8 | 325 | 94.45 | 340 | 101 | 350 |
| 57.95 | 283 | 66 | 301 | 81.8 | 323 | 94.45 | 339 | 101 | 344 |
| 57.95 | 282 | 66 | 302 | 81.8 | 324 | 94.45 | 338 | 101 | 351 |
| 57.95 | 284 | 66 | 301 | 81.8 | 325 | 94.45 | 341 | 101.4 | 351 |
| 58.35 | 284 | 66.95 | 301 | 83 | 325 | 95.5 | 341 | 101.4 | 351 |
| 58.35 | 286 | 66.95 | 303 | 83 | 326 | 95.5 | 342 | 101.4 | 350 |
| 58.35 | 283 | 66.95 | 302 | 83 | 327 | 95.5 | 340 | 101.65 | 350 |
| 58.2 | 283 | 66.95 | 304 | 83 | 323 | 95.5 | 344 | 101.65 | 351 |
| 58.2 | 289 | 67.85 | 304 | 84.35 | 323 | 96.35 | 344 | 101.65 | 353 |
| 58.2 | 286 | 67.85 | 303 | 84.35 | 327 | 96.35 | 343 | 101.65 | 352 |
| 58.2 | 285 | 69.15 | 303 | 84.35 | 328 | 96.35 | 341 | 101.8 | 352 |
| 58.8 | 285 | 69.15 | 302 | 84.35 | 326 | 96.9 | 341 | 101.8 | 350 |
| 58.8 | 286 | 69.15 | 307 | 85.45 | 326 | 96.9 | 343 | 101.85 | 350 |
| 58.8 | 288 | 70.45 | 307 | 85.45 | 328 | 97.2 | 343 | 101.85 | 351 |
| 59.65 | 288 | 70.45 | 306 | 85.45 | 327 | 97.2 | 345 | 101.85 | 353 |
| 59.65 | 290 | 70.45 | 309 | 86 | 327 | 97.2 | 344 | 101.85 | 351 |
| 59.65 | 289 | 71.5 | 309 | 86 | 323 | 97.2 | 345 | 102.35 | 351 |
| 60.4 | 289 | 71.5 | 307 | 86 | 331 | 98.05 | 345 | 102.35 | 349 |
| 60.4 | 290 | 71.5 | 308 | 86 | 330 | 99 | 345 | 102.35 | 352 |
| 60.4 | 293 | 71.5 | 312 | 86.3 | 330 | 99 | 348 | 102.35 | 347 |
| 61.3 | 293 | 72.95 | 312 | 86.3 | 332 | 99 | 347 | 102.85 | 347 |
| 61.3 | 292 | 72.95 | 310 | 86.3 | 331 | 99 | 346 | 102.85 | 352 |
| 61.3 | 291 | 72.95 | 311 | 87.05 | 331 | 99.3 | 346 | 102.85 | 353 |
| 61.8 | 291 | 73.4 | 311 | 87.05 | 332 | 99.3 | 343 | 102.95 | 353 |
| 102.95 | 351 | 64.3 | 324 | 43.4 | 290 | 30.45 | 266 | 21.1 | 238 |
| 102.95 | 352 | 64.3 | 325 | 42.1 | 290 | 30.45 | 267 | 21.1 | 235 |
| 101.45 | 352 | 64.3 | 323 | 42.1 | 288 | 30.45 | 263 | 20.25 | 235 |
| 101.45 | 350 | 62.55 | 323 | 42.1 | 287 | 30.45 | 264 | 20.25 | 232 |
| 101.45 | 351 | 62.55 | 322 | 42.1 | 290 | 29.35 | 264 | 20.25 | 236 |
| 100.25 | 351 | 62.55 | 319 | 40.8 | 290 | 29.35 | 262 | 19.3 | 236 |
| 100.25 | 352 | 61.1 | 319 | 40.8 | 288 | 29.35 | 264 | 19.3 | 233 |
| 100.25 | 353 | 61.1 | 322 | 40.8 | 290 | 28.4 | 264 | 18.55 | 233 |
| 100.25 | 352 | 61.1 | 320 | 39.85 | 290 | 28.4 | 261 | 18.55 | 231 |
| 99.2 | 352 | 61.1 | 318 | 39.85 | 289 | 28.4 | 258 | 18.55 | 226 |
| 99.2 | 350 | 59.55 | 318 | 39.85 | 290 | 28.4 | 261 | 18.55 | 225 |
| 99.2 | 349 | 59.55 | 317 | 39.85 | 287 | 28.4 | 255 | 17.8 | 225 |
| 99.2 | 347 | 59.55 | 312 | 39.4 | 287 | 27.5 | 255 | 17.8 | 227 |
| 96.7 | 347 | 59.55 | 314 | 39.4 | 285 | 27.5 | 257 | 17.8 | 224 |
| 96.7 | 346 | 57.45 | 314 | 39.4 | 286 | 27.5 | 254 | 17.8 | 223 |
| 96.7 | 347 | 57.45 | 313 | 38.6 | 286 | 27.5 | 252 | 16.8 | 223 |
| 91.85 | 347 | 57.45 | 315 | 38.6 | 284 | 26.35 | 252 | 16.8 | 222 |
| 91.85 | 345 | 55.25 | 315 | 38.6 | 283 | 26.35 | 254 | 16.8 | 223 |
| 91.85 | 344 | 55.25 | 309 | 38.6 | 280 | 26.35 | 252 | 16.8 | 221 |
| 91.85 | 343 | 55.25 | 310 | 37.5 | 280 | 26.35 | 250 | 15.8 | 221 |
| 86.6 | 343 | 53.15 | 310 | 37.5 | 282 | 25.2 | 250 | 15.8 | 219 |
| 86.6 | 341 | 53.15 | 306 | 37.5 | 283 | 25.2 | 251 | 15.8 | 220 |
| 86.6 | 339 | 53.15 | 304 | 37.5 | 282 | 24.15 | 251 | 15.3 | 220 |
| 82 | 339 | 51 | 304 | 36.6 | 282 | 24.15 | 249 | 15.3 | 219 |

-continued

| Sensor 8 | | | | | | | | | |
|---|---|---|---|---|---|---|---|---|---|
| pressure | resistance | pressure | resistance | pressure | resistance | pressure | resistance | pressure | resistance |
| 82 | 340 | 51 | 302 | 36.6 | 281 | 24.15 | 251 | 15.3 | 220 |
| 82 | 342 | 51 | 303 | 36.6 | 279 | 24.15 | 247 | 15.3 | 218 |
| 82 | 339 | 51 | 302 | 36.6 | 281 | 23.5 | 247 | 14.9 | 218 |
| 78.2 | 339 | 48.7 | 302 | 36.05 | 281 | 23.5 | 246 | 14.9 | 217 |
| 78.2 | 336 | 48.7 | 301 | 36.05 | 279 | 23.5 | 247 | 14.9 | 218 |
| 78.2 | 337 | 48.7 | 299 | 36.05 | 278 | 23.5 | 248 | 14.6 | 218 |
| 78.2 | 335 | 48.7 | 300 | 36.05 | 277 | 23.05 | 248 | 14.6 | 215 |
| 75.35 | 335 | 46.7 | 300 | 35.2 | 277 | 23.05 | 249 | 14.6 | 214 |
| 75.35 | 332 | 46.7 | 298 | 35.2 | 276 | 23.05 | 248 | 14.6 | 215 |
| 75.35 | 330 | 46.7 | 299 | 34.15 | 276 | 23.05 | 247 | 14.25 | 215 |
| 72.75 | 330 | 46.7 | 297 | 34.15 | 274 | 22.5 | 247 | 14.25 | 214 |
| 72.75 | 331 | 45.35 | 297 | 34.15 | 275 | 22.5 | 241 | 14.25 | 212 |
| 72.75 | 330 | 45.35 | 296 | 34.15 | 273 | 22.5 | 244 | 13.9 | 212 |
| 69.8 | 330 | 45.35 | 294 | 33.15 | 273 | 22.5 | 240 | 13.9 | 211 |
| 69.8 | 328 | 44.25 | 294 | 33.15 | 271 | 21.9 | 240 | 13.9 | 210 |
| 69.8 | 327 | 44.25 | 293 | 33.15 | 268 | 21.9 | 243 | 13.5 | 210 |
| 69.8 | 326 | 44.25 | 295 | 33.15 | 269 | 21.9 | 241 | 13.5 | 207 |
| 66.75 | 326 | 44.25 | 290 | 31.85 | 269 | 21.9 | 242 | 13.5 | 208 |
| 66.75 | 325 | 43.4 | 290 | 31.85 | 266 | 21.9 | 240 | 13.5 | 206 |
| 66.75 | 326 | 43.4 | 293 | 31.85 | 267 | 21.1 | 240 | 12.95 | 206 |
| 66.75 | 324 | 43.4 | 294 | 31.85 | 266 | 21.1 | 239 | 12.95 | 207 |
| 12.95 | 208 | 9.55 | 182 | 4.8 | 133 | 1.7 | 89 | 0.3 | 17 |
| 12.5 | 208 | 8.8 | 182 | 4.4 | 133 | 1.7 | 85 | 0.3 | 16 |
| 12.5 | 202 | 8.8 | 183 | 4.4 | 138 | 1.7 | 86 | 0.15 | 16 |
| 12.5 | 206 | 8.8 | 178 | 4.4 | 132 | 1.7 | 83 | 0.15 | 17 |
| 12.5 | 204 | 8.8 | 177 | 4.4 | 129 | 1.45 | 83 | 0.15 | 14 |
| 12.3 | 204 | 8.2 | 177 | 3.95 | 129 | 1.45 | 78 | 0.15 | 12 |
| 12.3 | 202 | 8.2 | 175 | 3.95 | 126 | 1.45 | 75 | 0.05 | 12 |
| 12.3 | 204 | 8.2 | 171 | 3.95 | 118 | 1.25 | 75 | 0.05 | 15 |
| 12.3 | 201 | 8.2 | 172 | 3.45 | 118 | 1.25 | 72 | 0.05 | 13 |
| 12.05 | 201 | 7.6 | 172 | 3.45 | 122 | 1.25 | 69 | 0.05 | 13 |
| 12.05 | 200 | 7.6 | 167 | 3.45 | 120 | 1.05 | 69 | 0.05 | 14 |
| 12.05 | 198 | 7.6 | 166 | 3.45 | 118 | 1.05 | 68 | 0.05 | 19 |
| 12.05 | 196 | 7.6 | 162 | 3.45 | 117 | 1.05 | 65 | 0.05 | 19 |
| 11.5 | 196 | 7.6 | 163 | 3.1 | 117 | 1.05 | 63 | 0.05 | 12 |
| 11.5 | 197 | 6.85 | 163 | 3.1 | 114 | 0.9 | 63 | 0.05 | 13 |
| 11.5 | 198 | 6.85 | 162 | 3.1 | 108 | 0.9 | 62 | 0.05 | 13 |
| 11.5 | 197 | 6.85 | 160 | 3.1 | 112 | 0.9 | 57 | 0.05 | 14 |
| 10.9 | 197 | 6.25 | 160 | 2.7 | 112 | 0.9 | 53 | 0.05 | 12 |
| 10.9 | 196 | 6.25 | 155 | 2.7 | 104 | 0.7 | 53 | 0.05 | 13 |
| 10.9 | 192 | 6.25 | 151 | 2.7 | 105 | 0.7 | 52 | 0.05 | 13 |
| 10.9 | 191 | 5.75 | 151 | 2.7 | 102 | 0.7 | 41 | 0.05 | 12 |
| 10.35 | 191 | 5.75 | 147 | 2.4 | 102 | 0.7 | 40 | 0.05 | 13 |
| 10.35 | 188 | 5.2 | 147 | 2.4 | 101 | 0.7 | 35 | 0.05 | 13 |
| 10.35 | 182 | 5.2 | 144 | 2.4 | 97 | 0.5 | 35 | 0.05 | 15 |
| 10.35 | 184 | 5.2 | 143 | 2.4 | 96 | 0.5 | 30 | 0.05 | 12 |
| 9.55 | 184 | 4.8 | 143 | 2.05 | 96 | 0.5 | 28 | | |
| 9.55 | 185 | 4.8 | 140 | 2.05 | 93 | 0.5 | 19 | | |
| 9.55 | 181 | 4.8 | 134 | 2.05 | 89 | 0.3 | 19 | | |

| Sensor 9 | | | | | | | | | |
|---|---|---|---|---|---|---|---|---|---|
| pressure | resistance | pressure | resistance | pressure | resistance | pressure | resistance | pressure | resistance |
| 0.1 | 10 | 5 | 103 | 16.4 | 162 | 26.8 | 207 | 37.55 | 238 |
| 0.1 | 14 | 5 | 105 | 16.4 | 164 | 27.85 | 207 | 38.7 | 238 |
| 0.1 | 17 | 6.2 | 105 | 16.4 | 163 | 27.85 | 209 | 38.7 | 241 |
| 0.1 | 15 | 6.2 | 108 | 17.1 | 163 | 27.85 | 211 | 38.7 | 239 |
| 0.25 | 15 | 6.2 | 112 | 17.1 | 166 | 27.85 | 207 | 38.7 | 240 |
| 0.25 | 20 | 6.2 | 117 | 17.1 | 168 | 29.1 | 207 | 39.75 | 240 |
| 0.25 | 21 | 7.65 | 117 | 17.95 | 168 | 29.1 | 210 | 39.75 | 244 |
| 0.25 | 26 | 7.65 | 116 | 17.95 | 171 | 29.1 | 211 | 39.75 | 242 |
| 0.4 | 26 | 7.65 | 118 | 17.95 | 170 | 29.8 | 211 | 39.75 | 243 |
| 0.4 | 24 | 7.65 | 120 | 17.95 | 173 | 29.8 | 212 | 40.65 | 243 |
| 0.4 | 26 | 9 | 120 | 18.8 | 173 | 29.8 | 214 | 40.65 | 242 |
| 0.4 | 27 | 9 | 123 | 18.8 | 175 | 30.05 | 214 | 40.65 | 244 |
| 0.55 | 27 | 9 | 126 | 18.8 | 179 | 30.05 | 215 | 41.4 | 244 |
| 0.55 | 28 | 10 | 126 | 19.75 | 179 | 30.05 | 216 | 41.4 | 245 |
| 0.55 | 31 | 10 | 128 | 19.75 | 180 | 30.95 | 216 | 41.4 | 246 |
| 0.55 | 30 | 10 | 123 | 19.75 | 183 | 30.95 | 218 | 41.4 | 248 |
| 0.75 | 30 | 10.5 | 123 | 19.75 | 182 | 30.95 | 221 | 41.9 | 248 |
| 0.75 | 39 | 10.5 | 130 | 21.15 | 182 | 32.2 | 221 | 41.9 | 249 |

-continued

| \multicolumn{10}{c|}{Sensor 9} |
| pressure | resistance | pressure | resistance | pressure | resistance | pressure | resistance | pressure | resistance |
| --- | --- | --- | --- | --- | --- | --- | --- | --- | --- |
| 0.75 | 40 | 10.5 | 134 | 21.15 | 184 | 32.2 | 220 | 42.7 | 249 |
| 0.75 | 47 | 11.1 | 134 | 21.15 | 188 | 32.2 | 222 | 42.7 | 250 |
| 1.1 | 47 | 11.1 | 137 | 21.15 | 186 | 33.15 | 222 | 42.7 | 247 |
| 1.1 | 51 | 11.1 | 139 | 22.6 | 186 | 33.15 | 224 | 42.7 | 250 |
| 1.1 | 54 | 11.1 | 138 | 22.6 | 188 | 33.15 | 226 | 42.95 | 250 |
| 1.1 | 56 | 11.9 | 138 | 22.6 | 186 | 33.15 | 223 | 42.95 | 249 |
| 1.65 | 56 | 11.9 | 143 | 22.6 | 190 | 33.7 | 223 | 42.95 | 251 |
| 1.65 | 57 | 11.9 | 141 | 23.45 | 190 | 33.7 | 225 | 43.3 | 251 |
| 1.65 | 58 | 11.9 | 142 | 23.45 | 192 | 33.7 | 227 | 43.3 | 252 |
| 1.65 | 62 | 12.7 | 142 | 23.45 | 193 | 33.7 | 228 | 43.3 | 253 |
| 2.25 | 62 | 12.7 | 144 | 24.05 | 193 | 34.3 | 228 | 43.3 | 254 |
| 2.25 | 66 | 12.7 | 147 | 24.05 | 190 | 34.3 | 227 | 44.35 | 254 |
| 2.25 | 70 | 12.7 | 150 | 24.05 | 193 | 34.3 | 229 | 44.35 | 255 |
| 2.25 | 74 | 13.6 | 150 | 24.05 | 197 | 34.75 | 229 | 44.35 | 256 |
| 2.9 | 74 | 13.6 | 151 | 25 | 197 | 34.75 | 230 | 44.35 | 252 |
| 2.9 | 71 | 13.6 | 152 | 25 | 198 | 34.75 | 231 | 46.15 | 252 |
| 2.9 | 80 | 13.6 | 149 | 25 | 197 | 35.6 | 231 | 46.15 | 257 |
| 2.9 | 84 | 14.7 | 149 | 25 | 198 | 35.6 | 232 | 46.15 | 256 |
| 2.9 | 88 | 14.7 | 154 | 26 | 198 | 35.6 | 233 | 46.15 | 258 |
| 3.85 | 88 | 14.7 | 157 | 26 | 200 | 36.55 | 233 | 46.15 | 260 |
| 3.85 | 90 | 15.6 | 157 | 26 | 201 | 36.55 | 234 | 47.5 | 260 |
| 3.85 | 93 | 15.6 | 160 | 26 | 199 | 36.55 | 235 | 47.5 | 263 |
| 3.85 | 95 | 15.6 | 162 | 26 | 202 | 37.55 | 235 | 47.5 | 259 |
| 5 | 95 | 15.6 | 160 | 26.8 | 202 | 37.55 | 238 | 47.5 | 262 |
| 5 | 99 | 16.4 | 160 | 26.8 | 205 | 37.55 | 234 | 48.75 | 262 |
| 48.75 | 264 | 55.7 | 282 | 65.1 | 299 | 76.05 | 313 | 90.65 | 336 |
| 48.75 | 263 | 56.95 | 282 | 65.1 | 298 | 76.05 | 317 | 91.3 | 336 |
| 48.75 | 262 | 56.95 | 283 | 65.1 | 299 | 76.05 | 318 | 91.3 | 337 |
| 49.85 | 262 | 56.95 | 281 | 65.5 | 299 | 77.05 | 318 | 91.3 | 338 |
| 49.85 | 265 | 56.95 | 283 | 65.5 | 300 | 77.05 | 320 | 92.75 | 338 |
| 49.85 | 264 | 57.95 | 283 | 65.5 | 303 | 77.05 | 319 | 92.75 | 339 |
| 49.85 | 267 | 57.95 | 285 | 66.4 | 303 | 77.05 | 322 | 92.75 | 341 |
| 50.75 | 267 | 57.95 | 286 | 66.4 | 301 | 78.35 | 322 | 92.75 | 340 |
| 50.75 | 263 | 58.75 | 286 | 66.4 | 302 | 78.35 | 319 | 93.6 | 340 |
| 50.75 | 269 | 58.75 | 285 | 67.8 | 302 | 78.35 | 321 | 93.6 | 341 |
| 51.4 | 269 | 58.8 | 285 | 67.8 | 304 | 78.35 | 322 | 93.6 | 343 |
| 51.4 | 266 | 58.8 | 287 | 67.8 | 305 | 80.05 | 322 | 95.35 | 343 |
| 51.4 | 268 | 58.8 | 285 | 67.8 | 304 | 80.05 | 324 | 95.35 | 345 |
| 51.4 | 267 | 58.8 | 287 | 67.8 | 305 | 81.45 | 324 | 95.35 | 343 |
| 52.05 | 267 | 59.3 | 287 | 68.95 | 305 | 81.45 | 325 | 95.35 | 345 |
| 52.05 | 270 | 59.3 | 289 | 68.95 | 306 | 81.45 | 326 | 96.25 | 345 |
| 52.05 | 271 | 59.3 | 287 | 70.3 | 306 | 81.45 | 323 | 97.7 | 345 |
| 52.7 | 271 | 59.3 | 288 | 70.3 | 307 | 82.55 | 323 | 97.7 | 347 |
| 52.7 | 270 | 60.1 | 288 | 70.3 | 306 | 82.55 | 325 | 97.7 | 345 |
| 52.7 | 273 | 60.1 | 290 | 70.8 | 306 | 82.55 | 324 | 97.7 | 346 |
| 53.25 | 273 | 60.1 | 288 | 70.8 | 307 | 82.55 | 327 | 98.65 | 346 |
| 53.25 | 272 | 61.45 | 288 | 70.8 | 306 | 83.05 | 327 | 98.65 | 347 |
| 53.25 | 273 | 61.45 | 292 | 70.8 | 309 | 83.05 | 326 | 98.65 | 346 |
| 53.25 | 274 | 61.45 | 290 | 71.3 | 309 | 83.05 | 327 | 99.65 | 346 |
| 53.25 | 276 | 61.45 | 293 | 71.3 | 308 | 83.6 | 327 | 99.65 | 347 |
| 53.8 | 276 | 62.05 | 293 | 71.3 | 309 | 83.6 | 326 | 99.65 | 349 |
| 53.8 | 274 | 62.05 | 289 | 71.3 | 311 | 83.6 | 329 | 100.35 | 349 |
| 53.8 | 273 | 62.05 | 291 | 71.85 | 311 | 83.6 | 328 | 100.35 | 348 |
| 54.15 | 273 | 62.05 | 292 | 71.85 | 310 | 84.35 | 328 | 100.35 | 347 |
| 54.15 | 274 | 62.9 | 292 | 71.85 | 309 | 84.35 | 331 | 100.35 | 349 |
| 54.15 | 277 | 62.9 | 294 | 71.85 | 311 | 85.75 | 331 | 101.05 | 349 |
| 54.05 | 277 | 62.9 | 295 | 72.6 | 311 | 85.75 | 325 | 101.05 | 350 |
| 54.05 | 276 | 62.9 | 294 | 72.6 | 319 | 85.75 | 331 | 101.05 | 349 |
| 54.05 | 275 | 63.3 | 294 | 72.6 | 312 | 86.7 | 331 | 101.05 | 349 |
| 54.05 | 276 | 63.3 | 297 | 73.7 | 312 | 86.7 | 332 | 101.05 | 350 |
| 54.05 | 276 | 63.3 | 295 | 73.7 | 314 | 86.7 | 333 | 101.4 | 350 |
| 54.05 | 278 | 64 | 295 | 73.7 | 313 | 86.7 | 334 | 101.4 | 351 |
| 54.05 | 274 | 64 | 297 | 74.55 | 313 | 88.05 | 334 | 101.5 | 351 |
| 54.05 | 277 | 64 | 295 | 74.55 | 314 | 88.05 | 333 | 101.5 | 350 |
| 54.65 | 277 | 64 | 297 | 74.55 | 316 | 88.05 | 334 | 101.5 | 352 |
| 54.65 | 279 | 64.45 | 297 | 74.55 | 315 | 89 | 334 | 102 | 352 |
| 54.65 | 278 | 64.45 | 298 | 75.7 | 315 | 89 | 336 | 102 | 353 |
| 54.65 | 280 | 64.45 | 299 | 75.7 | 316 | 89 | 335 | 102 | 352 |
| 55.7 | 280 | 64.45 | 298 | 75.7 | 315 | 89 | 337 | 102.65 | 352 |
| 55.7 | 281 | 65.1 | 298 | 75.7 | 313 | 90.65 | 337 | 102.65 | 347 |
| 102.65 | 351 | 61.65 | 321 | 41.95 | 284 | 25.65 | 244 | 13.2 | 193 |
| 102.1 | 351 | 61.65 | 320 | 41.95 | 282 | 25.65 | 246 | 13.2 | 191 |
| 102.1 | 352 | 60.75 | 320 | 40.05 | 282 | 24.75 | 246 | 12.45 | 191 |
| 102.1 | 351 | 60.75 | 318 | 40.05 | 281 | 24.75 | 242 | 12.45 | 192 |
| 99.35 | 351 | 60.75 | 317 | 40.05 | 280 | 24.75 | 244 | 12.45 | 188 |

-continued

Sensor 9

| pressure | resistance | pressure | resistance | pressure | resistance | pressure | resistance | pressure | resistance |
|---|---|---|---|---|---|---|---|---|---|
| 99.35 | 348 | 59.4 | 317 | 40.05 | 283 | 24.75 | 242 | 12.45 | 189 |
| 99.35 | 349 | 59.4 | 313 | 38.35 | 283 | 24.15 | 242 | 12.45 | 187 |
| 99.35 | 347 | 59.4 | 315 | 38.35 | 279 | 24.15 | 239 | 11.8 | 187 |
| 95.7 | 347 | 59.4 | 317 | 38.35 | 278 | 24.15 | 240 | 11.8 | 188 |
| 95.7 | 346 | 57.75 | 317 | 38.35 | 276 | 23.4 | 240 | 11.8 | 186 |
| 95.7 | 348 | 57.75 | 315 | 36.95 | 276 | 23.4 | 237 | 11.8 | 185 |
| 95.7 | 346 | 57.75 | 313 | 36.95 | 275 | 23.4 | 238 | 11.2 | 185 |
| 91.2 | 346 | 56.1 | 313 | 36.95 | 273 | 22.45 | 238 | 11.2 | 183 |
| 91.2 | 345 | 56.1 | 312 | 35.5 | 273 | 22.45 | 236 | 11.2 | 178 |
| 91.2 | 344 | 56.1 | 311 | 35.5 | 272 | 22.45 | 237 | 10.55 | 178 |
| 91.2 | 342 | 56.1 | 315 | 35.5 | 271 | 22.45 | 234 | 10.55 | 174 |
| 91.2 | 337 | 54.6 | 315 | 35.5 | 270 | 21.5 | 234 | 10.55 | 171 |
| 86.55 | 337 | 54.6 | 310 | 34.1 | 270 | 21.5 | 224 | 10.55 | 168 |
| 86.55 | 340 | 54.6 | 309 | 34.1 | 271 | 21.5 | 232 | 9.65 | 168 |
| 86.55 | 338 | 54.6 | 307 | 34.1 | 270 | 20.55 | 232 | 9.65 | 170 |
| 86.55 | 337 | 53 | 307 | 34.1 | 271 | 20.55 | 228 | 9.65 | 166 |
| 81.3 | 337 | 53 | 306 | 33.3 | 271 | 20.55 | 224 | 9.65 | 164 |
| 81.3 | 336 | 53 | 305 | 33.3 | 270 | 20.55 | 218 | 8.65 | 164 |
| 81.3 | 338 | 51.5 | 305 | 33.3 | 269 | 20.55 | 222 | 8.65 | 161 |
| 81.3 | 333 | 51.5 | 304 | 33.3 | 266 | 19.15 | 222 | 8.65 | 160 |
| 77 | 333 | 51.5 | 303 | 32.85 | 266 | 19.15 | 217 | 8.65 | 156 |
| 77 | 334 | 51.5 | 299 | 32.85 | 265 | 19.15 | 214 | 7.75 | 156 |
| 77 | 333 | 51.5 | 300 | 32.85 | 264 | 19.15 | 210 | 7.75 | 150 |
| 77 | 331 | 49.55 | 300 | 32.85 | 256 | 17.45 | 210 | 7.75 | 147 |
| 73.75 | 331 | 49.55 | 294 | 31.5 | 256 | 17.45 | 201 | 7.75 | 135 |
| 73.75 | 329 | 49.55 | 299 | 31.5 | 259 | 17.45 | 210 | 6.65 | 135 |
| 71.05 | 329 | 47.8 | 299 | 31.5 | 257 | 17.45 | 208 | 6.65 | 142 |
| 71.05 | 328 | 47.8 | 300 | 29.6 | 257 | 15.85 | 208 | 6.65 | 139 |
| 71.05 | 325 | 47.8 | 296 | 29.6 | 256 | 15.85 | 204 | 5.65 | 139 |
| 71.05 | 322 | 46.4 | 296 | 29.6 | 253 | 15.85 | 207 | 5.65 | 134 |
| 67.45 | 322 | 46.4 | 297 | 28.05 | 253 | 15.85 | 205 | 5.65 | 130 |
| 67.45 | 324 | 46.4 | 294 | 28.05 | 252 | 14.75 | 205 | 5.65 | 128 |
| 67.45 | 323 | 46.4 | 297 | 28.05 | 251 | 14.75 | 204 | 4.8 | 128 |
| 64.45 | 323 | 45.15 | 297 | 28.05 | 252 | 14.75 | 200 | 4.8 | 127 |
| 64.45 | 326 | 45.15 | 294 | 26.75 | 252 | 14.75 | 198 | 4.8 | 124 |
| 64.45 | 323 | 45.15 | 293 | 26.75 | 248 | 13.95 | 198 | 4.8 | 121 |
| 62.35 | 323 | 43.85 | 293 | 26.75 | 249 | 13.95 | 199 | 4.8 | 123 |
| 62.35 | 322 | 43.85 | 290 | 26.75 | 246 | 13.95 | 198 | 4.25 | 123 |
| 61.65 | 322 | 43.85 | 287 | 25.65 | 246 | 13.2 | 198 | 4.25 | 120 |
| 61.65 | 320 | 41.95 | 287 | 25.65 | 245 | 13.2 | 195 | 4.25 | 122 |
| 4.25 | 120 | 2.55 | 93 | 1 | 56 | 0.4 | 34 | 0.05 | 11 |
| 3.9 | 120 | 2.55 | 91 | 1 | 50 | 0.35 | 34 | 0.05 | 17 |
| 3.9 | 119 | 2.1 | 91 | 1 | 47 | 0.35 | 36 | 0.05 | 17 |
| 3.9 | 116 | 2.1 | 85 | 1 | 43 | 0.35 | 30 | 0.05 | 14 |
| 3.9 | 114 | 2.1 | 81 | 0.75 | 43 | 0.35 | 26 | 0.05 | 15 |
| 3.6 | 114 | 2.1 | 77 | 0.75 | 39 | 0.3 | 26 | 0.05 | 15 |
| 3.6 | 109 | 1.75 | 77 | 0.75 | 42 | 0.3 | 20 | 0.05 | 15 |
| 3.6 | 101 | 1.75 | 73 | 0.75 | 40 | 0.3 | 17 | 0.05 | 14 |
| 3.6 | 99 | 1.75 | 70 | 0.5 | 40 | 0.3 | 13 | 0.05 | 13 |
| 3.1 | 99 | 1.75 | 68 | 0.5 | 39 | 0.2 | 13 | 0.05 | 17 |
| 3.1 | 96 | 1.35 | 68 | 0.5 | 38 | 0.2 | 15 | 0.05 | 17 |
| 3.1 | 98 | 1.35 | 64 | 0.5 | 37 | 0.2 | 16 | 0.05 | 15 |
| 3.1 | 96 | 1.35 | 62 | 0.4 | 37 | 0.2 | 17 | 0.05 | 13 |
| 2.55 | 96 | 1.35 | 59 | 0.4 | 36 | 0.2 | 15 | 0.05 | 16 |
| 2.55 | 94 | 1 | 59 | 0.4 | 35 | 0.05 | 15 | | |

Sensor 10

| pressure | resistance | pressure | resistance | pressure | resistance | pressure | resistance | pressure | resistance |
|---|---|---|---|---|---|---|---|---|---|
| 0.05 | 4 | 5.45 | 103 | 16.75 | 171 | 29.1 | 209 | 41.35 | 242 |
| 0.05 | 10 | 5.45 | 108 | 16.75 | 172 | 28.95 | 209 | 41.35 | 243 |
| 0.1 | 10 | 6.5 | 108 | 18.7 | 172 | 28.95 | 207 | 41.35 | 249 |
| 0.1 | 13 | 6.5 | 110 | 18.7 | 174 | 28.95 | 209 | 41.35 | 243 |
| 0.1 | 15 | 6.5 | 114 | 18.7 | 176 | 29.5 | 209 | 41.35 | 242 |
| 0.1 | 20 | 6.5 | 118 | 18.7 | 175 | 29.5 | 212 | 41.05 | 242 |
| 0.25 | 20 | 7.9 | 118 | 20.25 | 175 | 29.5 | 214 | 41.05 | 244 |
| 0.25 | 21 | 7.9 | 120 | 20.25 | 178 | 29.5 | 215 | 41.05 | 245 |
| 0.25 | 23 | 7.9 | 122 | 20.25 | 177 | 30.8 | 215 | 41.4 | 245 |
| 0.4 | 23 | 7.9 | 127 | 20.25 | 181 | 30.8 | 216 | 41.4 | 246 |
| 0.4 | 24 | 9.35 | 127 | 21.45 | 181 | 30.8 | 217 | 41.4 | 247 |
| 0.4 | 26 | 9.35 | 129 | 21.45 | 184 | 30.8 | 218 | 42.35 | 247 |

-continued

| Sensor 10 | | | | | | | | | |
|---|---|---|---|---|---|---|---|---|---|
| pressure | resistance | pressure | resistance | pressure | resistance | pressure | resistance | pressure | resistance |
| 0.55 | 26 | 9.35 | 127 | 21.45 | 186 | 32.25 | 218 | 42.35 | 249 |
| 0.55 | 30 | 10.65 | 127 | 21.45 | 181 | 32.25 | 220 | 42.35 | 250 |
| 0.55 | 33 | 10.65 | 132 | 22.6 | 181 | 32.25 | 221 | 43.55 | 250 |
| 0.55 | 38 | 10.65 | 136 | 22.6 | 188 | 33.55 | 221 | 43.55 | 252 |
| 0.75 | 38 | 10.65 | 135 | 22.6 | 187 | 33.55 | 218 | 44.6 | 252 |
| 0.75 | 40 | 10.65 | 136 | 22.6 | 189 | 33.55 | 223 | 44.6 | 251 |
| 0.75 | 43 | 11.55 | 136 | 23.8 | 189 | 34.65 | 223 | 44.6 | 252 |
| 0.75 | 46 | 11.55 | 140 | 23.8 | 188 | 34.65 | 225 | 45.25 | 252 |
| 1.1 | 46 | 11.55 | 138 | 23.8 | 190 | 34.65 | 226 | 45.25 | 253 |
| 1.1 | 48 | 12.1 | 138 | 23.8 | 193 | 35.55 | 226 | 45.25 | 251 |
| 1.1 | 54 | 12.1 | 140 | 24.7 | 193 | 35.55 | 229 | 45.25 | 255 |
| 1.1 | 57 | 12.1 | 144 | 24.7 | 196 | 35.55 | 228 | 45.5 | 255 |
| 1.75 | 57 | 12.1 | 143 | 25.5 | 196 | 35.55 | 226 | 45.5 | 254 |
| 1.75 | 63 | 12.85 | 143 | 25.5 | 197 | 36.35 | 226 | 45.5 | 257 |
| 1.75 | 64 | 12.85 | 150 | 25.5 | 196 | 36.35 | 232 | 45.5 | 249 |
| 1.75 | 70 | 12.85 | 148 | 25.5 | 197 | 36.35 | 230 | 45.5 | 257 |
| 1.75 | 73 | 12.85 | 147 | 26.35 | 197 | 37.55 | 230 | 46.55 | 257 |
| 2.55 | 73 | 13.65 | 147 | 26.35 | 201 | 37.55 | 234 | 46.55 | 256 |
| 2.55 | 75 | 13.65 | 148 | 26.35 | 203 | 38.3 | 234 | 46.55 | 257 |
| 2.55 | 79 | 13.65 | 146 | 27.5 | 203 | 38.3 | 231 | 46.55 | 258 |
| 2.55 | 82 | 14.3 | 146 | 27.5 | 201 | 38.3 | 235 | 47.4 | 258 |
| 3.55 | 82 | 14.3 | 149 | 27.5 | 205 | 38.75 | 235 | 47.4 | 252 |
| 3.55 | 85 | 14.3 | 153 | 27.5 | 206 | 38.75 | 238 | 47.4 | 257 |
| 3.55 | 88 | 14.3 | 157 | 27.5 | 205 | 38.75 | 235 | 47.4 | 263 |
| 3.55 | 89 | 15.1 | 157 | 28.6 | 205 | 39.45 | 235 | 47.85 | 263 |
| 4.5 | 89 | 15.1 | 159 | 28.6 | 206 | 39.45 | 241 | 47.85 | 261 |
| 4.5 | 91 | 15.1 | 161 | 28.6 | 207 | 39.45 | 240 | 47.85 | 262 |
| 4.5 | 94 | 15.1 | 163 | 28.6 | 206 | 39.45 | 242 | 47.85 | 263 |
| 4.5 | 97 | 16.75 | 163 | 29.1 | 206 | 40.75 | 242 | 48.3 | 263 |
| 5.45 | 97 | 16.75 | 167 | 29.1 | 208 | 40.75 | 241 | 48.3 | 254 |
| 5.45 | 102 | 16.75 | 169 | 29.1 | 207 | 40.75 | 242 | 48.3 | 263 |
| 48.8 | 263 | 58.7 | 287 | 70.95 | 311 | 86.6 | 336 | 104 | 357 |
| 48.8 | 264 | 58.7 | 286 | 70.95 | 309 | 86.6 | 334 | 104 | 356 |
| 48.75 | 264 | 59.15 | 286 | 70.95 | 310 | 86.6 | 335 | 104.5 | 356 |
| 48.75 | 263 | 59.15 | 285 | 70.95 | 311 | 86.6 | 337 | 104.5 | 357 |
| 48.75 | 265 | 59.15 | 287 | 71 | 311 | 88.7 | 337 | 104.5 | 356 |
| 48.75 | 266 | 59.4 | 287 | 71 | 313 | 88.7 | 338 | 104.5 | 358 |
| 49.6 | 266 | 59.4 | 288 | 71.65 | 313 | 88.7 | 342 | 104.15 | 358 |
| 49.6 | 265 | 59.4 | 291 | 71.65 | 319 | 89.55 | 342 | 104.15 | 356 |
| 49.6 | 266 | 59.4 | 290 | 71.65 | 315 | 89.55 | 340 | 104.15 | 358 |
| 49.6 | 267 | 60.35 | 290 | 71.65 | 318 | 89.55 | 341 | 104.15 | 359 |
| 50.3 | 267 | 60.35 | 291 | 73.45 | 318 | 91.35 | 341 | 103.9 | 359 |
| 50.3 | 266 | 60.35 | 292 | 73.45 | 316 | 92.25 | 341 | 103.9 | 358 |
| 50.3 | 270 | 60.35 | 293 | 73.45 | 318 | 92.25 | 343 | 103.9 | 359 |
| 50.65 | 270 | 61.8 | 293 | 73.45 | 314 | 92.25 | 344 | 104.8 | 359 |
| 50.65 | 271 | 61.8 | 291 | 75.05 | 314 | 92.25 | 345 | 104.8 | 360 |
| 50.65 | 270 | 61.8 | 296 | 75.05 | 316 | 93.85 | 345 | 104.8 | 362 |
| 51.85 | 270 | 61.8 | 295 | 75.05 | 317 | 93.85 | 344 | 104.8 | 359 |
| 51.85 | 273 | 63 | 295 | 75.3 | 317 | 93.85 | 345 | 104.8 | 358 |
| 51.85 | 272 | 63 | 296 | 75.3 | 321 | 94.6 | 345 | 104.4 | 358 |
| 51.85 | 275 | 63 | 293 | 75.3 | 318 | 94.6 | 346 | 104.4 | 357 |
| 53.15 | 275 | 64 | 293 | 75.8 | 318 | 94.6 | 347 | 101.05 | 357 |
| 53.15 | 273 | 64 | 298 | 75.8 | 319 | 94.6 | 348 | 101.05 | 355 |
| 53.15 | 275 | 64 | 299 | 75.8 | 323 | 96 | 348 | 101.05 | 350 |
| 53.15 | 277 | 65.2 | 299 | 75.8 | 319 | 96 | 347 | 96.4 | 350 |
| 54.05 | 277 | 65.2 | 298 | 75.8 | 320 | 96 | 348 | 96.4 | 353 |
| 54.05 | 275 | 65.2 | 301 | 77.4 | 320 | 96.75 | 348 | 96.4 | 352 |
| 54.05 | 277 | 65.2 | 306 | 77.4 | 325 | 96.75 | 349 | 91.9 | 352 |
| 54.8 | 277 | 66.55 | 306 | 77.4 | 326 | 98.15 | 349 | 91.9 | 350 |
| 54.8 | 276 | 66.55 | 301 | 80.05 | 326 | 98.15 | 351 | 91.9 | 347 |
| 55.8 | 276 | 66.8 | 301 | 80.05 | 325 | 99.2 | 351 | 91.9 | 349 |
| 55.8 | 281 | 66.8 | 303 | 80.05 | 326 | 99.2 | 352 | 87.95 | 349 |
| 56.75 | 281 | 66.8 | 302 | 82 | 326 | 99.2 | 353 | 87.95 | 346 |
| 56.75 | 284 | 66.55 | 302 | 82 | 327 | 100.3 | 353 | 85 | 346 |
| 56.75 | 277 | 66.55 | 303 | 82 | 329 | 100.3 | 352 | 85 | 349 |
| 56.75 | 281 | 66.55 | 302 | 82 | 330 | 100.3 | 354 | 85 | 347 |
| 57.3 | 281 | 66.55 | 304 | 83.7 | 330 | 101.2 | 354 | 83.2 | 347 |
| 57.3 | 280 | 66.55 | 304 | 83.7 | 331 | 101.2 | 356 | 83.2 | 346 |
| 57.3 | 282 | 66.55 | 298 | 83.7 | 330 | 101.2 | 355 | 83.2 | 345 |
| 57.3 | 283 | 66.55 | 305 | 84.2 | 330 | 101.2 | 356 | 80.8 | 345 |
| 57.35 | 283 | 66.55 | 309 | 84.2 | 331 | 102.55 | 356 | 80.8 | 346 |
| 57.35 | 284 | 68 | 309 | 84.2 | 334 | 102.55 | 357 | 80.8 | 340 |
| 57.35 | 289 | 68 | 308 | 85.65 | 334 | 102.55 | 355 | 77.7 | 340 |
| 57.9 | 289 | 68 | 309 | 85.65 | 335 | 102.55 | 356 | 77.7 | 339 |
| 57.9 | 285 | 70.05 | 309 | 85.65 | 332 | 102.55 | 356 | 77.7 | 338 |

-continued

| Sensor 10 | | | | | | | | | |
|---|---|---|---|---|---|---|---|---|---|
| pressure | resistance | pressure | resistance | pressure | resistance | pressure | resistance | pressure | resistance |
| 57.9 | 287 | 70.05 | 311 | 85.65 | 336 | 104 | 356 | 77.7 | 335 |
| 74.2 | 335 | 48.7 | 297 | 29.9 | 255 | 19.65 | 224 | 9.7 | 172 |
| 74.2 | 334 | 48.7 | 299 | 29 | 255 | 19.65 | 223 | 9.7 | 170 |
| 74.2 | 329 | 47.3 | 299 | 29 | 254 | 19.65 | 220 | 9.7 | 169 |
| 70.1 | 329 | 47.3 | 295 | 28.25 | 254 | 19.65 | 216 | 8.85 | 169 |
| 70.1 | 328 | 47.3 | 297 | 28.25 | 256 | 18.3 | 216 | 8.85 | 168 |
| 70.1 | 325 | 47.3 | 294 | 28.25 | 253 | 18.3 | 218 | 8.85 | 165 |
| 66.45 | 325 | 45.85 | 294 | 27.6 | 253 | 18.3 | 216 | 8.15 | 165 |
| 66.45 | 329 | 45.85 | 295 | 27.6 | 252 | 17.1 | 216 | 8.15 | 158 |
| 66.45 | 328 | 45.85 | 289 | 27.6 | 251 | 17.1 | 214 | 8.15 | 153 |
| 64.5 | 328 | 45.85 | 287 | 27.6 | 247 | 17.1 | 215 | 8.15 | 155 |
| 64.5 | 327 | 45.85 | 286 | 27 | 247 | 17.1 | 214 | 7.4 | 155 |
| 64.5 | 326 | 43.9 | 286 | 27 | 250 | 16.35 | 214 | 7.4 | 148 |
| 64.5 | 325 | 43.9 | 285 | 27 | 249 | 16.35 | 211 | 7.4 | 147 |
| 63.7 | 325 | 43.9 | 283 | 26.1 | 249 | 16.35 | 210 | 7.4 | 148 |
| 63.7 | 326 | 41.8 | 283 | 26.1 | 246 | 15.75 | 210 | 6.4 | 148 |
| 63.7 | 324 | 41.8 | 282 | 26.1 | 247 | 15.75 | 209 | 6.4 | 144 |
| 63.7 | 326 | 41.8 | 280 | 26.1 | 246 | 15.75 | 208 | 6.4 | 139 |
| 62.75 | 326 | 39.75 | 280 | 26.1 | 243 | 15.1 | 208 | 6.4 | 136 |
| 62.75 | 325 | 39.75 | 281 | 25.25 | 243 | 15.1 | 205 | 6.4 | 126 |
| 62.75 | 323 | 39.75 | 276 | 25.25 | 245 | 15.1 | 204 | 5.4 | 126 |
| 61.8 | 323 | 39.75 | 271 | 25.25 | 244 | 14.5 | 204 | 5.4 | 122 |
| 61.8 | 324 | 38.05 | 271 | 24.5 | 244 | 14.5 | 203 | 5.4 | 118 |
| 61.8 | 321 | 38.05 | 275 | 24.5 | 243 | 14.5 | 204 | 4.35 | 118 |
| 61.8 | 322 | 38.05 | 272 | 24.5 | 242 | 14.5 | 200 | 4.35 | 116 |
| 61.8 | 321 | 38.05 | 269 | 24.5 | 243 | 13.9 | 200 | 4.35 | 111 |
| 60.4 | 321 | 36.1 | 269 | 23.9 | 243 | 13.9 | 196 | 4.35 | 107 |
| 60.4 | 319 | 36.1 | 266 | 23.9 | 245 | 13.9 | 194 | 3.45 | 107 |
| 58.85 | 319 | 36.1 | 268 | 23.9 | 241 | 13.9 | 196 | 3.45 | 104 |
| 58.85 | 315 | 34.25 | 268 | 23.9 | 242 | 13.1 | 196 | 3.45 | 103 |
| 58.85 | 313 | 34.25 | 267 | 23.35 | 242 | 13.1 | 195 | 3.45 | 96 |
| 58.85 | 312 | 33 | 267 | 23.35 | 237 | 13.1 | 194 | 2.8 | 96 |
| 57 | 312 | 33 | 265 | 23.35 | 239 | 13.1 | 193 | 2.8 | 90 |
| 57 | 310 | 33 | 264 | 23.35 | 238 | 13.1 | 189 | 2.8 | 80 |
| 57 | 304 | 33 | 261 | 22.85 | 238 | 12.1 | 189 | 2.8 | 77 |
| 54.25 | 304 | 33 | 263 | 22.85 | 237 | 12.1 | 188 | 2.05 | 77 |
| 54.25 | 306 | 32.05 | 263 | 22.85 | 235 | 12.1 | 186 | 2.05 | 74 |
| 54.25 | 305 | 32.05 | 261 | 22.85 | 236 | 12.1 | 184 | 2.05 | 73 |
| 51.55 | 305 | 32.05 | 260 | 22.05 | 236 | 11.3 | 184 | 2.05 | 71 |
| 51.55 | 309 | 32.05 | 261 | 22.05 | 232 | 11.3 | 183 | 1.5 | 71 |
| 51.55 | 304 | 30.9 | 261 | 22.05 | 231 | 11.3 | 181 | 1.5 | 73 |
| 51.55 | 306 | 30.9 | 259 | 22.05 | 232 | 11.3 | 178 | 1.25 | 73 |
| 49.95 | 306 | 30.9 | 258 | 21 | 232 | 10.5 | 178 | 1.25 | 74 |
| 49.95 | 302 | 29.9 | 258 | 21 | 229 | 10.5 | 180 | 1.25 | 73 |
| 49.95 | 300 | 29.9 | 257 | 21 | 226 | 10.5 | 174 | 1.3 | 73 |
| 48.7 | 300 | 29.9 | 252 | 21 | 224 | 10.5 | 172 | 1.3 | 69 |
| 1.3 | 59 | 0.2 | 14 | 0.05 | 14 | 0.05 | 13 | 0.05 | 11 |
| 1.3 | 44 | 0.2 | 12 | 0.05 | 14 | 0.05 | 12 | 0.05 | 11 |
| 1.05 | 44 | 0.2 | 17 | 0.05 | 13 | 0.05 | 12 | 0.05 | 10 |
| 1.05 | 37 | 0.2 | 16 | 0.05 | 13 | 0.05 | 11 | 0.05 | 11 |
| 1.05 | 28 | 0.05 | 16 | 0.05 | 12 | 0.05 | 10 | 0.05 | 11 |
| 1.05 | 21 | 0.05 | 15 | 0.05 | 13 | 0.05 | 14 | 0.05 | 12 |
| 1.05 | 19 | 0.05 | 14 | 0.05 | 13 | 0.05 | 14 | 0.05 | 12 |
| 0.6 | 19 | 0.05 | 15 | 0.05 | 15 | 0.05 | 13 | 0.05 | 11 |
| 0.6 | 15 | 0.05 | 15 | 0.05 | 13 | 0.05 | 11 | 0.05 | 12 |
| 0.6 | 16 | 0.05 | 14 | 0.05 | 13 | 0.05 | 11 | | |
| 0.6 | 14 | 0.05 | 17 | 0.05 | 11 | 0.05 | 12 | | |

| Sensor 11 | | | | | | | | | |
|---|---|---|---|---|---|---|---|---|---|
| pressure | resistance | pressure | resistance | pressure | resistance | pressure | resistance | pressure | resistance |
| 0.05 | 3 | 4.45 | 75 | 14.95 | 144 | 25.9 | 191 | 34.25 | 221 |
| 0.1 | 3 | 4.45 | 76 | 14.95 | 145 | 25.9 | 193 | 34.25 | 218 |
| 0.1 | 6 | 4.45 | 83 | 14.95 | 148 | 25.9 | 195 | 34.25 | 222 |
| 0.1 | 11 | 4.45 | 85 | 15.75 | 148 | 26.8 | 195 | 35.15 | 222 |
| 0.1 | 12 | 5.35 | 85 | 15.75 | 152 | 26.8 | 194 | 35.15 | 223 |
| 0.2 | 12 | 5.35 | 87 | 16.75 | 152 | 27.55 | 194 | 35.15 | 226 |
| 0.2 | 14 | 5.35 | 89 | 16.75 | 155 | 27.55 | 198 | 36.4 | 226 |
| 0.2 | 16 | 5.35 | 92 | 16.75 | 158 | 27.55 | 201 | 36.4 | 225 |
| 0.35 | 16 | 5.35 | 94 | 18.15 | 158 | 27.55 | 200 | 36.4 | 226 |
| 0.35 | 19 | 6.35 | 94 | 18.15 | 159 | 28.3 | 200 | 36.4 | 230 |

-continued

| \multicolumn{10}{c}{Sensor 11} |
|---|---|---|---|---|---|---|---|---|---|
| pressure | resistance | pressure | resistance | pressure | resistance | pressure | resistance | pressure | resistance |
| 0.35 | 20 | 6.35 | 96 | 18.15 | 158 | 28.3 | 201 | 37.5 | 230 |
| 0.5 | 20 | 6.35 | 97 | 18.15 | 163 | 28.3 | 205 | 37.5 | 231 |
| 0.5 | 22 | 6.35 | 102 | 19.25 | 163 | 28.3 | 203 | 37.5 | 232 |
| 0.5 | 26 | 7.4 | 102 | 19.25 | 161 | 29.2 | 203 | 38.6 | 232 |
| 0.7 | 26 | 7.4 | 106 | 19.25 | 162 | 29.2 | 200 | 38.6 | 233 |
| 0.7 | 28 | 7.4 | 104 | 19.25 | 164 | 29.2 | 201 | 38.6 | 235 |
| 0.7 | 30 | 7.4 | 108 | 19.25 | 166 | 29.2 | 203 | 38.6 | 234 |
| 0.7 | 31 | 8.5 | 108 | 20 | 166 | 29.55 | 203 | 39.6 | 234 |
| 0.9 | 31 | 8.5 | 111 | 20 | 168 | 29.55 | 205 | 39.6 | 236 |
| 0.9 | 33 | 8.5 | 113 | 20 | 171 | 29.55 | 211 | 39.6 | 239 |
| 1.1 | 33 | 8.5 | 115 | 20.75 | 171 | 30 | 211 | 39.6 | 236 |
| 1.1 | 39 | 9.65 | 115 | 20.75 | 176 | 30 | 207 | 40.2 | 236 |
| 1.1 | 44 | 9.65 | 116 | 21.8 | 176 | 30 | 208 | 40.2 | 237 |
| 1.4 | 44 | 9.65 | 119 | 21.8 | 174 | 30 | 207 | 40.2 | 238 |
| 1.4 | 47 | 10.6 | 119 | 21.8 | 177 | 30.4 | 207 | 40.35 | 238 |
| 1.4 | 49 | 10.6 | 120 | 21.8 | 178 | 30.4 | 206 | 40.35 | 235 |
| 1.4 | 51 | 10.6 | 122 | 22.8 | 178 | 30.4 | 209 | 40.35 | 237 |
| 1.9 | 51 | 10.6 | 124 | 22.8 | 179 | 31.3 | 209 | 40.35 | 239 |
| 1.9 | 53 | 11.5 | 124 | 22.8 | 181 | 31.3 | 211 | 40.3 | 239 |
| 1.9 | 54 | 11.5 | 128 | 23.45 | 181 | 31.3 | 213 | 40.3 | 240 |
| 1.9 | 60 | 11.5 | 127 | 23.45 | 180 | 31.55 | 213 | 40.3 | 241 |
| 2.45 | 60 | 11.5 | 130 | 23.45 | 183 | 31.55 | 212 | 40.9 | 241 |
| 2.45 | 58 | 12.4 | 130 | 23.45 | 184 | 31.55 | 214 | 40.9 | 242 |
| 2.45 | 61 | 12.4 | 135 | 24.1 | 184 | 31.9 | 214 | 41.8 | 242 |
| 2.45 | 63 | 13.3 | 135 | 24.1 | 185 | 31.9 | 213 | 41.8 | 240 |
| 3 | 63 | 13.3 | 130 | 24.1 | 184 | 31.9 | 216 | 41.8 | 245 |
| 3 | 64 | 13.3 | 137 | 24.6 | 184 | 32.35 | 216 | 43.05 | 245 |
| 3 | 68 | 13.3 | 139 | 24.6 | 186 | 32.35 | 217 | 43.05 | 246 |
| 3 | 69 | 13.3 | 140 | 24.6 | 188 | 32.35 | 218 | 43.05 | 248 |
| 3.65 | 69 | 14.15 | 140 | 25.2 | 188 | 32.35 | 219 | 43.05 | 252 |
| 3.65 | 72 | 14.15 | 141 | 25.2 | 190 | 33.45 | 219 | 43.05 | 248 |
| 3.65 | 74 | 14.15 | 142 | 25.2 | 189 | 33.45 | 218 | 44.15 | 248 |
| 3.65 | 75 | 14.95 | 142 | 25.2 | 191 | 33.45 | 221 | 44.15 | 247 |
| 44.15 | 250 | 52.6 | 273 | 61.2 | 294 | 71.15 | 314 | 85.9 | 338 |
| 44.85 | 250 | 52.6 | 274 | 61.95 | 294 | 71.15 | 316 | 85.9 | 343 |
| 44.85 | 248 | 52.6 | 273 | 61.95 | 291 | 72.05 | 316 | 85.9 | 341 |
| 44.85 | 252 | 52.6 | 275 | 61.95 | 302 | 72.05 | 318 | 87.15 | 341 |
| 44.85 | 256 | 54.15 | 275 | 61.95 | 294 | 72.05 | 319 | 87.15 | 342 |
| 45.3 | 256 | 54.15 | 273 | 62.05 | 294 | 72.05 | 317 | 87.15 | 343 |
| 45.3 | 252 | 54.15 | 277 | 62.05 | 296 | 73.2 | 317 | 88.9 | 343 |
| 45.3 | 254 | 54.15 | 276 | 62.05 | 297 | 73.2 | 318 | 88.9 | 342 |
| 45.3 | 252 | 55.35 | 276 | 62.45 | 297 | 73.2 | 319 | 88.9 | 345 |
| 45.95 | 252 | 55.35 | 277 | 62.45 | 301 | 74.2 | 319 | 88.9 | 344 |
| 45.95 | 254 | 55.35 | 276 | 63.3 | 301 | 74.2 | 321 | 89.85 | 344 |
| 45.95 | 257 | 55.35 | 279 | 63.3 | 299 | 74.5 | 321 | 89.85 | 343 |
| 45.95 | 255 | 55.35 | 277 | 63.3 | 300 | 74.5 | 322 | 89.85 | 344 |
| 46.95 | 255 | 55.9 | 277 | 63.3 | 296 | 74.5 | 323 | 89.85 | 345 |
| 46.95 | 258 | 55.9 | 278 | 64 | 296 | 75.35 | 323 | 90 | 345 |
| 46.95 | 257 | 55.9 | 281 | 64 | 301 | 75.35 | 324 | 90 | 347 |
| 47.55 | 257 | 55.9 | 283 | 64 | 302 | 75.35 | 327 | 90.35 | 347 |
| 47.55 | 258 | 56.25 | 283 | 64 | 301 | 76.9 | 327 | 90.35 | 345 |
| 47.55 | 257 | 56.25 | 284 | 64.35 | 301 | 76.9 | 326 | 90.35 | 346 |
| 47.55 | 258 | 56.25 | 283 | 64.35 | 302 | 76.9 | 327 | 90.35 | 349 |
| 48.4 | 258 | 56.25 | 284 | 64.9 | 302 | 77.8 | 327 | 90.9 | 349 |
| 48.4 | 260 | 57.35 | 284 | 64.9 | 303 | 77.8 | 326 | 90.9 | 350 |
| 48.4 | 262 | 57.35 | 282 | 64.9 | 304 | 77.8 | 327 | 90.9 | 351 |
| 48.4 | 259 | 57.35 | 284 | 64.9 | 305 | 77.8 | 330 | 90.9 | 350 |
| 48.65 | 259 | 58.3 | 284 | 66 | 305 | 79.25 | 330 | 92.25 | 350 |
| 48.65 | 261 | 58.3 | 286 | 66 | 306 | 79.25 | 329 | 92.25 | 349 |
| 48.65 | 263 | 58.3 | 284 | 66 | 301 | 79.25 | 330 | 92.25 | 350 |
| 48.65 | 261 | 58.3 | 285 | 66 | 305 | 80.1 | 330 | 92.25 | 349 |
| 48.65 | 264 | 58.2 | 285 | 67.2 | 305 | 80.1 | 331 | 92.9 | 349 |
| 49.4 | 264 | 58.2 | 286 | 67.2 | 310 | 80.1 | 332 | 92.9 | 351 |
| 49.4 | 263 | 58.2 | 287 | 67.2 | 307 | 80.1 | 333 | 92.9 | 352 |
| 49.4 | 265 | 58.6 | 287 | 68.4 | 307 | 81.6 | 333 | 94.3 | 352 |
| 49.95 | 265 | 58.6 | 289 | 68.4 | 304 | 81.6 | 332 | 94.3 | 353 |
| 49.95 | 264 | 58.6 | 291 | 68.4 | 309 | 81.6 | 331 | 94.3 | 357 |
| 49.95 | 267 | 59.65 | 291 | 68.4 | 308 | 81.6 | 333 | 94.3 | 354 |
| 49.95 | 269 | 59.65 | 289 | 68.85 | 308 | 82.5 | 333 | 95.4 | 354 |
| 50.85 | 269 | 59.65 | 290 | 68.85 | 309 | 82.5 | 334 | 95.4 | 355 |
| 50.85 | 268 | 59.65 | 287 | 68.9 | 309 | 82.5 | 336 | 95.4 | 357 |
| 50.85 | 267 | 60.5 | 287 | 68.9 | 310 | 83.95 | 336 | 95.4 | 355 |
| 50.85 | 268 | 60.5 | 288 | 68.9 | 312 | 83.95 | 337 | 96.8 | 355 |
| 51.25 | 268 | 60.5 | 292 | 69.85 | 312 | 83.95 | 339 | 96.8 | 356 |
| 51.25 | 269 | 60.5 | 293 | 69.85 | 313 | 84.8 | 339 | 96.8 | 358 |

-continued

| \multicolumn{10}{c|}{Sensor 11} |
|---|---|---|---|---|---|---|---|---|---|
| pressure | resistance | pressure | resistance | pressure | resistance | pressure | resistance | pressure | resistance |
| 51.8 | 269 | 61.2 | 293 | 69.85 | 314 | 84.8 | 338 | 97.6 | 358 |
| 51.8 | 271 | 61.2 | 291 | 71.15 | 314 | 84.8 | 339 | 97.6 | 355 |
| 51.8 | 273 | 61.2 | 293 | 71.15 | 313 | 85.9 | 339 | 97.6 | 356 |
| 97.6 | 359 | 93.15 | 355 | 57.1 | 316 | 37.1 | 274 | 22.25 | 229 |
| 98 | 359 | 93.15 | 357 | 57.1 | 314 | 37.1 | 272 | 22.25 | 230 |
| 98 | 356 | 93.15 | 356 | 55.05 | 314 | 37.1 | 271 | 22.25 | 226 |
| 98 | 359 | 93.15 | 357 | 55.05 | 315 | 35.65 | 271 | 21.2 | 226 |
| 98 | 356 | 93.15 | 354 | 55.05 | 312 | 35.65 | 267 | 21.2 | 223 |
| 98.65 | 356 | 88.05 | 354 | 55.05 | 310 | 35.65 | 268 | 21.2 | 221 |
| 98.65 | 361 | 88.05 | 351 | 52.95 | 310 | 34.3 | 268 | 21.2 | 219 |
| 98.65 | 359 | 83.9 | 351 | 52.95 | 309 | 34.3 | 269 | 21.2 | 220 |
| 98.65 | 360 | 83.9 | 348 | 52.95 | 307 | 33.5 | 269 | 20.05 | 220 |
| 99.85 | 360 | 83.9 | 352 | 50.75 | 307 | 33.5 | 268 | 20.05 | 216 |
| 100.8 | 360 | 83.9 | 347 | 50.75 | 306 | 33.5 | 263 | 20.05 | 213 |
| 100.8 | 361 | 80.05 | 347 | 50.75 | 305 | 32.85 | 263 | 18.7 | 213 |
| 100.8 | 358 | 80.05 | 346 | 48.9 | 305 | 32.85 | 260 | 18.7 | 210 |
| 101.1 | 358 | 80.05 | 345 | 48.9 | 301 | 32.85 | 259 | 18.7 | 212 |
| 101.1 | 362 | 80.05 | 342 | 48.9 | 302 | 31.4 | 259 | 18.7 | 210 |
| 101.1 | 361 | 76.55 | 342 | 48.9 | 301 | 31.4 | 258 | 17.5 | 210 |
| 101.1 | 361 | 76.55 | 340 | 48.9 | 302 | 31.4 | 256 | 17.5 | 207 |
| 101.1 | 362 | 76.55 | 338 | 47.55 | 302 | 29.8 | 256 | 17.5 | 205 |
| 100.9 | 362 | 72.7 | 338 | 47.55 | 301 | 29.8 | 257 | 17.5 | 201 |
| 100.9 | 363 | 72.7 | 336 | 47.55 | 302 | 29.8 | 255 | 16.35 | 201 |
| 100.9 | 363 | 72.7 | 333 | 47.55 | 303 | 29.8 | 254 | 16.35 | 202 |
| 100.9 | 362 | 72.7 | 332 | 46.6 | 303 | 28.8 | 254 | 16.35 | 198 |
| 100.7 | 362 | 68.4 | 332 | 46.6 | 299 | 28.8 | 255 | 15.2 | 198 |
| 100.7 | 363 | 68.4 | 329 | 46.6 | 297 | 28.8 | 253 | 15.2 | 199 |
| 100.7 | 362 | 68.4 | 332 | 45.55 | 297 | 28.8 | 251 | 15.2 | 195 |
| 100.65 | 362 | 68.4 | 331 | 45.55 | 296 | 28.2 | 251 | 15.2 | 196 |
| 100.65 | 364 | 64.95 | 331 | 44.5 | 296 | 28.2 | 250 | 14.25 | 196 |
| 100.65 | 363 | 64.95 | 330 | 44.5 | 293 | 28.2 | 248 | 14.25 | 194 |
| 100.65 | 362 | 64.95 | 329 | 44.5 | 292 | 28.2 | 249 | 14.25 | 195 |
| 100.6 | 362 | 62.85 | 329 | 44.5 | 289 | 27.15 | 249 | 14.25 | 190 |
| 100.6 | 364 | 62.85 | 327 | 42.95 | 289 | 27.15 | 247 | 13.55 | 190 |
| 100.6 | 365 | 62.85 | 330 | 42.95 | 291 | 27.15 | 246 | 13.55 | 189 |
| 101.7 | 365 | 62.85 | 328 | 42.95 | 287 | 27.15 | 241 | 13.55 | 190 |
| 101.7 | 366 | 62.85 | 326 | 42.95 | 284 | 26.1 | 241 | 13.55 | 189 |
| 102.1 | 366 | 61.7 | 326 | 41.2 | 284 | 26.1 | 240 | 12.95 | 189 |
| 102.1 | 365 | 61.7 | 327 | 41.2 | 285 | 26.1 | 239 | 12.95 | 185 |
| 102.1 | 363 | 61.7 | 325 | 41.2 | 283 | 24.85 | 239 | 12.95 | 184 |
| 102.1 | 364 | 60.5 | 325 | 39.45 | 283 | 24.85 | 238 | 12.95 | 187 |
| 100.75 | 364 | 60.5 | 324 | 39.45 | 281 | 24.85 | 235 | 12.5 | 187 |
| 100.75 | 363 | 60.5 | 323 | 39.45 | 282 | 24.85 | 234 | 12.5 | 181 |
| 100.75 | 359 | 59 | 323 | 39.45 | 281 | 23.45 | 234 | 12.5 | 184 |
| 97.2 | 359 | 59 | 320 | 38.35 | 281 | 23.45 | 230 | 12.25 | 184 |
| 97.2 | 360 | 59 | 319 | 38.35 | 279 | 23.45 | 233 | 12.25 | 179 |
| 97.2 | 358 | 57.1 | 319 | 38.35 | 276 | 23.45 | 231 | 12.25 | 176 |
| 97.2 | 355 | 57.1 | 317 | 37.1 | 276 | 22.25 | 231 | 12.25 | 175 |
| 11.6 | 175 | 7.35 | 138 | 3.1 | 77 | 0.25 | 14 | 0.05 | 7 |
| 11.6 | 176 | 7.35 | 137 | 2.5 | 77 | 0.25 | 13 | 0.05 | 10 |
| 11.6 | 174 | 6.45 | 137 | 2.5 | 73 | 0.25 | 12 | 0.05 | 10 |
| 11.6 | 173 | 6.45 | 133 | 2.5 | 72 | 0.15 | 12 | 0.05 | 9 |
| 10.95 | 173 | 6.45 | 129 | 2.5 | 70 | 0.15 | 18 | 0.05 | 10 |
| 10.95 | 171 | 6.45 | 125 | 1.95 | 70 | 0.15 | 12 | 0.05 | 10 |
| 10.95 | 168 | 6.45 | 122 | 1.95 | 72 | 0.05 | 12 | 0.05 | 10 |
| 10.2 | 168 | 5.55 | 122 | 1.95 | 69 | 0.05 | 9 | 0.05 | 7 |
| 10.2 | 166 | 5.55 | 113 | 1.95 | 64 | 0.05 | 12 | 0.05 | 11 |
| 10.2 | 162 | 5.55 | 110 | 1.55 | 64 | 0.05 | 12 | 0.05 | 9 |
| 10.2 | 160 | 5.55 | 108 | 1.55 | 50 | 0.05 | 11 | 0.05 | 9 |
| 9.4 | 160 | 4.55 | 108 | 1.55 | 44 | 0.05 | 12 | 0.05 | 10 |
| 9.4 | 156 | 4.55 | 106 | 1.55 | 34 | 0.05 | 11 | 0.05 | 9 |
| 9.4 | 154 | 4.55 | 101 | 1.55 | 20 | 0.05 | 11 | 0.05 | 9 |
| 9.4 | 152 | 3.75 | 101 | 1.05 | 20 | 0.05 | 10 | 0.05 | 7 |
| 8.4 | 152 | 3.75 | 97 | 1.05 | 18 | 0.05 | 12 | 0.05 | 9 |
| 8.4 | 150 | 3.75 | 93 | 0.55 | 18 | 0.05 | 12 | 0.05 | 10 |
| 8.4 | 147 | 3.75 | 90 | 0.55 | 21 | 0.05 | 10 | 0.05 | 10 |
| 8.4 | 146 | 3.1 | 90 | 0.55 | 16 | 0.05 | 11 | 0.05 | 6 |
| 7.35 | 146 | 3.1 | 89 | 0.55 | 13 | 0.05 | 10 | 0.05 | 7 |
| 7.35 | 139 | 3.1 | 84 | 0.25 | 13 | 0.05 | 10 | 0.05 | 9 |

| Sensor 12 | | | | | | | | | |
|---|---|---|---|---|---|---|---|---|---|
| pressure | resistance | pressure | resistance | pressure | resistance | pressure | resistance | pressure | resistance |
| 0.05 | 0 | 5.15 | 98 | 20.45 | 184 | 30.8 | 225 | 40.9 | 263 |
| 0.05 | 2 | 5.15 | 103 | 20.45 | 185 | 30.8 | 226 | 40.9 | 264 |
| 0.05 | 4 | 6.45 | 103 | 20.45 | 187 | 30.8 | 227 | 40.9 | 261 |
| 0.05 | 4 | 6.45 | 108 | 21.55 | 187 | 30.8 | 225 | 40.9 | 263 |
| 0.05 | 6 | 6.45 | 114 | 21.55 | 189 | 31.6 | 225 | 41.75 | 263 |
| 0.05 | 5 | 6.45 | 115 | 21.55 | 190 | 31.6 | 228 | 41.75 | 265 |
| 0.05 | 8 | 7.95 | 115 | 21.55 | 192 | 31.6 | 229 | 42.45 | 265 |
| 0.15 | 8 | 7.95 | 113 | 22.3 | 192 | 31.6 | 231 | 42.45 | 264 |
| 0.15 | 10 | 7.95 | 114 | 22.3 | 194 | 32.2 | 231 | 42.45 | 265 |
| 0.15 | 12 | 7.95 | 122 | 22.3 | 196 | 32.2 | 233 | 42.45 | 268 |
| 0.15 | 13 | 9.4 | 122 | 22.3 | 198 | 33.3 | 233 | 42.85 | 268 |
| 0.3 | 13 | 9.4 | 126 | 23.2 | 198 | 33.3 | 235 | 42.85 | 269 |
| 0.3 | 14 | 9.4 | 127 | 23.2 | 197 | 33.3 | 237 | 42.85 | 267 |
| 0.3 | 16 | 10.55 | 127 | 23.2 | 194 | 34.4 | 237 | 42.85 | 269 |
| 0.3 | 18 | 10.55 | 129 | 23.2 | 199 | 34.4 | 239 | 43.45 | 269 |
| 0.45 | 18 | 10.55 | 131 | 24.1 | 199 | 34.4 | 241 | 43.45 | 270 |
| 0.45 | 20 | 10.55 | 132 | 24.1 | 198 | 35.1 | 241 | 43.45 | 271 |
| 0.45 | 22 | 11.5 | 132 | 24.1 | 201 | 35.1 | 243 | 43.95 | 271 |
| 0.45 | 24 | 11.5 | 135 | 24.1 | 202 | 35.1 | 244 | 43.95 | 274 |
| 0.65 | 24 | 11.5 | 138 | 24.8 | 202 | 35.1 | 245 | 43.95 | 272 |
| 0.65 | 28 | 11.5 | 141 | 24.8 | 204 | 36.25 | 245 | 44.45 | 272 |
| 0.65 | 31 | 12.65 | 141 | 24.8 | 206 | 36.25 | 246 | 44.45 | 271 |
| 0.65 | 33 | 12.65 | 143 | 25.6 | 206 | 36.25 | 247 | 44.45 | 274 |
| 0.95 | 33 | 12.65 | 145 | 25.6 | 209 | 37.5 | 247 | 44.45 | 273 |
| 0.95 | 39 | 12.65 | 147 | 26.4 | 209 | 37.5 | 248 | 44.95 | 273 |
| 0.95 | 42 | 13.7 | 147 | 26.4 | 211 | 37.5 | 249 | 44.95 | 275 |
| 0.95 | 45 | 13.7 | 150 | 26.4 | 213 | 37.5 | 251 | 44.95 | 276 |
| 1.55 | 45 | 13.7 | 153 | 26.4 | 214 | 38.5 | 251 | 44.95 | 275 |
| 1.55 | 47 | 13.7 | 156 | 27.55 | 214 | 38.5 | 252 | 44.95 | 277 |
| 1.55 | 51 | 14.95 | 156 | 27.55 | 219 | 38.5 | 253 | 45.55 | 277 |
| 1.55 | 55 | 14.95 | 160 | 27.55 | 216 | 39.2 | 253 | 45.55 | 276 |
| 2.2 | 55 | 14.95 | 161 | 27.55 | 217 | 39.2 | 254 | 45.55 | 278 |
| 2.2 | 60 | 14.95 | 162 | 28.6 | 217 | 39.55 | 254 | 46.05 | 278 |
| 2.2 | 67 | 16.2 | 162 | 28.6 | 218 | 39.55 | 257 | 46.05 | 280 |
| 2.9 | 67 | 16.2 | 164 | 28.6 | 217 | 39.55 | 256 | 46.05 | 279 |
| 2.9 | 74 | 16.2 | 167 | 29.15 | 217 | 39.8 | 256 | 46.05 | 281 |
| 2.9 | 80 | 17.45 | 167 | 29.15 | 219 | 39.8 | 257 | 46.35 | 281 |
| 2.9 | 82 | 17.45 | 170 | 29.15 | 221 | 39.8 | 258 | 46.35 | 280 |
| 3.9 | 82 | 17.45 | 177 | 29.15 | 220 | 40.3 | 258 | 46.35 | 282 |
| 3.9 | 83 | 17.45 | 174 | 29.8 | 220 | 40.3 | 261 | 46.35 | 281 |
| 3.9 | 89 | 18.85 | 174 | 29.8 | 223 | 40.3 | 259 | 47 | 281 |
| 5.15 | 89 | 18.85 | 180 | 29.8 | 224 | 40.3 | 260 | 47 | 284 |
| 5.15 | 94 | 20.45 | 180 | 29.8 | 225 | 40.3 | 263 | 47 | 283 |
| 47 | 282 | 57.3 | 313 | 69.35 | 342 | 85.2 | 372 | 99.5 | 393 |
| 47.6 | 282 | 58 | 313 | 69.35 | 341 | 85.35 | 372 | 99.7 | 393 |
| 47.6 | 284 | 58 | 314 | 69.35 | 343 | 85.35 | 375 | 99.7 | 392 |
| 47.6 | 283 | 58 | 315 | 70.6 | 343 | 85.35 | 373 | 99.7 | 396 |
| 48.25 | 283 | 58 | 316 | 70.6 | 344 | 85.35 | 374 | 99.7 | 395 |
| 48.25 | 287 | 59.35 | 316 | 70.6 | 345 | 86.35 | 374 | 100.3 | 395 |
| 48.25 | 286 | 59.35 | 315 | 71.85 | 345 | 86.35 | 375 | 100.3 | 396 |
| 48.25 | 288 | 59.35 | 318 | 71.85 | 346 | 86.35 | 376 | 100.3 | 397 |
| 49.15 | 288 | 60.75 | 318 | 71.85 | 344 | 86.35 | 377 | 101.3 | 397 |
| 49.15 | 289 | 60.75 | 319 | 71.85 | 348 | 88.05 | 377 | 101.3 | 396 |
| 49.15 | 291 | 60.75 | 318 | 72.85 | 348 | 88.05 | 376 | 101.3 | 395 |
| 49.9 | 291 | 61.8 | 318 | 72.85 | 347 | 88.05 | 378 | 101.3 | 395 |
| 49.9 | 292 | 61.8 | 320 | 72.85 | 350 | 88.05 | 377 | 101.3 | 396 |
| 49.9 | 291 | 61.8 | 319 | 73.7 | 350 | 88.95 | 377 | 101.65 | 396 |
| 50.65 | 291 | 61.8 | 321 | 73.7 | 351 | 88.95 | 379 | 101.65 | 397 |
| 50.65 | 293 | 61.9 | 321 | 74.6 | 351 | 88.95 | 380 | 101.65 | 399 |
| 50.65 | 292 | 61.9 | 322 | 74.6 | 354 | 88.95 | 379 | 101.65 | 397 |
| 50.65 | 295 | 61.9 | 323 | 75.8 | 354 | 90.5 | 379 | 101.45 | 397 |
| 51.4 | 295 | 62.4 | 323 | 75.8 | 353 | 90.5 | 380 | 101.45 | 398 |
| 51.4 | 292 | 62.4 | 324 | 75.8 | 354 | 90.5 | 382 | 101.45 | 397 |
| 51.4 | 294 | 62.4 | 325 | 75.8 | 355 | 91.25 | 382 | 101.2 | 397 |
| 51.4 | 296 | 62.4 | 326 | 76.7 | 355 | 91.25 | 381 | 101.2 | 398 |
| 52 | 296 | 63.55 | 326 | 76.7 | 354 | 91.25 | 382 | 101.2 | 399 |
| 52 | 298 | 63.55 | 325 | 76.7 | 357 | 91.25 | 381 | 102 | 399 |
| 52 | 301 | 63.55 | 326 | 78.05 | 357 | 92.5 | 381 | 102 | 401 |
| 52 | 300 | 63.55 | 328 | 78.05 | 358 | 92.5 | 384 | 102 | 397 |
| 53.3 | 300 | 64.1 | 328 | 78.05 | 359 | 92.5 | 383 | 102 | 401 |
| 53.3 | 302 | 64.1 | 329 | 78.9 | 359 | 92.5 | 384 | 103.05 | 401 |
| 53.3 | 300 | 64.1 | 330 | 78.9 | 360 | 93.3 | 384 | 103.05 | 400 |
| 53.95 | 300 | 64.1 | 329 | 78.9 | 361 | 93.3 | 386 | 102.9 | 400 |
| 53.95 | 303 | 64.85 | 329 | 80.2 | 361 | 93.3 | 385 | 102.9 | 398 |
| 53.95 | 304 | 64.85 | 331 | 80.2 | 359 | 94.55 | 385 | 102.9 | 399 |
| 53.95 | 306 | 64.85 | 330 | 80.2 | 363 | 94.55 | 386 | 99.9 | 399 |
| 55.45 | 306 | 65.45 | 330 | 80.2 | 365 | 94.55 | 388 | 99.9 | 397 |

-continued

| \multicolumn{10}{c|}{Sensor 12} |
|---|---|---|---|---|---|---|---|---|---|
| pressure | resistance | pressure | resistance | pressure | resistance | pressure | resistance | pressure | resistance |
| 55.45 | 307 | 65.45 | 333 | 81.55 | 365 | 94.55 | 387 | 99.9 | 396 |
| 56.2 | 307 | 66.7 | 333 | 82.4 | 365 | 94.55 | 389 | 99.9 | 394 |
| 56.2 | 308 | 66.7 | 334 | 82.4 | 366 | 95.8 | 389 | 95.7 | 394 |
| 56.2 | 306 | 66.7 | 335 | 82.4 | 368 | 96.8 | 389 | 95.7 | 392 |
| 56.2 | 310 | 67.15 | 335 | 83.9 | 368 | 98.05 | 389 | 95.7 | 391 |
| 57.15 | 310 | 67.15 | 337 | 83.9 | 369 | 98.05 | 391 | 90.45 | 391 |
| 57.15 | 309 | 67.15 | 338 | 84.85 | 369 | 98.05 | 392 | 90.45 | 390 |
| 57.15 | 310 | 68.4 | 338 | 84.85 | 368 | 98.9 | 392 | 90.45 | 391 |
| 57.3 | 310 | 68.4 | 339 | 85.2 | 368 | 98.9 | 393 | 86.75 | 391 |
| 57.3 | 312 | 69.35 | 339 | 85.2 | 370 | 99.5 | 393 | 86.75 | 387 |
| 57.3 | 309 | 69.35 | 343 | 85.2 | 371 | 99.5 | 392 | 86.75 | 386 |
| 86.75 | 385 | 54.05 | 343 | 36.3 | 289 | 25.5 | 258 | 13.75 | 200 |
| 83.95 | 385 | 54.05 | 342 | 34.45 | 289 | 24.95 | 258 | 13.75 | 199 |
| 83.95 | 382 | 54.05 | 341 | 34.45 | 288 | 24.95 | 259 | 12.8 | 199 |
| 83.95 | 379 | 54.05 | 338 | 34.45 | 283 | 24.95 | 256 | 12.8 | 198 |
| 83.95 | 377 | 54.05 | 339 | 34.45 | 284 | 24.95 | 255 | 12 | 198 |
| 80.05 | 377 | 52.25 | 339 | 32.85 | 284 | 24.1 | 255 | 12 | 195 |
| 80.05 | 379 | 52.25 | 335 | 32.85 | 282 | 24.1 | 254 | 12 | 193 |
| 80.05 | 376 | 52.25 | 334 | 32.85 | 280 | 24.1 | 249 | 12 | 192 |
| 80.05 | 373 | 52.25 | 333 | 31.3 | 280 | 23.3 | 249 | 11.3 | 192 |
| 75.45 | 373 | 50.55 | 333 | 31.3 | 279 | 23.3 | 250 | 11.3 | 190 |
| 75.45 | 370 | 50.55 | 332 | 31.3 | 278 | 23.3 | 249 | 11.3 | 188 |
| 75.45 | 369 | 50.55 | 330 | 31.3 | 280 | 23.3 | 248 | 11.3 | 187 |
| 71.65 | 369 | 48.8 | 330 | 30.05 | 280 | 22.3 | 248 | 10.6 | 187 |
| 71.65 | 368 | 48.8 | 329 | 30.05 | 275 | 22.3 | 246 | 10.6 | 184 |
| 71.65 | 367 | 47.6 | 329 | 30.05 | 272 | 22.3 | 244 | 10.6 | 182 |
| 68.55 | 367 | 47.6 | 327 | 30.05 | 274 | 22.3 | 243 | 10.6 | 181 |
| 68.55 | 366 | 47.6 | 324 | 30.05 | 273 | 21.15 | 243 | 9.85 | 181 |
| 68.55 | 367 | 46.35 | 324 | 29.15 | 273 | 21.15 | 241 | 9.85 | 179 |
| 68.55 | 366 | 46.35 | 320 | 29.15 | 272 | 21.15 | 239 | 9.85 | 178 |
| 66.55 | 366 | 46.35 | 318 | 29.15 | 270 | 21.15 | 237 | 9.85 | 179 |
| 66.55 | 372 | 46.35 | 319 | 28.3 | 270 | 19.8 | 237 | 9.2 | 179 |
| 66.55 | 365 | 44.5 | 319 | 28.3 | 273 | 19.8 | 236 | 9.2 | 180 |
| 66.55 | 362 | 44.5 | 317 | 28.3 | 272 | 19.8 | 233 | 9.2 | 172 |
| 65.05 | 362 | 44.5 | 316 | 28.3 | 271 | 19.8 | 230 | 9.2 | 176 |
| 65.05 | 363 | 44.5 | 317 | 27.7 | 271 | 18.45 | 230 | 8.8 | 176 |
| 65.05 | 361 | 42.85 | 317 | 27.7 | 270 | 18.45 | 231 | 8.8 | 170 |
| 63.6 | 361 | 42.85 | 316 | 27.7 | 269 | 18.45 | 226 | 8.8 | 168 |
| 63.6 | 359 | 41.95 | 316 | 27.2 | 269 | 18.45 | 223 | 8.8 | 163 |
| 63.6 | 358 | 41.95 | 315 | 27.2 | 267 | 17.1 | 223 | 8.2 | 163 |
| 61.8 | 358 | 41.95 | 314 | 27.2 | 269 | 17.1 | 218 | 8.2 | 157 |
| 61.8 | 357 | 41.95 | 312 | 26.6 | 269 | 17.1 | 221 | 8.2 | 154 |
| 61.8 | 356 | 41.25 | 312 | 26.6 | 267 | 17.1 | 219 | 8.2 | 151 |
| 61.8 | 355 | 41.25 | 310 | 26.6 | 266 | 15.95 | 219 | 7.15 | 151 |
| 60.3 | 355 | 41.25 | 307 | 26.6 | 263 | 15.95 | 217 | 7.15 | 150 |
| 60.3 | 354 | 41.25 | 308 | 26.05 | 263 | 15.95 | 215 | 7.15 | 145 |
| 60.3 | 352 | 40.35 | 308 | 26.05 | 264 | 15.05 | 215 | 7.15 | 147 |
| 60.3 | 350 | 40.35 | 305 | 26.05 | 266 | 15.05 | 211 | 6.1 | 147 |
| 58.5 | 350 | 39.35 | 305 | 26.05 | 265 | 15.05 | 213 | 6.1 | 143 |
| 58.5 | 349 | 39.35 | 300 | 25.75 | 265 | 15.05 | 212 | 6.1 | 142 |
| 58.5 | 347 | 39.35 | 301 | 25.75 | 264 | 14.4 | 212 | 6.1 | 140 |
| 58.5 | 345 | 38 | 301 | 25.75 | 263 | 14.4 | 211 | 5.45 | 140 |
| 56.4 | 345 | 38 | 297 | 25.5 | 263 | 14.4 | 210 | 5.45 | 138 |
| 56.4 | 342 | 38 | 293 | 25.5 | 262 | 14.4 | 207 | 5.45 | 135 |
| 56.4 | 341 | 36.3 | 293 | 25.5 | 261 | 13.75 | 207 | 5.45 | 133 |
| 56.4 | 343 | 36.3 | 290 | 25.5 | 262 | 13.75 | 203 | 4.9 | 133 |
| 4.9 | 130 | 3.05 | 105 | 0.85 | 25 | 0.05 | 18 | 0.05 | 15 |
| 4.9 | 127 | 3.05 | 104 | 0.85 | 20 | 0.05 | 17 | 0.05 | 15 |
| 4.9 | 122 | 3.05 | 100 | 0.4 | 20 | 0.05 | 16 | 0.05 | 14 |
| 4.3 | 122 | 3.05 | 96 | 0.4 | 22 | 0.05 | 18 | 0.05 | 12 |
| 4.3 | 123 | 2.7 | 96 | 0.4 | 21 | 0.05 | 18 | 0.05 | 15 |
| 4.3 | 122 | 2.7 | 91 | 0.4 | 20 | 0.05 | 16 | 0.05 | 15 |
| 4.3 | 123 | 2.7 | 87 | 0.2 | 20 | 0.05 | 16 | 0.05 | 14 |
| 3.9 | 123 | 2.7 | 77 | 0.2 | 19 | 0.05 | 19 | 0.05 | 15 |
| 3.9 | 122 | 2.2 | 77 | 0.2 | 18 | 0.05 | 18 | 0.05 | 15 |
| 3.9 | 120 | 2.2 | 71 | 0.2 | 16 | 0.05 | 16 | 0.05 | 12 |
| 3.9 | 114 | 2.2 | 65 | 0.05 | 16 | 0.05 | 16 | 0.05 | 14 |
| 3.65 | 114 | 2.2 | 57 | 0.05 | 18 | 0.05 | 15 | 0.05 | 14 |
| 3.65 | 110 | 2.2 | 50 | 0.05 | 19 | 0.05 | 16 | 0.05 | 15 |
| 3.65 | 111 | 1.55 | 50 | 0.05 | 19 | 0.05 | 16 | 0.05 | 13 |
| 3.65 | 110 | 1.55 | 41 | 0.05 | 17 | 0.05 | 17 | 0.05 | 15 |
| 3.35 | 110 | 1.55 | 38 | 0.05 | 20 | 0.05 | 13 | 0.05 | 12 |
| 3.35 | 108 | 1.55 | 34 | 0.05 | 17 | 0.05 | 16 | 0.05 | 12 |

Sensor 12

| pressure | resistance | pressure | resistance | pressure | resistance | pressure | resistance | pressure | resistance |
|---|---|---|---|---|---|---|---|---|---|
| 3.35 | 106 | 0.85 | 34 | 0.05 | 17 | 0.05 | 16 | 0.05 | 14 |
| 3.35 | 105 | 0.85 | 28 | 0.05 | 18 | 0.05 | 14 | | |

Sensor 13

| pressure | resistance | pressure | resistance | pressure | resistance | pressure | resistance | pressure | resistance |
|---|---|---|---|---|---|---|---|---|---|
| 0.05 | 0 | 3.6 | 113 | 13.6 | 200 | 22.4 | 254 | 32.6 | 303 |
| 0.05 | 1 | 3.6 | 117 | 13.6 | 202 | 22.4 | 257 | 33.55 | 303 |
| 0.05 | 3 | 3.6 | 122 | 13.6 | 203 | 23.6 | 257 | 33.55 | 306 |
| 0.05 | 4 | 4.7 | 122 | 14.3 | 203 | 23.6 | 260 | 33.55 | 305 |
| 0.1 | 4 | 4.7 | 126 | 14.3 | 205 | 23.6 | 263 | 33.55 | 308 |
| 0.1 | 8 | 4.7 | 131 | 14.3 | 206 | 24.55 | 263 | 34.5 | 308 |
| 0.1 | 9 | 5.75 | 131 | 14.3 | 208 | 24.55 | 264 | 34.5 | 310 |
| 0.1 | 8 | 5.75 | 132 | 15 | 208 | 24.55 | 266 | 34.5 | 301 |
| 0.2 | 8 | 5.75 | 141 | 15 | 212 | 24.55 | 267 | 34.5 | 312 |
| 0.2 | 11 | 5.75 | 143 | 15 | 213 | 25.4 | 267 | 35.75 | 312 |
| 0.2 | 12 | 6.75 | 143 | 15 | 215 | 25.4 | 270 | 35.75 | 314 |
| 0.2 | 13 | 6.75 | 150 | 15.9 | 215 | 25.4 | 272 | 35.75 | 313 |
| 0.3 | 13 | 6.75 | 148 | 15.9 | 217 | 25.4 | 274 | 37.5 | 313 |
| 0.3 | 14 | 6.75 | 149 | 15.9 | 216 | 26.35 | 274 | 37.5 | 319 |
| 0.3 | 16 | 7.7 | 149 | 15.9 | 219 | 26.35 | 275 | 37.5 | 321 |
| 0.35 | 16 | 7.7 | 152 | 16.75 | 219 | 26.35 | 277 | 37.5 | 322 |
| 0.35 | 17 | 7.7 | 154 | 16.75 | 221 | 27.35 | 277 | 38.95 | 322 |
| 0.35 | 22 | 7.7 | 155 | 16.75 | 222 | 27.35 | 279 | 38.95 | 323 |
| 0.35 | 24 | 8.6 | 155 | 17.45 | 222 | 27.35 | 282 | 38.95 | 325 |
| 0.45 | 24 | 8.6 | 159 | 17.45 | 225 | 27.35 | 281 | 39.8 | 325 |
| 0.45 | 26 | 8.6 | 160 | 17.45 | 227 | 28.5 | 281 | 39.8 | 326 |
| 0.45 | 33 | 8.6 | 164 | 17.45 | 229 | 28.5 | 284 | 40.2 | 326 |
| 0.45 | 37 | 9.2 | 164 | 18.3 | 229 | 28.5 | 285 | 40.2 | 327 |
| 0.65 | 37 | 9.2 | 167 | 18.3 | 231 | 28.5 | 286 | 40.2 | 326 |
| 0.65 | 45 | 9.2 | 170 | 18.3 | 233 | 29.35 | 286 | 40.2 | 331 |
| 0.65 | 52 | 9.2 | 173 | 18.3 | 234 | 29.35 | 285 | 40.65 | 331 |
| 1.05 | 52 | 10.15 | 173 | 19 | 234 | 29.35 | 283 | 40.65 | 332 |
| 1.05 | 58 | 10.15 | 176 | 19 | 235 | 29.35 | 292 | 40.65 | 334 |
| 1.05 | 60 | 10.15 | 178 | 19 | 238 | 30.1 | 292 | 41.65 | 334 |
| 1.05 | 63 | 10.15 | 180 | 19 | 239 | 30.1 | 291 | 41.65 | 335 |
| 1.55 | 63 | 11.1 | 180 | 19.7 | 239 | 30.1 | 292 | 41.65 | 336 |
| 1.55 | 67 | 11.1 | 182 | 19.7 | 238 | 30.1 | 293 | 41.65 | 337 |
| 1.55 | 73 | 11.1 | 185 | 19.7 | 243 | 30.95 | 293 | 42.8 | 337 |
| 2.1 | 73 | 11.95 | 185 | 20.55 | 243 | 30.95 | 294 | 42.8 | 339 |
| 2.1 | 76 | 11.95 | 187 | 20.55 | 245 | 30.95 | 292 | 42.8 | 340 |
| 2.1 | 79 | 11.95 | 188 | 20.55 | 248 | 31.8 | 292 | 43.8 | 340 |
| 2.1 | 86 | 11.95 | 191 | 20.55 | 246 | 31.8 | 296 | 43.8 | 339 |
| 2.65 | 86 | 11.95 | 193 | 21.5 | 246 | 31.8 | 298 | 43.8 | 342 |
| 2.65 | 92 | 12.65 | 193 | 21.5 | 250 | 31.8 | 300 | 44.6 | 342 |
| 2.65 | 99 | 12.65 | 195 | 21.5 | 248 | 31.8 | 301 | 44.6 | 346 |
| 2.65 | 105 | 12.65 | 197 | 21.5 | 253 | 32.6 | 301 | 44.6 | 343 |
| 2.65 | 110 | 12.65 | 199 | 22.4 | 253 | 32.6 | 303 | 44.6 | 346 |
| 3.6 | 110 | 13.6 | 199 | 22.4 | 256 | 32.6 | 302 | 45.35 | 346 |
| 45.35 | 347 | 55.35 | 380 | 68.25 | 416 | 84.7 | 446 | 101 | 470 |
| 45.35 | 349 | 55.95 | 380 | 68.25 | 412 | 85.85 | 446 | 101 | 471 |
| 46.05 | 349 | 55.95 | 382 | 68.25 | 417 | 85.85 | 448 | 101.35 | 471 |
| 46.05 | 350 | 55.95 | 383 | 68.25 | 418 | 85.85 | 449 | 101.35 | 471 |
| 46.05 | 351 | 55.95 | 382 | 68.85 | 418 | 87.1 | 449 | 101.35 | 470 |
| 46.5 | 351 | 56.1 | 382 | 68.85 | 417 | 87.1 | 451 | 101.25 | 470 |
| 46.5 | 350 | 56.1 | 385 | 68.85 | 416 | 88.4 | 451 | 101.25 | 472 |
| 46.5 | 353 | 56.1 | 386 | 68.85 | 419 | 88.4 | 450 | 101.25 | 471 |
| 46.5 | 355 | 56.9 | 386 | 70.45 | 419 | 88.4 | 455 | 100.95 | 471 |
| 47.7 | 355 | 56.9 | 387 | 70.45 | 418 | 90.2 | 455 | 100.95 | 472 |
| 47.7 | 351 | 56.9 | 389 | 70.45 | 420 | 90.2 | 453 | 100.95 | 470 |
| 47.7 | 356 | 58.35 | 389 | 70.9 | 420 | 90.2 | 454 | 100.95 | 473 |
| 47.7 | 355 | 58.35 | 390 | 70.9 | 422 | 90.2 | 455 | 101.9 | 473 |
| 48.45 | 355 | 58.35 | 391 | 70.9 | 423 | 90.2 | 456 | 101.9 | 474 |
| 48.45 | 359 | 58.35 | 390 | 70.9 | 424 | 91.2 | 456 | 101.9 | 469 |
| 48.45 | 360 | 59.65 | 390 | 71.95 | 424 | 91.2 | 457 | 102.7 | 469 |
| 48.45 | 361 | 59.65 | 393 | 71.95 | 426 | 91.2 | 456 | 102.7 | 474 |
| 49.5 | 361 | 59.65 | 394 | 71.95 | 424 | 91.2 | 455 | 102.7 | 473 |
| 49.5 | 362 | 59.65 | 396 | 71.95 | 425 | 92.9 | 455 | 102.7 | 474 |
| 49.5 | 360 | 60.9 | 396 | 72.9 | 425 | 92.9 | 458 | 102.75 | 474 |
| 49.5 | 365 | 60.9 | 395 | 72.9 | 429 | 92.9 | 462 | 102.75 | 475 |
| 50.75 | 365 | 60.9 | 398 | 72.9 | 428 | 94 | 462 | 102.75 | 474 |

-continued

| \multicolumn{10}{c}{Sensor 13} |
| pressure | resistance | pressure | resistance | pressure | resistance | pressure | resistance | pressure | resistance |
|---|---|---|---|---|---|---|---|---|---|
| 50.75 | 370 | 60.9 | 399 | 72.9 | 427 | 94 | 461 | 102.75 | 471 |
| 50.75 | 364 | 62.15 | 399 | 74.6 | 427 | 95.55 | 461 | 100.25 | 471 |
| 50.75 | 367 | 62.15 | 397 | 74.6 | 429 | 95.55 | 464 | 100.25 | 470 |
| 51.6 | 367 | 62.15 | 400 | 74.6 | 428 | 95.55 | 461 | 100.25 | 467 |
| 51.6 | 369 | 62.15 | 408 | 75.95 | 428 | 95.55 | 464 | 96.15 | 467 |
| 52.95 | 369 | 63.25 | 408 | 75.95 | 435 | 96.8 | 464 | 96.15 | 466 |
| 52.95 | 371 | 63.25 | 403 | 75.95 | 432 | 96.8 | 465 | 96.15 | 463 |
| 52.95 | 372 | 64.25 | 403 | 75.95 | 435 | 97.65 | 465 | 90.95 | 463 |
| 52.95 | 373 | 64.25 | 400 | 77.5 | 435 | 97.65 | 464 | 90.95 | 466 |
| 53.8 | 373 | 64.25 | 404 | 77.5 | 433 | 97.65 | 467 | 90.95 | 462 |
| 53.8 | 375 | 64.25 | 405 | 77.5 | 438 | 97.65 | 466 | 86.95 | 462 |
| 53.8 | 374 | 64.6 | 405 | 79 | 438 | 98.45 | 466 | 86.95 | 464 |
| 53.8 | 376 | 64.6 | 406 | 79 | 437 | 98.45 | 467 | 86.95 | 458 |
| 54.35 | 376 | 64.6 | 407 | 79 | 439 | 98.45 | 468 | 86.95 | 459 |
| 54.35 | 377 | 64.6 | 405 | 81.05 | 439 | 99.05 | 468 | 83.25 | 459 |
| 54.35 | 378 | 65.25 | 405 | 81.05 | 441 | 99.05 | 469 | 83.25 | 458 |
| 54.35 | 379 | 65.25 | 409 | 81.05 | 443 | 100.15 | 469 | 83.25 | 456 |
| 55.3 | 379 | 66.55 | 409 | 83.25 | 443 | 100.15 | 470 | 83.25 | 455 |
| 55.3 | 377 | 66.55 | 411 | 83.25 | 442 | 100.15 | 468 | 79.1 | 455 |
| 55.3 | 381 | 67.05 | 411 | 83.25 | 448 | 100.15 | 470 | 79.1 | 454 |
| 55.3 | 382 | 67.05 | 414 | 84.75 | 448 | 100.15 | 468 | 79.1 | 451 |
| 55.35 | 382 | 67.05 | 413 | 84.75 | 446 | 101 | 468 | 79.1 | 450 |
| 55.35 | 381 | 68.25 | 413 | 84.75 | 447 | 101 | 472 | 74.7 | 450 |
| 74.7 | 451 | 47.9 | 399 | 29.6 | 345 | 19.85 | 303 | 11.45 | 253 |
| 74.7 | 447 | 47.9 | 402 | 29.6 | 344 | 19.4 | 303 | 11.45 | 247 |
| 74.7 | 446 | 47.9 | 395 | 29.6 | 340 | 19.4 | 302 | 11.45 | 246 |
| 71.15 | 446 | 47.9 | 394 | 29.6 | 342 | 19.4 | 299 | 11 | 246 |
| 71.15 | 447 | 45.85 | 394 | 28.75 | 342 | 19.4 | 300 | 11 | 245 |
| 71.15 | 448 | 45.85 | 390 | 28.75 | 337 | 18.85 | 300 | 11 | 243 |
| 71.15 | 445 | 45.85 | 389 | 28.75 | 338 | 18.85 | 295 | 10.65 | 243 |
| 71.15 | 440 | 45.85 | 387 | 28.75 | 337 | 18.85 | 296 | 10.65 | 242 |
| 68.2 | 440 | 43.8 | 387 | 28.75 | 334 | 18.85 | 290 | 10.65 | 239 |
| 68.2 | 441 | 43.8 | 385 | 27.75 | 334 | 18.1 | 290 | 10.65 | 238 |
| 68.2 | 440 | 43.8 | 390 | 27.75 | 331 | 18.1 | 289 | 10.2 | 238 |
| 68.2 | 437 | 42 | 390 | 27.75 | 330 | 18.1 | 288 | 10.2 | 233 |
| 65.95 | 437 | 42 | 386 | 27.75 | 328 | 17.15 | 288 | 10.2 | 228 |
| 65.95 | 438 | 42 | 384 | 26.35 | 328 | 17.15 | 290 | 10.2 | 224 |
| 65.95 | 434 | 42 | 382 | 26.35 | 326 | 17.15 | 283 | 9.45 | 224 |
| 65.95 | 437 | 40.7 | 382 | 26.35 | 325 | 17.15 | 285 | 9.45 | 220 |
| 63.7 | 437 | 40.7 | 381 | 26.35 | 326 | 16.35 | 285 | 9.45 | 216 |
| 63.7 | 434 | 40.7 | 375 | 24.9 | 326 | 16.35 | 283 | 9.45 | 209 |
| 63.7 | 433 | 40.7 | 374 | 24.9 | 324 | 15.7 | 283 | 8.3 | 209 |
| 61.7 | 433 | 40.7 | 376 | 24.9 | 323 | 15.7 | 280 | 8.3 | 207 |
| 61.7 | 431 | 39.6 | 376 | 24.9 | 321 | 15.7 | 278 | 8.3 | 198 |
| 61.7 | 429 | 39.6 | 375 | 23.7 | 321 | 15.7 | 277 | 7.15 | 198 |
| 61.7 | 427 | 39.6 | 372 | 23.7 | 319 | 15.2 | 277 | 7.15 | 199 |
| 59.85 | 427 | 39.6 | 370 | 23.7 | 318 | 15.2 | 276 | 7.15 | 195 |
| 59.85 | 424 | 38.25 | 370 | 23 | 318 | 15.2 | 273 | 7.15 | 196 |
| 59.85 | 423 | 38.25 | 369 | 23 | 317 | 14.7 | 273 | 6.3 | 196 |
| 57.55 | 423 | 38.25 | 368 | 23 | 316 | 14.7 | 272 | 6.3 | 195 |
| 57.55 | 417 | 36.8 | 368 | 23 | 315 | 14.7 | 270 | 6.3 | 191 |
| 57.55 | 418 | 36.8 | 365 | 22.25 | 315 | 14.7 | 265 | 6.3 | 193 |
| 57.55 | 415 | 36.8 | 362 | 22.25 | 314 | 14.05 | 265 | 5.85 | 193 |
| 54.75 | 415 | 35.2 | 362 | 21.65 | 314 | 14.05 | 259 | 5.85 | 190 |
| 54.75 | 416 | 35.2 | 361 | 21.65 | 313 | 14.05 | 260 | 5.85 | 192 |
| 54.75 | 411 | 35.2 | 359 | 21.65 | 311 | 13 | 260 | 5.85 | 190 |
| 52.35 | 411 | 35.2 | 357 | 21.65 | 310 | 13 | 259 | 5.85 | 193 |
| 52.35 | 413 | 33.85 | 357 | 21.65 | 309 | 13 | 258 | 5.65 | 193 |
| 52.35 | 412 | 33.85 | 355 | 21.1 | 309 | 12.25 | 258 | 5.65 | 187 |
| 50.9 | 412 | 33.85 | 352 | 21.1 | 305 | 12.25 | 256 | 5.45 | 187 |
| 50.9 | 410 | 32.2 | 352 | 21.1 | 309 | 12.25 | 255 | 5.45 | 184 |
| 50.9 | 411 | 32.2 | 349 | 21.1 | 311 | 12.25 | 254 | 5.45 | 178 |
| 50.9 | 406 | 32.2 | 343 | 20.45 | 311 | 11.9 | 254 | 5.45 | 176 |
| 50.9 | 405 | 32.2 | 347 | 20.45 | 305 | 11.9 | 251 | 5.15 | 176 |
| 49.6 | 405 | 30.7 | 347 | 20.45 | 304 | 11.9 | 252 | 5.15 | 174 |
| 49.6 | 404 | 30.7 | 348 | 19.85 | 304 | 11.9 | 251 | 5.15 | 177 |
| 49.6 | 401 | 30.7 | 344 | 19.85 | 303 | 11.45 | 251 | 5.15 | 178 |
| 49.6 | 399 | 30.7 | 345 | 19.85 | 302 | 11.45 | 250 | 4.8 | 178 |
| 4.8 | 170 | 1.85 | 79 | 0.15 | 27 | 0.05 | 24 | 0.05 | 22 |
| 4.8 | 173 | 1.85 | 76 | 0.15 | 28 | 0.05 | 21 | 0.05 | 24 |
| 4.8 | 174 | 1.3 | 76 | 0.15 | 26 | 0.05 | 23 | 0.05 | 20 |
| 4.55 | 174 | 1.3 | 75 | 0.15 | 24 | 0.05 | 23 | 0.05 | 21 |
| 4.55 | 171 | 1.3 | 72 | 0.1 | 24 | 0.05 | 23 | 0.05 | 21 |
| 4.55 | 165 | 1.3 | 65 | 0.1 | 25 | 0.05 | 22 | 0.05 | 20 |
| 4.35 | 165 | 0.9 | 65 | 0.05 | 25 | 0.05 | 17 | 0.05 | 21 |

Sensor 13

| pressure | resistance | pressure | resistance | pressure | resistance | pressure | resistance | pressure | resistance |
|---|---|---|---|---|---|---|---|---|---|
| 4.35 | 160 | 0.9 | 54 | 0.05 | 24 | 0.05 | 23 | 0.05 | 21 |
| 4.35 | 152 | 0.9 | 52 | 0.05 | 24 | 0.05 | 23 | 0.05 | 22 |
| 4.35 | 148 | 0.9 | 51 | 0.05 | 24 | 0.05 | 24 | 0.05 | 23 |
| 3.85 | 148 | 0.55 | 51 | 0.05 | 26 | 0.05 | 22 | 0.05 | 23 |
| 3.85 | 143 | 0.55 | 49 | 0.05 | 23 | 0.05 | 21 | 0.05 | 21 |
| 3.85 | 138 | 0.55 | 51 | 0.05 | 24 | 0.05 | 21 | 0.05 | 23 |
| 3.85 | 135 | 0.55 | 47 | 0.05 | 24 | 0.05 | 19 | 0.05 | 23 |
| 3.1 | 135 | 0.45 | 47 | 0.05 | 22 | 0.05 | 20 | 0.05 | 21 |
| 3.1 | 130 | 0.45 | 43 | 0.05 | 24 | 0.05 | 23 | 0.05 | 21 |
| 3.1 | 124 | 0.45 | 39 | 0.05 | 24 | 0.05 | 23 | 0.05 | 21 |
| 3.1 | 121 | 0.45 | 35 | 0.05 | 23 | 0.05 | 22 | 0.05 | 20 |
| 2.4 | 121 | 0.3 | 35 | 0.05 | 25 | 0.05 | 23 | 0.05 | 21 |
| 2.4 | 114 | 0.3 | 33 | 0.05 | 22 | 0.05 | 22 | 0.05 | 21 |
| 2.4 | 109 | 0.3 | 32 | 0.05 | 22 | 0.05 | 22 | 0.05 | 22 |
| 2.4 | 104 | 0.3 | 31 | 0.05 | 24 | 0.05 | 21 | 0.05 | 21 |
| 2.4 | 99 | 0.2 | 31 | 0.05 | 22 | 0.05 | 22 | 0.05 | 21 |
| 1.85 | 99 | 0.2 | 29 | 0.05 | 23 | 0.05 | 21 | 0.05 | 20 |
| 1.85 | 87 | 0.2 | 27 | 0.05 | 23 | 0.05 | 21 | 0.05 | 20 |

Sensor 14

| pressure | resistance | pressure | resistance | pressure | resistance | pressure | resistance | pressure | resistance |
|---|---|---|---|---|---|---|---|---|---|
| 0.05 | 3 | 5.25 | 101 | 14.5 | 163 | 23.85 | 212 | 31.55 | 242 |
| 0.05 | 5 | 5.25 | 106 | 14.5 | 165 | 24.45 | 212 | 32.45 | 242 |
| 0.15 | 5 | 6.3 | 106 | 14.5 | 171 | 24.45 | 215 | 32.45 | 245 |
| 0.15 | 9 | 6.3 | 109 | 15.1 | 171 | 24.45 | 216 | 32.45 | 246 |
| 0.15 | 11 | 6.3 | 112 | 15.1 | 169 | 25.3 | 216 | 32.85 | 246 |
| 0.25 | 11 | 6.3 | 117 | 15.1 | 171 | 25.3 | 219 | 32.85 | 247 |
| 0.25 | 7 | 7.65 | 117 | 15.1 | 174 | 25.3 | 218 | 32.85 | 246 |
| 0.25 | 13 | 7.65 | 120 | 16 | 174 | 25.3 | 220 | 32.85 | 247 |
| 0.25 | 14 | 7.65 | 119 | 16 | 175 | 26.2 | 220 | 33.4 | 247 |
| 0.4 | 14 | 7.65 | 125 | 16 | 176 | 26.2 | 219 | 33.4 | 250 |
| 0.4 | 15 | 7.65 | 126 | 16 | 179 | 26.2 | 221 | 33.4 | 251 |
| 0.4 | 19 | 8.75 | 126 | 17.25 | 179 | 26.9 | 221 | 33.4 | 252 |
| 0.4 | 20 | 8.75 | 129 | 17.25 | 180 | 26.9 | 224 | 34.1 | 252 |
| 0.6 | 20 | 8.75 | 128 | 17.25 | 179 | 26.9 | 222 | 34.1 | 251 |
| 0.6 | 23 | 8.75 | 130 | 17.25 | 183 | 26.9 | 226 | 34.1 | 253 |
| 0.6 | 27 | 9.6 | 130 | 18.35 | 183 | 27.7 | 226 | 35.05 | 253 |
| 0.6 | 29 | 9.6 | 133 | 18.35 | 184 | 27.7 | 229 | 35.05 | 255 |
| 0.85 | 29 | 10.3 | 133 | 18.35 | 185 | 27.7 | 228 | 35.05 | 254 |
| 0.85 | 32 | 10.3 | 135 | 18.35 | 187 | 28.4 | 228 | 35.05 | 256 |
| 0.85 | 36 | 10.3 | 138 | 19.2 | 187 | 28.4 | 229 | 35.8 | 256 |
| 0.85 | 45 | 11 | 138 | 19.2 | 189 | 28.4 | 230 | 35.8 | 258 |
| 1.2 | 45 | 11 | 139 | 19.2 | 191 | 28.4 | 231 | 35.8 | 254 |
| 1.2 | 46 | 11 | 141 | 19.2 | 192 | 29 | 231 | 35.8 | 259 |
| 1.2 | 53 | 11.6 | 141 | 20.1 | 192 | 29 | 232 | 36.55 | 259 |
| 1.2 | 58 | 11.6 | 144 | 20.1 | 195 | 29 | 233 | 36.55 | 261 |
| 1.85 | 58 | 11.6 | 145 | 20.1 | 197 | 29.6 | 233 | 36.55 | 262 |
| 1.85 | 59 | 11.6 | 151 | 21.2 | 197 | 29.6 | 232 | 37.2 | 262 |
| 1.85 | 60 | 12.15 | 151 | 21.2 | 199 | 29.6 | 234 | 37.2 | 263 |
| 1.85 | 64 | 12.15 | 150 | 21.2 | 196 | 29.6 | 236 | 38.1 | 263 |
| 2.6 | 64 | 12.15 | 152 | 21.2 | 198 | 30.15 | 236 | 38.1 | 264 |
| 2.6 | 65 | 12.15 | 151 | 21.2 | 200 | 30.15 | 235 | 38.1 | 263 |
| 2.6 | 73 | 12.8 | 151 | 21.75 | 200 | 30.15 | 234 | 38.85 | 263 |
| 2.6 | 78 | 12.8 | 153 | 21.75 | 199 | 30.15 | 236 | 38.85 | 268 |
| 3.5 | 78 | 12.8 | 154 | 21.75 | 203 | 30.35 | 236 | 38.85 | 267 |
| 3.5 | 81 | 12.8 | 153 | 21.75 | 201 | 30.35 | 240 | 39.5 | 267 |
| 3.5 | 79 | 13.45 | 153 | 22.35 | 201 | 30.35 | 235 | 39.5 | 268 |
| 3.5 | 83 | 13.45 | 155 | 22.35 | 205 | 30.35 | 240 | 39.5 | 272 |
| 4.35 | 83 | 13.45 | 156 | 22.35 | 206 | 30.7 | 240 | 39.5 | 270 |
| 4.35 | 86 | 13.45 | 158 | 22.35 | 205 | 30.7 | 237 | 40.1 | 270 |
| 4.35 | 93 | 14 | 158 | 23.05 | 205 | 30.7 | 242 | 40.1 | 268 |
| 4.35 | 94 | 14 | 160 | 23.05 | 208 | 31.55 | 242 | 40.1 | 271 |
| 5.25 | 94 | 14 | 161 | 23.05 | 210 | 31.55 | 244 | 40.1 | 269 |
| 5.25 | 98 | 14.5 | 161 | 23.85 | 210 | 31.55 | 240 | 40.6 | 269 |
| 40.6 | 272 | 47.9 | 289 | 58.1 | 323 | 69.75 | 345 | 85.25 | 375 |
| 40.6 | 269 | 47.9 | 294 | 59.25 | 323 | 69.75 | 348 | 85.25 | 376 |
| 40.6 | 272 | 47.9 | 295 | 59.25 | 324 | 71.2 | 348 | 85.25 | 378 |
| 40.7 | 272 | 48.8 | 295 | 59.25 | 325 | 71.2 | 350 | 86.55 | 378 |
| 40.7 | 274 | 48.9 | 295 | 59.25 | 321 | 71.2 | 349 | 86.55 | 377 |
| 40.7 | 273 | 48.9 | 297 | 59.25 | 326 | 71.9 | 349 | 86.55 | 373 |

-continued

| \multicolumn{10}{|c|}{Sensor 14} |
| pressure | resistance | pressure | resistance | pressure | resistance | pressure | resistance | pressure | resistance |
|---|---|---|---|---|---|---|---|---|---|
| 40.95 | 273 | 48.9 | 299 | 60.45 | 326 | 71.9 | 351 | 86.55 | 379 |
| 40.95 | 274 | 48.9 | 298 | 60.45 | 325 | 71.9 | 352 | 87.7 | 379 |
| 40.95 | 277 | 49.7 | 298 | 60.45 | 327 | 71.9 | 348 | 87.7 | 378 |
| 40.95 | 276 | 49.7 | 299 | 60.45 | 332 | 72.9 | 348 | 87.7 | 380 |
| 40.95 | 277 | 49.7 | 300 | 61.3 | 332 | 72.9 | 353 | 89.15 | 380 |
| 41.65 | 277 | 49.7 | 297 | 61.3 | 327 | 73.4 | 353 | 89.15 | 382 |
| 41.65 | 275 | 50.3 | 297 | 61.3 | 328 | 73.4 | 352 | 89.15 | 381 |
| 41.65 | 274 | 50.3 | 302 | 61.8 | 328 | 73.4 | 355 | 89.15 | 382 |
| 41.65 | 279 | 50.3 | 303 | 61.8 | 329 | 74.3 | 355 | 89.95 | 382 |
| 42.3 | 279 | 51.6 | 303 | 61.8 | 332 | 74.3 | 356 | 89.95 | 383 |
| 42.3 | 278 | 51.6 | 304 | 61.8 | 331 | 74.3 | 357 | 89.95 | 384 |
| 42.3 | 280 | 51.6 | 303 | 62.85 | 331 | 75.15 | 357 | 89.95 | 383 |
| 42.3 | 282 | 51.6 | 306 | 62.85 | 328 | 75.15 | 358 | 91.35 | 383 |
| 43.25 | 282 | 51.6 | 307 | 62.85 | 331 | 75.15 | 359 | 91.35 | 384 |
| 43.25 | 281 | 52.7 | 307 | 62.85 | 332 | 75.15 | 360 | 91.35 | 386 |
| 43.25 | 283 | 52.7 | 308 | 63.4 | 332 | 76.3 | 360 | 92.3 | 386 |
| 43.8 | 283 | 52.7 | 309 | 63.4 | 334 | 76.3 | 361 | 92.3 | 388 |
| 43.8 | 282 | 53.75 | 309 | 63.4 | 333 | 77.6 | 361 | 92.3 | 385 |
| 43.8 | 284 | 53.75 | 308 | 63.4 | 335 | 77.6 | 359 | 92.3 | 384 |
| 43.8 | 283 | 53.75 | 312 | 64.95 | 335 | 77.6 | 362 | 93 | 384 |
| 44.55 | 283 | 53.75 | 315 | 64.95 | 336 | 77.6 | 363 | 93 | 389 |
| 44.55 | 285 | 55 | 315 | 65.55 | 336 | 78 | 363 | 94.3 | 389 |
| 44.55 | 284 | 55 | 313 | 65.55 | 337 | 78 | 364 | 94.3 | 387 |
| 44.55 | 285 | 55 | 312 | 65.55 | 339 | 78 | 365 | 94.3 | 391 |
| 44.95 | 285 | 55.5 | 312 | 66.5 | 339 | 79.15 | 365 | 94.3 | 390 |
| 44.95 | 284 | 55.5 | 314 | 66.5 | 341 | 79.15 | 362 | 95.05 | 390 |
| 44.95 | 286 | 55.5 | 315 | 66.5 | 339 | 79.15 | 366 | 95.05 | 391 |
| 45.6 | 286 | 56.6 | 315 | 66.5 | 338 | 80.45 | 366 | 95.05 | 392 |
| 45.6 | 290 | 56.6 | 316 | 66.5 | 346 | 80.45 | 369 | 95.05 | 393 |
| 45.6 | 289 | 56.6 | 315 | 67.05 | 346 | 82.05 | 369 | 96.5 | 393 |
| 45.6 | 288 | 56.6 | 315 | 67.05 | 340 | 82.05 | 368 | 96.5 | 395 |
| 46.25 | 288 | 56.6 | 317 | 67.05 | 339 | 82.05 | 371 | 97.5 | 395 |
| 46.25 | 289 | 56.6 | 316 | 67.05 | 341 | 82.05 | 372 | 97.5 | 396 |
| 46.25 | 288 | 56.6 | 319 | 67.75 | 341 | 83.55 | 372 | 97.5 | 395 |
| 46.25 | 291 | 57.6 | 319 | 67.75 | 342 | 83.55 | 371 | 98.55 | 395 |
| 47.3 | 291 | 57.6 | 317 | 67.75 | 343 | 83.55 | 373 | 98.55 | 393 |
| 47.3 | 292 | 57.6 | 319 | 67.75 | 344 | 83.95 | 373 | 98.55 | 399 |
| 47.3 | 291 | 58.1 | 319 | 68.8 | 344 | 83.95 | 374 | 98.55 | 397 |
| 47.3 | 289 | 58.1 | 321 | 68.8 | 345 | 83.95 | 375 | 98.55 | 394 |
| 99.65 | 394 | 96.85 | 399 | 62.2 | 370 | 44 | 327 | 26.6 | 284 |
| 99.65 | 400 | 96.85 | 397 | 62.2 | 369 | 44 | 330 | 26.6 | 281 |
| 99.65 | 397 | 96.85 | 398 | 62.2 | 368 | 44 | 328 | 26.6 | 280 |
| 99.65 | 399 | 92.05 | 398 | 61.05 | 368 | 42.6 | 328 | 25.5 | 280 |
| 100.15 | 399 | 92.05 | 397 | 61.05 | 365 | 42.6 | 327 | 25.5 | 281 |
| 100.15 | 400 | 92.05 | 395 | 61.05 | 367 | 42.6 | 326 | 25.5 | 278 |
| 100.15 | 401 | 92.05 | 393 | 59.75 | 367 | 40.9 | 326 | 25.5 | 276 |
| 101.2 | 401 | 87.35 | 393 | 59.75 | 361 | 40.9 | 327 | 24.5 | 276 |
| 101.2 | 398 | 87.35 | 396 | 59.75 | 363 | 40.9 | 325 | 24.5 | 275 |
| 101.2 | 400 | 87.35 | 397 | 59.75 | 362 | 40.9 | 322 | 24.5 | 274 |
| 101.2 | 399 | 83.85 | 397 | 58.05 | 362 | 39.4 | 322 | 24.5 | 269 |
| 101.7 | 399 | 83.85 | 391 | 58.05 | 361 | 39.4 | 321 | 23.4 | 269 |
| 101.7 | 400 | 83.85 | 389 | 58.05 | 360 | 39.4 | 320 | 23.4 | 268 |
| 101.7 | 400 | 83.85 | 387 | 58.05 | 359 | 39.4 | 319 | 23.4 | 269 |
| 101.7 | 402 | 80.5 | 387 | 56.1 | 359 | 38.1 | 319 | 23.4 | 268 |
| 101.9 | 402 | 80.5 | 388 | 56.1 | 355 | 38.1 | 317 | 22.35 | 268 |
| 101.9 | 400 | 80.5 | 385 | 56.1 | 353 | 38.1 | 318 | 22.35 | 262 |
| 101.9 | 401 | 77.8 | 385 | 54.05 | 353 | 38.1 | 313 | 22.35 | 261 |
| 101.9 | 402 | 77.8 | 386 | 54.05 | 351 | 36.85 | 313 | 22.35 | 263 |
| 101.55 | 402 | 77.8 | 383 | 54.05 | 350 | 36.85 | 316 | 21.3 | 263 |
| 101.55 | 401 | 75.35 | 383 | 52.15 | 350 | 36.85 | 318 | 21.3 | 260 |
| 101.55 | 405 | 75.35 | 384 | 52.15 | 349 | 36.85 | 313 | 21.3 | 259 |
| 101.55 | 401 | 75.35 | 382 | 50.6 | 349 | 35.65 | 313 | 20.35 | 259 |
| 101.35 | 401 | 75.35 | 378 | 50.6 | 348 | 35.65 | 312 | 20.35 | 257 |
| 101.35 | 404 | 73.3 | 378 | 49.55 | 348 | 34.65 | 312 | 20.35 | 256 |
| 101.35 | 402 | 73.3 | 379 | 49.55 | 347 | 34.65 | 311 | 19.6 | 256 |
| 101.35 | 401 | 73.3 | 380 | 49.55 | 345 | 34.65 | 310 | 19.6 | 254 |
| 101.2 | 401 | 73.3 | 379 | 49.55 | 344 | 33.8 | 310 | 19.6 | 253 |
| 101.2 | 402 | 71.45 | 379 | 48.35 | 344 | 33.8 | 307 | 19.6 | 249 |
| 101.2 | 405 | 71.45 | 380 | 48.35 | 342 | 33.8 | 306 | 19 | 249 |
| 102.1 | 405 | 69.95 | 380 | 48.35 | 343 | 33.8 | 304 | 19 | 253 |
| 102.1 | 404 | 69.95 | 384 | 48.35 | 339 | 33.8 | 302 | 19 | 251 |
| 102.1 | 405 | 69.95 | 377 | 46.9 | 339 | 32.65 | 302 | 19 | 249 |
| 102.1 | 404 | 68.8 | 377 | 46.9 | 343 | 32.65 | 301 | 18.3 | 249 |
| 102.1 | 405 | 68.8 | 376 | 46.9 | 340 | 32.65 | 300 | 18.3 | 247 |
| 103.1 | 405 | 67.35 | 376 | 46.9 | 341 | 32.65 | 296 | 18.3 | 244 |

-continued

| Sensor 14 | | | | | | | | | |
|---|---|---|---|---|---|---|---|---|---|
| pressure | resistance | pressure | resistance | pressure | resistance | pressure | resistance | pressure | resistance |
| 103.1 | 407 | 67.35 | 374 | 45.55 | 341 | 31.05 | 296 | 18.3 | 245 |
| 103.1 | 405 | 65.5 | 374 | 45.55 | 342 | 31.05 | 292 | 17.25 | 245 |
| 103.1 | 402 | 65.5 | 372 | 45.55 | 338 | 29.35 | 292 | 17.25 | 239 |
| 103.1 | 402 | 65.5 | 368 | 44.6 | 338 | 29.35 | 289 | 17.25 | 235 |
| 103.1 | 404 | 65.5 | 375 | 44.6 | 339 | 29.35 | 287 | 17.25 | 238 |
| 100.75 | 404 | 63.65 | 375 | 44.6 | 336 | 27.85 | 287 | 16.1 | 238 |
| 100.75 | 402 | 63.65 | 372 | 44.6 | 337 | 27.85 | 285 | 16.1 | 234 |
| 100.75 | 401 | 63.65 | 371 | 44 | 337 | 27.85 | 287 | 16.1 | 233 |
| 100.75 | 399 | 63.65 | 370 | 44 | 336 | 27.85 | 284 | 16.1 | 231 |
| 15.05 | 231 | 10.85 | 199 | 5.6 | 143 | 1.8 | 32 | 0.05 | 12 |
| 15.05 | 230 | 10.85 | 195 | 5.6 | 140 | 1.25 | 32 | 0.05 | 11 |
| 15.05 | 226 | 10.85 | 191 | 5.1 | 140 | 1.25 | 31 | 0.05 | 12 |
| 15.05 | 223 | 9.95 | 191 | 5.1 | 138 | 1.25 | 28 | 0.05 | 12 |
| 15.05 | 226 | 9.95 | 187 | 5.1 | 135 | 1.25 | 26 | 0.05 | 13 |
| 14.15 | 226 | 9.95 | 184 | 5.1 | 132 | 0.65 | 26 | 0.05 | 12 |
| 14.15 | 223 | 9.95 | 182 | 4.5 | 132 | 0.65 | 23 | 0.05 | 12 |
| 14.15 | 220 | 9.95 | 180 | 4.5 | 129 | 0.65 | 15 | 0.05 | 11 |
| 14.15 | 223 | 8.8 | 180 | 4.5 | 122 | 0.65 | 14 | 0.05 | 11 |
| 13.3 | 223 | 8.8 | 174 | 4.5 | 114 | 0.3 | 14 | 0.05 | 12 |
| 13.3 | 213 | 8.8 | 173 | 3.85 | 114 | 0.3 | 16 | 0.05 | 12 |
| 13.3 | 216 | 8.8 | 170 | 3.85 | 109 | 0.3 | 14 | 0.05 | 11 |
| 13.3 | 219 | 7.75 | 170 | 3.85 | 103 | 0.3 | 15 | 0.05 | 12 |
| 12.55 | 219 | 7.75 | 165 | 3.85 | 95 | 0.15 | 15 | 0.05 | 12 |
| 12.55 | 215 | 7.75 | 164 | 3.85 | 85 | 0.15 | 14 | 0.05 | 11 |
| 12.55 | 214 | 7.75 | 162 | 3.1 | 85 | 0.15 | 10 | 0.05 | 10 |
| 12.55 | 212 | 6.85 | 162 | 3.1 | 92 | 0.15 | 13 | 0.05 | 10 |
| 11.9 | 212 | 6.85 | 160 | 3.1 | 90 | 0.05 | 13 | 0.05 | 12 |
| 11.9 | 213 | 6.85 | 159 | 3.1 | 84 | 0.05 | 12 | 0.05 | 10 |
| 11.9 | 210 | 6.85 | 153 | 2.4 | 84 | 0.05 | 13 | 0.05 | 11 |
| 11.9 | 211 | 6.15 | 153 | 2.4 | 78 | 0.05 | 12 | 0.05 | 11 |
| 11.4 | 211 | 6.15 | 155 | 2.4 | 71 | 0.05 | 13 | 0.05 | 10 |
| 11.4 | 208 | 6.15 | 153 | 2.4 | 64 | 0.05 | 13 | | |
| 11.4 | 207 | 6.15 | 149 | 1.8 | 64 | 0.05 | 12 | | |
| 11.4 | 202 | 5.6 | 149 | 1.8 | 55 | 0.05 | 9 | | |
| 10.85 | 202 | 5.6 | 146 | 1.8 | 41 | 0.05 | 9 | | |

| Sensor 16 | | | | | | | | | |
|---|---|---|---|---|---|---|---|---|---|
| pressure | resistance | pressure | resistance | pressure | resistance | pressure | resistance | pressure | resistance |
| 0.15 | 18 | 4.25 | 130 | 15.65 | 235 | 26.4 | 296 | 37.6 | 336 |
| 0.15 | 19 | 4.25 | 136 | 15.65 | 238 | 27.2 | 296 | 37.6 | 334 |
| 0.15 | 21 | 4.25 | 143 | 15.65 | 240 | 27.2 | 297 | 37.6 | 336 |
| 0.15 | 24 | 5.05 | 143 | 16.6 | 240 | 27.2 | 299 | 38.45 | 336 |
| 0.3 | 24 | 5.05 | 152 | 16.6 | 242 | 28.25 | 299 | 38.45 | 337 |
| 0.3 | 27 | 5.05 | 160 | 16.6 | 245 | 28.25 | 301 | 38.45 | 338 |
| 0.3 | 28 | 5.05 | 159 | 16.6 | 247 | 28.25 | 303 | 38.95 | 338 |
| 0.3 | 30 | 6.25 | 159 | 17.85 | 247 | 29.35 | 303 | 38.95 | 340 |
| 0.4 | 30 | 6.25 | 165 | 17.85 | 248 | 29.35 | 304 | 38.95 | 338 |
| 0.4 | 33 | 6.25 | 171 | 17.85 | 253 | 29.35 | 303 | 38.95 | 339 |
| 0.4 | 36 | 6.25 | 172 | 18.95 | 253 | 29.35 | 305 | 39.15 | 339 |
| 0.4 | 39 | 7.75 | 172 | 18.95 | 257 | 30.2 | 305 | 39.15 | 338 |
| 0.4 | 44 | 7.75 | 170 | 18.95 | 258 | 30.2 | 308 | 39.15 | 340 |
| 0.55 | 44 | 7.75 | 178 | 18.95 | 263 | 30.2 | 307 | 39.15 | 342 |
| 0.55 | 49 | 9 | 178 | 20.2 | 263 | 30.2 | 308 | 39.45 | 342 |
| 0.55 | 52 | 9 | 183 | 20.2 | 262 | 30.85 | 308 | 39.45 | 341 |
| 0.55 | 53 | 9 | 186 | 20.2 | 265 | 30.85 | 309 | 39.45 | 340 |
| 0.8 | 53 | 9 | 189 | 20.2 | 267 | 30.85 | 310 | 39.45 | 341 |
| 0.8 | 55 | 9.9 | 189 | 20.2 | 268 | 31.3 | 310 | 39.8 | 341 |
| 0.8 | 58 | 9.9 | 191 | 21.55 | 268 | 31.3 | 312 | 39.8 | 340 |
| 0.8 | 59 | 9.9 | 193 | 21.55 | 272 | 31.3 | 314 | 39.8 | 341 |
| 1.05 | 59 | 9.9 | 194 | 21.55 | 275 | 31.3 | 316 | 39.75 | 341 |
| 1.05 | 62 | 10.75 | 194 | 21.55 | 276 | 32.2 | 316 | 39.75 | 343 |
| 1.05 | 68 | 10.75 | 201 | 22.9 | 276 | 32.2 | 319 | 39.75 | 347 |
| 1.05 | 78 | 10.75 | 198 | 22.9 | 277 | 33.35 | 319 | 39.75 | 346 |
| 1.4 | 78 | 10.75 | 201 | 22.9 | 276 | 33.35 | 318 | 40 | 346 |
| 1.4 | 86 | 11.65 | 201 | 22.9 | 277 | 33.35 | 319 | 40 | 345 |
| 1.4 | 91 | 11.65 | 205 | 23.95 | 277 | 33.35 | 320 | 40 | 348 |
| 1.4 | 93 | 11.65 | 211 | 23.95 | 279 | 34.3 | 320 | 40 | 347 |
| 2.05 | 93 | 11.65 | 214 | 23.95 | 280 | 34.3 | 322 | 40.85 | 347 |
| 2.05 | 98 | 12.8 | 214 | 23.95 | 281 | 34.3 | 325 | 40.85 | 350 |
| 2.05 | 102 | 12.8 | 216 | 24.7 | 281 | 34.95 | 325 | 40.85 | 348 |

-continued

| \multicolumn{10}{c|}{Sensor 16} |
| pressure | resistance | pressure | resistance | pressure | resistance | pressure | resistance | pressure | resistance |
| --- | --- | --- | --- | --- | --- | --- | --- | --- | --- |
| 2.05 | 105 | 12.8 | 220 | 24.7 | 284 | 34.95 | 324 | 40.85 | 350 |
| 2.9 | 105 | 12.8 | 223 | 24.7 | 283 | 34.95 | 327 | 42.15 | 350 |
| 2.9 | 106 | 12.8 | 221 | 25.2 | 283 | 34.95 | 326 | 42.15 | 351 |
| 2.9 | 110 | 14.1 | 221 | 25.2 | 284 | 35.65 | 326 | 42.15 | 352 |
| 2.9 | 114 | 14.1 | 223 | 25.2 | 288 | 35.65 | 328 | 43.1 | 352 |
| 3.55 | 114 | 14.1 | 224 | 25.85 | 288 | 35.65 | 330 | 43.1 | 353 |
| 3.55 | 116 | 14.1 | 227 | 25.85 | 289 | 36.6 | 330 | 43.1 | 356 |
| 3.55 | 123 | 14.95 | 227 | 25.85 | 290 | 36.6 | 331 | 43.1 | 353 |
| 3.55 | 126 | 14.95 | 228 | 25.85 | 292 | 36.6 | 332 | 44 | 353 |
| 3.55 | 128 | 14.95 | 232 | 26.4 | 292 | 36.6 | 333 | 44 | 354 |
| 4.25 | 128 | 14.95 | 235 | 26.4 | 293 | 37.6 | 333 | 44 | 358 |
| 44.8 | 358 | 53.15 | 383 | 61.05 | 400 | 69.75 | 419 | 81.25 | 439 |
| 44.8 | 357 | 54.1 | 383 | 61.05 | 402 | 71 | 419 | 81.25 | 438 |
| 44.8 | 356 | 54.1 | 384 | 61.4 | 402 | 71 | 420 | 82.4 | 438 |
| 44.8 | 357 | 54.45 | 384 | 61.4 | 401 | 71 | 421 | 82.4 | 439 |
| 45.2 | 357 | 54.45 | 388 | 61.4 | 404 | 71 | 419 | 82.4 | 443 |
| 45.2 | 359 | 54.45 | 381 | 62.35 | 404 | 71.6 | 419 | 82.4 | 440 |
| 45.2 | 360 | 54.9 | 381 | 62.35 | 402 | 71.6 | 420 | 83.15 | 440 |
| 45.2 | 361 | 54.9 | 386 | 62.35 | 404 | 71.6 | 421 | 83.15 | 439 |
| 45.7 | 361 | 54.9 | 385 | 62.35 | 401 | 71.6 | 422 | 83.15 | 441 |
| 45.7 | 360 | 55.15 | 385 | 63.15 | 401 | 72.1 | 422 | 83.15 | 440 |
| 45.7 | 363 | 55.15 | 384 | 63.15 | 403 | 72.1 | 421 | 83.6 | 440 |
| 46 | 363 | 55.15 | 386 | 63.15 | 404 | 72.1 | 422 | 83.9 | 440 |
| 46 | 364 | 55.15 | 385 | 63.15 | 403 | 72.1 | 424 | 83.9 | 442 |
| 46 | 362 | 54.55 | 385 | 63.35 | 403 | 72.7 | 424 | 83.9 | 443 |
| 46 | 365 | 54.55 | 386 | 63.35 | 404 | 72.7 | 425 | 84.4 | 443 |
| 46.95 | 365 | 54.55 | 387 | 63.35 | 403 | 73.7 | 425 | 84.4 | 444 |
| 46.95 | 363 | 54.3 | 387 | 63.35 | 405 | 73.7 | 424 | 84.4 | 446 |
| 46.95 | 364 | 54.3 | 388 | 63.75 | 405 | 73.7 | 426 | 85.4 | 446 |
| 47.75 | 364 | 54.3 | 387 | 63.75 | 406 | 74.55 | 426 | 85.4 | 445 |
| 47.75 | 368 | 55 | 387 | 63.75 | 408 | 74.55 | 423 | 86.8 | 445 |
| 48.5 | 368 | 55 | 388 | 64.2 | 408 | 74.55 | 428 | 86.8 | 447 |
| 48.5 | 366 | 55 | 389 | 64.2 | 407 | 74.55 | 430 | 86.8 | 448 |
| 48.5 | 370 | 56 | 389 | 64.2 | 406 | 75.35 | 430 | 87.9 | 448 |
| 48.5 | 368 | 56 | 390 | 64.2 | 407 | 75.35 | 428 | 87.9 | 449 |
| 49 | 368 | 56 | 388 | 64.2 | 410 | 75.35 | 427 | 87.9 | 450 |
| 49 | 370 | 56.5 | 388 | 65.25 | 410 | 75.35 | 431 | 89 | 450 |
| 49 | 371 | 56.5 | 391 | 65.25 | 409 | 76.15 | 431 | 89 | 449 |
| 49.6 | 371 | 56.5 | 392 | 65.25 | 408 | 76.15 | 430 | 89 | 450 |
| 49.6 | 374 | 56.5 | 393 | 65.6 | 408 | 76.15 | 431 | 89.6 | 450 |
| 49.6 | 372 | 57.6 | 393 | 65.6 | 410 | 77.2 | 431 | 89.6 | 452 |
| 50.2 | 372 | 57.6 | 395 | 65.6 | 411 | 77.2 | 429 | 91 | 452 |
| 50.2 | 373 | 58.35 | 395 | 66.65 | 411 | 77.2 | 428 | 92 | 452 |
| 50.2 | 375 | 58.35 | 394 | 66.65 | 412 | 78 | 428 | 92 | 455 |
| 51.25 | 375 | 58.35 | 397 | 66.65 | 410 | 78 | 431 | 92 | 452 |
| 51.25 | 374 | 58.35 | 396 | 66.65 | 413 | 78 | 434 | 92 | 453 |
| 51.25 | 377 | 59.35 | 396 | 67.35 | 413 | 78.95 | 434 | 92 | 454 |
| 51.25 | 373 | 59.35 | 398 | 67.35 | 414 | 78.95 | 433 | 93.45 | 454 |
| 51.95 | 373 | 59.35 | 397 | 67.35 | 415 | 78.95 | 434 | 93.45 | 455 |
| 51.95 | 376 | 59.35 | 399 | 68.85 | 415 | 79.6 | 434 | 93.45 | 456 |
| 51.95 | 378 | 60.1 | 399 | 68.85 | 417 | 79.6 | 435 | 93.45 | 459 |
| 52.75 | 378 | 60.1 | 398 | 68.85 | 416 | 79.6 | 436 | 94.5 | 459 |
| 52.75 | 379 | 60.1 | 399 | 68.85 | 417 | 80.6 | 436 | 94.5 | 457 |
| 52.75 | 382 | 60.1 | 401 | 69.75 | 417 | 80.6 | 439 | 95.45 | 457 |
| 53.15 | 382 | 61.05 | 401 | 69.75 | 416 | 80.6 | 436 | 95.45 | 458 |
| 53.15 | 381 | 61.05 | 399 | 69.75 | 417 | 81.25 | 436 | 95.45 | 459 |
| 96.4 | 459 | 100.45 | 468 | 72.8 | 448 | 53.8 | 426 | 42.3 | 402 |
| 96.4 | 461 | 100.45 | 467 | 72.8 | 447 | 52.85 | 426 | 42.3 | 401 |
| 96.4 | 459 | 100.35 | 467 | 72.8 | 446 | 52.85 | 424 | 41.4 | 401 |
| 97.25 | 459 | 100.35 | 469 | 72.8 | 445 | 52.85 | 423 | 41.4 | 402 |
| 97.25 | 460 | 100.35 | 470 | 70.05 | 445 | 52.85 | 420 | 41.4 | 400 |
| 97.95 | 460 | 101.7 | 470 | 70.05 | 444 | 51.8 | 420 | 40.8 | 400 |
| 97.95 | 461 | 101.7 | 467 | 70.05 | 442 | 51.8 | 421 | 40.8 | 401 |
| 97.95 | 460 | 101.7 | 470 | 70.05 | 439 | 51.8 | 422 | 40.8 | 398 |
| 98 | 460 | 103.05 | 470 | 66.8 | 439 | 51.8 | 421 | 40.15 | 398 |
| 98 | 462 | 103.05 | 469 | 66.8 | 440 | 50.8 | 421 | 40.15 | 396 |
| 98 | 461 | 103.05 | 469 | 66.8 | 439 | 50.8 | 420 | 40.15 | 397 |
| 98 | 462 | 103.05 | 470 | 66.8 | 438 | 49.95 | 420 | 39.4 | 397 |
| 98.55 | 462 | 103.05 | 469 | 64.15 | 438 | 49.95 | 418 | 39.4 | 396 |
| 98.55 | 461 | 103.05 | 468 | 64.15 | 437 | 49.95 | 419 | 38.8 | 396 |
| 98.55 | 462 | 101.45 | 468 | 62.25 | 437 | 49.2 | 419 | 38.8 | 398 |
| 98.55 | 463 | 101.45 | 467 | 62.25 | 438 | 49.2 | 418 | 38.8 | 396 |
| 99.1 | 463 | 101.45 | 466 | 62.25 | 436 | 49.2 | 417 | 38.8 | 395 |
| 99.1 | 462 | 98.15 | 466 | 61.15 | 436 | 48.6 | 417 | 38.3 | 395 |
| 99.1 | 463 | 98.15 | 464 | 61.15 | 435 | 48.6 | 416 | 38.3 | 394 |

-continued

| Sensor 16 | | | | | | | | | |
|---|---|---|---|---|---|---|---|---|---|
| pressure | resistance | pressure | resistance | pressure | resistance | pressure | resistance | pressure | resistance |
| 99.4 | 463 | 93.6 | 464 | 61.15 | 434 | 48.6 | 415 | 38.3 | 395 |
| 99.4 | 464 | 93.6 | 462 | 61.15 | 435 | 48.1 | 415 | 37.75 | 395 |
| 99.4 | 465 | 93.6 | 463 | 60.15 | 435 | 48.1 | 416 | 37.75 | 393 |
| 99.85 | 465 | 93.6 | 461 | 60.15 | 434 | 47.55 | 416 | 37.75 | 392 |
| 99.85 | 463 | 93.6 | 460 | 60.15 | 435 | 47.55 | 415 | 37.75 | 390 |
| 99.85 | 465 | 88.75 | 460 | 60.15 | 434 | 47.55 | 413 | 36.95 | 390 |
| 99.85 | 462 | 88.75 | 459 | 59.25 | 434 | 47.55 | 409 | 36.95 | 389 |
| 100.6 | 462 | 88.75 | 462 | 59.25 | 431 | 46.9 | 409 | 36.95 | 390 |
| 100.6 | 466 | 88.75 | 459 | 58.35 | 431 | 46.9 | 413 | 36.1 | 390 |
| 100.95 | 466 | 85.3 | 459 | 58.35 | 432 | 46.9 | 412 | 36.1 | 388 |
| 100.95 | 465 | 85.3 | 458 | 58.35 | 433 | 46.25 | 412 | 36.1 | 384 |
| 100.95 | 468 | 85.3 | 459 | 58.35 | 432 | 46.25 | 411 | 36.1 | 387 |
| 100.95 | 468 | 85.3 | 458 | 58.35 | 430 | 45.45 | 411 | 35.2 | 387 |
| 100.95 | 467 | 83.3 | 458 | 57.5 | 430 | 45.45 | 409 | 35.2 | 384 |
| 100.95 | 462 | 83.3 | 457 | 57.5 | 428 | 45.45 | 406 | 35.2 | 382 |
| 100.95 | 466 | 81.25 | 457 | 57.5 | 429 | 44.55 | 406 | 34.2 | 382 |
| 100.95 | 466 | 81.25 | 455 | 56.25 | 429 | 44.55 | 407 | 34.2 | 381 |
| 100.85 | 466 | 81.25 | 456 | 56.25 | 428 | 44.55 | 404 | 33.1 | 381 |
| 100.85 | 467 | 81.25 | 454 | 56.25 | 427 | 44.55 | 405 | 33.1 | 378 |
| 100.85 | 465 | 78.85 | 454 | 56.25 | 426 | 44.55 | 403 | 33.1 | 376 |
| 100.85 | 466 | 78.85 | 453 | 54.95 | 426 | 43.4 | 403 | 31.95 | 376 |
| 100.65 | 466 | 78.85 | 452 | 54.95 | 427 | 43.4 | 400 | 31.95 | 369 |
| 100.65 | 467 | 75.7 | 452 | 54.95 | 424 | 43.4 | 404 | 31.95 | 372 |
| 100.65 | 466 | 75.7 | 451 | 53.8 | 424 | 43.4 | 403 | 31.95 | 369 |
| 100.65 | 467 | 75.7 | 449 | 53.8 | 425 | 42.3 | 403 | 30.7 | 369 |
| 100.45 | 467 | 75.7 | 448 | 53.8 | 423 | 42.3 | 401 | 30.7 | 370 |
| 30.7 | 368 | 19.15 | 331 | 11.15 | 277 | 5 | 193 | 0.05 | 33 |
| 29.4 | 368 | 19.15 | 330 | 11.15 | 276 | 5 | 186 | 0.05 | 32 |
| 29.4 | 367 | 18.9 | 330 | 11.15 | 273 | 4.35 | 186 | 0.05 | 32 |
| 29.4 | 366 | 18.9 | 328 | 11.15 | 274 | 4.35 | 177 | 0.05 | 31 |
| 28.5 | 366 | 18.9 | 330 | 10.45 | 274 | 4.35 | 171 | 0.05 | 33 |
| 28.5 | 367 | 18.9 | 325 | 10.45 | 270 | 4.35 | 164 | 0.05 | 33 |
| 28.5 | 362 | 18.4 | 325 | 10.45 | 269 | 3.45 | 164 | 0.05 | 31 |
| 28.5 | 364 | 18.4 | 323 | 10.45 | 267 | 3.45 | 163 | 0.05 | 30 |
| 27.9 | 364 | 18.4 | 322 | 9.85 | 267 | 3.45 | 158 | 0.05 | 31 |
| 27.9 | 362 | 18.4 | 320 | 9.85 | 266 | 3.45 | 154 | 0.05 | 31 |
| 27.9 | 359 | 18.4 | 321 | 9.85 | 264 | 2.85 | 154 | 0.05 | 32 |
| 27.1 | 359 | 17.5 | 321 | 9.3 | 264 | 2.85 | 146 | 0.05 | 31 |
| 27.1 | 356 | 17.5 | 315 | 9.3 | 263 | 2.85 | 139 | 0.05 | 30 |
| 27.1 | 353 | 17.5 | 317 | 9.3 | 260 | 2.85 | 125 | 0.05 | 30 |
| 27.1 | 352 | 17.5 | 315 | 9.3 | 259 | 2.3 | 125 | 0.05 | 31 |
| 25.6 | 352 | 16.6 | 315 | 8.8 | 259 | 2.3 | 114 | 0.05 | 30 |
| 25.6 | 353 | 16.6 | 313 | 8.8 | 256 | 2.3 | 106 | 0.05 | 30 |
| 24.45 | 353 | 15.9 | 313 | 8.45 | 256 | 2.3 | 94 | 0.05 | 30 |
| 24.45 | 352 | 15.9 | 311 | 8.45 | 254 | 1.65 | 94 | 0.05 | 30 |
| 24.45 | 351 | 15.9 | 310 | 8.45 | 251 | 1.65 | 91 | 0.05 | 29 |
| 24.45 | 349 | 15.25 | 310 | 8 | 251 | 1.65 | 85 | 0.05 | 28 |
| 23.9 | 349 | 15.25 | 307 | 8 | 248 | 1.65 | 82 | 0.05 | 28 |
| 23.9 | 348 | 15.25 | 305 | 8 | 244 | 1.05 | 82 | 0.05 | 30 |
| 23.9 | 347 | 15.25 | 304 | 8 | 242 | 1.05 | 83 | 0.05 | 29 |
| 23.4 | 347 | 14.6 | 304 | 7.5 | 242 | 1.05 | 80 | 0.05 | 29 |
| 23.4 | 344 | 14.6 | 302 | 7.5 | 238 | 0.7 | 80 | 0.05 | 28 |
| 23.4 | 343 | 14.6 | 301 | 7.5 | 236 | 0.7 | 76 | 0.05 | 29 |
| 22.4 | 343 | 13.85 | 301 | 7.5 | 234 | 0.7 | 70 | 0.05 | 30 |
| 22.4 | 341 | 13.85 | 290 | 7.5 | 232 | 0.7 | 65 | 0.05 | 30 |
| 22.4 | 340 | 13.85 | 296 | 6.85 | 232 | 0.55 | 65 | 0.05 | 29 |
| 21.5 | 340 | 13.85 | 292 | 6.85 | 227 | 0.55 | 57 | 0.05 | 28 |
| 21.5 | 338 | 13.1 | 292 | 6.85 | 226 | 0.55 | 45 | 0.05 | 28 |
| 21.5 | 337 | 13.1 | 291 | 6.85 | 223 | 0.55 | 38 | 0.05 | 26 |
| 20.75 | 337 | 13.1 | 286 | 6.2 | 223 | 0.4 | 38 | 0.05 | 28 |
| 20.75 | 336 | 13.1 | 287 | 6.2 | 219 | 0.4 | 36 | 0.05 | 28 |
| 20.75 | 335 | 12.4 | 287 | 6.2 | 218 | 0.4 | 35 | 0.05 | 29 |
| 20.2 | 335 | 12.4 | 288 | 6.2 | 214 | 0.4 | 34 | 0.05 | 33 |
| 20.2 | 333 | 12.4 | 286 | 5.6 | 214 | 0.2 | 34 | 0.05 | 30 |
| 20.2 | 334 | 12.4 | 281 | 5.6 | 215 | 0.2 | 33 | 0.05 | 30 |
| 20.2 | 331 | 11.8 | 281 | 5.6 | 207 | 0.2 | 30 | 0.05 | 29 |
| 19.65 | 331 | 11.8 | 283 | 5.6 | 205 | 0.05 | 30 | 0.05 | 28 |
| 19.65 | 332 | 11.8 | 279 | 5 | 205 | 0.05 | 32 | 0.05 | 28 |
| 19.65 | 331 | 11.8 | 277 | 5 | 200 | 0.05 | 33 | 0.05 | 30 |

| Sensor 17 ||||||||||
|---|---|---|---|---|---|---|---|---|---|
| pressure | resistance | pressure | resistance | pressure | resistance | pressure | resistance | pressure | resistance |
| 0.05 | 10 | 3.95 | 107 | 15.6 | 189 | 25.9 | 236 | 33.8 | 262 |
| 0.05 | 12 | 4.6 | 107 | 15.6 | 188 | 25.9 | 235 | 33.8 | 263 |
| 0.05 | 15 | 4.6 | 109 | 15.6 | 189 | 26.55 | 235 | 34.65 | 263 |
| 0.05 | 14 | 4.6 | 112 | 15.6 | 191 | 26.55 | 236 | 34.65 | 265 |
| 0.2 | 14 | 5.3 | 112 | 16.35 | 191 | 26.55 | 239 | 34.65 | 266 |
| 0.2 | 17 | 5.3 | 118 | 16.35 | 192 | 26.55 | 238 | 34.65 | 267 |
| 0.2 | 19 | 5.3 | 121 | 16.35 | 194 | 27.5 | 238 | 35.45 | 267 |
| 0.3 | 19 | 5.3 | 126 | 16.35 | 195 | 27.5 | 240 | 35.45 | 268 |
| 0.3 | 20 | 6.25 | 126 | 17.15 | 195 | 27.5 | 241 | 35.45 | 269 |
| 0.3 | 22 | 6.25 | 130 | 17.15 | 197 | 28.1 | 241 | 35.45 | 271 |
| 0.3 | 24 | 6.25 | 135 | 17.15 | 200 | 28.1 | 240 | 36.55 | 271 |
| 0.4 | 24 | 6.25 | 140 | 18.25 | 200 | 28.1 | 241 | 36.55 | 272 |
| 0.4 | 28 | 6.25 | 143 | 18.25 | 203 | 28.1 | 243 | 36.55 | 271 |
| 0.4 | 33 | 7.6 | 143 | 18.25 | 206 | 28.65 | 243 | 36.55 | 274 |
| 0.5 | 33 | 7.6 | 148 | 18.25 | 201 | 28.65 | 244 | 37.8 | 274 |
| 0.5 | 31 | 7.6 | 150 | 19.1 | 201 | 28.65 | 243 | 37.8 | 273 |
| 0.5 | 34 | 9.1 | 150 | 19.1 | 204 | 28.65 | 246 | 37.8 | 275 |
| 0.5 | 36 | 9.1 | 154 | 19.1 | 206 | 28.65 | 245 | 37.8 | 277 |
| 0.6 | 36 | 9.1 | 155 | 19.1 | 207 | 29.45 | 245 | 38.8 | 277 |
| 0.6 | 39 | 9.1 | 157 | 19.75 | 207 | 29.45 | 248 | 38.8 | 278 |
| 0.6 | 46 | 10.4 | 157 | 19.75 | 209 | 30.15 | 248 | 39.6 | 278 |
| 0.85 | 46 | 10.4 | 160 | 19.75 | 212 | 30.15 | 250 | 39.6 | 279 |
| 0.85 | 51 | 10.4 | 159 | 19.75 | 215 | 30.15 | 249 | 39.6 | 281 |
| 0.85 | 54 | 10.4 | 163 | 20.9 | 215 | 30.15 | 246 | 40.1 | 281 |
| 1.15 | 54 | 11.4 | 163 | 20.9 | 216 | 30.55 | 246 | 40.1 | 280 |
| 1.15 | 57 | 11.4 | 164 | 20.9 | 217 | 30.55 | 252 | 40.1 | 281 |
| 1.15 | 64 | 11.4 | 167 | 20.9 | 218 | 30.55 | 251 | 40.1 | 282 |
| 1.15 | 69 | 11.4 | 163 | 22.25 | 218 | 30.55 | 256 | 40.7 | 282 |
| 1.15 | 74 | 12.15 | 163 | 22.25 | 220 | 31.15 | 256 | 40.7 | 285 |
| 1.65 | 74 | 12.15 | 168 | 22.25 | 221 | 31.15 | 253 | 40.7 | 283 |
| 1.65 | 79 | 12.15 | 167 | 23.4 | 221 | 31.15 | 252 | 40.7 | 285 |
| 1.65 | 83 | 12.15 | 169 | 23.4 | 223 | 31.15 | 254 | 41.65 | 285 |
| 1.65 | 85 | 12.75 | 169 | 23.4 | 225 | 31.8 | 254 | 41.65 | 286 |
| 2.45 | 85 | 12.75 | 170 | 23.4 | 226 | 31.8 | 256 | 41.65 | 284 |
| 2.45 | 89 | 12.75 | 174 | 23.4 | 228 | 32.25 | 256 | 41.65 | 286 |
| 2.45 | 91 | 12.75 | 176 | 24.35 | 228 | 32.25 | 257 | 42.5 | 286 |
| 3.3 | 91 | 13.55 | 176 | 24.35 | 230 | 32.25 | 258 | 42.5 | 287 |
| 3.3 | 93 | 13.55 | 177 | 24.35 | 228 | 32.85 | 258 | 42.5 | 288 |
| 3.3 | 101 | 13.55 | 180 | 25.25 | 228 | 32.85 | 260 | 42.5 | 286 |
| 3.3 | 100 | 13.55 | 183 | 25.25 | 230 | 32.85 | 262 | 42.95 | 286 |
| 3.95 | 100 | 14.55 | 183 | 25.25 | 231 | 33.8 | 262 | 42.95 | 290 |
| 3.95 | 102 | 14.55 | 185 | 25.9 | 231 | 33.8 | 261 | 42.95 | 291 |
| 3.95 | 104 | 14.55 | 189 | 25.9 | 233 | 33.8 | 263 | 42.95 | 293 |
| 43.85 | 293 | 51.95 | 316 | 62.05 | 340 | 73.65 | 360 | 85.1 | 381 |
| 43.85 | 289 | 51.95 | 318 | 62.05 | 339 | 74.5 | 360 | 85.1 | 379 |
| 43.85 | 294 | 52.65 | 318 | 62.05 | 340 | 74.5 | 361 | 85.1 | 382 |
| 45.2 | 294 | 52.65 | 317 | 62.65 | 340 | 74.5 | 364 | 85.9 | 382 |
| 45.2 | 292 | 52.65 | 319 | 62.65 | 341 | 75.1 | 364 | 85.9 | 383 |
| 45.2 | 296 | 53.65 | 319 | 62.65 | 342 | 75.1 | 365 | 85.9 | 384 |
| 45.2 | 295 | 53.65 | 320 | 62.65 | 347 | 74.65 | 365 | 87.4 | 384 |
| 46 | 295 | 53.65 | 322 | 63.75 | 347 | 74.65 | 362 | 87.4 | 382 |
| 46 | 297 | 53.65 | 319 | 63.75 | 343 | 74.65 | 365 | 87.4 | 383 |
| 46 | 297 | 54.7 | 319 | 63.75 | 344 | 74.65 | 366 | 87.4 | 385 |
| 46 | 295 | 54.7 | 321 | 64.6 | 344 | 74.35 | 366 | 88.05 | 385 |
| 46 | 301 | 54.7 | 324 | 64.6 | 345 | 74.35 | 367 | 88.05 | 383 |
| 46.35 | 301 | 55.45 | 324 | 65 | 345 | 74.35 | 366 | 88.05 | 385 |
| 46.35 | 300 | 55.45 | 325 | 65 | 346 | 75.45 | 366 | 88.05 | 386 |
| 46.35 | 301 | 56.8 | 325 | 65 | 345 | 75.45 | 367 | 88.05 | 387 |
| 46.35 | 303 | 56.8 | 327 | 65.9 | 345 | 75.45 | 370 | 89.55 | 387 |
| 46.95 | 303 | 56.8 | 326 | 65.9 | 347 | 77.05 | 370 | 89.55 | 386 |
| 46.95 | 302 | 57.3 | 326 | 65.9 | 353 | 77.05 | 369 | 89.55 | 387 |
| 46.95 | 301 | 57.3 | 329 | 66.2 | 353 | 77.05 | 371 | 90.55 | 387 |
| 46.95 | 303 | 57.3 | 328 | 66.2 | 349 | 78.1 | 371 | 90.55 | 388 |
| 47.8 | 303 | 58.1 | 328 | 66.2 | 348 | 78.1 | 373 | 90.55 | 387 |
| 47.8 | 304 | 58.1 | 329 | 66.85 | 348 | 78.1 | 371 | 90.55 | 389 |
| 47.8 | 305 | 58.1 | 328 | 66.85 | 349 | 78.1 | 370 | 91.25 | 389 |
| 48.75 | 305 | 58.1 | 330 | 66.85 | 348 | 79.65 | 370 | 91.25 | 387 |
| 48.75 | 306 | 58.4 | 330 | 66.85 | 346 | 79.65 | 371 | 91.25 | 388 |
| 48.75 | 303 | 58.4 | 331 | 66.85 | 351 | 79.65 | 372 | 91.25 | 390 |
| 48.75 | 307 | 58.8 | 331 | 67.35 | 351 | 79.65 | 373 | 92.4 | 390 |
| 49.15 | 307 | 58.8 | 332 | 67.35 | 353 | 80.55 | 373 | 93.25 | 390 |
| 49.15 | 309 | 58.8 | 333 | 67.35 | 351 | 80.55 | 374 | 93.25 | 391 |
| 49.15 | 308 | 59.1 | 333 | 68.95 | 351 | 80.55 | 373 | 93.25 | 392 |
| 50.05 | 308 | 59.1 | 331 | 68.95 | 353 | 81.8 | 373 | 93.25 | 391 |
| 50.05 | 309 | 59.1 | 332 | 68.95 | 355 | 81.8 | 375 | 94.75 | 391 |
| 50.05 | 310 | 59.1 | 335 | 70.05 | 355 | 81.8 | 374 | 94.75 | 392 |
| 50.45 | 310 | 59.6 | 335 | 70.05 | 356 | 81.8 | 376 | 94.75 | 394 |

-continued

| \multicolumn{10}{c|}{Sensor 17} |
| pressure | resistance | pressure | resistance | pressure | resistance | pressure | resistance | pressure | resistance |
| --- | --- | --- | --- | --- | --- | --- | --- | --- | --- |
| 50.45 | 309 | 59.6 | 336 | 71.15 | 356 | 82.3 | 376 | 95.45 | 394 |
| 50.45 | 311 | 59.6 | 334 | 71.15 | 357 | 82.3 | 378 | 95.45 | 392 |
| 50.65 | 311 | 59.6 | 335 | 71.15 | 358 | 82.3 | 376 | 96.8 | 392 |
| 50.65 | 312 | 60.7 | 335 | 72.05 | 358 | 82.75 | 376 | 96.8 | 396 |
| 50.65 | 310 | 60.7 | 336 | 72.05 | 359 | 82.75 | 377 | 96.8 | 395 |
| 50.65 | 313 | 61 | 336 | 72.05 | 360 | 82.75 | 376 | 96.8 | 393 |
| 50.85 | 313 | 61 | 337 | 72.6 | 360 | 82.75 | 379 | 96.8 | 395 |
| 50.85 | 312 | 61 | 339 | 72.6 | 359 | 83.6 | 379 | 97.6 | 395 |
| 51.3 | 312 | 61 | 338 | 72.6 | 362 | 83.6 | 378 | 97.6 | 397 |
| 51.3 | 317 | 62.05 | 338 | 73.65 | 362 | 83.6 | 379 | 98.15 | 397 |
| 51.3 | 316 | 62.05 | 335 | 73.65 | 361 | 83.6 | 381 | 98.15 | 398 |
| 98.7 | 398 | 89.65 | 397 | 56.1 | 361 | 36.95 | 317 | 25.1 | 286 |
| 98.7 | 399 | 89.65 | 396 | 56.1 | 359 | 35.85 | 317 | 25.1 | 287 |
| 98.7 | 397 | 89.65 | 394 | 56.1 | 356 | 35.85 | 313 | 25.1 | 285 |
| 99.5 | 397 | 85.45 | 394 | 54.35 | 356 | 35.85 | 315 | 24.05 | 285 |
| 99.5 | 399 | 85.45 | 392 | 54.35 | 358 | 35.85 | 312 | 24.05 | 283 |
| 99.5 | 404 | 85.45 | 390 | 52.4 | 358 | 34.3 | 312 | 22.95 | 283 |
| 99.5 | 398 | 81.6 | 390 | 52.4 | 354 | 34.3 | 315 | 22.95 | 281 |
| 100.25 | 398 | 81.6 | 389 | 52.4 | 353 | 34.3 | 312 | 22.95 | 280 |
| 100.25 | 400 | 81.6 | 388 | 50.8 | 353 | 32.95 | 312 | 22.95 | 281 |
| 100.25 | 402 | 81.6 | 387 | 50.8 | 351 | 32.95 | 311 | 22.25 | 281 |
| 100.25 | 398 | 77.55 | 387 | 50.8 | 349 | 32.95 | 308 | 22.25 | 280 |
| 101.3 | 398 | 77.55 | 384 | 49.45 | 349 | 32.95 | 304 | 22.25 | 278 |
| 101.3 | 400 | 77.55 | 383 | 49.45 | 348 | 31.7 | 304 | 22.25 | 279 |
| 101.3 | 401 | 74 | 383 | 49.45 | 347 | 31.7 | 305 | 22.25 | 278 |
| 101.3 | 401 | 74 | 382 | 49.45 | 346 | 31.7 | 306 | 21.7 | 278 |
| 101.3 | 400 | 74 | 378 | 47.85 | 346 | 31.7 | 302 | 21.7 | 276 |
| 101.75 | 400 | 71.2 | 378 | 47.85 | 345 | 30.4 | 302 | 21.1 | 276 |
| 101.75 | 401 | 71.2 | 381 | 47.85 | 340 | 30.4 | 304 | 21.1 | 273 |
| 101.55 | 401 | 71.2 | 380 | 47.85 | 341 | 30.4 | 306 | 21.1 | 276 |
| 101.55 | 402 | 71.2 | 381 | 46 | 341 | 30.4 | 303 | 20.6 | 276 |
| 101.55 | 400 | 69.2 | 381 | 46 | 338 | 29.4 | 303 | 20.6 | 271 |
| 101.55 | 403 | 69.2 | 379 | 44.2 | 338 | 29.4 | 302 | 20.6 | 273 |
| 101.7 | 403 | 69.2 | 374 | 44.2 | 339 | 29.4 | 300 | 20.6 | 271 |
| 101.7 | 404 | 69.2 | 375 | 42.9 | 339 | 29.4 | 303 | 20.1 | 271 |
| 101.7 | 403 | 66.9 | 375 | 42.9 | 335 | 28.65 | 303 | 20.1 | 272 |
| 101.7 | 404 | 66.9 | 374 | 42.9 | 334 | 28.65 | 301 | 20.1 | 271 |
| 101.7 | 403 | 66.9 | 375 | 42.9 | 333 | 28.65 | 300 | 19.75 | 271 |
| 102.85 | 403 | 66.9 | 373 | 41.85 | 333 | 28.65 | 299 | 19.75 | 267 |
| 102.85 | 404 | 64.6 | 373 | 41.85 | 332 | 28.65 | 298 | 19.75 | 262 |
| 102.85 | 403 | 64.6 | 372 | 41.85 | 330 | 27.95 | 298 | 18.95 | 262 |
| 103.15 | 403 | 64.6 | 371 | 40.5 | 330 | 27.95 | 299 | 18.95 | 261 |
| 103.15 | 402 | 62.2 | 371 | 40.5 | 329 | 27.95 | 297 | 18.95 | 256 |
| 103.15 | 403 | 62.2 | 369 | 40.5 | 328 | 27.95 | 298 | 18.95 | 259 |
| 101.2 | 403 | 60.55 | 369 | 40.5 | 327 | 27.55 | 298 | 17.6 | 259 |
| 101.2 | 402 | 60.55 | 367 | 38.8 | 327 | 27.55 | 296 | 17.6 | 257 |
| 101.2 | 403 | 60.55 | 369 | 38.8 | 326 | 27.55 | 295 | 17.6 | 255 |
| 101.2 | 402 | 60.55 | 368 | 38.8 | 324 | 27.1 | 295 | 17.6 | 257 |
| 98.8 | 402 | 58.9 | 368 | 38.8 | 325 | 27.1 | 293 | 16.5 | 257 |
| 98.8 | 399 | 58.9 | 360 | 38.8 | 322 | 26.5 | 293 | 16.5 | 255 |
| 98.8 | 398 | 58.9 | 365 | 37.7 | 322 | 26.5 | 292 | 16.5 | 254 |
| 98.8 | 400 | 58.9 | 363 | 37.7 | 323 | 26.5 | 293 | 16.5 | 257 |
| 94.6 | 400 | 57.5 | 363 | 37.7 | 325 | 25.75 | 293 | 16 | 257 |
| 94.6 | 397 | 57.5 | 361 | 36.95 | 325 | 25.75 | 289 | 16 | 253 |
| 94.6 | 398 | 57.5 | 362 | 36.95 | 320 | 25.75 | 281 | 16 | 251 |
| 94.6 | 397 | 56.1 | 362 | 36.95 | 318 | 25.1 | 281 | 15.65 | 251 |
| 15.65 | 248 | 10.2 | 212 | 4.6 | 155 | 1.25 | 71 | 0.05 | 13 |
| 15.65 | 249 | 9.45 | 212 | 4.6 | 153 | 1.25 | 65 | 0.05 | 12 |
| 15.65 | 246 | 9.45 | 211 | 4.6 | 149 | 1.25 | 60 | 0.05 | 12 |
| 15 | 246 | 9.45 | 210 | 4.05 | 149 | 0.95 | 60 | 0.05 | 14 |
| 15 | 244 | 9.05 | 210 | 4.05 | 144 | 0.95 | 49 | 0.05 | 13 |
| 15 | 242 | 9.05 | 209 | 4.05 | 139 | 0.95 | 44 | 0.05 | 13 |
| 15 | 240 | 9.05 | 207 | 3.45 | 139 | 0.95 | 40 | 0.05 | 14 |
| 14.1 | 240 | 9.05 | 202 | 3.45 | 134 | 0.55 | 40 | 0.05 | 12 |
| 14.1 | 241 | 8.65 | 202 | 3.45 | 133 | 0.55 | 34 | 0.05 | 13 |
| 14.1 | 244 | 8.65 | 199 | 3.45 | 129 | 0.55 | 27 | 0.05 | 13 |
| 14.1 | 241 | 8.65 | 192 | 3 | 129 | 0.55 | 19 | 0.05 | 12 |
| 13.6 | 241 | 7.9 | 192 | 3 | 124 | 0.35 | 19 | 0.05 | 12 |
| 13.6 | 243 | 7.9 | 187 | 3 | 122 | 0.35 | 18 | 0.05 | 11 |
| 13.6 | 241 | 7.9 | 183 | 2.55 | 122 | 0.35 | 20 | 0.05 | 12 |
| 13.6 | 238 | 7.9 | 182 | 2.55 | 116 | 0.35 | 18 | 0.05 | 13 |
| 13.35 | 238 | 6.75 | 182 | 2.55 | 109 | 0.2 | 18 | 0.05 | 13 |
| 13.35 | 230 | 6.75 | 179 | 2.2 | 109 | 0.2 | 16 | 0.05 | 12 |
| 13.35 | 231 | 6.75 | 178 | 2.2 | 106 | 0.1 | 16 | 0.05 | 12 |
| 13.35 | 229 | 6.75 | 173 | 2.2 | 102 | 0.1 | 15 | 0.05 | 13 |

Sensor 17

| pressure | resistance | pressure | resistance | pressure | resistance | pressure | resistance | pressure | resistance |
|---|---|---|---|---|---|---|---|---|---|
| 13.35 | 226 | 5.8 | 173 | 2.2 | 101 | 0.1 | 14 | 0.05 | 12 |
| 12.5 | 226 | 5.8 | 172 | 1.8 | 101 | 0.05 | 14 | 0.05 | 12 |
| 12.5 | 225 | 5.8 | 169 | 1.8 | 99 | 0.05 | 13 | 0.05 | 13 |
| 12.5 | 222 | 5.8 | 170 | 1.8 | 97 | 0.05 | 12 | 0.05 | 12 |
| 12.5 | 217 | 5.8 | 164 | 1.5 | 97 | 0.05 | 12 | 0.05 | 12 |
| 11.2 | 217 | 5.15 | 164 | 1.5 | 94 | 0.05 | 13 | 0.05 | 10 |
| 11.2 | 218 | 5.15 | 161 | 1.5 | 84 | 0.05 | 14 | 0.05 | 12 |
| 11.2 | 217 | 5.15 | 158 | 1.5 | 75 | 0.05 | 12 | 0.05 | 12 |
| 11.2 | 215 | 5.15 | 156 | 1.5 | 73 | 0.05 | 12 | 0.05 | 13 |
| 10.2 | 215 | 4.6 | 156 | 1.25 | 73 | 0.05 | 14 | 0.05 | 10 |

Sensor 18

| pressure | resistance | pressure | resistance | pressure | resistance | pressure | resistance | pressure | resistance |
|---|---|---|---|---|---|---|---|---|---|
| 0.05 | 3 | 4.1 | 94 | 16.15 | 168 | 24.7 | 208 | 34.85 | 237 |
| 0.05 | 7 | 4.1 | 96 | 16.15 | 170 | 25.5 | 208 | 34.85 | 238 |
| 0.1 | 7 | 4.1 | 100 | 16.15 | 172 | 25.5 | 209 | 34.85 | 237 |
| 0.1 | 11 | 4.85 | 100 | 16.8 | 172 | 25.5 | 210 | 34.95 | 237 |
| 0.1 | 15 | 4.85 | 103 | 16.8 | 174 | 25.5 | 214 | 34.95 | 238 |
| 0.1 | 17 | 4.85 | 107 | 16.8 | 175 | 25.5 | 212 | 34.95 | 237 |
| 0.2 | 17 | 4.85 | 109 | 16.8 | 177 | 26.25 | 212 | 34.6 | 237 |
| 0.2 | 20 | 5.75 | 109 | 17.45 | 177 | 26.25 | 211 | 34.6 | 240 |
| 0.2 | 26 | 5.75 | 114 | 17.45 | 178 | 26.25 | 214 | 34.85 | 240 |
| 0.2 | 24 | 5.75 | 118 | 17.45 | 181 | 26.25 | 213 | 34.85 | 242 |
| 0.35 | 24 | 5.75 | 122 | 18.45 | 181 | 27 | 213 | 35.7 | 242 |
| 0.35 | 26 | 6.9 | 122 | 18.45 | 182 | 27 | 215 | 35.7 | 243 |
| 0.35 | 30 | 6.9 | 128 | 18.45 | 179 | 27.6 | 215 | 35.7 | 241 |
| 0.35 | 33 | 6.9 | 131 | 18.45 | 185 | 27.6 | 216 | 35.7 | 243 |
| 0.55 | 33 | 8.4 | 131 | 19.5 | 185 | 27.6 | 218 | 36.4 | 243 |
| 0.55 | 34 | 8.4 | 130 | 19.5 | 186 | 28.1 | 218 | 36.4 | 244 |
| 0.55 | 38 | 8.4 | 133 | 19.5 | 194 | 28.1 | 220 | 36.4 | 245 |
| 0.55 | 41 | 9.55 | 133 | 19.5 | 187 | 28.1 | 218 | 36.9 | 245 |
| 0.55 | 45 | 9.55 | 136 | 19.5 | 188 | 28.8 | 218 | 36.9 | 246 |
| 0.75 | 45 | 9.55 | 138 | 20.45 | 188 | 28.8 | 220 | 37.3 | 246 |
| 0.75 | 44 | 9.55 | 140 | 20.45 | 189 | 28.8 | 218 | 37.3 | 249 |
| 0.75 | 46 | 10.45 | 140 | 20.45 | 190 | 29.25 | 218 | 37.7 | 249 |
| 1.05 | 46 | 10.45 | 142 | 20.45 | 191 | 29.25 | 221 | 37.7 | 246 |
| 1.05 | 50 | 10.45 | 143 | 20.95 | 191 | 29.25 | 223 | 37.7 | 248 |
| 1.05 | 55 | 10.45 | 146 | 20.95 | 192 | 29.75 | 223 | 37.7 | 247 |
| 1.05 | 59 | 11.3 | 146 | 20.95 | 198 | 29.75 | 224 | 38.4 | 247 |
| 1.4 | 59 | 11.3 | 144 | 21.7 | 198 | 30.5 | 224 | 38.4 | 251 |
| 1.4 | 64 | 11.3 | 151 | 21.7 | 196 | 30.5 | 225 | 38.4 | 250 |
| 1.4 | 68 | 11.3 | 150 | 21.7 | 195 | 30.5 | 228 | 39.3 | 250 |
| 1.4 | 70 | 12.2 | 150 | 21.7 | 198 | 30.5 | 227 | 39.3 | 251 |
| 2 | 70 | 12.2 | 151 | 22.65 | 198 | 31.3 | 227 | 39.3 | 253 |
| 2 | 73 | 12.2 | 152 | 22.65 | 199 | 31.3 | 231 | 40.1 | 253 |
| 2 | 76 | 12.85 | 152 | 22.65 | 201 | 31.6 | 231 | 40.1 | 254 |
| 2 | 77 | 12.85 | 158 | 23.4 | 201 | 31.6 | 230 | 40.1 | 250 |
| 2.8 | 77 | 12.85 | 159 | 23.4 | 200 | 31.6 | 231 | 40.1 | 254 |
| 2.8 | 79 | 12.85 | 162 | 23.4 | 203 | 31.6 | 232 | 40.1 | 255 |
| 2.8 | 80 | 13.8 | 162 | 24 | 203 | 32.2 | 232 | 40.8 | 255 |
| 2.8 | 83 | 13.8 | 164 | 24 | 204 | 32.2 | 234 | 40.8 | 256 |
| 3.45 | 83 | 13.8 | 165 | 24 | 206 | 32.2 | 233 | 40.8 | 257 |
| 3.45 | 86 | 15.1 | 165 | 24 | 204 | 32.2 | 236 | 40.8 | 256 |
| 3.45 | 89 | 15.1 | 168 | 24.7 | 204 | 33.75 | 236 | 41.35 | 256 |
| 3.45 | 92 | 15.1 | 169 | 24.7 | 207 | 33.75 | 235 | 41.35 | 257 |
| 4.1 | 92 | 15.1 | 168 | 24.7 | 212 | 33.75 | 237 | 41.35 | 259 |
| 42.05 | 259 | 48.25 | 275 | 57.4 | 294 | 66.4 | 313 | 78.9 | 334 |
| 42.05 | 257 | 48.25 | 276 | 57.4 | 296 | 66.4 | 314 | 80 | 334 |
| 42.05 | 258 | 48.25 | 275 | 58.5 | 296 | 66.4 | 318 | 80 | 336 |
| 42.6 | 258 | 48.25 | 277 | 58.5 | 298 | 67.45 | 318 | 80 | 338 |
| 42.6 | 260 | 49.1 | 277 | 58.5 | 297 | 67.45 | 317 | 80 | 337 |
| 42.6 | 261 | 49.1 | 275 | 58.85 | 297 | 67.45 | 318 | 80.9 | 337 |
| 43.25 | 261 | 49.1 | 277 | 58.85 | 292 | 68.75 | 318 | 80.9 | 339 |
| 43.25 | 255 | 49.25 | 277 | 58.85 | 298 | 68.75 | 317 | 80.9 | 338 |
| 43.25 | 262 | 49.25 | 278 | 58.85 | 299 | 68.75 | 319 | 81.65 | 338 |
| 43.25 | 263 | 49.8 | 278 | 59.05 | 299 | 69.95 | 319 | 81.65 | 340 |
| 43.65 | 263 | 49.8 | 279 | 59.05 | 300 | 69.95 | 320 | 81.65 | 341 |
| 43.65 | 262 | 49.8 | 280 | 59.05 | 301 | 69.95 | 321 | 82.55 | 341 |
| 43.65 | 263 | 51.05 | 280 | 59.85 | 301 | 70.65 | 321 | 83.5 | 341 |
| 44 | 263 | 51.05 | 281 | 59.85 | 305 | 70.65 | 320 | 83.5 | 344 |

-continued

| \multicolumn{10}{c|}{Sensor 18} |
| pressure | resistance | pressure | resistance | pressure | resistance | pressure | resistance | pressure | resistance |
| --- | --- | --- | --- | --- | --- | --- | --- | --- | --- |
| 44 | 264 | 51.05 | 282 | 59.85 | 304 | 70.65 | 321 | 83.5 | 342 |
| 44 | 265 | 51.05 | 281 | 59.85 | 303 | 71.15 | 321 | 84.35 | 342 |
| 44 | 264 | 52.25 | 281 | 61.2 | 303 | 71.15 | 322 | 84.35 | 344 |
| 44.4 | 264 | 52.25 | 282 | 61.2 | 304 | 71.15 | 323 | 84.35 | 342 |
| 44.4 | 262 | 52.25 | 284 | 61.2 | 305 | 71.15 | 324 | 84.35 | 344 |
| 44.4 | 265 | 52.5 | 284 | 61.5 | 305 | 71.85 | 324 | 84.55 | 344 |
| 44.4 | 266 | 52.5 | 283 | 61.5 | 304 | 71.85 | 323 | 84.55 | 343 |
| 44.85 | 266 | 52.5 | 284 | 61.5 | 305 | 71.85 | 324 | 84.55 | 344 |
| 44.85 | 268 | 52.5 | 282 | 61.5 | 304 | 71.85 | 325 | 84.95 | 344 |
| 44.85 | 267 | 52.65 | 282 | 62.65 | 304 | 72.65 | 325 | 84.95 | 345 |
| 45.2 | 267 | 52.65 | 286 | 62.65 | 306 | 72.65 | 328 | 84.95 | 344 |
| 45.2 | 268 | 52.65 | 284 | 62.65 | 307 | 72.65 | 327 | 84.95 | 346 |
| 45.2 | 269 | 52.65 | 286 | 63.05 | 307 | 73.9 | 327 | 85.6 | 346 |
| 45.8 | 269 | 53.45 | 286 | 63.05 | 309 | 73.9 | 328 | 85.6 | 345 |
| 45.8 | 268 | 53.45 | 288 | 63.05 | 308 | 73.9 | 327 | 85.6 | 347 |
| 45.8 | 269 | 53.45 | 286 | 64.05 | 308 | 74.65 | 327 | 86.7 | 347 |
| 46.4 | 269 | 53.45 | 289 | 64.05 | 306 | 74.65 | 329 | 86.7 | 345 |
| 46.4 | 270 | 54.65 | 289 | 64.05 | 307 | 74.65 | 330 | 86.7 | 348 |
| 46.4 | 272 | 54.65 | 288 | 64.05 | 311 | 76.2 | 330 | 86.7 | 349 |
| 46.4 | 268 | 54.65 | 289 | 64.45 | 311 | 76.2 | 331 | 87.5 | 349 |
| 46.85 | 268 | 55.2 | 289 | 64.45 | 310 | 76.2 | 330 | 87.5 | 351 |
| 46.85 | 272 | 55.2 | 290 | 64.45 | 309 | 76.2 | 332 | 87.5 | 348 |
| 46.85 | 271 | 55.2 | 291 | 64.45 | 310 | 76.9 | 332 | 87.5 | 350 |
| 46.85 | 272 | 55.7 | 291 | 65.15 | 310 | 76.9 | 335 | 88.9 | 350 |
| 46.9 | 272 | 55.7 | 292 | 65.15 | 313 | 76.9 | 332 | 89.45 | 350 |
| 46.9 | 273 | 55.7 | 290 | 65.15 | 312 | 76.9 | 334 | 89.45 | 352 |
| 46.9 | 272 | 56.25 | 290 | 65.6 | 312 | 78.05 | 334 | 89.45 | 351 |
| 46.9 | 273 | 56.25 | 293 | 65.6 | 309 | 78.05 | 332 | 90.6 | 351 |
| 47.45 | 273 | 56.25 | 294 | 65.6 | 314 | 78.05 | 334 | 90.6 | 353 |
| 47.45 | 274 | 57.4 | 294 | 65.6 | 315 | 78.9 | 334 | 90.6 | 349 |
| 47.45 | 275 | 57.4 | 295 | 66.4 | 315 | 78.9 | 336 | 90.6 | 353 |
| 91.35 | 353 | 100.25 | 365 | 92 | 363 | 57 | 328 | 41.7 | 296 |
| 91.35 | 355 | 100.45 | 365 | 92 | 364 | 57 | 326 | 40.3 | 296 |
| 91.35 | 354 | 100.45 | 366 | 92 | 362 | 57 | 327 | 40.3 | 293 |
| 91.35 | 353 | 100.4 | 366 | 92 | 361 | 55.3 | 327 | 38.95 | 293 |
| 92.6 | 353 | 100.4 | 366 | 89.25 | 361 | 55.3 | 325 | 38.95 | 294 |
| 92.6 | 354 | 100.4 | 363 | 89.25 | 359 | 55.3 | 321 | 38.95 | 292 |
| 92.6 | 355 | 100.4 | 366 | 89.25 | 356 | 55.3 | 324 | 37.65 | 292 |
| 92.6 | 356 | 100.4 | 367 | 85.85 | 356 | 53.5 | 324 | 37.65 | 291 |
| 93.25 | 356 | 100.25 | 367 | 85.85 | 357 | 53.5 | 322 | 36.65 | 291 |
| 93.25 | 358 | 100.25 | 366 | 85.85 | 356 | 53.5 | 323 | 36.65 | 289 |
| 93.25 | 357 | 100.25 | 367 | 82 | 356 | 53.5 | 320 | 36.65 | 286 |
| 94.2 | 357 | 100.25 | 367 | 82 | 354 | 51.9 | 320 | 35.6 | 286 |
| 94.2 | 358 | 100.3 | 367 | 82 | 353 | 51.9 | 319 | 35.6 | 284 |
| 94.2 | 359 | 100.3 | 368 | 77.75 | 353 | 51.9 | 320 | 35.6 | 283 |
| 94.9 | 359 | 100.3 | 367 | 77.75 | 351 | 50.5 | 320 | 34.35 | 283 |
| 94.9 | 361 | 100.3 | 370 | 77.75 | 347 | 50.5 | 317 | 34.35 | 284 |
| 94.9 | 356 | 100.35 | 370 | 77.75 | 349 | 50.5 | 318 | 34.35 | 280 |
| 94.9 | 359 | 100.35 | 368 | 74.15 | 349 | 50.5 | 317 | 34.35 | 282 |
| 95.6 | 359 | 100.35 | 365 | 74.15 | 347 | 49.5 | 317 | 33.1 | 282 |
| 95.6 | 357 | 100.35 | 369 | 74.15 | 346 | 49.5 | 318 | 33.1 | 283 |
| 95.6 | 360 | 100.35 | 368 | 74.15 | 344 | 49.5 | 317 | 33.1 | 281 |
| 96.3 | 360 | 101.65 | 368 | 70.5 | 344 | 49.5 | 314 | 33.1 | 280 |
| 96.3 | 361 | 101.65 | 369 | 70.5 | 345 | 48.8 | 314 | 33.1 | 281 |
| 97.3 | 361 | 101.65 | 368 | 70.5 | 344 | 48.8 | 317 | 32 | 281 |
| 97.3 | 360 | 101.65 | 369 | 70.5 | 342 | 48.8 | 316 | 32 | 277 |
| 97.3 | 361 | 102.85 | 369 | 67.5 | 342 | 48.8 | 315 | 32 | 276 |
| 98.45 | 361 | 102.85 | 368 | 67.5 | 341 | 48.3 | 315 | 32 | 274 |
| 98.45 | 363 | 102.85 | 369 | 65.1 | 341 | 48.3 | 314 | 30.95 | 274 |
| 98.45 | 362 | 102.7 | 369 | 65.1 | 340 | 48.3 | 312 | 30.95 | 275 |
| 99.05 | 362 | 102.7 | 373 | 65.1 | 339 | 47.45 | 312 | 30.95 | 273 |
| 99.05 | 363 | 102.7 | 369 | 63.5 | 339 | 47.45 | 311 | 29.95 | 273 |
| 99.05 | 365 | 101.45 | 369 | 63.5 | 337 | 47.45 | 310 | 29.95 | 271 |
| 99.05 | 363 | 101.45 | 370 | 63.5 | 335 | 45.95 | 310 | 29.95 | 272 |
| 99.45 | 363 | 101.45 | 366 | 62.05 | 335 | 45.95 | 306 | 29.15 | 272 |
| 99.45 | 365 | 101.45 | 368 | 62.05 | 336 | 45.95 | 305 | 29.15 | 271 |
| 99.45 | 364 | 99.85 | 368 | 62.05 | 335 | 45.95 | 307 | 29.15 | 270 |
| 99.45 | 365 | 99.85 | 367 | 62.05 | 334 | 44.3 | 307 | 28.5 | 270 |
| 99.45 | 364 | 97.65 | 367 | 60.5 | 334 | 44.3 | 304 | 28.5 | 271 |
| 99.85 | 364 | 97.65 | 366 | 60.5 | 333 | 42.95 | 304 | 28.5 | 269 |
| 99.85 | 363 | 97.65 | 367 | 60.5 | 332 | 42.95 | 299 | 27.75 | 269 |
| 100.1 | 363 | 97.65 | 366 | 58.75 | 332 | 42.95 | 300 | 27.75 | 267 |
| 100.1 | 365 | 94.9 | 366 | 58.75 | 331 | 42.95 | 301 | 27.75 | 266 |
| 100.25 | 365 | 94.9 | 364 | 58.75 | 330 | 41.7 | 301 | 27.75 | 265 |
| 100.25 | 363 | 94.9 | 365 | 58.75 | 329 | 41.7 | 300 | 26.75 | 265 |

Sensor 18

| pressure | resistance | pressure | resistance | pressure | resistance | pressure | resistance | pressure | resistance |
|---|---|---|---|---|---|---|---|---|---|
| 100.25 | 366 | 94.9 | 363 | 57 | 329 | 41.7 | 299 | 26.75 | 264 |
| 26.75 | 263 | 15.35 | 224 | 10 | 189 | 4.15 | 131 | 0.5 | 26 |
| 26.75 | 261 | 15.35 | 223 | 9.5 | 189 | 4.15 | 129 | 0.5 | 19 |
| 25.6 | 261 | 15.35 | 224 | 9.5 | 188 | 3.7 | 129 | 0.5 | 16 |
| 25.6 | 260 | 14.85 | 224 | 9.5 | 186 | 3.7 | 127 | 0.5 | 14 |
| 25.6 | 262 | 14.85 | 225 | 8.95 | 186 | 3.35 | 127 | 0.25 | 14 |
| 25.6 | 258 | 14.85 | 221 | 8.95 | 187 | 3.35 | 126 | 0.25 | 13 |
| 24.55 | 258 | 14.85 | 223 | 8.95 | 186 | 3.35 | 125 | 0.25 | 12 |
| 24.55 | 255 | 14.45 | 223 | 8.95 | 181 | 3.35 | 124 | 0.25 | 13 |
| 24.55 | 253 | 14.45 | 219 | 8.5 | 181 | 3.15 | 124 | 0.1 | 13 |
| 23.6 | 253 | 14.45 | 218 | 8.5 | 177 | 3.15 | 119 | 0.1 | 12 |
| 23.6 | 255 | 14.45 | 217 | 8.5 | 173 | 3.15 | 120 | 0.1 | 11 |
| 23.6 | 252 | 14.45 | 218 | 8.5 | 172 | 3.15 | 119 | 0.05 | 11 |
| 23.6 | 245 | 14.1 | 218 | 7.8 | 172 | 3 | 119 | 0.05 | 12 |
| 22.6 | 245 | 14.1 | 217 | 7.8 | 170 | 3 | 118 | 0.05 | 11 |
| 22.6 | 249 | 14.1 | 211 | 7.8 | 169 | 2.85 | 118 | 0.05 | 10 |
| 22.6 | 250 | 14.1 | 213 | 7.8 | 167 | 2.85 | 114 | 0.05 | 10 |
| 22.6 | 249 | 13.6 | 213 | 6.95 | 167 | 2.85 | 111 | 0.05 | 8 |
| 21.5 | 249 | 13.6 | 215 | 6.95 | 165 | 2.85 | 112 | 0.05 | 10 |
| 21.5 | 248 | 13.6 | 214 | 6.95 | 160 | 2.6 | 112 | 0.05 | 10 |
| 21.5 | 246 | 13 | 214 | 6.95 | 163 | 2.6 | 108 | 0.05 | 9 |
| 21.5 | 245 | 13 | 212 | 6.25 | 163 | 2.6 | 105 | 0.05 | 10 |
| 20.55 | 245 | 13 | 213 | 6.25 | 160 | 2.3 | 105 | 0.05 | 10 |
| 20.55 | 244 | 13 | 212 | 6.25 | 158 | 2.3 | 98 | 0.05 | 11 |
| 20.55 | 242 | 12.65 | 212 | 6.25 | 157 | 2.3 | 94 | 0.05 | 9 |
| 19.7 | 242 | 12.65 | 210 | 5.8 | 157 | 2.3 | 91 | 0.05 | 11 |
| 19.7 | 240 | 12.65 | 209 | 5.8 | 156 | 1.9 | 91 | 0.05 | 11 |
| 19.7 | 241 | 12.65 | 210 | 5.8 | 154 | 1.9 | 87 | 0.05 | 9 |
| 19.7 | 240 | 12.3 | 210 | 5.8 | 153 | 1.9 | 84 | 0.05 | 10 |
| 19.05 | 240 | 12.3 | 208 | 5.45 | 153 | 1.9 | 78 | 0.05 | 11 |
| 19.05 | 239 | 12.3 | 206 | 5.45 | 152 | 1.5 | 78 | 0.05 | 11 |
| 19.05 | 237 | 12.3 | 205 | 5.45 | 151 | 1.5 | 76 | 0.05 | 10 |
| 19.05 | 234 | 11.8 | 205 | 5.1 | 151 | 1.5 | 70 | 0.05 | 11 |
| 18.4 | 234 | 11.8 | 204 | 5.1 | 150 | 1.5 | 67 | 0.05 | 10 |
| 18.4 | 230 | 11.8 | 202 | 5.1 | 147 | 1.15 | 67 | 0.05 | 10 |
| 17.5 | 230 | 11.8 | 201 | 5.1 | 146 | 1.15 | 68 | 0.05 | 11 |
| 17.5 | 231 | 11.15 | 201 | 4.8 | 146 | 1.15 | 65 | 0.05 | 10 |
| 17.5 | 229 | 11.15 | 200 | 4.8 | 145 | 1.15 | 63 | 0.05 | 10 |
| 17.5 | 234 | 10.7 | 200 | 4.8 | 144 | 0.9 | 63 | 0.05 | 11 |
| 16.55 | 234 | 10.7 | 198 | 4.8 | 143 | 0.9 | 58 | 0.05 | 11 |
| 16.55 | 230 | 10.7 | 195 | 4.5 | 143 | 0.9 | 51 | 0.05 | 10 |
| 16.55 | 228 | 10.4 | 195 | 4.5 | 141 | 0.9 | 45 | 0.05 | 10 |
| 16.55 | 226 | 10.4 | 192 | 4.5 | 139 | 0.7 | 45 | 0.05 | 9 |
| 15.85 | 226 | 10 | 192 | 4.5 | 136 | 0.7 | 41 | 0.05 | 11 |
| 15.85 | 225 | 10 | 193 | 4.15 | 136 | 0.7 | 35 | 0.05 | 8 |
| 15.85 | 224 | 10 | 190 | 4.15 | 134 | 0.7 | 26 | 0.05 | 8 |
| 0.05 | 13 | | | | | | | | |
| 0.05 | 10 | | | | | | | | |
| 0.05 | 9 | | | | | | | | |
| 0.05 | 9 | | | | | | | | |
| 0.05 | 8 | | | | | | | | |

Sensor 19

| pressure | resistance | pressure | resistance | pressure | resistance | pressure | resistance | pressure | resistance |
|---|---|---|---|---|---|---|---|---|---|
| 0.05 | 11 | 4.5 | 89 | 19.15 | 176 | 30.75 | 212 | 41.5 | 248 |
| 0.05 | 15 | 4.5 | 93 | 19.15 | 178 | 30.75 | 214 | 41.5 | 243 |
| 0.05 | 16 | 4.5 | 96 | 20.6 | 178 | 30.75 | 213 | 41.5 | 245 |
| 0.05 | 18 | 5.25 | 96 | 20.6 | 180 | 31.45 | 213 | 42.75 | 245 |
| 0.25 | 18 | 5.25 | 101 | 20.6 | 181 | 31.45 | 215 | 42.75 | 244 |
| 0.25 | 22 | 5.25 | 103 | 22.25 | 181 | 31.45 | 216 | 42.75 | 245 |
| 0.25 | 25 | 5.25 | 109 | 22.25 | 183 | 31.45 | 220 | 42.75 | 252 |
| 0.4 | 25 | 6.4 | 109 | 22.25 | 185 | 32.45 | 220 | 43.6 | 252 |
| 0.4 | 27 | 6.4 | 112 | 23.35 | 185 | 32.45 | 221 | 43.6 | 249 |
| 0.4 | 29 | 6.4 | 115 | 23.35 | 183 | 32.45 | 220 | 43.6 | 248 |
| 0.6 | 29 | 6.4 | 122 | 23.35 | 191 | 33.55 | 220 | 43.6 | 249 |
| 0.6 | 35 | 8.1 | 122 | 23.35 | 190 | 33.55 | 221 | 43.85 | 249 |
| 0.6 | 36 | 8.1 | 119 | 24.2 | 190 | 33.55 | 223 | 43.85 | 247 |
| 0.6 | 37 | 8.1 | 123 | 24.2 | 192 | 34.05 | 223 | 43.85 | 251 |
| 0.6 | 39 | 8.1 | 124 | 24.2 | 194 | 34.05 | 224 | 44.2 | 251 |
| 0.8 | 39 | 9.65 | 124 | 25 | 194 | 34.05 | 225 | 44.2 | 250 |

-continued

| \multicolumn{10}{c}{Sensor 19} |
|---|---|---|---|---|---|---|---|---|---|
| pressure | resistance | pressure | resistance | pressure | resistance | pressure | resistance | pressure | resistance |
| 0.8 | 41 | 9.65 | 125 | 25 | 193 | 34.55 | 225 | 44.2 | 252 |
| 1.05 | 41 | 9.65 | 128 | 25 | 195 | 34.55 | 227 | 44.2 | 254 |
| 1.05 | 43 | 9.65 | 130 | 25 | 196 | 35.45 | 227 | 44.95 | 254 |
| 1.05 | 45 | 10.9 | 130 | 25.9 | 196 | 35.45 | 228 | 44.95 | 255 |
| 1.05 | 49 | 10.9 | 132 | 25.9 | 197 | 35.45 | 230 | 46.15 | 255 |
| 1.25 | 49 | 10.9 | 136 | 25.9 | 200 | 35.45 | 227 | 46.15 | 257 |
| 1.25 | 53 | 10.9 | 137 | 26.6 | 200 | 36.4 | 227 | 46.15 | 258 |
| 1.25 | 56 | 12.05 | 137 | 26.6 | 202 | 36.4 | 230 | 47.2 | 258 |
| 1.25 | 59 | 12.05 | 141 | 27.5 | 202 | 36.4 | 231 | 47.2 | 259 |
| 1.7 | 59 | 12.05 | 142 | 27.5 | 201 | 36.7 | 231 | 47.2 | 261 |
| 1.7 | 63 | 13.25 | 142 | 27.5 | 202 | 36.7 | 233 | 47.2 | 264 |
| 1.7 | 66 | 13.25 | 144 | 27.5 | 204 | 36.7 | 232 | 48.35 | 264 |
| 1.7 | 67 | 13.25 | 146 | 28.35 | 204 | 36.7 | 226 | 48.35 | 260 |
| 2.4 | 67 | 13.25 | 151 | 28.35 | 205 | 36.9 | 226 | 48.35 | 261 |
| 2.4 | 69 | 14.5 | 151 | 28.35 | 203 | 36.9 | 232 | 48.35 | 263 |
| 2.4 | 70 | 14.5 | 152 | 28.35 | 205 | 36.9 | 235 | 49.5 | 263 |
| 2.4 | 73 | 14.5 | 157 | 28.9 | 205 | 36.9 | 234 | 49.5 | 264 |
| 3.15 | 73 | 14.5 | 155 | 28.9 | 206 | 37.7 | 234 | 50.2 | 264 |
| 3.15 | 76 | 14.5 | 160 | 28.9 | 207 | 37.7 | 236 | 50.2 | 265 |
| 3.15 | 83 | 15.95 | 160 | 29.3 | 207 | 37.7 | 237 | 50.2 | 268 |
| 3.15 | 80 | 15.95 | 163 | 29.3 | 209 | 38.8 | 237 | 50.2 | 267 |
| 3.8 | 80 | 15.95 | 166 | 29.3 | 211 | 38.8 | 239 | 51 | 267 |
| 3.8 | 81 | 17.85 | 166 | 29.95 | 211 | 38.8 | 243 | 51 | 269 |
| 3.8 | 84 | 17.85 | 167 | 29.95 | 215 | 40.1 | 243 | 51 | 268 |
| 3.8 | 86 | 17.85 | 171 | 29.95 | 211 | 40.1 | 240 | 51 | 270 |
| 3.8 | 88 | 19.15 | 171 | 29.95 | 213 | 40.1 | 241 | 52.1 | 270 |
| 4.5 | 88 | 19.15 | 172 | 30.75 | 213 | 41.5 | 241 | 52.1 | 268 |
| 52.1 | 271 | 61.75 | 292 | 71.2 | 309 | 83.5 | 330 | 95.25 | 347 |
| 52.1 | 270 | 62.1 | 292 | 71.2 | 310 | 83.5 | 329 | 95.25 | 346 |
| 53.3 | 270 | 62.1 | 294 | 71.2 | 311 | 84 | 329 | 95.9 | 346 |
| 53.3 | 273 | 62.1 | 293 | 72.2 | 311 | 84 | 330 | 95.9 | 349 |
| 53.3 | 275 | 62.1 | 295 | 72.2 | 313 | 84.75 | 330 | 95.9 | 347 |
| 54.35 | 275 | 62.9 | 295 | 73 | 313 | 84.75 | 331 | 95.9 | 346 |
| 54.35 | 274 | 62.9 | 296 | 73 | 314 | 84.75 | 330 | 96.65 | 346 |
| 54.35 | 277 | 62.9 | 297 | 74.25 | 314 | 84.7 | 330 | 96.65 | 347 |
| 55.25 | 277 | 62.9 | 296 | 74.25 | 315 | 84.7 | 333 | 96.65 | 348 |
| 55.25 | 279 | 63.35 | 296 | 74.25 | 316 | 85.65 | 333 | 97.25 | 348 |
| 55.25 | 276 | 63.35 | 300 | 74.9 | 316 | 85.65 | 332 | 97.25 | 346 |
| 56.05 | 276 | 63.35 | 297 | 74.9 | 319 | 85.65 | 333 | 97.25 | 348 |
| 56.05 | 277 | 64.05 | 297 | 74.9 | 317 | 85.65 | 335 | 97.25 | 349 |
| 56.05 | 279 | 64.05 | 296 | 75.6 | 317 | 86.45 | 335 | 97.65 | 349 |
| 56.7 | 279 | 64.05 | 294 | 75.6 | 318 | 86.45 | 334 | 97.65 | 347 |
| 56.7 | 281 | 64.05 | 297 | 75.6 | 317 | 86.45 | 335 | 98.3 | 347 |
| 57.25 | 281 | 64.35 | 297 | 75.6 | 316 | 87.9 | 335 | 98.3 | 349 |
| 57.25 | 280 | 64.35 | 298 | 76.45 | 316 | 87.9 | 336 | 98.3 | 350 |
| 57.25 | 281 | 64.35 | 300 | 76.45 | 320 | 88.6 | 336 | 98.95 | 350 |
| 57.25 | 283 | 65.1 | 300 | 76.45 | 319 | 88.6 | 337 | 98.95 | 352 |
| 57.85 | 283 | 65.1 | 298 | 76.45 | 320 | 88.6 | 338 | 98.95 | 349 |
| 57.85 | 280 | 65.1 | 299 | 77.3 | 320 | 88.6 | 337 | 98.95 | 350 |
| 57.85 | 283 | 65.1 | 298 | 77.3 | 321 | 89.8 | 337 | 99.7 | 350 |
| 57.85 | 284 | 65.4 | 298 | 78.5 | 321 | 89.8 | 340 | 99.7 | 351 |
| 58.5 | 284 | 65.4 | 299 | 78.5 | 318 | 89.8 | 336 | 99.7 | 350 |
| 58.5 | 286 | 65.4 | 305 | 78.5 | 321 | 90.65 | 336 | 99.7 | 351 |
| 58.5 | 285 | 66.1 | 305 | 78.5 | 323 | 90.65 | 339 | 99.9 | 351 |
| 58.5 | 284 | 66.1 | 302 | 79.05 | 323 | 90.65 | 337 | 99.9 | 352 |
| 59.4 | 284 | 66.75 | 302 | 79.05 | 321 | 91.5 | 337 | 100.25 | 352 |
| 59.4 | 287 | 66.75 | 304 | 79.05 | 323 | 91.5 | 339 | 100.55 | 352 |
| 59.4 | 286 | 66.75 | 303 | 79.05 | 326 | 91.5 | 340 | 100.55 | 353 |
| 59.4 | 287 | 67.65 | 303 | 80.05 | 326 | 92.2 | 340 | 100.55 | 353 |
| 59.85 | 287 | 67.65 | 304 | 80.05 | 324 | 92.2 | 341 | 100.55 | 352 |
| 59.85 | 288 | 67.65 | 305 | 80.05 | 323 | 92.2 | 342 | 100.8 | 352 |
| 59.85 | 289 | 67.65 | 306 | 80.05 | 325 | 92.95 | 342 | 100.8 | 353 |
| 59.85 | 288 | 68.7 | 306 | 80.6 | 325 | 92.95 | 343 | 100.8 | 354 |
| 60.55 | 288 | 68.7 | 305 | 80.6 | 326 | 93.7 | 343 | 100.85 | 354 |
| 60.55 | 290 | 68.7 | 308 | 81.6 | 326 | 93.7 | 341 | 100.85 | 356 |
| 60.55 | 287 | 68.7 | 307 | 82.2 | 326 | 93.7 | 343 | 100.85 | 354 |
| 61.2 | 287 | 69.65 | 307 | 82.2 | 327 | 94.4 | 343 | 101.6 | 354 |
| 61.2 | 291 | 69.65 | 308 | 82.2 | 330 | 94.4 | 345 | 101.6 | 355 |
| 61.2 | 290 | 69.65 | 305 | 82.2 | 329 | 94.4 | 344 | 101.6 | 354 |
| 61.2 | 292 | 70.55 | 305 | 82.2 | 328 | 94.4 | 345 | 102.65 | 354 |
| 61.75 | 292 | 70.55 | 308 | 83.5 | 328 | 95.25 | 345 | 102.65 | 356 |
| 61.75 | 291 | 70.55 | 309 | 83.5 | 329 | 95.25 | 346 | 102.65 | 354 |
| 102.65 | 358 | 65.75 | 325 | 47.9 | 301 | 33.7 | 272 | 24.2 | 247 |
| 102.65 | 354 | 65.75 | 323 | 47.9 | 300 | 33.7 | 270 | 24.2 | 244 |
| 102.7 | 354 | 62.9 | 323 | 47.9 | 299 | 33.7 | 266 | 23.3 | 244 |

-continued

| \multicolumn{10}{c|}{Sensor 19} |
|---|---|---|---|---|---|---|---|---|---|
| pressure | resistance | pressure | resistance | pressure | resistance | pressure | resistance | pressure | resistance |
| 102.7 | 353 | 62.9 | 324 | 46.3 | 299 | 33.7 | 269 | 23.3 | 242 |
| 102.7 | 355 | 62.9 | 325 | 46.3 | 297 | 32.4 | 269 | 23.3 | 240 |
| 100.75 | 355 | 61.45 | 325 | 46.3 | 298 | 32.4 | 267 | 22.55 | 240 |
| 100.75 | 353 | 61.45 | 322 | 46.3 | 294 | 32.4 | 268 | 22.55 | 243 |
| 100.75 | 356 | 61.45 | 324 | 44.75 | 294 | 32.4 | 267 | 22.55 | 240 |
| 100.75 | 354 | 61.45 | 321 | 44.75 | 296 | 31.1 | 267 | 22.55 | 241 |
| 99.45 | 354 | 60.25 | 321 | 44.75 | 294 | 31.1 | 265 | 22.55 | 239 |
| 99.45 | 353 | 60.25 | 322 | 43.25 | 294 | 31.1 | 266 | 21.9 | 239 |
| 99.45 | 356 | 59 | 322 | 43.25 | 293 | 31.1 | 263 | 21.9 | 240 |
| 97.05 | 356 | 59 | 319 | 43.25 | 295 | 30.15 | 263 | 21.9 | 238 |
| 97.05 | 351 | 59 | 320 | 43.25 | 293 | 30.15 | 262 | 21.9 | 237 |
| 97.05 | 348 | 59 | 321 | 42.4 | 293 | 30.15 | 265 | 21.35 | 237 |
| 92.85 | 348 | 57.85 | 321 | 42.4 | 294 | 30.15 | 262 | 21.35 | 236 |
| 92.85 | 347 | 57.85 | 319 | 42.4 | 291 | 29.3 | 262 | 21.35 | 235 |
| 92.85 | 349 | 57.85 | 321 | 41.8 | 291 | 29.3 | 260 | 21.35 | 234 |
| 92.85 | 348 | 57.85 | 319 | 41.8 | 287 | 29.3 | 262 | 20.65 | 234 |
| 88.25 | 348 | 57.1 | 319 | 41.8 | 292 | 29.3 | 259 | 20.65 | 232 |
| 88.25 | 346 | 57.1 | 320 | 41.8 | 289 | 28.45 | 259 | 20.65 | 230 |
| 85 | 346 | 57.1 | 319 | 41.2 | 289 | 28.45 | 258 | 19.85 | 230 |
| 85 | 347 | 57.1 | 318 | 41.2 | 290 | 28.45 | 259 | 19.85 | 231 |
| 85 | 344 | 56.25 | 318 | 41.2 | 287 | 27.7 | 259 | 19.85 | 230 |
| 85 | 346 | 56.25 | 315 | 40.2 | 287 | 27.7 | 254 | 19.85 | 224 |
| 85 | 344 | 56.25 | 317 | 40.2 | 286 | 27.7 | 256 | 19.05 | 224 |
| 82.35 | 344 | 56.25 | 314 | 39.15 | 286 | 27.7 | 257 | 19.05 | 226 |
| 82.35 | 342 | 54.9 | 314 | 39.15 | 282 | 27.15 | 257 | 19.05 | 223 |
| 79.8 | 342 | 54.9 | 313 | 39.15 | 281 | 27.15 | 258 | 19.05 | 224 |
| 79.8 | 341 | 53.4 | 313 | 39.15 | 283 | 27.15 | 255 | 18.1 | 224 |
| 79.8 | 339 | 53.4 | 317 | 38.1 | 283 | 26.65 | 255 | 18.1 | 223 |
| 77.35 | 339 | 53.4 | 313 | 37.25 | 283 | 26.65 | 251 | 18.1 | 222 |
| 77.35 | 336 | 53.4 | 314 | 37.25 | 281 | 26.65 | 254 | 17.3 | 222 |
| 75 | 336 | 52.4 | 314 | 37.25 | 280 | 26.25 | 254 | 17.3 | 221 |
| 75 | 338 | 52.4 | 309 | 36.5 | 280 | 26.25 | 257 | 17.3 | 216 |
| 75 | 334 | 52.4 | 312 | 36.5 | 278 | 26.25 | 252 | 16.7 | 216 |
| 72.3 | 334 | 51.25 | 312 | 36.5 | 276 | 25.8 | 252 | 16.7 | 214 |
| 72.3 | 332 | 51.25 | 308 | 36.5 | 279 | 25.8 | 250 | 16.7 | 215 |
| 72.3 | 331 | 51.25 | 307 | 35.8 | 279 | 25.8 | 249 | 16 | 215 |
| 69.25 | 331 | 51.25 | 303 | 35.8 | 275 | 25.8 | 248 | 16 | 213 |
| 69.25 | 328 | 51.25 | 305 | 35.8 | 277 | 25.05 | 248 | 16 | 212 |
| 69.25 | 327 | 49.65 | 305 | 35.8 | 276 | 25.05 | 249 | 16 | 211 |
| 69.25 | 324 | 49.65 | 304 | 34.8 | 276 | 25.05 | 247 | 16 | 210 |
| 65.75 | 324 | 49.65 | 303 | 34.8 | 275 | 24.2 | 247 | 15.1 | 210 |
| 65.75 | 327 | 47.9 | 303 | 34.8 | 272 | 24.2 | 246 | 15.1 | 208 |
| 15.1 | 204 | 10.65 | 182 | 5.55 | 141 | 3.4 | 104 | 1.1 | 58 |
| 14.25 | 204 | 10.15 | 182 | 5.55 | 140 | 2.85 | 104 | 1.1 | 57 |
| 14.25 | 202 | 10.15 | 181 | 5.55 | 137 | 2.85 | 99 | 0.8 | 57 |
| 14.25 | 200 | 10.15 | 183 | 5 | 137 | 2.85 | 95 | 0.8 | 51 |
| 14.25 | 199 | 10.15 | 178 | 5 | 135 | 2.85 | 93 | 0.8 | 49 |
| 13.25 | 199 | 10.15 | 175 | 5 | 137 | 2.4 | 93 | 0.8 | 47 |
| 13.25 | 195 | 9.65 | 175 | 5 | 135 | 2.4 | 91 | 0.6 | 47 |
| 13.25 | 194 | 9.65 | 174 | 4.7 | 135 | 2.4 | 89 | 0.6 | 38 |
| 13.25 | 195 | 9.65 | 168 | 4.7 | 134 | 2.4 | 87 | 0.45 | 38 |
| 12.25 | 195 | 9.65 | 163 | 4.7 | 132 | 1.95 | 87 | 0.45 | 34 |
| 12.25 | 193 | 8.85 | 163 | 4.45 | 132 | 1.95 | 85 | 0.45 | 32 |
| 12.25 | 192 | 8.85 | 162 | 4.45 | 129 | 1.95 | 82 | 0.45 | 30 |
| 11.65 | 192 | 8.85 | 158 | 4.45 | 125 | 1.6 | 82 | 0.3 | 30 |
| 11.65 | 191 | 8.85 | 154 | 4.45 | 122 | 1.6 | 80 | 0.3 | 26 |
| 11.65 | 189 | 7.7 | 154 | 4.45 | 118 | 1.6 | 75 | 0.3 | 24 |
| 11.25 | 189 | 7.7 | 150 | 4.05 | 118 | 1.4 | 75 | 0.15 | 24 |
| 11.25 | 187 | 7.7 | 147 | 4.05 | 114 | 1.4 | 70 | 0.15 | 20 |
| 11.25 | 185 | 7.7 | 145 | 4.05 | 111 | 1.4 | 64 | 0.15 | 16 |
| 11.25 | 184 | 6.4 | 145 | 3.4 | 111 | 1.4 | 59 | 0.15 | 15 |
| 10.65 | 184 | 6.4 | 144 | 3.4 | 110 | 1.1 | 59 | 0.05 | 15 |
| 10.65 | 185 | 6.4 | 145 | 3.4 | 111 | 1.1 | 60 | 0.05 | 11 |
| 10.65 | 181 | 6.4 | 141 | 3.4 | 108 | 1.1 | 62 | 0.05 | 14 |

Summary of Sensor Responses for Increasing Force

| sensorNum | increasing pressure logarithmic trendline | slope | $R^2$ value |
|---|---|---|---|
| 0 | y = 79.532ln(x) + 35.65 | 79.532 | 0.90091 |
| 1 | y = 73.492ln(x) + 76.504 | 73.492 | 0.89734 |
| 2 | y = 71.258ln(x) + 57.888 | 71.258 | 0.88863 |
| 3 | y = 71.294ln(x) + 27.696 | 71.294 | 0.86748 |
| 4 | y = 70.829ln(x) + 38.586 | 70.829 | 0.88832 |
| 5 | y = 47.022ln(x) + 3.6772 | 47.022 | 0.89202 |
| 6 | y = 56.311ln(x) + 28.652 | 56.311 | 0.87141 |
| 7 | y = 58.188ln(x) + 24.371 | 58.188 | 0.89709 |
| 8 | y = 62.681ln(x) + 29.387 | 62.681 | 0.91059 |
| 9 | y = 60.881ln(x) + 31.336 | 60.881 | 0.89726 |
| 10 | y = 58.585ln(x) + 39.5 | 58.585 | 0.87527 |
| 11 | y = 64.575ln(x) + 17.856 | 64.575 | 0.86721 |
| 12 | y = 62.719ln(x) + 48.299 | 62.719 | 0.83935 |
| 13 | y = 76.879ln(x) + 59.35 | 76.879 | 0.88099 |
| 14 | y = 71.569ln(x) + 19.524 | 71.569 | 0.87404 |
| 15 | dead | dead | dead |
| 16 | y = 83.287ln(x) + 49.128 | 83.287 | 0.93708 |
| 17 | y = 67.349ln(x) + 48.599 | 67.349 | 0.89315 |
| 18 | y = 61.161ln(x) + 43.018 | 61.161 | 0.88636 |
| 19 | y = 60.775ln(x) + 34.902 | 60.775 | 0.88318 |
| max | | 83.287 | 0.93708 |
| min | | 47.022 | 0.83935 |
| Standard Deviation | | 8.93816348 | |

Summary of Sensor Responses for Decreasing Force

| sensorNum | decreasing pressure logarithmic trendline | slope | $R^2$ value |
|---|---|---|---|
| 0 | y = 79.647ln(x) + 50.553 | 79.647 | 0.91966 |
| 1 | y = 71.294ln(x) + 106.52 | 71.294 | 0.90667 |
| 2 | y = 65.57ln(x) + 100.88 | 65.57 | 0.90652 |
| 3 | y = 58.609ln(x) + 91.879 | 58.609 | 0.88328 |
| 4 | y = 60.21ln(x) + 100.59 | 60.21 | 0.91721 |
| 5 | y = 35.525ln(x) + 62.436 | 35.525 | 0.90237 |
| 6 | y = 50.221ln(x) + 67.851 | 50.221 | 0.89585 |
| 7 | y = 46.808ln(x) + 81.536 | 46.808 | 0.91163 |
| 8 | y = 50.769ln(x) + 91.666 | 50.769 | 0.9325 |
| 9 | y = 51.514ln(x) + 84.023 | 51.514 | 0.91998 |
| 10 | y = 46.317ln(x) + 103.76 | 46.317 | 0.90362 |
| 11 | y = 47.234ln(x) + 99.173 | 47.234 | 0.88442 |
| 12 | y = 49.917ln(x) + 111.77 | 49.917 | 0.87557 |
| 13 | y = 57.27ln(x) + 148.53 | 57.27 | 0.91038 |
| 14 | y = 55.537ln(x) + 108.86 | 55.537 | 0.89042 |
| 15 | dead | dead | dead |
| 16 | y = 60.882ln(x) + 160.6 | 60.882 | 0.93421 |
| 17 | y = 53.444ln(x) + 120.95 | 53.444 | 0.92771 |
| 18 | y = 49.68ln(x) + 105.09 | 49.68 | 0.92358 |
| 19 | y = 59.881ln(x) + 61.353 | 59.881 | 0.94787 |
| max | | 79.647 | 0.94787 |
| min | | 35.525 | 0.87557 |
| Standard Deviation | | 9.94086457 | |

What is claimed is:

1. A sensor system, comprising:
a plurality of sensors, each sensor including piezoresistive fabric and two or more conductors in contact with the piezoresistive fabric; and
sensor circuitry configured to activate and receive signals from the sensors via the conductors, each signal representing a force acting on a corresponding sensor, the sensor circuitry having associated memory and being further configured to determine a force value for each signal using sensor data stored in the memory, the sensor data including a plurality of stored values for each sensor, the plurality of stored values representing a response of the corresponding sensor to a range of forces.

2. The sensor system of claim 1, wherein the sensor circuitry is configured to determine the force value for each signal by mapping an analog-to-digital converter (ADC) value for each signal to a corresponding one of the stored values in the memory associated with the sensor circuitry.

3. The sensor system of claim 2, wherein the sensor circuitry is further configured to determine the force value for each signal by interpolation using the corresponding stored value.

4. The sensor system of claim 2, wherein the ADC values are generated by an ADC converter, and wherein the memory includes one of the stored values for each sensor for each possible output value of the ADC converter.

5. The sensor system of claim 1, wherein the sensor circuitry is configured to determine the force value corresponding to a sensor of interest by generating a first value with the sensor of interest activated, generating a second value with remaining sensors activated, and processing the first and second values to account for parasitic resistances of the plurality of sensors.

6. The sensor system of claim 1, wherein the sensor circuitry is further configured to process the signals corresponding to multiple sensors to determine a speed and a direction represented by changes in the corresponding forces.

7. The sensor system of claim 1, wherein the plurality of sensors is configured on the piezoresistive fabric, and wherein the conductors are printed, screened, or deposited on the piezoresistive fabric.

8. The sensor system of claim 7, wherein the sensor circuitry is connected to the conductors of the sensors via routing conductors, and wherein the routing conductors are insulated from the piezoresistive fabric.

9. The sensor system of claim 7, further comprising a dielectric substrate, wherein the dielectric substrate is secured to the piezoresistive fabric only at locations on the piezoresistive fabric where there are no sensors.

10. The sensor system of claim 7, wherein the piezoresistive fabric is included among a plurality of layers, the plurality of layers further including top and bottom layers that combine to enclose and provide environmental protection to the piezoresistive fabric.

11. The sensor system of claim 1, wherein the plurality of sensors is configured on a dielectric substrate, wherein the conductors are printed, screened, or deposited on the dielectric substrate.

12. The sensor system of claim 11, wherein the sensor circuitry is connected to the conductors of the sensors via routing conductors, and wherein the routing conductors are insulated from the piezoresistive fabric.

13. The sensor system of claim 11, wherein the dielectric substrate is secured to the piezoresistive fabric only at locations on the piezoresistive fabric where there are no sensors.

14. The sensor system of claim 11, wherein the piezoresistive fabric and the dielectric substrate are included among a plurality of layers, the plurality of layers further including top and bottom layers that combine to enclose and provide environmental protection to the piezoresistive fabric and the dielectric substrate.

15. The sensor system of claim 1, wherein the plurality of sensors includes a plurality of subsets, each of which includes multiple sensors, and wherein the sensor circuitry is configured to simultaneously activate and a receive signals from all of the sensors in each subset.

16. The sensor system of claim 1, wherein the response of each sensor encompasses a range of about 50 grams to about 100 kilograms.

17. A sensor system, comprising:
a plurality of sensors, each sensor comprising two or more conductors printed, screened, or deposited on piezoresistive fabric; and
sensor circuitry configured to activate and receive signals from the sensors via the conductors, each signal representing a force acting on a corresponding sensor, the sensor circuitry being further configured to determine a force value for each signal by mapping an analog-to-digital converter (ADC) value for each signal to at least one of a plurality of stored values for the corresponding sensor in memory associated with the sensor circuitry, the plurality of stored values for each sensor representing a response of the corresponding sensor to a range of forces.

18. The sensor system of claim 17, wherein the sensor circuitry is further configured to determine the force value for each signal by interpolation using the at least one of the plurality of stored values.

19. The sensor system of claim 17, wherein the ADC values are generated by an ADC converter, and wherein the plurality of stored values for each sensor includes a stored value for each possible output value of the ADC converter.

20. The sensor system of claim 17, wherein the sensor circuitry is configured to determine the force value corresponding to a sensor of interest by generating a first value with the sensor of interest activated, generating a second value with remaining sensors activated, and processing the first and second values to account for parasitic resistances of the plurality of sensors.

21. The sensor system of claim 17, wherein the sensor circuitry is further configured to process the signals corresponding to multiple sensors to determine a speed and a direction represented by changes in the corresponding forces.

22. The sensor system of claim 17, wherein the sensor circuitry is connected to the conductors of the sensors via routing conductors, and wherein the routing conductors are insulated from the piezoresistive fabric.

23. The sensor system of claim 17, further comprising a dielectric substrate, wherein the dielectric substrate is secured to the piezoresistive fabric only at locations on the piezoresistive fabric where there are no sensors.

24. The sensor system of claim 17, wherein the piezoresistive fabric is included among a plurality of layers, the plurality of layers further including top and bottom layers that combine to enclose and provide environmental protection to the piezoresistive fabric.

25. A sensor system, comprising:
a plurality of sensors, each sensor comprising two or more conductors printed, screened, or deposited on a dielectric substrate, and piezoresistive fabric in contact with the conductors; and
sensor circuitry configured to activate and receive signals from the sensors via the conductors, each signal representing a force acting on a corresponding sensor, the sensor circuitry being further configured to determine a force value for each signal by mapping an analog-to-digital converter (ADC) value for each signal to at least one of a plurality of stored values for the corresponding sensor in memory associated with the sensor circuitry, the plurality of stored values for each sensor representing a response of the corresponding sensor to a range of forces.

26. The sensor system of claim 25, wherein the sensor circuitry is further configured to determine the force value for each signal by interpolation using the at least one of the plurality of stored values.

27. The sensor system of claim 25, wherein the ADC values are generated by an ADC converter, and wherein the plurality of stored values for each sensor includes a stored value for each possible output value of the ADC converter.

28. The sensor system of claim 25, wherein the sensor circuitry is configured to determine the force value corresponding to a sensor of interest by generating a first value with the sensor of interest activated, generating a second value with remaining sensors activated, and processing the first and second values to account for parasitic resistances of the plurality of sensors.

29. The sensor system of claim 25, wherein the sensor circuitry is further configured to process the signals corresponding to multiple sensors to determine a speed and a direction represented by the corresponding forces.

30. The sensor system of claim 25, wherein the piezoresistive fabric and the dielectric substrate are included among a plurality of layers, the plurality of layers further including top and bottom layers that combine to enclose and provide environmental protection to the piezoresistive fabric and the dielectric substrate.

* * * * *